(12) United States Patent
Yue et al.

(10) Patent No.: US 12,541,181 B2
(45) Date of Patent: Feb. 3, 2026

(54) GENERATING METHOD, PROCESSING METHOD AND EXECUTING METHOD OF DATA AND DEVICE

(71) Applicant: TINECO INTELLIGENT TECHNOLOGY CO., LTD., Suzhou (CN)

(72) Inventors: Qiang Yue, Suzhou (CN); Hongbin Jiang, Suzhou (CN); Min Zhang, Suzhou (CN); Rui Chen, Suzhou (CN); Wenjing Pu, Suzhou (CN); Hao Chen, Suzhou (CN); Xisheng Xu, Suzhou (CN); Rendi Wu, Suzhou (CN); Zhongguan Sui, Jiangsu (CN); Yifei Xia, Suzhou (CN); Min Yang, Suzhou (CN); Xi Wang, Suzhou (CN); Weidong Zhang, Suzhou (CN); Yong Chen, Suzhou (CN)

(73) Assignee: TINECO INTELLIGENT TECHNOLOGY CO., LTD., Suzhou (CN)

( * ) Notice: Subject to any disclaimer, the term of this patent is extended or adjusted under 35 U.S.C. 154(b) by 545 days.

(21) Appl. No.: 17/916,013

(22) PCT Filed: Apr. 6, 2021

(86) PCT No.: PCT/CN2021/085677
§ 371 (c)(1),
(2) Date: Sep. 29, 2022

(87) PCT Pub. No.: WO2021/204115
PCT Pub. Date: Oct. 14, 2021

(65) Prior Publication Data
US 2023/0168651 A1 Jun. 1, 2023

(30) Foreign Application Priority Data

Apr. 7, 2020 (CN) .......................... 202010266397.4
Apr. 7, 2020 (CN) .......................... 202010266398.9
(Continued)

(51) Int. Cl.
*G05B 19/042* (2006.01)
*G16Y 10/80* (2020.01)
*G16Y 40/30* (2020.01)

(52) U.S. Cl.
CPC .... *G05B 19/042* (2013.01); *G05B 2219/2643* (2013.01); *G16Y 10/80* (2020.01); *G16Y 40/30* (2020.01)

(58) Field of Classification Search
CPC ........... A47J 36/321; G05B 2219/2643; G16Y 10/80; G16Y 40/30; H04L 12/282; H04L 2012/285
See application file for complete search history.

(56) References Cited

U.S. PATENT DOCUMENTS 5,044,262 A 9/1991 Burkett et al.
10,130,218 B2 11/2018 Xu et al.
(Continued)

FOREIGN PATENT DOCUMENTS

CN 102824098 A 12/2012
CN 103110340 A 5/2013
(Continued)

OTHER PUBLICATIONS

Chinese Office Action issued in corresponding application No. 202010317552.0, dated Jan. 24, 2022.
(Continued)

*Primary Examiner* — Vincent H Tran
(74) *Attorney, Agent, or Firm* — Maschoff Brennan

(57) ABSTRACT

Embodiments of the present disclosure provide a generating method of data, a processing method of data, an executing
(Continued)

method of data and device thereof. A user can create required structured data by means of a terminal device, even if the user does not understand the working principle of an Internet-of-Things device and an instruction code. The terminal device can convert execution sequence data into structured data that can be executed by the Internet-of-Things device and provide the structured data for the Internet-of-Things device, so that the Internet-of-Things device can directly execute a corresponding operation according to a state control instruction in the structured data, thereby improving the structured data custom extension capability of the Internet-of-Things device while meeting user requirements.

7 Claims, 26 Drawing Sheets

(30) Foreign Application Priority Data

| | | |
|---|---|---|
| Apr. 7, 2020 | (CN) | 202010266883.6 |
| Apr. 21, 2020 | (CN) | 202010317552.0 |
| Jul. 9, 2020 | (CN) | 202010658355.5 |
| Aug. 7, 2020 | (CN) | 202010788884.7 |
| Oct. 30, 2020 | (CN) | 202011194272.1 |
| Oct. 30, 2020 | (CN) | 202011198098.8 |

(56) References Cited

U.S. PATENT DOCUMENTS

| | | | |
|---|---|---|---|
| 10,198,422 B2 | 2/2019 | Lee | |
| 10,360,812 B2 | 7/2019 | Koennings et al. | |
| 2011/0070340 A1 | 3/2011 | Pechaigner et al. | |
| 2011/0132201 A1* | 6/2011 | Richardson | F24C 7/08 99/325 |
| 2015/0119003 A1* | 4/2015 | Park | H04W 4/00 455/414.1 |
| 2015/0142889 A1 | 5/2015 | Sakata et al. | |
| 2015/0208858 A1* | 7/2015 | Robbins | A47J 27/002 426/231 |
| 2016/0065653 A1* | 3/2016 | Chen | H04L 41/0813 715/735 |
| 2016/0381742 A1* | 12/2016 | Banavara | H05B 6/6438 99/331 |
| 2017/0161290 A1* | 6/2017 | Kuroyama | G06Q 10/087 |
| 2017/0224148 A1 | 8/2017 | Koennings et al. | |
| 2018/0008089 A1* | 1/2018 | Jiang | A47J 36/06 |
| 2018/0240357 A1 | 8/2018 | Trench Roca | |
| 2019/0034556 A1 | 1/2019 | Gu et al. | |
| 2019/0053332 A1* | 2/2019 | Cheng | F24C 7/046 |
| 2019/0285483 A1* | 9/2019 | Cheng | F24C 7/085 |
| 2019/0313844 A1* | 10/2019 | Nadendla | A47J 37/108 |
| 2020/0234702 A1* | 7/2020 | Shin | G10L 15/28 |
| 2020/0241847 A1* | 7/2020 | Zhou | G06F 16/367 |
| 2021/0089943 A1* | 3/2021 | Choi | G06V 20/20 |
| 2022/0167788 A1* | 6/2022 | Oh | G05B 19/042 |
| 2022/0188948 A1* | 6/2022 | Sagong | H05B 6/64 |

FOREIGN PATENT DOCUMENTS

| | | |
|---|---|---|
| CN | 103442048 A | 12/2013 |
| CN | 103892695 A | 7/2014 |
| CN | 104106973 A | 10/2014 |
| CN | 104407533 A | 3/2015 |
| CN | 104580290 A | 4/2015 |
| CN | 105204451 A | 12/2015 |
| CN | 105652735 A | 6/2016 |
| CN | 105981999 A | 10/2016 |
| CN | 106073457 A | 11/2016 |
| CN | 106288634 A | 1/2017 |
| CN | 106407658 A | 2/2017 |
| CN | 106483908 A | 3/2017 |
| CN | 106647469 A | 5/2017 |
| CN | 106713457 A | 5/2017 |
| CN | 106955013 A | 7/2017 |
| CN | 107203644 A | 9/2017 |
| CN | 107357665 A | 11/2017 |
| CN | 107423421 A | 12/2017 |
| CN | 107426262 A | 12/2017 |
| CN | 107561958 A | 1/2018 |
| CN | 107621789 A | 1/2018 |
| CN | 107664958 A | 2/2018 |
| CN | 107664959 A | 2/2018 |
| CN | 107703830 A | 2/2018 |
| CN | 107733783 A | 2/2018 |
| CN | 107908670 A | 4/2018 |
| CN | 108009266 A | 5/2018 |
| CN | 108123989 A | 6/2018 |
| CN | 108427325 A | 8/2018 |
| CN | 108552936 A | 9/2018 |
| CN | 108667905 A | 10/2018 |
| CN | 109044113 A | 12/2018 |
| CN | 109815375 A | 5/2019 |
| CN | 109884925 A | 6/2019 |
| CN | 110132890 A | 8/2019 |
| CN | 110135646 A | 8/2019 |
| CN | 110141108 A | 8/2019 |
| CN | 110477735 A | 11/2019 |
| CN | 110547667 A | 12/2019 |
| CN | 110584451 A | 12/2019 |
| CN | 110677267 A | 1/2020 |
| CN | 209915737 U | 1/2020 |
| CN | 110794696 A | 2/2020 |
| CN | 110851475 A | 2/2020 |
| CN | 110853732 A | 2/2020 |
| CN | 110874087 A | 3/2020 |
| CN | 110929147 A | 3/2020 |
| CN | 111110005 A | 5/2020 |
| CN | 112383454 A | 2/2021 |
| CN | 112383455 A | 2/2021 |
| IN | 201637006761 A | 6/2016 |
| IN | 109567565 A | 4/2019 |
| JP | 2001-258726 A | 9/2001 |
| WO | 2007/035851 A2 | 3/2007 |
| WO | 2016/138828 A1 | 9/2016 |
| WO | 2017/135742 A1 | 8/2017 |

OTHER PUBLICATIONS

Chinese Office Action issued in corresponding application No. 202010788884.7, dated Jan. 19, 2023.
Chinese Office Action issued in corresponding application No. 202010266397.4, dated Jan. 20, 2023.
Chinese Office Action issued in corresponding application No. 202010317552.0, dated Feb. 28, 2023.
Chinese Office Action issued in corresponding application No. 202010266883.6, dated May 8, 2023.
Chinese Office Action issued in corresponding application No. 202010266398.9, dated May 27, 2023.
Extended European Search Report dated Apr. 2, 2024 as received in Application No. 21785372.0.
Chinese Office Action issued in corresponding application No. 202010317552.0, dated Nov. 24, 2022.
CN OA in application No. 202010266397.4 dated Jan. 13, 2022.
CN OA in application No. 202010266397.4 dated Jun. 10, 2022.
CN OA in application No. 202010266397.4 dated Sep. 23, 2022.
CN OA in application No. 202010788884.7 dated Mar. 25, 2022.
CN OA in application No. 202010788884.7 dated Aug. 22, 2022.
CN OA in application No. 202011194272.1 dated Oct. 28, 2021.
CN OA in application No. 202011198098.8 dated Oct. 12, 2021.
CN OA in application No. 202011198098.8 dated May 9, 2022.
CN Office Action dated May 30, 2024 as received in Application No. 202010658355.5.

* cited by examiner

```
┌─────────────────────────────────────────────────────────────┐    P11
│ Generating candidate recipes in a recipe creation process,   │
│ and displaying the candidate recipes to a user               │
└─────────────────────────────────────────────────────────────┘
                              │
                              ▼
┌─────────────────────────────────────────────────────────────┐    P13
│ Receiving uploaded recipes edited by the user with respect   │
│ to the candidate recipes, and taking the uploaded recipes    │
│ as recipes of the user in the recipe creation process        │
└─────────────────────────────────────────────────────────────┘
```

FIG. 4a

| Seasoning state | | | | | |
|---|---|---|---|---|---|
| Operation step | Operation state | Seasoning preparation | Adding seasonings | Seasoning weight | Actual operation of user |
| 1 | 0x01: Material preparation process | 1: Seasoning 1 | Vegetable oil | 20 | vegetable oil 20 g |
| 2 | 0x01: Material preparation process | 2: Seasoning 2 | Cooking wine | 30 | cooking wine 30 g |
| 3 | 0x01: Material preparation process | 3: Seasoning 3 | Shredded ginger | 20 | shredded ginger 20 g |
| 3 | 0x01: Material preparation process | 3: Seasoning 3 | Green onion | 20 | green onion 20 g |
| 4 | 0x01: Material preparation process | 4: Seasoning 4 | Ground pepper | 1 | ground pepper 1 g |
| 4 | 0x01: Material preparation process | 4: Seasoning 4 | White sugar | 15 | white sugar 15 g |
| 4 | 0x01: Material preparation process | 4: Seasoning 4 | Light soy sauce | 25 | light soy sauce 25 g |
| 4 | 0x01: Material preparation process | 4: Seasoning 4 | Cooking wine | 30 | cooking wine 30 g |
| 5 | 0x01: Material preparation process | 5: Seasoning 5 | Salt | 2 | salt 2 g |

FIG. 4b

| Cooking stage | | | | | | | |
|---|---|---|---|---|---|---|---|
| Operation step | Operation state | Pot cover state | Stirring state | Heating power | Heating time | Adding seasonings | Actual operation of the device |
| 1 | 0x03: Heating process | 0x02: Closing cover | 0x00: Not stirring | 0x0A 1800W | 60s | 0: not adding seasonings | Pot body preheating |
| 2 | 0x04: Material adding process | 0x00: Maintaining state | 0x00: Not stirring | 0x0A 1800W | 5s | 1: seasoning 1 | Vegetable oil 20 g |
| 3 | 0x02: Pot cover control process | 0x01: Opening cover | 0x00: Not stirring | 0x0A 1800W | 5s | 0: not adding seasonings | Opening cover |
| 4 | 0x06: Waiting process | 0x00: Maintaining state | 0x00: Not stirring | 0x05 900W | | 0: not adding seasonings | Please add potatoes 500 g |
| 5 | 0x02: Pot cover control process | 0x02: Closing cover | 0x00: Not stirring | 0x0A 1800W | 5s | 0: not adding seasonings | Confirm to close the cover |
| 6 | 0x03: Heating process | 0x00: Maintaining state | 0x01: Stirring | 0x0A 1800W | 10s | 0: not adding seasonings | Starting stirring |
| 7 | 0x04: Material adding process | 0x00: Maintaining state | 0x01: Stirring | 0x0A 1800W | 10s | 2: seasoning 2 | Cooking wine 30 g |
| 8 | 0x04: Material adding process | 0x00: Maintaining state | 0x01: Stirring | 0x0A 1800W | 40s | 3: seasoning 3 | Shredded ginger 20 g and green onion 20 g |
| 9 | 0x04: Material adding process | 0x00: Maintaining state | 0x01: Stirring | 0x0A 1800W | 240s | 4: seasoning 4 | Ground pepper 1 g, white sugar 15 g, light soy sauce 25 g and cooking wine 30 g |
| 10 | 0x04: Material adding process | 0x00: Maintaining state | 0x01: Stirring | 0x0A 1800W | 40s | 5: seasoning 5 | Salt 2 g |
| 11 | 0x03: Heating process | 0x00: Maintaining state | 0x00: Not stirring | 0x04 800W | 110s | 0: not adding seasonings | Simmering for reduction |
| 12 | 0x03: Heating process | 0x01: Opening cover | 0x00: Not stirring | 0x01 500W | | 0: not adding seasonings | Maintaining the temperature after completion of cooking |
| 13 | 0x02: Pot cover control process | 0x02: Closing cover | 0x00: Not stirring | 0x00 Not heating | 5s | 0: not adding seasonings | Completing cooking |

FIG. 4c

FIG. 4d
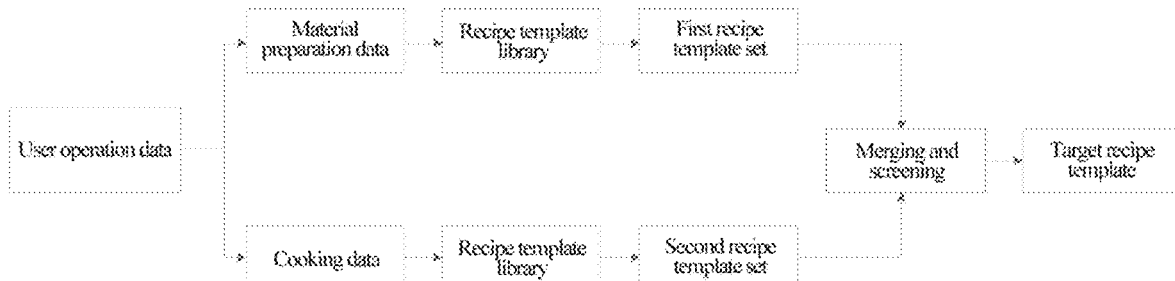
FIG. 4e
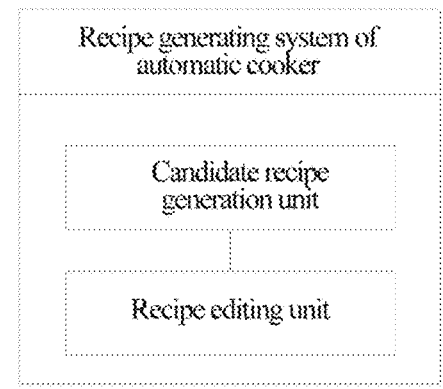
FIG. 4f

GENERATING METHOD, PROCESSING METHOD AND EXECUTING METHOD OF DATA AND DEVICE

CROSS-REFERENCE TO RELATED APPLICATION

The present disclosure claims priority to Chinese Patent Application No. 2020102668836 filed on Apr. 7, 2020 and entitled "Recipe Generation and Execution Method and System for Automatic Cooker and Automatic Cooker", Chinese Patent Application No. 2020102663989 filed on Apr. 7, 2020 and entitled "Structured Recipe and Cooking Method and Apparatus based on Structured Recipe", Chinese Patent Application No. 2020102663974 filed on Apr. 7, 2020 and entitled "Automatic Cooking Method and System for Automatic Cooker and Automatic Cooker", Chinese Patent Application No. 2020103175520 filed on Apr. 21, 2020 and entitled "Intelligent Cooking Method, Apparatus and System and Intelligent Cooker", Chinese Patent Application No. 2020106583555 filed on Jul. 9, 2020 and entitled "Socialized Dish Cooking Method and Apparatus", Chinese Patent Application No. 2020107888847 filed on Aug. 7, 2020 and entitled "Recipe Generation and Cooking Step Recommendation Method and System for Automatic Cooker", Chinese Patent Application No. 2020111980988 filed on Oct. 30, 2020 and entitled "Data Generation Method and Execution Method and Device", and Chinese Patent Application No. 2020111942721 filed on Oct. 30, 2020 and entitled "Data Processing and Execution Method and Device", which are incorporated herein by reference in their entireties.

FIELD

The present disclosure relates to the technical field of intelligent household appliances, and particularly relates to a generating method, processing method and executing method of data and device.

BACKGROUND

With the rapid development of artificial intelligence, more and more intelligent machines are used in people's lives, such as intelligent automatic cookers. Users may complete automatic cooking procedures with few participation steps by using the intelligent automatic cookers, thereby bringing great convenience to cooking.

In the prior art, some structured data are preset in the intelligent machines. Users may select corresponding structured data from the preset structured data, and corresponding operation tasks are automatically executed by the intelligent machines according to the structured data selected by the users. However, there is a limited quantity of preset structured data in the intelligent machines. When the users want to make the intelligent machines execute operation tasks other than the structured data, the intelligent machines cannot complete automatic operations. Thus, operation requirements of the users cannot be met.

SUMMARY

The present disclosure provides a generating method and an executing method of data and device that can solve or partially solve the above problems.

An embodiment of the present disclosure provides a generating method of data. The method comprises: acquiring object feature data and execution sequence data in response to an input operation of a user on a data generation interface; converting the execution sequence data into an executable state control instruction of an Internet-of-Things device, and generating structured data according to the state control instruction and the object feature data; and transmitting the structured data to the Internet-of-Things device to enable the Internet-of-Things device to execute a corresponding operation according to the structured data.

Another embodiment of the present disclosure provides an executing method of data applicable to an Internet-of-Things device. The method comprises: receiving structured data transmitted by a terminal device, wherein the structured data comprises object feature data, a state control instruction to the Internet-of-Things device and an association relationship therebetween; executing a corresponding operation according to the state control instruction, the object feature data and the association relationship therebetween; and acquiring execution state prompt information that corresponds to the state control instruction, and outputting the execution state prompt information.

Another embodiment of the present disclosure provides a terminal device. The terminal device comprises: a display screen, a processor and a memory storing a computer program; the display screen is used for displaying a data generation interface; the processor is used for executing the computer program for: acquiring object feature data and execution sequence data in response to an input operation of a user on a data generation interface; converting the execution sequence data into an executable state control instruction of an Internet-of-Things device, and generating structured data according to the state control instruction and the object feature data; and transmitting the structured data to the Internet-of-Things device to enable the Internet-of-Things device to execute a corresponding operation according to the structured data.

Another embodiment of the present disclosure provides an Internet-of-Things device. The Internet-of-Things device comprises: a display screen, a processor and a memory storing a computer program; the processor is used for executing the computer program for: receiving structured data transmitted by a terminal device, wherein the structured data comprises object feature data, a state control instruction to the Internet-of-Things device and an association relationship therebetween; executing a corresponding operation according to the state control instruction, the object feature data and the association relationship therebetween; and acquiring execution state prompt information that corresponds to the state control instruction, and outputting the execution state prompt information to the display screen; and the display screen is used for displaying the execution state prompt information to a user for enabling the user to know the current execution state.

In one technical solution provided by embodiments of the present disclosure, a user may make desired structured data that may be executed by an Internet-of-Things device through a terminal device. The user only needs to provide the own familiar object feature data and execution sequence data through a data generation interface provided by the terminal device. The structured data may be made without understanding operating principles and instruction codes of the Internet-of-Things device; and the structured data is simple in making process and low in cost. However, after converting the execution sequence data into the executable state control instruction of the Internet-of-Things device, the terminal device provides structured data including state control instruction information for the Internet-of-Things device. Thus, the Internet-of-Things device can directly execute corresponding operations according to the state control instruction in the structured data, thereby meeting cooking requirements of the user and further improving structured data custom extension capability of the Internet-of-Things device.

Embodiments of the present disclosure further provide a processing method of data, an executing method of data and device thereof.

Another embodiment of the present disclosure provides a processing method of data. The method comprises: acquiring a plurality of structured data, wherein the plurality of structured data comprise object feature data; determining an execution sequence of the plurality of structured data according to similarity of the object feature data among the plurality of structured data; and controlling the Internet-of-Things device to execute corresponding operations in accordance with the plurality of structured data according to the execution sequence.

Another embodiment of the present disclosure provides an executing method of data. The method comprises: acquiring current structured data, wherein the current structured data comprises object feature data; and executing a corresponding operation according to the current structured data if similarity of object feature data between the current structured data and the previous structured data meets set similarity conditions.

Another embodiment of the present disclosure provides a terminal device. The terminal device comprises: a display screen, a processor and a memory storing a computer program; the display screen is used for displaying a data list; the processor is used for executing the computer program for: acquiring a plurality of structured data in response to a selection operation of a user, wherein the plurality of structured data comprise object feature data; determining an execution sequence of the plurality of structured data according to similarity among object feature data in the plurality of structured data; and controlling the Internet-of-Things device to execute corresponding operations in accordance with the plurality of structured data according to the execution sequence.

Another embodiment of the present disclosure provides an Internet-of-Things device. The Internet-of-Things device comprises: a display screen, a processor and a memory storing a computer program; the processor is used for executing the computer program for: receiving current structured data transmitted by a terminal device, wherein the current structured data comprises object feature data; and executing a corresponding operation according to the current structured data when similarity of object feature data between the current structured data and the previous structured data meets a set similarity condition.

In technical solutions provided by the embodiments of the present disclosure, the terminal device may intelligently sort the plurality of structured data according to the similarity of the object feature data among the plurality of structured data, and instruct the Internet-of-Things device to execute corresponding operations in accordance with the plurality of structured data according to the sequenced sequence. Due to higher similarity of object feature data between adjacent sequenced structured data, some resources may be shared when the structured data with high similarity are executed together, thereby improving the execution efficiency.

Embodiments of the present disclosure further provide a generating method and system of structured data for an Internet-of-Things device, an executing method and system of structured data, and an Internet-of-Things device.

Another embodiment of the present disclosure provides a generating method of structured data for an Internet-of-Things device. The method comprises: setting execution flow data of a task object in the structured data, and collecting user operation data and Internet-of-Things device operation data that correspond to the execution flow data; and determining condition parameters that correspond to the execution flow data of the task object according to the user operation data and the Internet-of-Things device operation data; and generating structured data according to each of the condition parameters.

Another embodiment of the present disclosure provides a generating system of structured data for an Internet-of-Things device. The system comprises: a data collection unit, used for setting execution flow data of a task object in the structured data, and collecting user operation data and Internet-of-Things device operation data that correspond to the execution flow data; and a structured data generation unit, used for determining condition parameters that correspond to the execution flow data of the task object according to the user operation data and the Internet-of-Things device operation data; and generating the structured data according to the condition parameters that correspond to the execution flow data of each task object.

Another embodiment of the present disclosure provides an Internet-of-Things device. The Internet-of-Things device comprises a memory and a processor, wherein the memory is used for storing a computer program, and the computer program is used for realizing the following functions when executed by the processor: setting execution flow data of a task object in the structured data, and collecting user operation data and Internet-of-Things device operation data that correspond to the execution flow data; and determining condition parameters that correspond to the execution flow data of the task object according to the user operation data and the Internet-of-Things device operation data; and generating the structured data according to the condition parameters that correspond to the execution flow data of each task object.

Another embodiment of the present disclosure provides an executing method of structured data for an Internet-of-Things device. The method comprises: acquiring structured data, and identifying execution flow data of a task object comprised in the structured data; parsing execution flow data of a current task object to acquire user operation data that corresponds to the execution flow data of the current task object and/or the Internet-of-Things device operation data; and executing the Internet-of-Things device operation data, and/or displaying the user operation data to the user, and receiving an operation fed back by the user, so as to complete the execution flow data of the current task object.

Another embodiment of the present disclosure provides an executing system of structured data for an Internet-of-Things device. The system comprises: a structured data analysis unit, used for acquiring structured data and identifying execution flow data of a task object comprised in the structured data; a data acquisition unit, used for parsing execution flow data of a current task object to acquire user operation data that corresponds to the execution flow data of the current task object and/or the Internet-of-Things device operation data; and an execution unit, used for executing the Internet-of-Things device operation data, and/or displaying the user operation data to the user, and receiving an operation fed back by the user, so as to complete execution flow data of the current task object.

Another aspect of the present disclosure further provides an Internet-of-Things device. The Internet-of-Things device comprises a memory and a processor, wherein the memory is used for storing a computer program, and the computer program is used for realizing the following functions when executed by the processor: acquiring structured data and identifying execution flow data of a task object comprised in the structured data; parsing execution flow data of a current task object to acquire user operation data that corresponds to the execution flow data of the current task object and/or the Internet-of-Things device operation data; and executing the Internet-of-Things device operation data, and/or displaying the user operation data to the user, and receiving an operation fed back by the user, so as to complete execution flow data of the current task object.

It may be seen from the above that, the structured data may be freely generated by the user in the technical solutions provided by one or more embodiments of the present disclosure. Specifically, the execution flow data of each task object in the structured data may be set by the Internet-of-Things device according to the execution process of the task object. When the Internet-of-Things device is used by the user, the Internet-of-Things device may collect the user operation data that corresponds to the execution flow data of each task object and/or the own operation data for the Internet-of-Things device. For example, the user operation data may be as follows: the Internet-of-Things device is controlled to add the first object, and an execution temperature, execution time and the like are set. The own operation data for the Internet-of-Things device may be an operation state of the second component, a task execution mode in the second component, etc. The condition parameters in the execution flow data of each task object may be determined by summarizing the user operation data and the Internet-of-Things device operation data, and these condition parameters may be finally used for generating the structured data. Thus, a wide variety of structured data may be freely generated by parsing the execution process of the task object, not only limited to built-in limited structured data for the Internet-of-Things device.

In addition, when the Internet-of-Things device is used by the user, structured data shared by others may be acquired, and then the acquired structured data may be analyzed by the Internet-of-Things device so as to identify the execution flow data of a task object contained in the structured data. The user operation data that corresponds to the execution flow data of each task object and/or the Internet-of-Things device operation data may be determined by parsing the execution flow data of the task object. The user operation data in the scenario may be displayed to the user by the Internet-of-Things device so as to remind the user of executing operations of adding a second object, operating a second component, etc. The Internet-of-Things device operation data may be automatically executed by the Internet-of-Things device. For example, the first object is automatically added; the execution temperature and execution time are automatically set, etc. In this way, the target task may be finally completed by parsing the execution flow data of the task object in the structured data one by one and by virtue of cooperation between the user and the Internet-of-Things device. Therefore, the production efficiency of the target task is improved, and the produced target task may be matched with the structured data, thereby achieving a better execution effect of the task object.

The embodiments of the present disclosure further provide a generating method of structured data for an Internet-of-Things device, a recommending method and system of an operation step and an Internet-of-Things device. Thus, the generation efficiency of the structured data may be improved.

Another embodiment of the present disclosure provides a generating method of structured data for an Internet-of-Things device. The method comprises: generating candidate structured data in a structured data creation process, and displaying the candidate structured data to a user; receiving uploaded structured data edited by the user with respect to the candidate structured data, and taking the uploaded structured data as structured data generated by the user in a structured data creation process.

Another embodiment of the present disclosure provides a generating system of structured data for an Internet-of-Things device. The system comprises: a candidate structured data generating unit, used for generating candidate structured data in a structured data creation process and displaying the candidate structured data to a user; and a structured data editing unit, used for receiving uploaded structured data edited by the user with respect to the candidate structured data, and taking the uploaded structured data as structured data generated by the user in a structured data creation process.

Another embodiment of the present disclosure provides an Internet-of-Things device. The Internet-of-Things device comprises a memory and a processor, wherein the memory is used for storing a computer program, and the computer program is used for realizing the following functions when executed by the processor: generating candidate structured data in a structured data creation process, and displaying the candidate structured data to a user; receiving uploaded structured data edited by the user with respect to the candidate structured data, and taking the uploaded structured data as structured data generated by the user in a structured data creation process.

Another embodiment of the present disclosure provides a recommending method of a job for an Internet-of-Things device. The method comprises: acquiring operation data of a user in a structured data creation process, wherein the operation data comprises at least one of object data and job data; comparing the operation data in a preset structured data template library to determine a target structured data template matched with the operation data, and recommending a job step in the target structured data template to the user; and judging whether to continuously recommend a subsequent job step in the target structured data template to the user according to whether the user adopts an instruction of the job step.

Another embodiment of the present disclosure provides a recommending system of a job for an Internet-of-Things device. The system comprises: an operation data acquisition unit, used for acquiring operation data of a user in a structured data creation process, wherein the operation data comprises at least one of object data and job data; a job step recommendation unit, used for comparing the operation data in a preset structured data template library to determine a target structured data template matched with the operation data, and recommending a job step in the target structured data template to the user; and a judgment unit, used for judging whether to continuously recommend a subsequent job step in the target structured data template to the user according to whether the user adopts an instruction of the job step.

Another embodiment of the present disclosure provides an Internet-of-Things device. The Internet-of-Things device comprises a memory and a processor, wherein the memory is used for storing a computer program, and the computer program is used for realizing the following functions when executed by the processor: acquiring operation data of a user in a structured data creation process, wherein the operation data comprises at least one of object data and job data; comparing the operation data in a preset structured data template library to determine a target structured data template matched with the operation data, and recommending a job step in the target structured data template to the user; and judging whether to continuously recommend a subsequent job step in the target structured data template to the user according to whether the user adopts an instruction of the job step.

It may be seen from the above that, in the technical solutions provided by one or more embodiments of the present disclosure, the structured data may be independently created by the user when the Internet-of-Things device is used. In the structured data creation process, the candidate structured data containing various job parameters may be generated by the Internet-of-Things device. The Internet-of-Things device may provide the candidate structured data for the user. The user may confirm the candidate structured data as the finally generated structured data according to own requirements, and may also adjust the steps or parameters in the candidate structured data so as to obtain the finally generated structured data. It may be seen from the above that, in the structured data creation process, the user only needs to carry out normal operation procedures without needing too many additional operations, thereby greatly simplifying the structured data generation process and improving the structured data generation efficiency.

Embodiments of the present disclosure further provide structured data, and an executing method and apparatus of a task based on the structured data.

Another embodiment of the present disclosure provides structured data. The structured data comprises step execution information and export information, wherein: the step execution information records all execution flow data of a target task; each of the execution flow data corresponds to one frame of character string; and each frame of the character string is composed of a hardware recognizable character group corresponding to each piece of detailed information in the execution flow data; and the export information at least comprises structured data description information and manual operation prompt information that correspond to the target task.

Another embodiment of the present disclosure provides an executing method of a task based on structured data. The method comprises: receiving an execution instruction of a target task, and downloading structured data of the target task from a server, wherein the structured data comprises step execution information and export information; parsing the export information, and outputting structured data description information or manual operation prompt information in the export information when an information output instruction is received; parsing the step execution information, and acquiring a character string that corresponds to all execution flow data of the target task; and executing the target task based on a hardware recognizable character group that corresponds to each piece of detailed information comprised in the character string.

Another embodiment of the present disclosure provides an executing apparatus of a task based on structured data. The apparatus comprises: a structured data acquisition module, used for receiving an execution instruction of a target task and downloading structured data of the target task from a server, wherein the structured data comprises step execution information and export information; a structured data parsing module, used for parsing the export information, parsing the step execution information, and acquiring character strings corresponding to all the execution flow data of the target task; an information output module, used for outputting structured data description information or manual operation prompt information in the export information when an information output instruction is received; and a target task execution module, used for executing the target task based on a hardware recognizable character group that corresponds to each piece of detailed information comprised in the character string.

The structured data shown in the embodiments of the present disclosure is composed of two major parts such as the step execution information and the export information. The execution flow data of the target task is recorded by the character string composed of the hardware recognizable character group in the step execution information; and the export information comprises structured data description information and manual operation prompt information corresponding to the target task. Thus, the structured data is structured. On the one hand, all the step details in the target task execution process may be restored by parsing the character string, and then the execution process of the target task may be automatically completed thereby without excessive manual participation; on the other hand, a kitchen robot may intuitively and effectively display details of the target task by outputting the export information. Further, when the structured data is generated in a structured form, generation and management of the structured data may be facilitated.

The embodiments of the present disclosure further provide an executing method and system of data for an Internet-of-Things device and the Internet-of-Things device. Thus, the production efficiency of a target task may be improved.

Another embodiment of the present disclosure provides an executing method of data for an Internet-of-Things device. The method comprises: loading structured data, and identifying condition parameters comprised in the structured data; generating execution flow data of the structured data based on the condition parameters, wherein the execution flow data comprises user operation data and Internet-of-Things device operation data; and executing the Internet-of-Things device operation data, and/or displaying the user operation data to a user, and receiving an operation fed back by the user feedback to complete the execution process of the structured data.

Another embodiment of the present disclosure provides an executing system of data for an Internet-of-Things device. The system comprises: a structured data analysis unit, used for loading structured data and identifying condition parameters comprised in the structured data; a data acquisition unit, used for generating execution flow data of the structured data based on the condition parameters, wherein the execution flow data comprises user operation data and Internet-of-Things device operation data; and an execution unit, used for executing the Internet-of-Things device operation data, and/or displaying the user operation data to a user, and receiving an operation fed back by the user to complete an execution process of the structured data.

Another embodiment of the present disclosure provides an Internet-of-Things device. The Internet-of-Things device comprises a memory and a processor, wherein the memory is used for storing a computer program, and the computer program is used for realizing the following functions when executed by the processor: loading structured data, and identifying condition parameters comprised in the structured data; generating execution flow data of the structured data based on the condition parameters, wherein the execution flow data comprises user operation data and Internet-of-Things device operation data; and executing the Internet-of-Things device operation data, and/or displaying the user operation data to a user, and receiving an operation fed back by the user feedback to complete the execution process of the structured data.

Another embodiment of the present disclosure provides an executing method of data for an Internet-of-Things device. The method comprises: receiving an execution instruction of a task object transmitted by a user, and generating user operation data and/or Internet-of-Things device operation data in response to the execution instruction of the task object; and executing the Internet-of-Things device operation data, and/or displaying the user operation data to a user, and receiving an operation fed back by the user to complete an execution process.

Another embodiment of the present disclosure provides an executing system of data for an Internet-of-Things device. The system comprises: a data generation unit, used for receiving an execution instruction of a task object transmitted by a user, and generating user operation data and Internet-of-Things device operation data in response to the execution instruction of the task object; and an execution unit, used for executing the Internet-of-Things device operation data, and/or displaying the user operation data to the user, and receiving an operation fed back by the user to complete an execution process.

Another embodiment of the present disclosure provides an Internet-of-Things device. The Internet-of-Things device comprises a memory and a processor, wherein the memory is used for storing a computer program, and the computer program is used for realizing the following functions when executed by the processor: receiving an execution instruction of a task object transmitted by a user, and generating user operation data and/or Internet-of-Things device operation data in response to the execution instruction of the task object; and executing the Internet-of-Things device operation data, and/or displaying the user operation data to a user, and receiving an operation fed back by the user to complete an execution process.

It may be seen from the above that, in the technical solutions provided by one or more embodiments of the present disclosure, when the Internet-of-Things device is used by the user, the execution instruction of the task object may be transmitted to the Internet-of-Things device; and in response to the execution instruction of the task object, the Internet-of-Things device may determine the user operation data and/or the Internet-of-Things device operation data during execution. The user operation data in the scenario may be displayed to the user by the Internet-of-Things device so as to remind the user of executing operations of adding a second object, operating a second component, etc. The Internet-of-Things device operation data may be automatically executed by the Internet-of-Things device. For example, the first object is automatically added; the execution temperature and execution time are automatically set, etc. Thus, the target task may be finally completed through the cooperation between the user and the Internet-of-Things device, thereby improving the production efficiency of the target task and achieving a better cooking effect.

Another embodiment of the present disclosure provides an operating method for an Internet-of-Things device. The method comprises: acquiring a multi-machine simultaneous operation instruction, wherein the multi-machine simultaneous operation instruction is generated according to multi-machine simultaneous operation time information of a plurality of Internet-of-Things devices corresponding to structured data; and controlling a first Internet-of-Things device to execute the multi-machine simultaneous operation instruction, so as to enable the first Internet-of-Things device to execute an operation corresponding to the structured data at time corresponding to the multi-machine simultaneous operation time information.

Another embodiment of the present disclosure provides an Internet-of-Things device, comprising: an instruction acquisition module, configured to acquire a multi-machine simultaneous operation instruction, wherein the multi-machine simultaneous operation instruction is generated according to multi-machine simultaneous operation time information corresponding to structured data; and an execution control module, configured to control a first Internet-of-Things device to execute the multi-machine simultaneous operation instruction, so as to enable the first Internet-of-Things device to execute an operation corresponding to the structured data at time corresponding to the multi-machine simultaneous operation time information.

Another embodiment of the present disclosure provides an operating method for an Internet-of-Things device, comprising: acquiring structured data, wherein the structured data comprises corresponding multi-machine simultaneous operation time information; and transmitting the structured data to an intelligent terminal, so as to enable the intelligent terminal to acquire a multi-machine simultaneous operation instruction, wherein the multi-machine simultaneous operation instruction is generated according to multi-machine simultaneous operation time information corresponding to the structured data; further enable the intelligent terminal to control a first Internet-of-Things device to execute the multi-machine simultaneous operation instruction; and enable the first Internet-of-Things device to execute an operation corresponding to the structured data at time corresponding to the multi-machine simultaneous operation time information.

Another embodiment of the present disclosure provides an Internet-of-Things device, comprising: a structured data acquisition module, configured to acquire structured data, wherein the structured data comprises corresponding multi-machine simultaneous operation time information; and a structured data transmitting module, configured to transmit the structured data to an intelligent terminal, so as to enable the intelligent terminal to acquire a multi-machine simultaneous operation instruction, wherein the multi-machine simultaneous operation instruction is generated according to multi-machine simultaneous operation time information corresponding to the structured data; further enable the intelligent terminal to control a first Internet-of-Things device to execute the multi-machine simultaneous operation instruction; and enable the first Internet-of-Things device to execute an operation corresponding to the structured data at time corresponding to the multi-machine simultaneous operation time information.

Another embodiment of the present disclosure provides an operating system for an Internet-of-Things device, comprising: two or more Internet-of-Things devices, wherein the two or more Internet-of-Things devices are respectively configured to acquire a multi-machine simultaneous operation instruction, and the multi-machine simultaneous operation instruction is generated according to multi-machine simultaneous operation time information corresponding to structured data; and the multi-machine simultaneous operation instruction is executed, so that the two or more Internet-of-Things devices respectively operations corresponding to the structured data at the time corresponding to the multi-machine simultaneous operation time information.

Another embodiment of the present disclosure provides an Internet-of-Things device, comprising: a memory and a processor, wherein the memory is used for storing computer executable instructions, and the processor is used for executing the computer executable instructions: acquiring a multi-machine simultaneous operation instruction, wherein the multi-machine simultaneous operation instruction is generated according to multi-machine simultaneous operation time information corresponding to structured data; and controlling a first Internet-of-Things device to execute the multi-machine simultaneous operation instruction so as to enable the first Internet-of-Things device to execute an operation corresponding to the structured data at the time corresponding to the multi-machine simultaneous operation time information.

An embodiment of one aspect of the present disclosure provides an operating method for an Internet-of-Things device. Since the multi-machine simultaneous operation instruction is acquired in the method, and the multi-machine simultaneous operation instruction is generated according to multi-machine simultaneous operation time information corresponding to structured data, the first Internet-of-Things device may execute the operation corresponding to the structured data at the time corresponding to the multi-machine simultaneous operation time information by controlling the first Internet-of-Things device to execute the multi-machine simultaneous operation instruction. Moreover, the first Internet-of-Things device is any Internet-of-Things device in the two or more Internet-of-Things devices; and the other Internet-of-Things devices in the two or more Internet-of-Things devices simultaneously execute the job operation corresponding to the structured data with the first Internet-of-Things device at the time corresponding to the multi-machine simultaneous operation time information by acquiring the multi-machine simultaneous job instruction. It may be seen that, an intelligent cooperation channel among a plurality of Internet-of-Things devices is established through the multi-machine simultaneous operation time information that corresponds to structured data, so that the two or more Internet-of-Things devices may respectively simultaneously execute operations corresponding to the same structured data at the time corresponding to the multi-machine simultaneous operation time information, and the operation of the same structured data may be precisely and simultaneously executed by a respective operation machine without too much time and energy of the user, thereby overcoming defects of social functions of the Internet-of-Things devices and improving user experience.

An embodiment of another aspect of the present disclosure provides another operating method for an Internet-of-Things device. Since the structured data acquired by the method has the corresponding multi-machine simultaneous operation time information, and the structured data is transmitted to the intelligent terminal, the intelligent terminal acquires the multi-machine simultaneous operation instruction, and the multi-machine simultaneous operation instruction is generated according to the multi-machine simultaneous operation time information corresponding to the structured data. Therefore, the first Internet-of-Things device and the other Internet-of-Things devices may simultaneously execute the operation corresponding to the structured data by controlling the first Internet-of-Things device to execute the multi-machine simultaneous operation instruction. It may be seen that, an intelligent cooperation channel among a plurality of Internet-of-Things devices is established through the multi-machine simultaneous operation time information that corresponds to structured data, so that the two or more Internet-of-Things devices may respectively simultaneously execute operations corresponding to the same structured data at the time corresponding to the multi-machine simultaneous operation time information, and the operation of the same structured data may be precisely and simultaneously executed by a respective operation machine without too much time and energy of the user, thereby overcoming defects of social functions of the Internet-of-Things devices and improving user experience.

The embodiments of the present disclosure provide an executing method and apparatus of a socialized task.

Another embodiment of the present disclosure provides an executing method of a socialized task. The method comprises: downloading structured data of a target task by an intelligent terminal device based on a structured data acquisition request initiated by a target account; adding the target account into a session group corresponding to the target task by the intelligent terminal device according to a session group identifier associated with the structured data; and transmitting the structured data, by the intelligent terminal device, to an Internet-of-Things device bound to the intelligent terminal device, and triggering the Internet-of-Things device to execute the target task.

Another embodiment of the present disclosure provides an executing apparatus of a socialized task object. The apparatus comprises: a structured data downloading module, used for downloading structured data of a target task based on a structured data acquisition request initiated by a target account; a group adding module, used for adding the target account to a session group corresponding to the target task according to a session group identifier associated with the structured data; and a triggering module, used for transmitting the structured data to an Internet-of-Things device bound to the triggering module, and triggering the Internet-of-Things device to execute the target task.

In the embodiments of the present disclosure, the intelligent terminal device downloads the structured data of the target task based on the structured data acquisition request initiated by the target account; the intelligent terminal device adds the target account to the session group corresponding to the target task according to the session group identifier associated with the structured data; and the intelligent terminal device transmits the structured data to the Internet-of-Things device bound to the triggering module, and triggers the Internet-of-Things device to execute the target task. Thus, when the user executes dishes by using the Internet-of-Things device, the dishes may be automatically added into the session group corresponding to the dishes, so that the user may execute related contents of the dishes in the session group, discuss and share the contents with other users, may also consult historical session information in the session group, and further comprehensively and truly know the dishes based on the above processing. Therefore, interactivity and sociability in the execution process of the task object are enhanced; and execution enjoyment of the task object is improved.

BRIEF DESCRIPTION OF THE DRAWINGS

To clearly explain technical solutions in the embodiments of the present disclosure or in the prior art, drawings to be used in descriptions of the embodiments or the prior art will be briefly introduced below. Apparently, the drawings described herein are some embodiments of the present disclosure. Other drawings may be obtained by those ordinary skilled in the art without making creative labor.

FIG. 4a is a schematic diagram of steps of another generating method of a recipe provided by embodiments of the present disclosure;

FIG. 4b is a schematic diagram of a seasoning stage provided by embodiments of the present disclosure;

FIG. 4c is a schematic diagram of a cooking stage provided by embodiments of the present disclosure;

FIG. 4d is a schematic diagram of a recipe classifying provided by embodiments of the present disclosure;

FIG. 4e is a schematic diagram of screening of a target recipe template provided by embodiments of the present disclosure;

FIG. 4f is a schematic diagram of a function module of another generating system of a recipe provided by embodiments of the present disclosure;

DETAILED DESCRIPTION OF EXAMPLE EMBODIMENTS

To make purposes, technical solutions and advantages of the present disclosure clear, the technical solutions in the present disclosure will be clearly and fully described in combination with specific embodiments and corresponding drawings in the present disclosure. Apparently, the described embodiments are merely one part of embodiments in the present disclosure, rather than total embodiments. Based on the embodiments in the present disclosure, all the other embodiments obtained by those ordinary skilled in the art without making creative labor shall fall within the protection scope of the present disclosure.

Figure 1A:
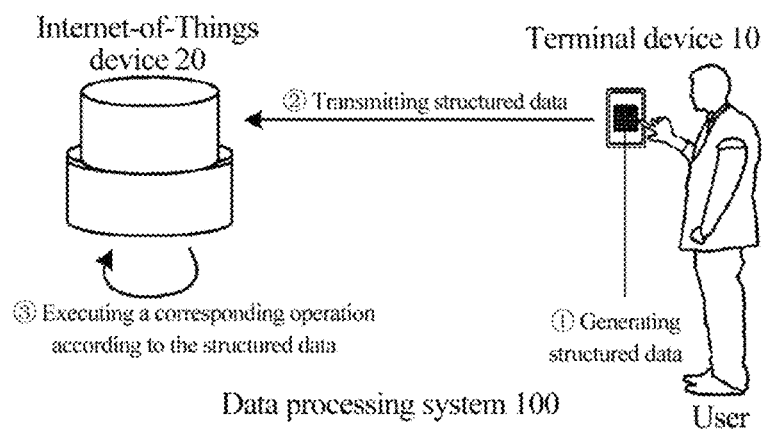
FIG. 1a is a structural schematic diagram of a processing system of data provided by embodiments of the present disclosure.

Embodiments of the present disclosure provide a processing system of data. FIG. 1a is a structural schematic diagram of a processing system of data provided by the embodiments of the present disclosure. As shown in FIG. 1a, a processing system of data 100 comprises a terminal device 10 and an Internet-of-Things device 20, wherein the terminal device 10 is provided with a structured data generation function. As shown in ① of FIG. 1a, a user may make own desired structured data via a data generation interface provided by the terminal device 10; and the user may execute an input operation on the data generation interface and then configure object feature data and execution sequence data. The object feature data refers to feature data of an object, and the object is an execution object involved in an execution operation of the Internet-of-Things device 20. The execution sequence data is used for describing an execution sequence of the object by the Internet-of-Things device 20. The object feature data and the execution sequence data input by the user may be converted into an executable state control instruction of the Internet-of-Things device by operating the terminal device 10, and then the structured data is generated according to the state control instruction and the object feature data. Further, as shown in ② of FIG. 1a, the terminal device 10 may transmit the structured data to the Internet-of-Things device 20 for enabling the Internet-of-Things device 20 to execute a corresponding operation according to the structured data. The Internet-of-Things device 20 may receive the structured data transmitted by the terminal device 10. The structured data comprises the object feature data, the state control instruction to the Internet-of-Things device 20 and an association relationship therebetween. Further, as shown in ③ of FIG. 1a, the Internet-of-Things device 20 may perform a corresponding operation according to the state control instruction, the object feature data and the association relationship therebetween.

In optional embodiments of the present disclosure, the structured data is subjected to partitioned storage management by the terminal device 10 to enable the plurality of structured data to share the same state control instruction and object feature data. The partitioned storage management of the plurality of structured data comprises at least two modes of the followings: a structured data area, a picture data area, a character data area, a voice data area and a video data area; and each data of each partition comprise address data.

In optional embodiments of the present disclosure, the data generation interface provided by the terminal device 10 comprises object configuration items and execution sequence configuration items; and the user may execute an input operation on the data generation interface and configure the object feature data and execution sequence data. The terminal device 10 may acquire identifiers and attributes of a plurality of object features needed by the structured data in response to configuration operations of the user to the object configuration items, to serve as the object feature data, and may also acquire content and description information of the plurality of execution sequence configuration items in response to configuration operations of the user to the execution sequence configuration items, to serve as the execution sequence data.

In optional embodiments of the present disclosure, the attributes of the object feature data comprise at least one of the followings: types, amounts, addition modes and addition time of the object features; and the addition modes comprise manual addition or automatic addition. The description information of the execution sequence comprises at least one of the followings: execution sequence associated object feature data, execution modes and execution parameters.

In optional embodiments of the present disclosure, while converting the execution sequence data into the executable state control instruction of the Internet-of-Things device, the terminal device 10 may combine control codes and description information that correspond to the plurality of execution sequences in accordance with the plurality of execution sequences based on a preset corresponding relation between the preset execution sequences and the control codes, to form the state control instruction. When the structured data is generated according to the state control instruction and the object feature data information, for each execution sequence, a target object feature associated with the execution sequence in the plurality of object features is determined in accordance with the description information of the execution sequence; and further, the control codes and description information of the execution sequences are associated with identifiers and attributes of the target object features to obtain the structured data.

Further, in the case of obtaining the structured data, the terminal device 10 may transmit the structured data to the Internet-of-Things device 20, and the Internet-of-Things device 20 may receive the structured data transmitted by the terminal device 10, wherein the structured data comprises the object feature data, the state control instruction to the Internet-of-Things device and the association relationship therebetween. The Internet-of-Things device 20 may execute a corresponding operation according to the state control instruction, the object feature data and the association relationship therebetween, acquire execution state prompt information corresponding to the state control instruction, and output the execution state prompt information.

In optional embodiments of the present disclosure, while executing the corresponding operation according to the state control instruction, the object feature data and the association relationship therebetween, the Internet-of-Things device 20 may parse description information and control codes of the plurality of execution sequences from the state control instruction, and parse identifiers and attributes of a plurality of objects from the object feature data, and may further sequentially execute corresponding control codes of the plurality of execution sequences in accordance with the description information of the plurality of execution sequences and the attributes of associated object features thereof, to execute corresponding operations.

In optional embodiments of the present disclosure, while sequentially executing the corresponding control codes of the plurality of execution sequences in accordance with the description information of the plurality of execution sequences and the attributes of associated object features thereof, to execute corresponding operations, the Internet-of-Things device 20 may parse the description information that corresponds to the control codes and the attributes of associated object features thereof as control parameters needed by the control codes with respect to currently executed control codes, and execute the control codes according to the control parameters to execute corresponding operations. When execution state prompt information that corresponds to the state control instruction is acquired, execution state prompt information that corresponds to the currently executed control codes may be acquired in accordance with a corresponding relationship between local built-in control codes and the execution state prompt information with respect to the currently executed control codes.

According to the processing system of the data 100 in the embodiments of the present disclosure, the terminal device 10 may generate the structured data and instruct the Internet-of-Things device 20 to execute corresponding operations based on the structured data. The structured data and device forms of the Internet-of-Things device 20 will be different according to different application scenarios. For example, the processing system of the data 100 in the embodiments of the present disclosure may be applied to a cooking scenario; when applied to the cooking scenario, the Internet-of-Things device 20 may be a kitchen robot (such as an automatic cooker and other cooking devices); and an execution object of the kitchen robot may be seasoning in the cooking process. Correspondingly, the structured data having a guiding effect for the Internet-of-Things device 20 may be an electronic recipe, and the object feature data may be seasoning information. The technical problems existing in the cooking scenario and solutions of the technical problems in the embodiments of the present disclosure are described below in detail.

Figure 1B:
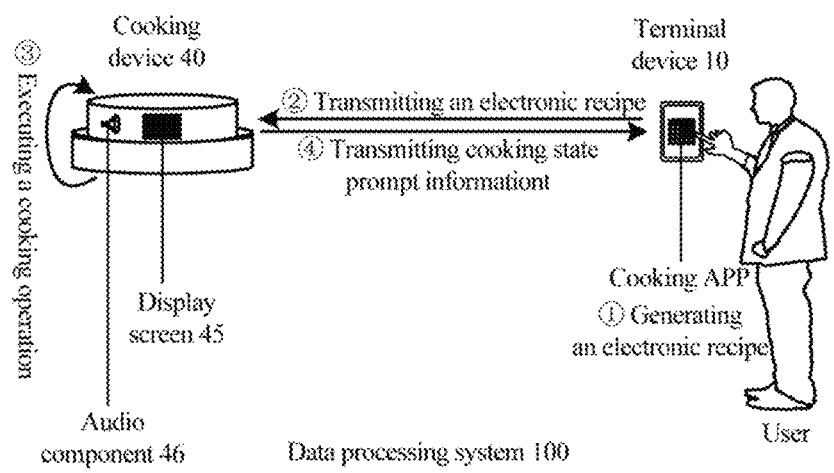
FIG. 1B is a structural schematic diagram of another processing system of data provided by embodiments of the present disclosure.

FIG. 1B is a structural schematic diagram of the processing system of the data 100 provided by embodiments of the present disclosure. As shown in FIG. 1B, the processing system of the data 100 comprises a terminal device 10 and a cooking device 40. The terminal device 10 may be any terminal device that can provide an interface operation function, for example, a mobile phone, a tablet computer, a smart watch, smart glasses, a notebook computer or a desktop computer. A cooking application corresponding to the cooking device 40 may be installed in the terminal device 10. The cooking application may establish communication connection and perform data interaction with the cooking device 40.

When a user wants to cook a dish using the cooking device 40 and an electronic recipe corresponding to the dish is not preset in the cooking device 40, the user may make the own desired electronic recipe through the cooking application program running on the terminal device 10. For example, the cooking APP that is installed on the terminal device 10 and that corresponds to the cooking device 40 includes a function of "creating a recipe". As shown in action ① of FIG. 1B, the user may make a desired electronic recipe by using the cooking APP. For example, when the cooking APP is used by the user, the terminal device 10 may transmit either—or option information to the user to ask the user whether to create an electronic recipe or to make an electronic recipe; or the user may find a function module of "creating a recipe" in the cooking APP and directly make the electronic recipe; or, a "recipe creating" function may be included in a preset recipe selection interface, and when a target recipe cannot be found in the preset recipe, the electronic recipe may be created through the function.

Under a condition that the user determines to make the electronic recipe, the terminal device 10 may display a recipe generation interface to the user for enabling the user to make the electronic recipe; and the user may input content information required by the electronic recipe through an input operation executed on the recipe generation interface.

Optionally, information selection items required by generation of the electronic recipe may be displayed on the recipe generation interface, such as food material options, seasoning options, step options, etc. These information selection items and corresponding optional information are preset; and the user only needs to select own required information from the optional information according to these information selection items. For example, for the food material options, the user may select 250 g of tomatoes and 100 g of eggs, etc.; for the seasoning options, the user may select 10 ml of peanut oil, 5 g of salt, 3 g of sugar, 2 ml of dark soy sauce and 10 g of onion, ginger and garlic, etc.; and for the step options, the user may fry the eggs with the peanut oil in a step 1, add the salt in the egg stir-frying process in a step 2, fry the tomatoes with the peanut oil and the dark soy sauce in a step 3, add the sugar in a tomato stir-frying process in a step 4, and mix the fried eggs and the tomato for stir-frying for 4 times in a step 5.

Optionally, information editing items required by generation of the electronic recipe may be displayed on the recipe generation interface, such as food material editing items, seasoning editing items, step editing items, etc. The user needs to manually edit corresponding information of these information editing items. Optionally, edit icons and/or voice icons may be displayed next to these information items. The user may click the edit icons and then edit these information items in a text input manner via a touch screen of the terminal device 10, and may also click the voice icons and adjust a microphone of the terminal device 10 to edit these information items in a voice input manner. For example, for the food editing items, the user may input 200 g of potatoes and 100 g of beef in a text or voice manner; for the seasoning options, the user may input 30 ml of peanut oil, 10 g of salt, 3 ml of dark soy sauce in a text or voice manner; and for the step options, the user may stir-fry the beef with the peanut oil in the text or voice manner in a step 1, add hot water into a pot to simmer the beef by slow fire for 40 minutes in a step 2, add the potatoes to continuously simmer the beef by slow fire in a step 3, and add the salt in a step 4.

It may be seen from the above examples that, the content information input by the user comprises the cooking material information and the cooking step information; and the cooking materials may be food materials to be cooked, such as the tomatoes, eggs, potatoes, beef, etc. and may also be seasoning required for cooking the food materials, such as the peanut oil, dark soy sauce, salt, pepper, and aniseeds, etc. Further optionally, the cooking material information may also include cooking attribute information of various cooking materials, such as types, amounts, addition manners and addition time of the cooking materials. In the present embodiment, the cooking device 40 supports two cooking material addition manners, such as manual addition and automatic addition. The cooking step information is some information used for describing the cooking steps, for example, including execution sequences among the cooking steps and description information thereof. The description information includes but not limited to: a cooking material associated with the cooking steps (e.g. the potato or beef), a cooking manner (e.g. simmering or stir-frying), and a cooking parameter (e.g. simmering duration and a number of stir-frying times), etc.

The terminal device 10 may acquire the cooking material information and the cooking step information input by the user in response to an input operation of the user on the recipe generation interface, and convert the cooking step information into an executable state control instruction by the cooking device 40. The executable state control instruction of the cooking device 40 may be understood as the sum of control codes corresponding to controlling the cooking device 40 to execute each cooking step, and is a code instruction set that may be directly executed by the cooking device 40. Since there is an association relationship between the cooking step and the cooking material, the terminal device 10 may generate the electronic recipe according to the state control instruction and the cooking material information after the cooking step is converted into the state control instruction. The process is mainly a process of converting the association relationship between the cooking step and the cooking material into an association relationship between the state control instruction and the cooking material information. The electronic recipe comprises the state control instruction and the cooking material, and further comprises the association relationship therebetween. Further, in the case of generating the electronic recipe, according to the ② interaction action of the terminal device 10 and the cooking device 40 as shown in FIG. 1B, the terminal device 10 may transmit the generated electronic recipe to the cooking device 40, so that the cooking device 40 executes a cooking operation according to the electronic recipe, and cooks a delicious food that corresponds to the made electronic recipe for the user. Optionally, the terminal device 10 may transmit the generated electronic recipe to the cooking device 40 in response to a confirm operation of completion of the electronic recipe transmitted by the user, or in response to an operation of cooking the dish according to the generated electronic recipe transmitted by the user. However, the operation of the terminal device is not limited herein. For example, the terminal device 10 may also transmit the electronic recipe to the cooking device 40 by default after the electronic recipe is generated.

In the embodiments of the present disclosure, the recipe generation interface comprises a cooking material configuration item and a cooking step configuration item, and while acquiring the cooking material information and the cooking step information in response to an input operation of the user on the recipe generation interface, the terminal device 10 may acquire identifiers and cooking attributes of a plurality of cooking materials required by the electronic recipe in response to a configuration operation of the user on the cooking material configuration item, to serve as the cooking material information; and the terminal device 10 may acquire execution sequences and description information of a plurality of cooking steps required for cooking the plurality of cooking materials in response to a configuration operation of the user on the cooking step configuration item, to serve as the cooking step information. The cooking material configuration item refers to a configuration item used for configuring an identifier and a cooking attribute of a cooking material; and the cooking step configuration item refers to a configuration item used for configuring an execution sequence and description information of a plurality of cooking steps. In an implementation form, these configuration items may be editable text input items (such as the various edit items mentioned in the above example), and may also be selection items such as pull-down lists or check boxes (e.g., the various options mentioned in the above example). The configuration items may be flexibly set according to specific requirements, and are not limited herein.

In the embodiments of the present disclosure, the identifiers of the cooking materials may be names of the cooking materials, and the cooking attributes of the cooking materials may include at least one of types, amounts, addition modes and addition time of the cooking materials. The types of the cooking materials refer to currently configured cooking materials, including food materials or seasonings. For example, chicken, fish, egg, Chinese cabbage, etc. belong to food material types, while oil, salt, sauce, vinegar, chicken essence, wild pepper, etc. belong to seasoning types. Optionally, the addition mode may comprise manual addition or automatic addition. If the addition mode of the cooking material configured by the user is the manual addition, the cooking device 40 prompts the user to manually add the cooking material when the cooking material needs to be added during the cooking operation; and if the addition mode of the cooking material configured by the user is the automatic addition, the cooking device 40 automatically adds the cooking material to a cooking pot when the cooking material needs to be added during the cooking operation.

In the embodiments of the present disclosure, the description information of the cooking step may include at least one of a cooking material associated with the cooking step, a cooking manner and a cooking parameter. The cooking material may be a food material or seasoning; the cooking manner may comprise steaming, boiling, frying, stewing, etc.; and the cooking parameter refers to a control parameter used when the cooking device 40 executes a cooking operation in a certain cooking manner, such as cooking times, duration, power, temperature, etc. For example, if the user wants to make steamed pot chicken, a step 5 needs to be executed after the food materials and seasonings are added, the chicken is steamed by small fire (low-grade) for 1 hour, then when the electronic recipe is configured by the user, the cooking parameters configured in the step 5 are as follows: the cooking material is the chicken; the cooking manner is steaming; and the cooking duration is 1 hour. When the user performs cooking by the small fire (low-grade), the cooking power is that the power corresponding to the small fire (low-grade) is assumed as 500 W; and the cooking temperature is that the temperature corresponding to the small fire (low-grade) is assumed as 120° C.

Further, under a condition that each cooking step and the description information corresponding to each cooking step are configured by the user, the terminal device 10 may combine control codes corresponding to the plurality of cooking steps and the description information according to the execution sequences of the plurality of cooking steps based on a preset corresponding relationship between the cooking steps and the control codes to form a state control instruction for enabling the cooking device 40 to execute the corresponding cooking step according to each control code in the state control instruction. For example, when the user wants to make scrambled eggs with tomatoes, the required cooking materials include: tomatoes, eggs, green onion, ginger, garlic as well as oil and salt (e.g., identifiers corresponding to the cooking materials); and the cooking steps respectively include: a first step of uncovering, a second step of turning on the fire, a third step of adding the oil, a fourth step of adding the eggs, a fifth step of taking out of the eggs, a sixth step of adding the oil, a seventh step of adding the green onion, ginger, garlic, an eighth step of adding the tomatoes; a ninth step of adding the eggs; a tenth step of adding the salt; an eleventh step of turning off the fire, and a twelfth step of dishing up. Assuming that corresponding relationships between the cooking steps and the control codes preset by the terminal device 10 are respectively as follows: the uncovering step corresponds to a control code 1, the step of turning on the fire corresponds to a control code 2, the step of adding the seasonings corresponds to a control code 3, the step of adding the food materials corresponds to a control code 4, the step of turning off the fire corresponds to a control code 5, and the step of dishing up corresponds to a control code 6, the control codes that correspond to the above cooking steps are respectively 1, 2, 3, 4, 6, 3, 3, 4, 4, 3, 5 and 6. These control codes are merely examples. In practice, the control codes of the terminal device 10 may be binary digit codes that may be recognized by a computer device, and may also be character strings composed of letters, or character strings composed of combinations of numbers and letters. The control codes are not limited herein. Then, the user may configure the corresponding identifiers and cooking attributes according to the above cooking materials, and configure the corresponding description information for each cooking step. The terminal device 10 may associate the cooking steps configured by the user with the control codes according to the corresponding relationships between the cooking steps and the control codes. The description information of each cooking step and the cooking attributes of a target cooking material may be flexibly configured by the user according to attributes of the to-be-cooked dish and own dietary requirements of the user. For example, in the present embodiment, the cooking manner may be stir-frying by small fire (low-grade); the stir-frying time may be specifically set according to requirements of different steps, e.g., shorter time may be set during stir-frying of the seasonings, assumed as 30 seconds, and longer time may be set during stir-frying of the food materials, assumed as 1 minute. Specific configuration information of the cooking attributes of the target cooking material may refer to the following embodiments.

Under a condition that the above information is configured by the user, for each cooking step, the terminal device 10 may determine a target cooking material associated with the cooking step in a plurality of cooking materials according to the description information of the cooking step, and associate the control code and the description information of the cooking step with the identifiers and cooking attributes of the target cooking material to obtain an electronic recipe. In the embodiments of the present disclosure, the generated electronic recipe not only contains the cooking materials, the cooking step information and an association relationship therebetween, but also can translate complete cooking steps into machine instructions that may be understood by the cooking device 40. According to the execution action of the cooking device 40 in FIG. 1B, while receiving the electronic recipe transmitted by the terminal device 10, the terminal device 10 may execute a cooking operation according to the cooking material information included in the electronic recipe, the state control instruction to the cooking device and the association relationship therebetween so as to provide a corresponding cooking service for the user.

Optionally, while receiving the electronic recipe transmitted by the terminal device 10, the cooking device 40 may parse the received electronic recipe, parse description information and control codes of a plurality of cooking steps from the state control instruction, and parse identifiers and cooking attributes of a plurality of cooking materials from the cooking material information. By taking the electronic recipe corresponding to the scrambled eggs with tomatoes in the above embodiments as an example, the cooking device 40 may parse the control codes associated with each cooking step as 1, 2, 3, 4, 6, 3, 3, 4, 4, 3, 5 and 6 respectively according to the electronic recipe, wherein the control code 1 corresponds to a cooking action of "uncovering", the control code 2 corresponds to a cooking action of "turning on the fire", the control code 5 corresponds to a cooking action of "turning off the fire", and the control code 6 corresponds to a cooking action of "dishing up". The target cooking materials corresponding to the control codes 3, 4, 3, 3, 4, 4 and 3 are respectively oil, eggs, oil, green onion, ginger, garlic, tomatoes, eggs and salt, namely, identifiers of the target cooking materials. The cooking manner of the cooking materials is stir-frying; the cooking power and temperature are the power and temperature (e.g. 500 W and 80° C.) corresponding to the small fire (low-grade); cooking time corresponding to the control code 3 is 30 seconds; and the cooking time corresponding to the control code 4 is 1 minute. These control codes are merely examples. In practice, the control codes received by the cooking device 40 may be binary digit codes that may be recognized by a computer device, and may also be character strings composed of letters, or character strings composed of combinations of numbers and letters. The control codes are not limited herein. For another example, the cooking attributes of the target cooking materials parsed by the cooking device 40 are respectively as follows: the types of the tomatoes and eggs are food materials; the types of the green onion, ginger, garlic, oil and salt are seasonings; the amount of the tomatoes and eggs is respectively 250 g; the amount of the green onion, ginger, garlic is respectively 50 g; the amount of the oil added twice is respectively 50 ml; and the amount of the salt is 50 g. The addition mode is automatic addition; and the addition time is as follows: the oil is added when a temperature of the pot reaches a temperature 80° C. corresponding to the small fire (low-grade) after the steps of uncovering and turning on the fire; the eggs are added at an interval of 30 seconds; then the eggs are taken out and the oil is added again at an interval of 1 minute; the green onion, ginger and garlic are added at an interval of 30 seconds after the oil is added; the tomatoes are added at an interval of 30 seconds; then the eggs are added at an interval of 1 minute after the tomatoes are added; the salt is added at an interval of 1 minute; and finally the fire is turned off at an interval of 30 seconds after the salt is added, and the step of dishing up is executed. In the case that the above information is parsed, the cooking device 40 may sequentially execute the control codes corresponding to the plurality of cooking steps according to the description information of the plurality of cooking steps and the cooking attributes of the associated cooking materials so as to execute the cooking operation.

In the embodiments of the present disclosure, the cooking device 40 may parse the description information corresponding to the control codes and the cooking attributes of the associated cooking materials into control parameters required for executing the control codes with respect to the currently executed control codes, and execute the current control codes according to the control parameters so as to execute the cooking operation. For example, in the present embodiment, when the control code 1 is executed, the cooking device 40 may determine that the cooking action corresponding to control code 1 is an uncovering operation performed without participation of the cooking material according to the corresponding relationship between the cooking step and the preset control code, and then the cooking device 40 will open the cooking pot cover for adding the cooking material into the cooking pot. When the cooking pot cover is opened, a step corresponding to the control code 2 is executed, and according to the description information corresponding to the control code 2, the cooking device 40 parses the control parameter required for executing the control code 2 as a heating temperature of 80° C. by small fire (low-grade) for entering the next step. Then the cooking device 40 will turn on the fire for heating according to the power of 500 W corresponding to the preset small fire (low-grade). When the pot temperature reaches 80° C., the step corresponding to the first control code 3 is executed, and according to the description information corresponding to the control code 3, the cooking device 40 parses the control parameter required for executing the control code 3 as an operation of automatically adding 50 ml of the oil to be heated for 30 seconds for entering the next step. Then the cooking device 40 will control a seasoning container filled with oil to add 50 ml of oil into the cooking pot; and the next step is executed within 30 seconds after heating. These control codes are merely examples. In practice, the control codes execute by the cooking device 40 may be binary digit codes that may be recognized by a computer device, and may also be character strings composed of letters, or character strings composed of combinations of numbers and letters. The control codes are not limited herein.

In the embodiments of the present disclosure, as shown in FIG. 1B, the cooking device 40 further comprises a display screen 45 and an audio component 46. The cooking device 40 may acquire prompt information of a cooking state corresponding to the state control command, and output the prompt information of the cooking state via the display screen 45 and/or the audio component 46 for enabling a user to know the current cooking state. In the present embodiment, implementation forms of the display screen 45 and the audio component 46 are not limited. For example, the display screen 45 may be a common LED display screen, or a touch screen with a touch function; and the audio component 46 may be a separate voice output device, or a device that can output audio and video simultaneously in combination with the display screen 45. In the embodiments of the present disclosure, a corresponding relationship between the control code and the prompt information is locally preset by the cooking device 40. The cooking device 40 may acquire the cooking state prompt information corresponding to the currently executed control code according to the corresponding relationship between the local built-in control code and the cooking state prompt information, with respect to the currently executed control code, so as to transmit the cooking state prompt information to the user when the cooking step corresponding to each control code is executed. It should be noted that, if the addition mode of the cooking material is configured as the manual addition by the user, the cooking device 40 may transmit the prompt information to the user via the display screen 45 and/or the audio component 46 to prompt the user to manually add the corresponding cooking material when addition of the corresponding cooking material is executed. Specific prompt manners may refer to the following embodiments.

In the embodiments of the present disclosure, the type of the cooking state prompt information is not limited, and may be at least one of picture, character and voice. If the cooking state prompt information preset by the cooking device 40 is the picture, the cooking state prompt information of the picture type may be displayed on the display screen 45 when the prompt information needs to be transmitted to the user. For example, when the cooking step corresponding to the control code 2 is executed, the cooking device 40 parses out that the cooking step corresponding to the control code 2 is turning on the fire for heating the pot, and then a picture of small fire may be displayed on the display screen 45 to prompt the user to know that the pot is being heated. If the cooking state prompt information preset by the cooking device 40 is the character, the cooking state prompt information of the character type may be displayed on the display screen 45 when the prompt information needs to be transmitted to the user. For example, when the cooking step corresponding to the first control code 4 is executed, the cooking device 40 parses out that the cooking step corresponding to the first control code 4 is frying eggs, and then characters with the contents of "adding the eggs and stir-frying" may be displayed on the display screen 45 so as to prompt the user that the eggs are being fried. If the cooking state prompt information preset by the cooking device 40 is the voice, the cooking state prompt information may be output through the audio component 46 when the prompt information needs to be transmitted to the user. For example, when the cooking step corresponding to the first control code 6 is executed, the cooking device 40 parses out that the cooking step corresponding to the first control code 6 is taking out the eggs; and then voice with the contents of "eggs are being taken out" may be output through the audio component 46 so as to prompt the user that the eggs are being taken out.

Further optionally, the cooking state prompt information may further comprise video; and when the prompt information needs to be transmitted to the user, the video prompt information corresponding to the current control code may also be displayed on the display screen 45 to prompt the user of the current cooking state. Moreover, under a condition that a variety of pictures, characters, voice or video are locally preset by the cooking device 40, the cooking device 40 may prompt the user of various forms of the pictures, characters, voice or video when prompt information is transmitted to the user, so as to provide a better prompt effect. For example, two kinds of cooking state prompt information such as the voice and video are locally preset by the cooking device 40. When the cooking step corresponding to the first control code 4 is executed, the cooking device 40 parses out that the cooking step corresponding to the first control code 4 is frying the eggs, and then the video with the content of "adding the eggs and stir-frying" may be displayed on the display screen 45, and the voice of "adding the eggs and stir-frying" may be played at the same time, so as to prompt the user that eggs are being fried. For another example, if the addition mode of the food materials is configured as manual addition by the user, the user will be prompted to add the corresponding food materials into the cooking pot through the above prompt manner once the control code 4 is executed. After the cooking step corresponding to the last control code 6 is executed and the dish is filled, the user may be prompted of completion of the cooking operation through any of the above manners, and then the user can enjoy the delicious food.

Further optionally, according to the interaction action ④ between the cooking device 40 and the terminal device 10 in FIG. 1B, the cooking device 40 may further transmit the prompt information and the cooking state information corresponding to the execution of each cooking step to the terminal device 10; and the terminal device 10 may transmit the prompt information to the user on the display screen in the case of receiving the above cooking state information, so as to make the user know the current cooking state. For example, the addition mode of the cooking material set by the user is automatic addition, and after determining to start cooking or doing other things in the living room or bedroom, the user cannot see or hear the cooking state prompt information transmitted by the cooking device 40. The cooking state is prompted to the user by the terminal device 10 in real time, and the user may know the cooking state in time at a long distance, so as to enjoy the delicacy in time in case of completion of the cooking.

Figure 1C:
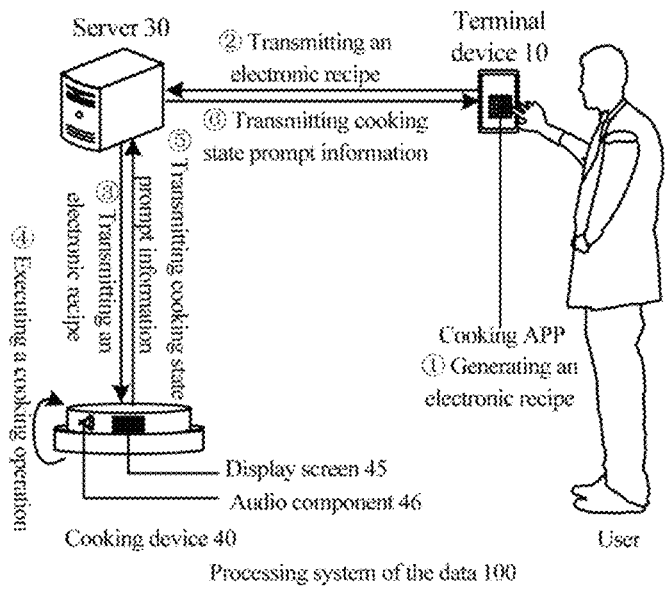
FIG. 1c is a structural schematic diagram of another processing system of data provided by embodiments of the present disclosure.

Further optionally, as shown in FIG. 1c, the cooking system may further include a server 30; and the terminal device 10 and the cooking device 40 may further communicate with each other through the server 30. As shown in the actions ① and ② of FIG. 1c, the user may transmit the electronic recipe to the server 30 under a condition that the electronic recipe is set by the terminal device 10 through the cooking APP. Further, as shown in the action ③ of FIG. 1c, the server 30 may transmit the received electronic recipe to the cooking device 40, or the cooking device 40 may also periodically actively acquire the electronic recipe from the server 30. A specific manner is not limited. Further, as shown in the action ④ of FIG. 1c, the cooking device 40 may execute a corresponding cooking operation according to the received electronic recipe, so as to cook a delicious food for the user. A specific process may refer to the above embodiments. Unnecessary details are not given herein. Moreover, in the cooking process, as shown in the actions ⑤ and ⑥ of FIG. 1c, the cooking device 40 may transmit the cooking state information corresponding to each cooking step to the server 30, and the cloud server 30 transmits the above information to the terminal device 10, or the terminal device 10 may periodically actively acquire the above information from the server 30. A specific manner is not limited.

It should be noted that, in the embodiments of the present disclosure, a communication mode between the terminal device 10 and the cooking device 40 may be Bluetooth connection, or a connection mode via Wi-Fi or any other mobile network. A network type of the mobile network may be any one of 2G (GSM), 2.5G (GPRS), 3G (WCDMA, TD-SCDMA, CDMA2000, UTMS), 4G (LTE), 4G+(LTE+), 5G, WiMax or a new network type that will appear in the future. A specific network type is not limited. The server 30 may be a common service server or a cloud server, and may be set according to specific requirements.

In the embodiments of the present disclosure, the user is provided with a function of making the electronic recipe at the terminal device, and the user may make an electronic recipe other than a recipe preset by the cooking device, so that the cooking device can cook a desired delicious food for the user according to the user's requirements. Further, the electronic recipe comprises the cooking material information and the cooking step information, and further comprises the state control instruction corresponding to an association relationship between the cooking material information and the cooking step information; and the state control instruction is determined by an association relationship between the preset control code and the cooking steps. Thus, the cooking device can cook the delicious food according to the cooking step corresponding to each control code in the state control instruction; and in the case that the user needs to be prompted, the prompt information corresponding to the current cooking step is provided according to the corresponding relationship between the preset control code and the prompt information, so as to bring better cooking experience to the user.

Application Scenario I

A user Zhang San owns a smart phone and an intelligent automatic cooker; the mobile phone is installed with application software APP of the intelligent automatic cooker; and the mobile phone and the automatic cooker are in radio signal connection by utilizing a Bluetooth manner. Wireless data communication may be established between the mobile phone and the automatic cooker at home. Zhang San creates a recipe on the APP of the automatic cooker, clicks "create a recipe" on the APP, and selects a dish. The dish selected by Zhang San is braised prawns. After entering a creation interface of the braised prawn recipe, control codes in the electronic recipe are mapped, by the APP, to characters that can be recognized by Zhang San. For example, if the control code of the electronic recipe is "open cover", "opening the pot cover" is displayed at the electronic recipe creation end of the APP; and if the control code is "running time", the "running time" is displayed. Meanwhile, there is a fixed recipe format in the APP. The control codes are embedded into the recipe format to form a guide interface with an interaction function. The guide interface comprises major information, seasoning information, state information, etc. The major information includes: recipe names, running time, seasoning steps, state steps, etc.; the seasoning information comprises: numbers of seasonings, character description, names of main materials and amounts of the seasonings, etc.; and the state information includes an operating state, a pot cover state, a stirring state, fire power, running time, a running temperature, character description and the like. Zhang San edits and inputs the food material information as follows: 500 g of prawns, 50 ml of edible oil, 20 g of chili, 20 ml of soy sauce, 10 ml of aromatic vinegar, 10 g of salt, and 50 g of green onion, ginger and garlic; and after the food material information is saved, cooking parameter information is edited as follows: the heating temperature is 180° C. and the heating time is 5 minutes. Meanwhile, Zhang San needs to edit the step information. According to the time axis, in the first step, the washed prawns are added into a cooking pot and the pot cover is closed. In the second step, seasonings are added into seasoning boxes. Then, the various seasonings need to be accurately measured; measured items include volume and weight; the volume of each seasoning is measured by utilizing volume of a measuring cup; and the weight is measured by utilizing an electronic scale of measuring cup. In the third step, cooking is started; the pot body is heated by a heater; and Zhang San is notified of the current heating temperature and heating time when the voice and displayed prompt information are transmitted by the automatic cooker. Subsequent steps are not listed until the cooking is completed. The data information of these recipes is subjected to partitioned storage by the APP; the data information is specifically divided into a recipe area, a picture area, a character library area, a voice area and a video area; and each storage partition comprises data information such as contents, a starting address and a size. The plurality of electronic recipes may share the same state control instruction and cooking material information. Each recipe needs to have the same cooking step information: adding the seasonings, opening the pot cover and closing the pot cover. All the step information is respectively stored in the recipe area and the voice area and includes address information; and the same step information may be shared by a plurality of recipes. While making the dishes such as the scrambled eggs with tomatoes, braised prawns and braised pork in brown sauce, the user needs to call the cooking step information. However, after the partitioned storage management, control instructions of all the cooking step information are respectively stored once in the recipe area and the voice area; and different electronic recipes call the same shared state control instruction. The plurality of electronic recipes may also share the same cooking material information. For example, the plurality of electronic recipes may be established for the dish of scrambled eggs with tomatoes; and the name of the dish is displayed to the user when the same picture is used in each electronic recipe. The plurality of electronic recipes of the scrambled eggs with tomatoes use the same shared picture information; the picture information is stored in the picture area with the address information after the partitioned storage management; and the picture data information is shared by different electronic recipes of the scrambled eggs with tomatoes. Due to the partitioned storage management, the management efficiency is improved, and storage space is saved.

Application Scenario II

A user Li Si has an intelligent automatic cooker; and application software for man-machine interaction is built in a display screen of the intelligent automatic cooker. Li Si creates a recipe on the application software, clicks "create a recipe" on the application software, and selects a dish. The dish selected by Li Si is braised prawns. After entering a creation interface of the braised prawn recipe, control codes in the electronic recipe are mapped, by the application software, to characters that can be recognized by Li Si. For example, if the control code of the electronic recipe is "open cover", "opening the pot cover" is displayed at the electronic recipe creation end of the APP; and if the control code is "running time", the "running time" is displayed. Meanwhile, there is a fixed recipe format in the application software. The control codes are embedded into the recipe format to form a guide interface with an interaction function. The guide interface comprises major information, seasoning information, state information, etc. The major information includes: recipe names, running time, seasoning steps, state steps, etc.; the seasoning information comprises: numbers of seasonings, character description, names of main materials and amounts of the seasonings, etc.; and the state information includes an operating state, a pot cover state, a stirring state, fire power, running time, a running temperature, character description and the like. Li Si edits and inputs the food material information as follows: 500 g of prawns, 50 ml of edible oil, 20 g of chili, 20 ml of soy sauce, 10 ml of aromatic vinegar, 10 g of salt, and 50 g of green onion, ginger and garlic; and after the food material information is saved, cooking parameter information is edited as follows: the heating temperature is 180° C. and the heating time is 5 minutes. Meanwhile, Li Si needs to edit the step information. According to the time axis, in the first step, the washed prawns are added into a cooking pot and the pot cover is closed. In the second step, seasonings are added into seasoning boxes. Then, the various seasonings need to be accurately measured; measured items include volume and weight; the volume of each seasoning is measured by utilizing volume of a measuring cup; and the weight is measured by utilizing an electronic scale of measuring cup. In the third step, cooking is started; the pot body is heated by a heater; and Li Si is notified of the current heating temperature and heating time when the voice and displayed prompt information are transmitted by the automatic cooker. Subsequent steps are not listed until the cooking is completed. The data information of these recipes is subjected to partitioned storage by the application software; the data information is specifically divided into a recipe area, a picture area, a character library area, a voice area and a video area; and each storage partition comprises data information such as contents, a starting address and a size. The information stored in the partitions may be individually edited, copied, called, etc. The data information of these recipes is subjected to partitioned storage by the automatic cooker; the data information is specifically divided into a recipe area, a picture area, a character area, a voice area and a video area; and each storage partition comprises data information such as contents, a starting address and a size. The plurality of electronic recipes may share the same state control instruction and cooking material information. Each recipe needs to have the same character information: character library, figures and letters; the character information is stored in the character area and includes address information; and the same character information may be shared by the plurality of recipes. While making the dishes such as the scrambled eggs with tomatoes, the braised prawns and braised pork in brown sauce, the user needs to call the character information. However, after the partitioned storage management, the character information is stored once in the character area; and different electronic recipes call the same shared character information. The plurality of electronic recipes may also share the same state control instruction. For example, the plurality of electronic recipes may be established for the dish of braised prawns; and the cooking process of the dish is displayed to the user when the same video information is used in each electronic recipe. The plurality of electronic recipes of the braised prawns use the same shared video information; the video information is stored in the video area with the address information after the partitioned storage management; and the video data information is shared by different electronic recipes with different video information. Due to the partitioned storage management, the management efficiency is improved, and storage space is saved.

In addition to the above cooking scenario, the data processing system in the embodiments of the present disclosure may also be applied to other scenarios suitable for controlling an Internet-of-Things device to execute corresponding operations according to structured data; and a specific implementation process is similar to the above embodiments and may refer to the above embodiments. To explain the contents of the embodiments of the present disclosure in detail, the embodiments of the present disclosure further provide a generating method of data. The method is applicable to the terminal device in the above system embodiments.

Figure 1D:
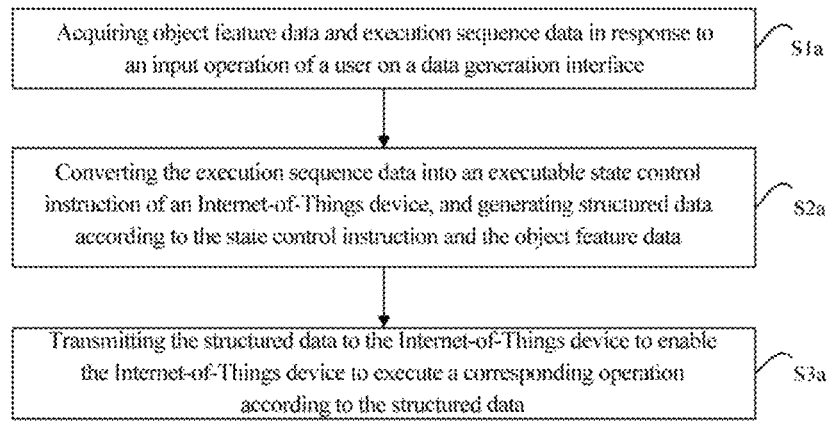
FIG. 1d is a flow chart of a generating method of data provided by embodiments of the present disclosure.

FIG. 1d is a flow chart of a generating method of structured data. As shown in FIG. 1d, the method comprises:

S1a, acquiring object feature data and execution sequence data in response to an input operation of a user on a data generation interface;

S1d, converting the execution sequence data into an executable state control instruction of an Internet-of-Things device, and generating structured data according to the state control instruction and the object feature data; and S1f, transmitting the structured data to the Internet-of-Things device to enable the Internet-of-Things device to execute a corresponding operation according to the structured data.

In the embodiments of the present disclosure, a terminal device is provided with a structured data generation function, and a user may specifically configure the object feature data and the execution sequence data at a data generation interface of the terminal device so as to form the desired structured data. The terminal device may convert the execution sequence data configured by the user into an executable state control instruction of the Internet-of-Things device in response to the configuration operation of the user; and the structured data may be generated according to the state control instruction and the object feature data. Further, the structured data may be transmitted to the Internet-of-Things device for enabling the Internet-of-Things device to execute a corresponding operation according to the structured data.

In an optional embodiment, the structured data may be subjected to partitioned storage management by the terminal device for enabling a plurality of structured data to share the same state control instruction and object feature data. The partitioned storage management of the plurality of structured data may comprise at least two of the followings: a structured data area, a picture data area, a character data area, a voice data area and a video data area; and each data of each partition comprise address data.

In an optional embodiment, the data generation interface comprises object configuration items and execution sequence configuration items; when the object feature data and execution sequence data are acquired in response to the input operation of the user on the data generation interface, identifiers and attributes of a plurality of objects needed by the structured data are acquired in response to configuration operations of the user to the object configuration items, to serve as the object feature data; and contents and description information of the plurality of execution sequence configuration items are acquired in response to configuration operations of the user to the execution sequence configuration items, to serve as the execution sequence data. The object configuration item refers to a configuration item used for configuring the identifiers and attributes of the object; and the execution sequence configuration item refers to a configuration item used for configuring a plurality of execution sequences and description information. In an implementation form, these configuration items may be editable text input items, and may also be selection items such as pull-down lists or check boxes. The configuration items may be flexibly set according to specific requirements, and are not limited herein.

In an optional embodiment, the attributes of the object comprise at least one of the followings: types, amounts, addition modes and addition time of the objects; and the addition modes comprise manual addition or automatic addition. The description information of the execution sequence comprises at least one of the followings: execution sequence associated objects, execution modes and execution parameters. The execution parameters are control parameters used when the Internet-of-Things device executes a corresponding operation in a certain execution manner, such as a number of execution times, duration, power and temperatures.

In an optional embodiment, when the object feature data is converted into the executable state control instruction of the Internet-of-Things device, control codes and description information that correspond to the plurality of execution sequences are combined in accordance with the plurality of execution sequences based on a preset corresponding relation between the execution sequences and the control codes, to form the state control instruction, for enabling the Internet-of-Things device to execute a corresponding step according to each control code in the state control instruction.

In an optional embodiment, when the structured data is generated according to the state control instruction and the object feature data, for each execution sequence, a target object associated with the execution sequence in the plurality of objects is determined in accordance with the description information of the execution sequence; and the control codes and description information of the execution sequences are associated with identifiers and attributes of the target objects to obtain the structured data. Then, the generated structured data includes the object, the execution sequence data and the association relationship therebetween, and further includes the state control instruction that is translated from the complete execution sequence and that can be understood by the Internet-of-Things device. In case of receiving the structured data, the Internet-of-Things device may parse the object feature data, the state control instruction to the Internet-of-Things device and the association relationship therebetween included in the structured data, and execute a corresponding operation according to the structured data so as to provide a corresponding service for a user.

In an optional embodiment, the structured data is an electronic recipe, and the object feature data is a cooking material.

The embodiments of the present disclosure further provide an executing method of data. The method is applicable to the Internet-of-Things device in the system embodiments.

Figure 1E:
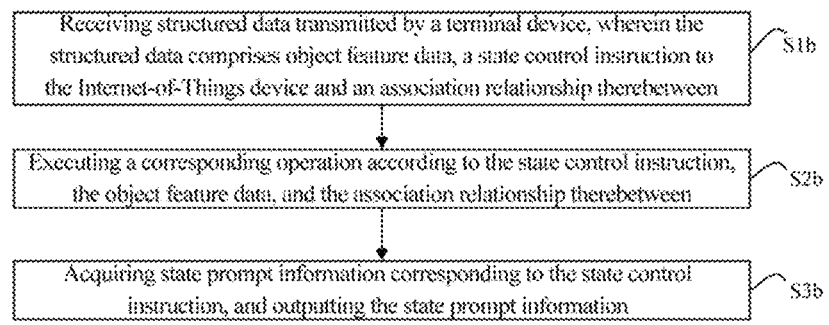
FIG. 1e is a flow chart of an executing method of data provided by embodiments of the present disclosure.

FIG. 1e is a flow chart of an executing method of data. As shown in FIG. 1e, the method comprises:

S1b, receiving structured data transmitted by a terminal device, wherein the structured data comprises object feature data, a state control instruction to the Internet-of-Things device and an association relationship therebetween;

S1e, executing a corresponding operation according to the state control instruction, the object feature data and the association relationship therebetween; and S1g, acquiring execution state prompt information that corresponds to the state control instruction, and outputting the execution state prompt information.

In the embodiments of the present disclosure, the Internet-of-Things device may execute the corresponding operation according to the object feature data, the state control instruction to the Internet-of-Things device and the association relationship therebetween included in the received structured data. Moreover, in the operation executing process, the execution state prompt information corresponding to the state control instruction may be acquired; and under a condition that information prompt needs to be transmitted to the user, the execution state prompt information is output to make the user know the current execution state.

In an optional embodiment, the Internet-of-Things device may parse the received structured data, parse description information and control codes of a plurality of execution sequences from the state control instruction while executing the corresponding operation according to the state control instruction, the object feature data and the association relationship therebetween, and parse identifiers and attributes of a plurality of objects from the object feature data. Since each execution sequence has a corresponding relationship with the control code, the control codes that correspond to the plurality of execution sequence may be sequentially executed according to the description information of the plurality of execution steps and the attributes of the associated objects to execute corresponding operations.

In an optional embodiment, when the corresponding control codes of the plurality of execution sequences are sequentially executed in accordance with the description information of the plurality of execution sequences and the attributes of associated objects thereof, to execute corresponding operations, the description information that corresponds to the control codes and the attributes of associated objects thereof are parsed as control parameters needed by the control codes with respect to currently executed control codes; and the control codes are executed according to the control parameters to execute corresponding operations. The control parameters required by the control codes may be at least one of object types, amounts, addition manners and addition time corresponding to the attributes of the objects, and the addition manner may be manual addition or automatic addition. The control parameters may also be at least one of objects that correspond to the description information of the execution sequences, execution modes and execution parameters; and the execution parameters are control parameters used when the Internet-of-Things device executes a corresponding operation in a certain execution manner, such as a number of execution times, duration, power and temperatures.

In an optional embodiment, when the execution state prompt information corresponding to the state control instruction is acquired, the execution state prompt information corresponding to the currently executed control code may be acquired according to the corresponding relationship between the local built-in control codes and the execution state prompt information with respect to the currently executed control code, so as to output the execution state prompt information when the prompt information needs to be transmitted to the user.

In optional embodiments of the present disclosure, the type of the execution state prompt information comprises at least one of picture, character and voice; correspondingly, the execution state prompt information of the picture type may be displayed on the display screen; the execution state prompt information of the character type may be displayed on the display screen; and the execution state prompt information is output in any manner, such as a voice manner of playing the execution state prompt information of the voice type. Further optionally, the type of execution state prompt information may also include video, and when the execution state prompt information is output to the user, the execution state prompt information of the video type may also be output on the display screen. Further optionally, under a condition that at least two of the above plurality of types of prompt information are included, when the execution state prompt information is output to the user, a plurality of types of the prompt information may be simultaneously output to the user. Specific implementation modes are not limited herein.

In an optional embodiment, the structured data is an electronic recipe, and the object feature data is a cooking material.

In addition to completion of generation of the structured data by using the above terminal device, the user may directly generate the structured data through the Internet-of-Things device under a condition that the Internet-of-Things device has a display screen. Therefore, the embodiments of the present disclosure further provide a generating method of structured data for an Internet-of-Things device, comprising: displaying a data generation interface for enabling a user to make structured data; acquiring object feature data and execution sequence data in response to an input operation of the user on the data generation interface; and converting the execution sequence data into an executable state control instruction of the Internet-of-Things device, and generating the structured data according to the state control instruction and the object feature data and saving the structured data locally. Further, when the user transmits an instruction of instructing the Internet-of-Things device to execute a corresponding operation according to the structured data, the Internet-of-Things device may read the structured data locally, parse the structured data, and execute a corresponding operation according to the parsed corresponding relationship between the control code that corresponds to the state control instruction and the execution sequence, and the object feature data and description information that correspond to the execution sequence. The difference between the above steps and the above embodiments is as follows: only the execution subject is different. However, detailed implementation modes can all be seen in the above embodiments, and necessary details are not given herein.

It should be noted that, the execution subject in each step of the method provided by the above embodiments may be the same device; or, different devices may serve as the execution subject in the method. For example, the execution subject in the steps S1$a$ to S1$f$ may be a device A; and for another example, the execution subject in the steps S1$a$ and S1$d$ may be the device A, and the execution subject in the step S1$f$ may be a device B; and the like.

In addition, in some processes described in the above embodiments and the drawings, multiple operations occurring according to a specific sequence are included. However, it should be clearly understood that, these operations may not be executed according to a sequence occurring in the present disclosure or may be concurrently executed. Operation numbers such as S1$a$ and S1$d$ are merely used for distinguishing various different operations; and the numbers do not represent any execution sequence. In addition, these processes may include more or fewer operations, and the operations may be executed sequentially or concurrently. It should be noted that, the descriptions such as "first", "second", etc. herein are used for distinguishing different messages, devices, modules, etc., and do not represent sequences. The "first" and "second" are not limited as different types.

FIG. if is a structural schematic diagram of a terminal device in the embodiments of the present disclosure. As shown in FIG. 1$f$, a terminal device 10 comprises a display screen 15, a processor 11 and a memory 12 storing a computer program, wherein the display screen 15 is used for a man-machine interaction interface, comprising a display data generation interface; and a number of the processor 11 or the memory 12 may be one or more.

The memory 12 is mainly used for storing computer programs, and these computer programs may be executed by the processor 11. Thus, the processor 11 controls the terminal device 10 to realize corresponding functions and complete corresponding actions or tasks. In addition to storing the computer programs, the memory 12 may be configured to store various other data to support operations on the terminal device 10. Examples of these data include instructions for any application program or method operated on the terminal device 10.

In the embodiments of the present disclosure, appropriate data storage distribution is designed according to the size of capacity of the memory 12; the structured data, picture data, character library data and voice data are respectively arranged to realize partitioned storage; and address data information that may be directly recognized by the processor 11 may be generated according to the written storage data information. Specifically, in the memory of the Internet-of-Things device, the stored data information of the structured data is subjected to partitioned storage, and divided into a structured data area, a picture area, a character library area and a voice area, etc.; and a starting address for a processor that may be directly called by the processor is configured in each data storage area so as to identify the partitioned access data information and conveniently find the partitions such as the picture area. As a preferred embodiment of the present disclosure, after the stored information of the structured data is subject to partitioned management, data information of each partition may be called by the plurality of structured data, including some repeated information, and information at a high usage frequency, such as, heating power in a cooking scenario, cover opening, and cover closing. There is some data information of voice, picture and video. For example, the voice information includes: please add salt, and cooking; and the picture information includes food pictures of braised prawns. The above information may be repeatedly called by the plurality of structured data, so that space may be saved due to the partitioned management, and the efficiency is improved. Since each piece of the stored data information carries identity information including content, address and size, the stored information of these partitioned structured data may be modularly edited, replicated and transferred. For example, the picture data information stored in the intelligent terminal may be replicated to the storage area of the Internet-of-Things device, and vice versa. Thus, user experience and convenience are improved. In the embodiments of the present disclosure, the structured data is subjected to partitioned storage management, so that the same state control instruction and object feature data are called by the plurality of structured data. The partitioned storage management of the plurality of structured data comprises at least two of the followings: a recipe data area, a picture data area, a character data area, a voice data area and a video data area; and each data of each partition comprise address data.

The memory 12 may be implemented by volatile or non-volatile memory devices of any type or a combination of the devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

In the embodiments of the present disclosure, an implementation form of the processor 11 is not limited. For example, the processor 11 may be but not limited to CPU, GPU or MCU, etc. The processor 11 may be seen as a control system of the terminal device 10 and may be used for executing a computer program stored in the memory 12 to control the terminal device 10 to realize corresponding functions and complete corresponding actions or tasks. It should be noted that, according to different implementation forms and location scenarios of the terminal device 10, the functions to be implemented and the actions or tasks to be completed thereby will be different. Correspondingly, the computer programs stored in the memory 12 may also be different, while the terminal device 10 may be controlled to realize different functions and complete different actions or tasks by virtue of different computer programs executed by the processor 11.

Figure 1F:
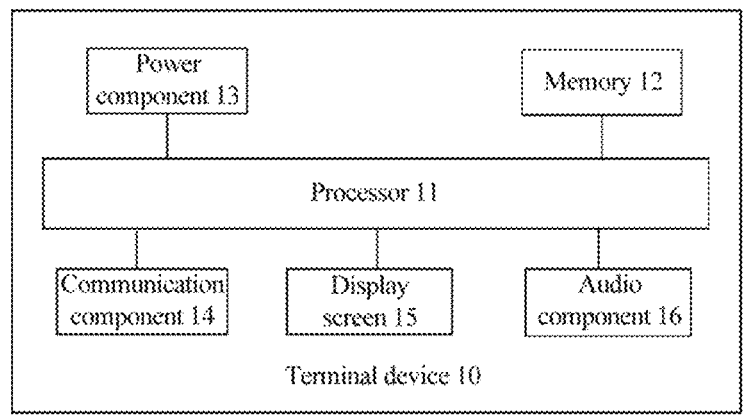
FIG. 1f is a structural schematic diagram of a terminal device provided by embodiments of the present disclosure.

In some optional embodiments, as shown in FIG. 1f, the terminal device 10 may further comprise other components such as a power component 13, a communication component 14 and an audio component 16. FIG. if schematically shows partial components only. It does not mean that, the terminal device 10 only comprises the components shown in FIG. 1f. The terminal device 10 may further comprise other components for different application requirements. Specific components are determined by depending on a product form of the terminal device 10.

In the embodiments of the present disclosure, while executing the computer program in the memory 12, the processor 11 is used for: acquiring object feature data and execution sequence data in response to an input operation of the user on the data generation interface; converting the execution sequence data into an executable state control instruction of the Internet-of-Things device, and generating the structured data according to the state control instruction and the object feature data; transmitting the structured data to the Internet-of-Things device for enabling the Internet-of-Things device to execute a corresponding operation according to the structured data.

In an optional embodiment, if the data generation interface comprises object configuration items and execution sequence configuration items, while acquiring the object feature data and execution sequence data in response to the input operation of the user on the data generation interface, the processor 11 is used for: acquiring identifiers and attributes of a plurality of objects needed by the structured data in response to configuration operations of the user to the object configuration items, to serve as the object feature data; and is also used for: acquiring a plurality of execution sequences and description information in response to configuration operations of the user to the execution sequence configuration items, to serve as the execution sequence data.

In an optional embodiment, the attributes of the object comprise at least one of the followings: types, amounts, addition modes and addition time of the objects; and the addition modes comprise manual addition or automatic addition In an optional embodiment, the description information of the execution sequence comprises at least one of the followings: execution sequence associated objects, execution modes and execution parameters.

In an optional embodiment, while converting the execution sequence data into the executable state control instruction of the Internet-of-Things device, the processor 11 is used for: combining control codes and description information that correspond to the plurality of execution sequences in accordance with the plurality of execution sequences based on a preset corresponding relation between the execution sequences and the control codes, to form the state control instruction.

In an optional embodiment, while generating the structured data according to the state control instruction and the object feature data, the processor 11 is used for: for each execution sequence, determining a target object associated with the execution sequence in the plurality of objects in accordance with the description information of the execution sequence; and associating the control codes and description information of the execution sequences with identifiers and attributes of the target objects to obtain the structured data.

In an optional embodiment, the structured data is an electronic recipe, and the object feature data is a cooking material.

Correspondingly, the embodiments of the present disclosure further provide a computer readable storage medium storing a computer program. When the computer program is executed, various steps that may be executed by the terminal device in the above method embodiments may be implemented.

Figure 1G:
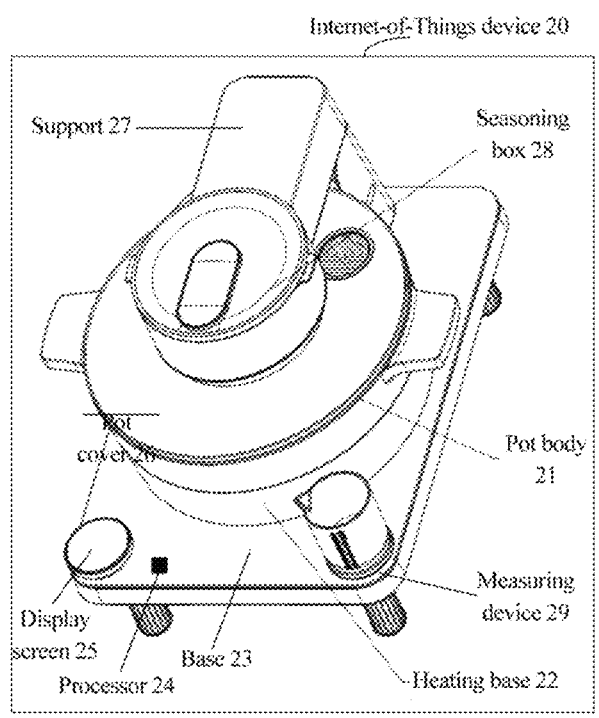
FIG. 1g is a structural schematic diagram of an Internet-of-Things device provided by embodiments of the present disclosure.

FIG. 1g is a structural schematic diagram of the Internet-of-Things device in the embodiments of the present disclosure. As shown in FIG. 1g, the Internet-of-Things device 20 comprises a display screen 25, a processor 24 and a memory storing a computer program; a number of the processor 24 or the memory may be one or more.

The memory is mainly used for storing computer programs, and these computer programs may be executed by the processor 24, so that the processor 24 controls the Internet-of-Things device 20 to realize corresponding functions and complete corresponding actions or tasks. In addition to storing the computer programs, the memory may be configured to store various other data to support operations on the Internet-of-Things device 20. Examples of the data include instructions for any application or method operated on the Internet-of-Things device 20.

The memory may be implemented by volatile or non-volatile memory devices of any type or a combination of the devices, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

In the embodiments of the present disclosure, an implementation form of the processor 24 is not limited. For example, it may be but not limited to CPU, GPU or MCU, etc. The processor 24 may be seen as a control system of the Internet-of-Things device 20, and may be used for executing a computer program stored in the memory so as to control the Internet-of-Things device 20 to realize corresponding functions and complete corresponding actions or tasks. It should be noted that, according to different implementation forms and location scenarios of the Internet-of-Things device 20, the functions to be implemented and the actions or tasks to be completed thereby will be different. Correspondingly, different computer programs may be stored in the memory, while the processor 24 may control the Internet-of-Things device 20 to realize different functions and complete different actions or tasks by executing different computer programs.

In some optional embodiments, if the Internet-of-Things device 20 is a cooking device in a cooking scenario, the Internet-of-Things device 20 may further include a pot body 21, a heating base 22 for heating the pot body 21, and a base 23 bearing the heating base 22 as shown in FIG. 1g. The display screen 25, the processor 24 and the memory may be arranged on the base 23. Further optionally, as shown in FIG. 1g, the Internet-of-Things device 20 may further include: a pot cover 26 used for covering the pot body 21; a support 27 used for supporting the pot body 21 and the pot cover 26; a seasoning box 28 used for containing seasonings required for cooking; a measuring device 29 used for measuring the amount of the contained seasonings; an audio component used for outputting prompt information to a user, and a communication component used for establishing communication connection with other devices (the audio component and the communication component are not shown in FIG. 1g). FIG. 1g schematically shows partial components only. It does not mean that, the Internet-of-Things device 20 only comprises the components shown in FIG. 1g. The Internet-of-Things device 20 may further comprise other components for different application requirements. Specific components are determined by depending on a product form of the Internet-of-Things device 20.

In the embodiments of the present disclosure, while executing the computer program in the memory, the processor 24 is used for: receiving structured data transmitted by the terminal device, wherein the structured data comprises the object feature data, the state control instruction to the Internet-of-Things device and the association relationship therebetween; executing a corresponding operation according to the state control instruction, the object feature data and the association relationship therebetween; and acquiring execution state prompt information that corresponds to the state control instruction, and outputting the execution state prompt information to the display screen 25. The display screen 25 is used for displaying the execution state prompt information to the user to enable the user to know the current execution state.

In an optional embodiment, while executing the corresponding operation according to the state control instruction, the object feature data and the association relationship therebetween, the processor 24 is used for: parsing description information and control codes of a plurality of execution sequences from the state control instruction, and parsing identifiers and attributes of a plurality of objects from the object feature data; and sequentially executing corresponding control codes of the plurality of execution sequences in accordance with the description information of the plurality of execution sequences and the attributes of associated objects thereof, to execute corresponding operations.

In an optional embodiment, while sequentially executing the corresponding control codes of the plurality of execution sequences in accordance with the description information of the plurality of execution sequences and the attributes of associated objects thereof, to execute corresponding operations, the processor 24 is used for: parsing the description information that corresponds to the control codes and the attributes of associated objects thereof as control parameters needed by the executed control codes with respect to currently executed control codes; and executing the control codes according to the control parameters to execute corresponding operations.

In an optional embodiment, while acquiring execution state prompt information that corresponds to the state control instruction, the processor 24 is used for: acquiring execution state prompt information that corresponds to the currently executed control codes in accordance with a corresponding relationship between local built-in control codes and the execution state prompt information with respect to the currently executed control codes.

In an optional embodiment, the type of the execution state prompt information comprises at least one of picture, text and voice; correspondingly, while outputting the execution state prompt information, the processor 24 is used for outputting at least one of the following operations: displaying the execution state prompt information of the picture type on a display screen; displaying the execution state prompt information of the text type on the display screen; and playing the execution state prompt information of the voice type in a voice manner.

In an optional embodiment, the structured data is an electronic recipe, and the object feature data is a cooking material.

In addition to a function of executing corresponding operations according to the structured data, the Internet-of-Things device 20 provided by the present embodiment may have a function of generating the structured data. Specifically, while executing the computer program in the memory, the processor 24 in the Internet-of-Things device 20 may also be used for: acquiring object feature data and execution sequence data in response to an input operation of a user on the data generation interface; and converting the execution sequence data into an executable state control instruction of the Internet-of-Things device 20, and generating the structured data according to the state control instruction and the object feature data and saving the structured data locally. Detailed implementation of the related operations shall refer to the above embodiments. Unnecessary details are not given herein.

Correspondingly, the embodiments of the present disclosure further provide a computer readable storage medium storing a computer program. When the computer program is executed, various steps that may be executed by the cooking device in the above method embodiments may be implemented.

It may be seen from the above embodiments that, a user may select a corresponding recipe from a preset recipe in the intelligent automatic cooker, and delicious foods may be automatically cooked by the intelligent automatic cooker according to the recipe selected by the user. In a practical application, the user may continuously cook a plurality of dishes by utilizing the intelligent automatic cooker, and a plurality of delicious foods may be continuously cooked by the intelligent automatic cooker under instruction of the user. However, in the process of continuously cooking the plurality of dishes, the efficiency of intelligent automatic cooker is relatively low; higher manual cost is needed; and poor experience is brought to the user in the process of providing intelligent cooking services for the user.

Figure 2A:
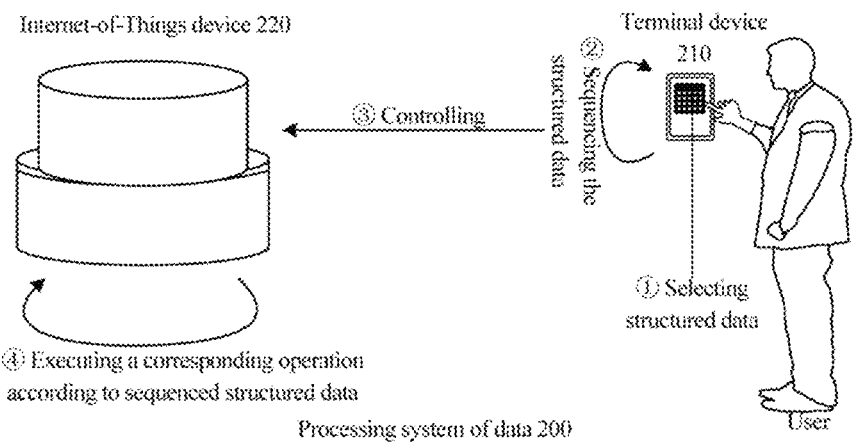
FIG. 2a is a structural schematic diagram of another processing system of data provided by embodiments of the present disclosure.

To solve the above problems, the embodiments of the present disclosure provide a data processing system. FIG. 2a is a structural schematic diagram of the data processing system provided by the embodiments of the present disclosure. As shown in FIG. 2a, a processing system of data 200 comprises a terminal device 210 and an Internet-of-Things device 220. The Internet-of-Things device 220 may execute corresponding operations according to the structured data; the structured data comprises object feature data, wherein the object feature data is feature data of an object (referred to as an execution object for short) involved in an execution corresponding operation of the Internet-of-Things device 220; and according to different application scenarios to which the Internet-of-Things device 220 belongs, the execution object will be different, and the feature data of the execution object will also be different. The structured data may direct the Internet-of-Things device 220 to execute operations on the execution objects. The Internet-of-Things device 220 may execute corresponding operations according to the structured data under control of the terminal device 210. As shown in ① of FIG. 2a, the terminal device 210 is provided with a structured data selection function. A user may select or make a plurality of desired structured data via the terminal device 210; and the structured data comprises the object feature data. Further, as shown in ② of FIG. 2a, the terminal device 210 may determine the execution sequences of the plurality of structured data according to similarity of the object feature data among the plurality of structured data. Further, as shown in ③ of FIG. 2a, the terminal device 210 may control the Internet-of-Things device 220 to execute a corresponding operation in accordance with the plurality of structured data according to the determined execution sequence. Further, as shown in ④ of FIG. 2a, the Internet-of-Things device 220 may sequentially execute corresponding operations according to the structured data according to the control of the terminal device 210.

Optionally, the terminal device 210 may sequentially transmit a control instruction to the Internet-of-Things device 220 according to the execution sequence among the plurality of structured data; the Internet-of-Things device 220 acquires the current structured data (namely, structured data to be executed) according to the control instruction of the terminal device 210, and calculates similarity of the object feature data between the current structured data and the previous structured data; and when the similarity of the object feature data between the current structured data and the previous structured data meets a set similarity condition, a corresponding operation is executed according to the current structured data. In the process, the plurality of structured data are rationally sequenced by the terminal device 210, so that the structured data with higher similarity may be executed together, thereby facilitating resource sharing and improving execution efficiency.

In the embodiments of the present disclosure, the terminal device 210 may display a first interface to the user while acquiring the plurality of structured data; a data list is included on the first interface; and the structured data may be selected by the user from the data list. The terminal device 210 may acquire the plurality of selected structured data in response to a selection operation of the user to the structured data list, and display the plurality of structured data on the second interface according to a selected sequence. Further, a function of adjusting the execution sequence of the plurality of structured data may be provided on the second interface; and before the execution sequence of the plurality of structured data is determined by the user, prompt information whether to selectively adjust the execution sequence of the plurality of structured data may be displayed on the second interface to prompt the user to adjust the execution sequence of the plurality of structured data according to the requirements. If the user determines to adjust the execution sequence of the plurality of structured data, the terminal device 210 may respond to a confirm operation of the user to the prompt information and execute an operation of determining the execution sequence of the plurality of structured data according to the similarity of the object feature data among the plurality of structured data.

Further, while determining the execution sequence of the plurality of structured data according to the similarity of the object feature data among the plurality of structured data, the terminal device 210 may divide the plurality of structured data into a plurality of grades, wherein each grade at least includes one structured data; and the execution sequence of the structured data at a high grade takes precedence over the execution sequence of the structured data at a low grade. If each grade includes at least two structured data, the terminal device 210 may determine an execution sequence between the at least two structured data according to the similarity of the object feature data between the at least two structured data. Further optionally, when the plurality of structured data are divided into the plurality of grades, at least one reference material category may be preset; and each reference material category represents a grade other than the highest grade. When each structured data is classified, with respect to each structured data, whether the structured data comprises the object feature data under the reference material category is judge; if the structured data comprises the object feature data under the reference material category, the structured data is divided into a grade corresponding to the comprised reference material category; and if the structured data does not comprise the object feature data under any reference material category, the structured data is divided as the highest grade.

In the embodiments of the present disclosure, while determining the execution sequence between the at least two structured data according to the similarity of the object feature data between the at least two structured data, the terminal device 210 may calculate the similarity of the object feature data between the at least two structured data according to the adding sequence, contents and categories of the object feature data in the at least two structured data. Further, the at least two structured data may be classified according to the similarity of the object feature data from high to low to obtain the execution sequence between the at least two structured data Optionally, when the similarity of the object feature data between at least two structured data is calculated by the terminal device 210, for any two structured data, if the contents of the object feature data on the same adding sequence in the any two structured data are all the same, the similarity of the object feature data between the any two structured data is determined as first similarity; if the contents of the object feature data on the same adding sequence in the two structured data are not all the same, but the categories of the object feature data on the same adding sequence are all the same, the similarity of the object feature data between the any two structured data is determined as second similarity; and if the categories of object feature data on the same adding sequence in the any two structured data are not all the same, the similarity of the object feature data between the any two structured data is determined as third similarity, wherein the first similarity is greater than the second similarity, and the second similarity is greater than the third similarity.

Further, after obtaining the execution sequence between the at least two structured data, the terminal device 210 may transmit a first execution instruction to the Internet-of-Things device 220 in sequence according to the execution sequence, wherein the first execution instruction includes identifier information of the structured data to be executed in sequence; or, the terminal device 210 may carry the execution sequence in a second execution instruction and transmit the second execution instruction to the Internet-of-Things device 220 for enabling the Internet-of-Things device 220 to execute operations corresponding to a plurality of structured data in sequence according to the execution sequence.

In the embodiments of the present disclosure, while receiving the execution instruction transmitted by the terminal device 210, the Internet-of-Things device 220 may determine whether it is necessary to process hardware resources dependent on the execution operation according to the similarity of the object feature data between the current structured data and the previous structured data. If the similarity of the object feature data between the current structured data and the previous structured data does not meet the set similarity condition, the Internet-of-Things device 220 may output first prompt information to prompt the user to process the hardware resources dependent on the execution operation; and after seeing the prompt information, the user may choose whether to process the hardware resources dependent on the execution operation according to requirements. Further, the user may transmit the execution instruction to the Internet-of-Things device 220 after not processing the hardware resource or processing the hardware resource, and the Internet-of-Things device 220 executes a corresponding operation according to the current structured data in response to an instruction of not processing the hardware resource transmitted by the user or an execution continuing instruction transmitted by the user after processing the hardware resource.

Optionally, if the Internet-of-Things device 220 determines that the hardware resource dependent on the execution operation needs to be processed according to the similarity of the object feature data between the current structured data and the previous structured data, when the first prompt information is transmitted to the user, identifier information of the to-be-processed hardware resource may be identified according to the similarity of the object feature data between the current structured data and the previous structured data; and when the first prompt information is output to the user, prompt information with the identifier information of the to-be-processed hardware resource is output for enabling the user to confirm whether to process the to-be-processed hardware resource.

In another optional embodiment, the Internet-of-Things device 220 may also receive the similarity of the object feature data between the current structured data and the previous structured data transmitted by the terminal device 210; or the similarity of the object feature data between the current structured data and the previous structured data is calculated according to the adding sequence, content and category of the object feature data in the current structured data and the object feature data in the previous structured data. Further, whether the hardware resource dependent on the execution operation needs to be processed is determined according to the received or calculated similarity; and when it is determined that the hardware resource dependent on the execution operation needs to be processed, first prompt information is transmitted to the user so as to prompt the user to process the hardware resource dependent on the execution operation.

According to the processing system of data 200 in the embodiments of the present disclosure, the plurality of structured data are rationally sequenced by the terminal device 210, so that the structured data with higher similarity may be executed together, thereby facilitating resource sharing and improving the execution efficiency. According to different application scenarios, the structured data and device forms of Internet-of-Things devices will be different. For example, the processing system of data 200 in the embodiments of the present disclosure may be applied to cooking scenarios for solving problems occurring in the cooking scenarios, such as lower cooking efficiency and higher human cost. When applied to the cooking scenario, the Internet-of-Things device may be a kitchen robot (such as an automatic cooker and any other cooking device); an execution object of the kitchen robot may be seasoning in a cooking process; the hardware resource dependent on the execution operation may be a seasoning box containing the seasoning; and correspondingly, the structured data having a guiding effect on the Internet-of-Things device may be an electronic recipe. For example, the current structured data is a current electronic recipe; the previous structured data is a previous electronic recipe; and the object feature data may be seasoning information. The technical problems existing in the cooking scenarios and solutions of the technical problems in the embodiments of the present disclosure are described below in detail.

In the cooking scenario, the cooking device may execute a cooking operation according to the instruction of the user to cook a desired delicious food for the user. If the user wants to continuously cook multiple dishes, cooking instructions may be transmitted to the cooking device in sequence; and the cooking device cooks the dishes according to the corresponding electronic recipes in sequence according to the instructions. Generally, 4-6 kinds of seasonings may be required for cooking a dish; and according to the characteristic, the cooking device is provided with a certain number of seasoning boxes, for example 6 seasoning boxes, for enabling the user to fill the seasonings required for cooking the dish and to provide conditions for automatic cooking. During cooking, the cooking device may sequentially add the seasonings into the cooking pot according to the cooking step corresponding to the current dish based on the adding sequence of the seasonings. However, the seasonings required for cooking different dishes or the adding sequences of the seasonings may be different. Moreover, in case of successively cooking the multiple dishes, more than 6 kinds of seasonings may be required; and the number of the seasoning boxes provided by the cooking device cannot meet filling requirements of all the seasonings required for successively cooking the multiple dishes simultaneously, which involves a problem that the seasoning boxes are reused in different cooking processes. To maintain taste of each dish, after completion of cooking of one dish, if a new seasoning is required for cooking the next dish, the user needs to manually wash the seasoning box for containing the seasoning required for cooking the next dish. Thus, the cooking efficiency is lowered; the human cost is increased; and poor experience is brought to the user in the intelligent cooking service.

According to the technical solutions provided by the embodiments of the present disclosure, under a condition that the plurality of electronic recipes are selected by the user via the terminal device, the terminal device may sort the plurality of electronic recipes according to the similarity of seasoning information among the plurality of electronic recipes. Thus, the seasoning information between adjacent electronic recipes may be as close as possible, and the cooking device is controlled to execute the cooking operation according to the electronic recipes in sequence according to the sequence after sequencing. Therefore, the seasoning boxes may be shared among the electronic recipes; a number of times of cleaning the seasoning boxes may be decreased; the cooking efficiency is improved; and the human cost is saved.

Figure 2B:
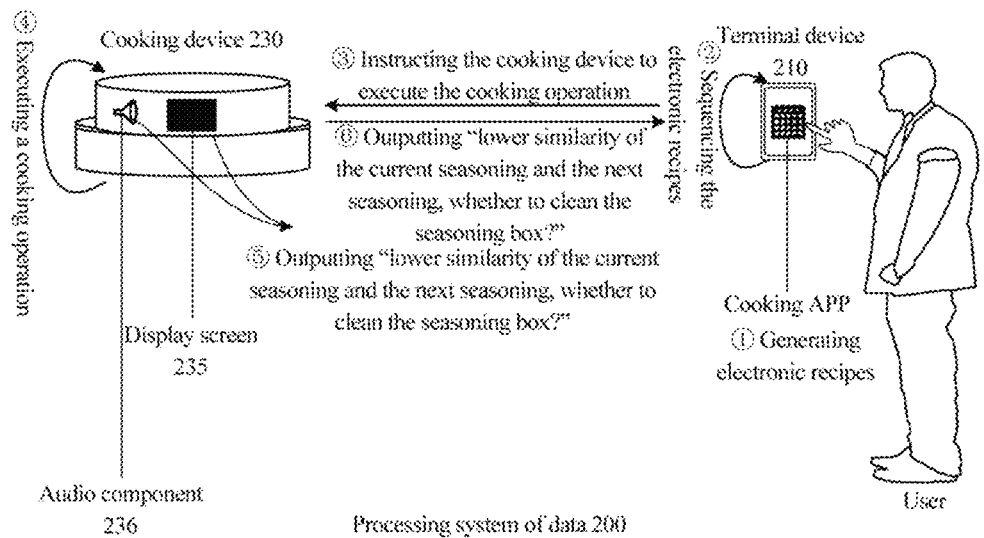
FIG. 2c is a flow chart of a processing method of data provided by embodiments of the present disclosure.
FIG. 2d is a flow chart of another executing method of data provided by embodiments of the present disclosure.

FIG. 2b is a structural schematic diagram of another data processing system provided by the embodiments of the present disclosure. As shown in FIG. 2b, a processing system of data 200 comprises a terminal device 210 and a cooking device 230. The terminal device 210 may be any terminal device that can provide a man-machine interaction interface and support a man-machine interaction operation. For example, the terminal device 210 may be a mobile phone, a tablet computer, a notebook computer or a desktop computer, etc. A cooking application corresponding to the cooking device 230 may be installed in the terminal device 210. The cooking application may establish communication connection and perform data interaction with the cooking device 230. The cooking device 230 is an intelligent device that can automatically execute a cooking operation according to an electronic recipe so as to cook a corresponding dish. A user may cook one or more dishes through the cooking device 230. Regardless of one dish or multiple dishes cooked, the user may select or make a desired electronic recipe through a cooking application on the terminal device 210; the electronic recipe is provided for the cooking device 230 by the terminal device 210; and then the user may transmit a cooking instruction to instruct the cooking device 230 to execute the cooking operation according to the corresponding electronic recipe to cook the dishes.

When the user wants to continuously cook multiple dishes through the cooking device 230, the user may select or make a plurality of electronic recipes through the cooking application on the terminal device 210. For example, a cooking APP corresponding to the cooking device 230 installed on the terminal device 210 includes a "recipe list" function. As shown in action ① of FIG. 2b, the user may select a plurality of desired electronic recipes by using the cooking APP. For example, when the cooking APP is used for the user, the terminal device 210 may display an electronic recipe list to the user for enabling the user to select the electronic recipe from the list. The terminal device 210 may respond to a selection operation of the user on the plurality of electronic recipes, and acquire the plurality of electronic recipes selected by the user, wherein the plurality of electronic recipes comprise seasoning information required for cooking the dish, such as oil, salt and light soy sauce required for cooking the dish and the amounts thereof.

Each of the electronic recipes selected by the user includes respective seasoning information; and the seasoning information in each electronic recipe may be the same as or similar to the seasoning information in other electronic recipes. The same or similar seasoning information in different electronic recipes mainly refers to the same or similar information such as the adding sequence of the seasonings, the contents of the seasonings (i.e. specific seasonings) and the categories of the seasonings. The same seasoning box may be shared with the same or similar seasoning information; and since the same or similar seasoning information in adjacent electronic recipes has little or no effect on the taste of two adjacent dishes, the seasoning boxes do not need to be washed; and the number of times for washing the seasoning boxes may be decreased. In view of this, as shown in action ② of FIG. 2b, the terminal device 210 may determine the cooking sequence of the plurality of electronic recipes according to the similarity of the seasoning information among the plurality of electronic recipes. Further, the cooking device 230 may be controlled to cook corresponding dishes in accordance with the plurality of electronic recipes according to the cooking sequence. Thus, the electronic recipes with the same or similar seasoning information may be adjacent to each other, so that when the adjacent dishes are cooked by the cooking device 230, due to the same or similar seasonings added, the same seasoning box may be directly shared without cleaning. Therefore, a frequency of the user cleaning the seasoning box during continuous cooking of the multiple dishes by the cooking device 230 can be decreased; time is saved; the overall cooking efficiency is further improved; and the human cost is saved.

In an optional embodiment, the terminal device 210 may display a first interface to the user through the cooking APP while acquiring the plurality of electronic recipes; and the first interface includes an electronic recipe list for allowing the user to select the electronic recipes required for cooking the dish from the list. The electronic recipes in the list may be preset electronic recipes corresponding to a plurality of popular homemade dishes, such as, scrambled eggs with tomatoes, stewed beancurd with minced pork in pepper sauce, vinegar-pepper shredded potatoes, sauteed cabbage with vinegar sauce, stir-fried beans, braised beef brisket with potatoes, double cooked pork slices, fish filets in hot chili oil, braised pieces of chicken, cola chicken wings and spareribs with brown sauce. If the user wants to cook multiple dishes, the plurality of electronic recipes may be selected from the electronic recipe list. The terminal device 210 may acquire the plurality of selected electronic recipes in response to the selection operation of the user on the electronic recipe list, and display the plurality of electronic recipes on a second interface according to a selected sequence, wherein the second interface may be a floating layer, a window or a new application page and is used for displaying the plurality of electronic recipes. For example, when the user sequentially selects electronic recipes that correspond to the stewed beancurd with minced pork in pepper sauce, double cooked pork slices and spareribs with brown sauce from the electronic recipe list, the electronic recipes that correspond to the stewed beancurd with minced pork in pepper sauce, double cooked pork slices and spareribs with brown sauce may be sequentially displayed in the second interface from top to bottom under a condition that a confirm operation is executed. Each electronic recipe includes corresponding cooking steps during cooking of the current dish, and required seasoning information. For example, the step information is as follows: a first step of adding oil; a second step of adding green onion, ginger and garlic; a third step of adding bean curd; a fourth step of adding wild pepper and chilli powder; a fifth step of adding salt and a sixth step of dishing up; and the seasoning information includes oil, green onion, ginger, garlic, wild pepper, chilli powder and salt.

Further optionally, after the plurality of electronic recipes are displayed on the second interface according a selected sequence of the electronic recipes, the terminal device 210 may display prompt information whether to selectively adjust the cooking sequence of the plurality of electronic recipes on the second interface for enabling the user to select whether to adjust the cooking sequence of the plurality of recipes. If a user determines to adjust the cooking sequence of the plurality of recipes, a confirm operation may be transmitted with respect to the prompt information; the terminal device 210 may respond to the confirm operation of the user to the prompt information and execute an operation of determining the cooking sequence of the plurality of electronic recipes according to the similarity of the seasoning information among the plurality of electronic recipes. It should be noted that, in addition to displaying the prompt information whether to selectively adjust the cooking sequence of the plurality of electronic recipes on the second interface, the terminal device 210 may output the prompt information by voice, or prompt the user whether to adjust the cooking sequence among the plurality of electronic recipes in manners such as screen flicker and signal lights flashing. In addition, in addition to executing the operation of determining the cooking sequence of the plurality of electronic recipes according to the similarity of the seasoning information among the plurality of electronic recipes according to the confirm operation of the user to the prompt information, the terminal device 210 may also automatically execute the operation of determining the cooking sequence of the plurality of electronic recipes according to the similarity of the seasoning information among the plurality of electronic recipes after displaying the plurality of electronic recipes on the second interface according to the selected sequence of the electronic recipes.

Either way, the cooking sequence of the plurality of electronic recipes adjusted by the terminal device 210 may be the same as the sequence of the electronic recipes selected by the user (namely, the sequence of the electronic recipes displayed in the second interface before adjustment), or may be different from the sequence of the electronic recipes selected by the user. Since the cooking sequence of the plurality of electronic recipes is adjusted by the terminal device 210 according to the similarity of the seasoning information among the plurality of electronic recipes, if the user considers the condition that the seasoning boxes may need to be cleaned frequently during continuous cooking of two dishes with great differences of the seasoning information while selecting the electronic recipes, and the electronic recipes are deliberately selected according to the similarity of the seasoning information, the cooking sequence of the plurality of electronic recipes adjusted by the terminal device 210 may also be the same as the sequence of the plurality of electronic recipes selected by the user.

Optionally, while seeing the prompt information whether to selectively adjust the cooking sequence of the plurality of electronic recipes displayed on the second interface, the user may also select to not adjust the cooking sequence of the plurality of electronic recipes and directly confirm to execute the cooking operation. Thus, the cooking device 230 may sequentially execute the cooking operation according to the sequence of the electronic recipes selected by the user. Further optionally, the cooking APP may be provided with a function of manually adjusting the cooking sequence of the plurality of recipes; and if the cooking sequence of the plurality of electronic recipes adjusted by the terminal device 210 is not the desired cooking sequence of the user, the user may adjust the cooking sequence of the plurality of electronic recipes adjusted by the terminal device 210 as the own desired cooking sequence again via the manual adjustment function. For example, in the three dishes such as the stewed beancurd with minced pork in pepper sauce, double cooked pork slices and spareribs with brown sauce, the cooking sequence adjusted by the terminal device 210 is the spareribs with brown sauce, the stewed beancurd with minced pork in pepper sauce and the double cooked pork slices. However, the user considers that taste of the stewed beancurd with minced pork in pepper sauce is better when hot, and the taste of the double cooked pork slices is not greatly affected even if the food is slightly cool, then the user may manually adjust the cooking sequence as the double cooked pork slices, the spareribs with brown sauce and the stewed beancurd with minced pork in pepper sauce. Therefore, the user may enjoy the stewed beancurd with minced pork in pepper sauce immediately; and the taste is not affected.

In the embodiments of the present disclosure, an implementation mode that the cooking sequence of the plurality of electronic recipes is determined by the terminal device 210 according to the similarity of the seasoning information among the plurality of electronic recipes is not limited. In an optional embodiment, the terminal device 210 may divide the plurality of electronic recipes into a plurality of grades and sort the plurality of electronic recipes according to different grades. After the electronic recipes are divided into the plurality of grades, at least one electronic recipe is included under each grade; and the cooking sequence of the electronic recipe under the high grade takes precedence over the cooking sequence of the electronic recipe under the low grade. If at least two electronic recipes are included in each grade, the cooking sequence between the at least two electronic recipes is determined according to the similarity of seasoning information between the at least two electronic recipes. In other words, the cooking sequence of the electronic recipes is adjusted by the terminal device 210 in a progressive manner. Firstly, the plurality of electronic recipes is classified; and cooking sequences among different grades are determined to form an overall structure of the cooking sequence of the plurality of electronic recipes. Secondly, the cooking sequence of at least two electronic recipes in each grade is further adjusted according to the similarity of the seasoning information therebetween, so that the electronic recipes in each grade may be sequentially cooked. Finally, the cooking sequence of the plurality of electronic recipes selected by the user is determined through the grades having different cooking sequences and the cooking sequence of the electronic recipes under each grade. In this way, the cooking sequence of electronic recipes having similar seasoning information may be respectively individually adjusted; moreover, a number of times for sequencing the cooking sequences of all the electronic recipes in a unified manner can be decreased, thereby improving the adjustment efficiency of the cooking sequence of the plurality of electronic recipes.

Optionally, the terminal device 210 may preset at least one reference seasoning category; each reference seasoning category represents a grade other than the highest grade. Further, when the plurality of electronic recipes are divided into the plurality of grades, whether each electronic recipe includes seasoning information under the reference seasoning category is judged with respect to each electronic recipe, so as to determine a grade that should correspond to each electronic recipe. If each electronic recipe includes the seasoning information under the reference seasoning category, the electronic recipe is divided into a grade corresponding to the included reference seasoning category; and if the electronic recipe does not include seasoning information under any reference seasoning category, the electronic recipe is divided as the highest grade. In the present embodiment, the number and form of the reference seasoning categories are not limited. For example, the reference seasoning categories may be determined by categories such as oil, powder or solids, liquid, and sauce. For example, when oil, liquid and sauce types are determined as the reference seasoning category, the electronic recipes containing oil, liquid or sauce type seasoning information do not belong to the highest grade; and the corresponding grade of the oil, liquid or sauce type may be determined according to specific requirements. For example, it is determined that, the liquid type seasoning grade is higher than the oil type seasoning grade; and the oil type seasoning grade is higher than the sauce type seasoning grade. Further, if the user has a higher taste requirement for a delicious food, the above categories may be further subdivided, e.g. the reference seasoning category is determined according to sour, sweet, bitter, spicy and salty tastes under each category. For example, if it is judged that the seasoning information of the current electronic recipe contains liquid type seasoning, which of the sour, sweet, bitter, spicy and salty tastes the contained liquid type seasoning belongs to is further judged. Moreover, the grade of the electronic recipe is determined according to the category to which the seasoning information of the current electronic recipe belongs.

In the above embodiments, the purpose of selecting the reference seasoning category is to divide the plurality of electronic recipes into different grades, and the purpose of dividing the plurality of electronic recipes into different grades is to determine the cooking sequence of the electronic recipes among different grades. Then, while selecting the reference seasoning category, the terminal device 210 needs to consider the similarity of seasoning information of electronic recipes of adjacent cooking sequences. Generally, seasoning boxes may not need to be cleaned when two seasonings having the same or higher similarity are contained in sequence, while the seasoning boxes need to be cleaned when two seasonings having greater differences are contained in sequence, so as to decrease the influence of the previous seasoning on the taste of subsequent dishes. For example, the seasoning box containing the liquid, oil or sauce cannot directly contain powdered or granular or solid seasonings after the seasoning in the seasoning box is used up; and the seasoning box can be used only when cleaned. The seasoning box containing the powdered or granular or solid seasonings in sequence may be used for directly containing the seasoning without cleaning. Therefore, for non-powdered or solid seasonings, while selecting the reference seasonings, the terminal device 210 may distinguish the seasonings according to consistency of the seasonings, set a consistency threshold value for the consistency of the seasonings, determine the seasoning with the consistency greater than the set consistency threshold value as the reference seasoning, and further grade the seasoning information of the plurality of electronic recipes according to the reference seasonings.

Optionally, the plurality of seasoning grades in the embodiments of the present disclosure may include a first grade and a second grade; at least one reference seasoning category comprises a seasoning grade having the consistency greater than the set consistency threshold value; the seasoning grade having the consistency greater than the set consistency threshold represents the second grade; and the seasoning grade having the consistency smaller than the set consistency threshold represents the first grade. For example, the sauce type seasoning is selected as the reference seasoning category, and the lowest consistency value of the sauce type seasoning serves as the consistency threshold value (for example, the consistency threshold value is 30%). Then, the seasoning with the consistency greater than the consistency threshold value is the second grade, such as sesame paste, peanut paste, tomato paste, bean paste, etc.; and the seasoning with the consistency value smaller than the consistency threshold is the first grade, such as mature vinegar, light soy sauce, dark soy sauce and white vinegar. Thus, after the grade of the seasoning information is divided, the terminal device 210 may judge the similarity of the seasonings according to the grade of the seasoning information, e.g., the similarity of seasonings of the same grade is higher than the similarity of seasonings of different grades.

In the actual cooking process, the seasonings required for cooking each dish have a certain adding sequence. Moreover, before each dish is cooked by the cooking device 230 in the embodiment of the present disclosure, the seasonings required by the to-be-cooked dish need to be added into the cooking device 230; and corresponding seasonings are sequentially added by the cooking device 230 according to the sequence of the seasoning boxes. Therefore, for the seasoning information divided into each grade, if at least two kinds of seasoning information are included in the grade, the terminal device 210 may calculate the similarity of the seasoning information between the at least two electronic recipes according to the adding sequence, content and category of the seasoning information in the at least two electronic recipes while determining the cooking sequence of the at least two electronic recipes according to the similarity of the seasoning information between the at least two electronic recipes. Further, the terminal device 210 may sort the at least two electronic recipes according to the similarity of seasoning information from high to low to obtain the cooking sequence between the at least two electronic recipes. The calculation of the similarity of seasoning information between at least two electronic recipes according to the adding sequence, content and category of the seasoning information in the at least two electronic recipes may be as follows: the content and/or category of the seasoning information on the same adding sequence in any two electronic recipes is compared.

Further, the similarity of the seasoning information of the two electronic recipes is calculated according to a comparison result of the seasoning information on all the same adding sequences of the current two electronic recipes. For example, the similarity of the seasoning information of the electronic recipes A, B and C is calculated; and 5 seasonings are included in the seasoning information of the electronic recipes A, B and C. Assuming that the seasoning information of the electronic recipes A and B, B and C, and A and C is compared in sequence according to the seasoning adding sequences 1-5 of each electronic recipe, 4 seasonings in the A and B are the same or similar, 5 seasonings in the B and C are the same or similar, and 2 seasonings in the A and C are the same or similar. Then, according to the similarity of seasoning the information sequencing from high to low, the cooking sequence of the electronic recipes A, B and C may be obtained as follows: C, B and A. During cooking according to the sequence after sequencing, it may be ensured that the seasoning box does not need to be cleaned after the dish corresponding to the electronic recipe C is completely cooked; the dish corresponding to the electronic recipe B may be directly contained; and only one seasoning box needs to be cleaned after the dish corresponding to the electronic recipe B is completely cooked. It may be seen that, when multiple delicious foods need to be continuously cooked, the cooking sequence is adjusted according to the similarity of the seasoning information among the plurality of electronic recipes; and the frequency of cleaning the seasoning boxes may be decreased during cooking according to the ranked cooking sequence, thereby improving the cooking efficiency and decreasing the labor cost.

In the embodiments of the present disclosure, when the content and category of the seasoning information on the same adding sequence in any two electronic recipes are compared, the similarity of the seasoning information may be distinguished according to the comparison result for sequencing according to the similarity of the seasoning information (e.g., in the above embodiments, sequencing according to the similarity of the seasoning information while determining the cooking sequence of the electronic recipes A, B and C). In an optional embodiment, the terminal device 210 may divide the similarity of the seasoning information among the electronic recipes into first similarity, second similarity and third similarity, wherein the first similarity is greater than the second similarity and the second similarity is greater than the third similarity. Further, the terminal device 210 may sort the cooking sequence of the electronic recipes according to the determined similarity grade, i.e. the electronic recipe having the first similarity is cooked firstly, the electronic recipe having the second similarity is cooked secondly, and the recipe having the third similarity is cooked finally. The process of determining the similarity grade of the seasoning information on the same adding sequence in any two electronic recipes may refer to the following embodiments:

Determination of the first similarity: if the contents of the seasoning information on the same adding sequence in any two electronic recipes are all the same, the similarity of the seasoning information between any two electronic recipes is determined as the first similarity. For example, by taking the cooked sweet and sour fillet of pork and double cooked pork slices as examples, the contents and sequence of the seasonings added into the cooked sweet and sour fillet of pork and double cooked pork slices are as follows: oil, green onion, ginger, garlic, sugar, vinegar and salt. Then, the terminal device 210 may determine that the seasonings required for cooking the double cooked pork slices may be directly contained in the seasoning box after the sweet and sour fillet of pork is completely cooked, and the seasoning box does not need to be cleaned, i.e. the similarity of two electronic recipes with all the same contents of seasoning information in the same adding sequence is the highest; and the terminal device 210 may determine the similarity as the first similarity.

Determination of the second similarity: if the contents of the seasoning information on the same adding sequence in any two electronic recipes are not all the same, but the categories of the seasoning information on the same adding sequence are all the same, the similarity of the seasoning information between any two electronic recipes is determined as the second similarity. For example, by taking cooked dishes P and Q as an example, assuming that 6 seasonings are respectively included in the dishes P and Q, the first three seasonings of the dishes P and Q are oil, light soy sauce and mature vinegar in sequence, and the last three seasonings have different contents, but all the seasonings are granular seasonings. For example, the last three seasonings of the dish P are sugar, chicken essence and salt in sequence; and the last three seasonings of the dish Q are sesame, pepper seeds and chili powder in sequence. According to practical cooking experience, after the cooking of the dish P is finished, the seasonings corresponding to the dish Q are directly contained in the seasoning box that corresponds to the dish P. Since the sugar, chicken essence and salt used by the dish P will not stick to the seasoning box, the taste of the seasonings corresponding to the dish Q is not substantially changed, namely, the taste of the dish Q is not affected. Therefore, although the contents of the seasonings added in sequence on the same adding sequence are not all the same, the similarity of two electronic recipes of the same category is higher. Then, the terminal device 210 may determine the similarity as the second similarity.

Determination of the third similarity: if the categories of seasoning information on the same adding sequence in any two electronic recipes are not all the same, the similarity of the seasoning information between any two electronic recipes is determined as the third similarity. For the seasoning information of two different categories on the same adding sequence, the seasoning boxes need to be cleaned when the dishes that correspond to the two electronic recipes are continuously cooked. For example, by taking cooking of sauted meat shreds with soy bean paste and meatballs with sesame seeds as an example, assuming that the remaining seasonings of the sauted meat shreds with soy bean paste and meatballs with sesame seeds are all the same or are of the same category, but the third seasoning of the sauted meat shreds with soy bean paste is the sauce, and the third seasoning of the meatballs with sesame seeds is the sesame. Then, after completion of the cooking of the sauted meat shreds with soy bean paste, if the third seasoning box is not cleaned and is used for directly containing the sesame, the newly contained sesames may stick to the seasoning box. During cooking of the meatballs with sesame seeds, a possible condition may exist as follows: the sesames in the third seasoning box cannot be poured out or insufficient sesames are poured out. Thus, the cooking effect and the taste of the dish are affected. Therefore, for the seasoning information of different categories on the same adding sequence, the terminal device 210 may determine similarity of the seasoning information as the third similarity, i.e. lower similarity.

Optionally, according to the practical cooking experience, generally the oil seasoning is added after the pot is heated when a delicious food is cooked; and edible salt is added before dishing up, i.e., after other seasonings are all added. Therefore, when the similarity of the seasoning information on the same adding sequence in any two electronic recipes is compared, the first seasoning box and the last seasoning box may also be ignored, and only the middle seasoning information is compared, thereby improving the efficiency of adjusting the cooking sequence of the plurality of electronic recipes.

Further optionally, although the seasonings on different adding sequence have different seasoning categories, the seasonings may be considered similar as long as the cooking effect is not affected. For example, if a user wants to cook vinegar-pepper shredded potatoes after completion of the cooking of the stewed beancurd with minced pork in pepper sauce, the step of adding the chilli powder during cooking the stewed beancurd with minced pork in pepper sauce corresponds to the seasoning box 4; the step of adding the chilli powder during cooking the vinegar-pepper shredded potatoes corresponds to the seasoning box 3; and the step of adding vinegar during cooking the vinegar-pepper shredded potatoes corresponds to the seasoning box 4. Although the seasoning boxes that correspond to the step of adding the chili powder during the cooking of the two dishes are inconsistent, the taste of the vinegar-pepper shredded potatoes is not affected when the vinegar required for cooking the vinegar-pepper shredded potatoes is contained in the seasoning box used for containing the chilli powder during cooking of the stewed beancurd with minced pork in pepper sauce. Therefore, the seasoning box 4 containing the chili powder may be not cleaned after completion of the cooking of the stewed beancurd with minced pork in pepper sauce; and the vinegar required for cooking the vinegar-pepper shredded potatoes may be directly contained in the seasoning box 4, so as to decrease the number of times of cleaning the seasoning box.

Further, while determines the cooking sequence of the plurality of electronic recipes according to the similarity of seasoning information of any two electronic recipes, the terminal device 210 may generate a corresponding cooking instruction according to the adjusted cooking sequence of the plurality of electronic recipes, and transmit the cooking instruction to the cooking device 230, to control the cooking device 230 to cook the corresponding dishes according to the plurality of electronic recipes. In the present embodiment, an implementation form of the terminal device 210 transmitting the cooking instruction to the cooking device 230 is not limited. Optionally, the terminal device 210 may transmit a first cooking instruction to the cooking device 230 in sequence according to a cooking sequence, wherein the first cooking instruction may include identifier information of electronic recipes needing to be cooked in sequence. Thus, the cooking device 230 acquires the corresponding electronic recipe according to the identifier information. Alternatively, the terminal device 210 may carry the cooking sequence in the second cooking instruction, and transmit the second cooking instruction to the cooking device 230 for enabling the cooking device to sequentially cook the dishes corresponding to the plurality of electronic recipes according to the cooking sequence.

As shown in the interaction action ③ in FIG. 2b, the terminal device 210 may instruct the cooking device 230 to execute a cooking operation according to the adjusted cooking sequence of the plurality of electronic recipes. The cooking device 230 may acquire a current electronic recipe according to an instruction transmitted by the terminal device 210, wherein the current electronic recipe includes seasoning information required for cooking the dish. In the embodiments of the present disclosure, the manner of the cooking device 230 for acquiring the electronic recipe is not limited. For example, if the terminal device 210 only carries the electronic recipe while transmitting a cooking instruction to the cooking device 230, the cooking device 230 may directly read electronic recipe information in the instruction; or, under a condition that the cooking device 230 locally stores an electronic recipe, the terminal device 210 may carry identifier information of the electronic recipe in the cooking instruction transmitted to the cooking device 230, and the cooking device 230 may locally acquire an electronic recipe selected by the user according to the identifier information. Further, the number of the electronic recipes acquired by the cooking device 230 is also not limited. If the terminal device 210 transmits the electronic recipes while transmitting the cooking instruction to the cooking device 230, the terminal device 210 may transmit the cooking instruction and an electronic recipe that corresponds to the current to-be-cooked dish once before each dish is cooked according to the cooking sequence of the electronic recipes; or, the terminal device 210 may transmit the cooking instruction to the cooking device 230 once only, wherein the instruction carries all the electronic recipes. Under a condition that the cooking device 230 locally stores the electronic recipes, the terminal device 210 may transmit the cooking instruction once before each dish is cooked according to the cooking sequence of the electronic recipes, wherein the cooking instruction carries electronic recipe identifier information corresponding to the current to-be-cooked dish, so that the cooking device 230 locally acquires the electronic recipes with the cooking instruction in sequence; or, the terminal device 210 may transmit the cooking instruction to the cooking device 230 once only, and the instruction carries identifier information of all the electronic recipes, so that the cooking device 230 locally acquires the electronic recipes with the cooking instruction in sequence, or acquires all the electronic recipes at a time.

As shown in the interaction action ④ in FIG. 2b, while acquiring the current electronic recipe, the cooking device 230 may execute a corresponding cooking operation according to the current electronic recipe when it is determined that the seasoning box does not need to be cleaned in accordance with the similarity of the seasoning information between the current electronic recipe and the previous electronic recipe. If the cooking device 230 determines that the seasoning box needs to be cleaned according to the similarity of the seasoning information between the current electronic recipe and the previous electronic recipe, first prompt information may be output to the user to prompt the user whether to clean the corresponding seasoning box. In the embodiments of the present disclosure, the manner and content of outputting the first prompt information by the cooking device 230 are not limited. As shown in FIG. 2b, the cooking device 230 may further comprise a display screen 235 and an audio component 236; and under a condition that the cooking device 230 determines that the seasoning box needs to be replaced, a user may be prompted to clean the seasoning box in the form of image-text, animation or voice via the display screen 235 and/or the audio component 236. For example, as shown in the action ⑤ of FIG. 2b, the prompt information may be the content including "lower similarity of the current seasoning and the next seasoning, whether to clean the seasoning box?".

In addition, as shown in the interaction ⑥ of FIG. 2b, the cooking device 230 may also transmit the prompt information to the terminal device 210, so that the user can know the cooking state in time even if the user is not in the vicinity of the cooking device 230; and under a condition that the seasoning box needs to be replaced, the user can return to the cooking device 230 to replace the seasoning box. Further, when the user sees the first prompt information, if the user selects not to clean the seasoning box, an operation of "not cleaning the seasoning box" may be executed by the cooking device 230 or the terminal device 210; and if the user selects to clean the seasoning box, the seasoning box may be removed for cleaning, and after cleaning, the seasoning box may be reinstalled, and a new seasoning may be contained. Further, a "continue cooking" operation may be executed by the cooking device 230 or the terminal device 210. The user may transmit an operation instruction to the cooking device 230 after executing the corresponding operation; and further, the cooking device 230 may execute the corresponding cooking operation according to the current electronic recipe in response to an instruction of not cleaning the seasoning box transmitted by the user or a continue cooking instruction transmitted by the user after cleaning the seasoning box.

Further optionally, when the cooking device 230 identifies whether the seasoning box needs to be cleaned according to the similarity of the seasoning information between the current electronic recipe and the previous electronic recipe, if it is identified that the seasoning box needs to be cleaned, the identifier information corresponding to the to-be-cleaned seasoning box may be further identified. When the first prompt information is output, prompt information with the identifier information of the to-be-cleaned seasoning box may be output for enabling the user to confirm whether to clean the to-be-cleaned seasoning box. Further, while viewing the first prompt information, the user can know which seasoning box should be cleaned according to the identifier information of the seasoning box so as to avoid wrong cleaning.

In the embodiments of the present disclosure, a manner of determining to clean the seasoning box by the cooking device 230 is not limited. The cooking device 230 may directly receive the similarity of the seasoning information between the current electronic recipe and the previous electronic recipe transmitted by the terminal device 210. The cooking device may directly judge whether the seasoning box needs to be cleaned before cooking the next dish according to the similarity of the received seasoning information between the current electronic recipe and the previous electronic recipe. If it is judged that the similarity of the seasoning information between the electronic recipe and the previous electronic recipe is the first similarity or the second similarity, the seasoning box does not need to be cleaned; and the cooking device 230 executes a corresponding cooking operation according to the electronic recipe to be cooked. If it is judged that the similarity of the seasoning information between the electronic recipe and the previous electronic recipe is the third similarity, the seasoning box needs to be cleaned, and the cooking device 230 will transmit prompt information to the user to prompt the user to change a corresponding seasoning box in time.

It should be noted that, in the present disclosure, a manner of determining the similarity of the seasoning information of any two electronic recipes is not limited; and there may be more implementation modes according to actual requirements. In addition, a manner of adjusting the cooking sequence of the plurality of electronic recipes is also not defined, and is not limited to the similarity of seasoning information of any two electronic recipes. Manners that can be realized and through which the same purpose can be achieved are applicable to the embodiments of the present disclosure. Unnecessary details are not given herein.

In the embodiments of the present disclosure, when the user wants to continuously cook multiple dishes, a plurality of electronic recipes that are desired by the user and may be executed by the cooking device may be selected through the terminal device; and the cooking device is instructed to cook delicious foods according to the electronic recipe selected by the user. Moreover, the terminal device is further provided with a function of adjusting the cooking sequence of the plurality of electronic recipes; the cooking sequence of the plurality of electronic recipes can be adjusted according to the similarity of seasoning information among the plurality of electronic recipes; and an electronic recipe with seasoning information of higher similarity may be adjusted as an adjacent cooking sequence. Thus, the number of times for cleaning the seasoning box is minimized when the cooking device sequentially cooks dishes corresponding to each electronic recipe according to the adjusted cooking sequence. For the user, the human cost is decreased, and the user experience is improved; and for the cooking process, the cooking efficiency is improved, and the time is saved.

In addition to the above cooking scenario, the data example system in the embodiments of the present disclosure may also be applied to any other scenario suitable for controlling an Internet-of-Things device to execute corresponding operations according to structured data; and a specific implementation process is similar to the above embodiment and may refer to the above embodiment. To explain the contents of the embodiments in the present disclosure in detail, the embodiments of the present disclosure further provide a data processing method. The method is applicable to the terminal device in the above system embodiments.

Figure 2C:
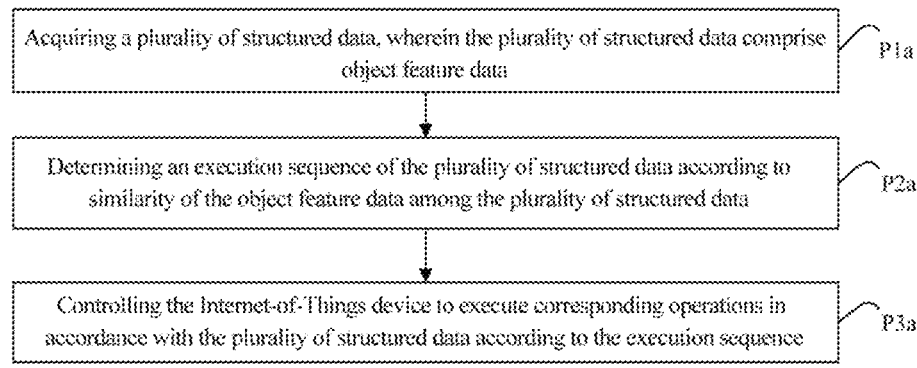

FIG. 2c is a flow chart of a data processing method. As shown in FIG. 2c, the method comprises:

P1a, acquiring a plurality of structured data, wherein the plurality of structured data comprise object feature data;

P1d, determining an execution sequence of the plurality of structured data according to similarity of the object feature data among the plurality of structured data; and P1f, controlling the Internet-of-Things device to execute corresponding operations in accordance with the plurality of structured data according to the execution sequence.

In the embodiments of the present disclosure, the terminal device may acquire the plurality of structured data selected by the user, wherein the plurality of structured data comprises the object feature data. Further, in the case of obtaining the object feature data of the plurality of structured data, the execution sequence of the plurality of structured data may be adjusted according to the similarity of the object feature data among the plurality of structured data, and the Internet-of-Things device is instructed to execute corresponding operations according to the adjusted execution sequence. In the embodiments of the present disclosure, since the object feature data between adjacent sequenced structured data has higher similarity, the structured data with higher similarity may be executed together. Thus, some resources may be shared; and the execution efficiency is improved.

In an optional embodiment, the terminal device may display a first interface to the user; the first interface includes a data list; and the user may execute a selection operation via the first interface to select the desired structured data from the data list. Further, the terminal device may acquire the plurality of selected structured data in response to the selection operation of the user, and display the plurality of structured data on the second interface according to the selected sequence. In the present embodiment, implementation forms of the first interface and the second interface are not limited, and may be, for example, a floating layer, a window or a new application page. Further, the manner of a plurality of users for executing the selection operation is not limited. For example, a form of the check box may be selected by the user in front of each structured data; and the plurality of structured data may be displayed in a pull-down list to be selected by the user. An implementation form that meets the requirement is applicable to the present embodiment.

Further optionally, before the execution sequence of the plurality of structured data is determined, prompt information whether to selectively adjust the execution sequence of the plurality of structured data may also be displayed on the second interface for prompting the user whether to adjust the execution sequence before the user completely selects the plurality of structured data and executes the operation. If the execution sequence of the plurality of structured data is selectively adjusted, a confirm operation may be executed on the prompt information; furthermore, the terminal device may execute an operation of determining the execution sequence of the plurality of structured data according to the similarity of the object feature data among the plurality of structured data in response to the confirm operation of the user on the prompt information.

In an optional embodiment, when the execution sequence of the plurality of structured data is determined according to the similarity of the object feature data among the plurality of structured data, the plurality of structured data may be divided into a plurality of grades, wherein at least one structured data is contained under each grade, and the execution sequence of the structured data under a high grade takes precedence over the execution sequence of the structured data under a low grade. When the Internet-of-Things device is instructed to execute an operation, the operation may be preferentially executed on structured data at a high grade, and then an operation may be executed on structured data at a low grade, so as to execute corresponding operations according to the adjusted execution sequence. Further, if each grade contains at least two structured data, the execution sequence between the at least two structured data may also be determined according to the similarity of the object feature data between the at least two structured data. Then, when the Internet-of-Things device is instructed to execute operations on the plurality of structured data, not only the structured data of different grades can be executed sequentially, but also the operations can be executed in sequence for the structured data at each grade.

In an optional embodiment, before dividing the plurality of structured data into a plurality of grades, at least one reference material category may be preset as grading reference, wherein each reference material category represents a grade other than the highest grade. When the structured data is graded, whether each structured data includes object feature data under the reference material category is judged. If the structured data includes the object feature data under the reference material category, the structured data is divided into a grade corresponding to the included reference material category; and if the structured data does not include the object feature data under any reference material category, the structured data is classified as the highest grade. In the present embodiment, the number and form of the reference material category are not limited. For example, if the materials are seasonings in the cooking scenario, the reference material categories may be determined according to oil, powder or solid, liquid and sauce, etc.; and according to different material attributes, the determination manner of the reference material category may also be different.

In an optional embodiment, the plurality of grades may include a first grade and a second grade, and the reference material category may be a material category having consistency greater than a set consistency threshold value. When the first grade and the second grade are divided, the material category having the consistency greater than the set consistency threshold value may represent the second grade; and the material category having the consistency smaller than the set consistency threshold may represent the first grade. For example, if the materials are seasonings in the cooking scenario, and a sauce type seasoning is selected as the reference material category, assuming that the lowest consistency value of the sauce type seasoning is 30%, the seasoning with the consistency greater than 30% is of the second grade; and the seasoning having the consistency value smaller than 30% is of the first grade. Thus, after the grades of the material information are divided, the similarity of the materials may be judged according to the grade of the material information, namely, the similarity of the materials of the same grade is higher than the similarity of the materials of different grades.

In an optional embodiment, the similarity of the object feature data between the at least two structured data may be calculated according to the adding sequence, content and category in the object feature data in the at least two structured data when the execution sequence between the at least two structured data is determined according to the similarity of the object feature data between the at least two structured data. The calculation of the similarity of the object feature data between the at least two structured data according to the adding sequence, content and category of the object feature data in the at least two structured data may be as follows: the contents and/or categories of the object feature data on the same adding sequence in any two structured data are compared. Further, the at least two structured data are sequenced according to the similarity of the object feature data from high to low, so that the execution sequence between the at least two structured data may be obtained so as to be used for instructing the Internet-of-Things device to execute corresponding operations according to the execution sequence.

Further optionally, when the similarity of the object feature data between the at least two structured data is calculated according to the adding sequence, content and category of the object feature data in the at least two structured data, the similarity of the object feature data may be distinguished. For example, the similarity of the object feature data is distinguished as first similarity, second similarity and third similarity, wherein the first similarity is greater than the second similarity and the second similarity is greater than the third similarity.

Optionally, for any two structured data, if it is judged that the contents of object feature data on the same adding sequence in any two structured data are all the same, the similarity of the object feature data between the any two structured data is determined as the first similarity, i.e., the highest similarity. If materials that correspond to the previous and later hardware resources dependent on the execution operation have the first similarity, it is indicated that the previous and later materials have the same content. Thus, the hardware resource does not need to be processed. If it is judged that the contents of the object feature data on the same adding sequence in any two structured data are not all the same, but the categories of the object feature data on the same adding sequence are all the same, the similarity of the object feature data between the any two structured data is determined as the second similarity. If materials that correspond to the previous and later hardware resources dependent on the execution operation have the second similarity, it is indicated that the previous and later materials are of same type although the contents of the materials are different. Thus, a new material may be used without processing the hardware resource. If it is judged that the categories of object feature data on the same adding sequence in any two structured data are not all the same, the similarity of the object feature data between the any two structured data is determined as the third similarity, i.e., the lowest similarity. If materials that correspond to the previous and later hardware resources dependent on the execution operation have the third similarity, it is indicated that the previous and later materials are of different types. Thus, a new material may be used under a condition that the hardware resource is processed.

Under a condition that the execution sequence of the plurality of structured data is determined according to the similarity of the object feature data among the plurality of structured data, the Internet-of-Things device may be controlled to execute a corresponding operation in accordance with the plurality of structured data according to the execution sequence. Optionally, a first execution instruction may be sequentially transmitted to the Internet-of-Things device in sequence according to the execution sequence, wherein the first execution instruction includes identifier information of the structured data that needs to be executed in sequence; and the Internet-of-Things device may acquire corresponding structured data via the identifier information. Alternatively, the execution sequence may be carried in a second cooking instruction; and the second execution instruction is transmitted to the Internet-of-Things device for enabling the Internet-of-Things device to sequentially execute operations corresponding to the plurality of structured data according to the execution sequence.

In one application scenario, the structured data may be an electronic recipe; and the object feature data may be seasoning information, such as the above cooking scenario. The technical solutions of the present disclosure are described below in detail in combination with specific application scenarios.

Application Scenario I

A user Zhang San has a smart phone and an intelligent automatic cooker. Zhang San transmits electronic recipes to the intelligent automatic cooker via the smart phone; the intelligent automatic cooker receives a plurality of electronic recipes from the user Zhang San; and before preset cooking starting time, the intelligent automatic cooker sorts the received 8 to-be-cooked electronic recipes transmitted by Zhang San. The sequencing basis is similarity of seasonings of the electronic recipes of the 8 to-be-cooked dishes. Dishes with high similarity of the seasoning information are cooked in sequence, thereby decreasing the turnover and cleaning frequency of seasoning boxes. When the 8 dishes are respectively braised prawns, braised pork in brown sauce, braised beef with soy sauce, shredded cabbage, dry fried string beans, leaf lettuce with garlic, small green vegetables and steamed perch with scallion and black beans, the 8 dishes are sequenced according to respective seasoning information as follows: peanut oil, wild pepper oil, salt, soy sauce, sugar, vinegar, ginger, garlic, green onion and chili. The three dishes having identical seasoning information refer to the braised prawns, shredded cabbage and dry fried string beans; and the three dishes are cooked first according to a sequence. Most of the seasoning information of the braised pork in brown sauce and braised beef with soy sauce is the same; and the two dishes are sequenced after the above three dishes are cooked. A little seasoning information of the leaf lettuce with garlic, small green vegetables and steamed perch with scallion and black beans is the same; and the three dishes are sequenced after the braised pork in brown sauce and braised beef with soy sauce are cooked. After analyzing the seasoning information of the 8 dishes, the automatic cooker performs cooking sequencing on the 8 dishes. On the one hand, a number of the times of changing seasonings and cleaning seasoning boxes between every two dishes of Zhang San may be decreased; on the other hand, trouble of mixed taste caused by incomplete cleaning of a pot body of the automatic cooker and the seasoning boxes between every two dishes of Zhang San may also be decreased. Meanwhile, the cooking efficiency may be improved; and the automatic cooker has excellent user experience and viscosity.

Application Scenario II

When users Li Si, Wang wu, et al. take meals in a restaurant, dishes are cooked for various users by using an intelligent automatic cooker. The intelligent automatic cooker receives a plurality of electronic recipes transmitted by the users Li Si, Wang wu, et al. Before preset cooking start time, the received 10 to-be-cooked electronic recipes transmitted by the plurality of users are sequenced by the intelligent automatic cooker. The sequencing basis is similarity of seasonings of the electronic recipes of the 10 to-be-cooked dishes. Dishes with high similarity of the seasoning information are cooked in sequence, thereby decreasing the turnover and cleaning frequency of seasoning boxes. When the 10 dishes are respectively braised prawns, braised pork in brown sauce, braised beef with soy sauce, shredded cabbage, dry fried string beans, fried beef with pepper, leaf lettuce with garlic, small green vegetables, steamed perch with scallion and black beans and tomato and egg soup, the 10 dishes are sequenced according to respective seasoning information as follows: peanut oil, wild pepper oil, salt, soy sauce, sugar, vinegar, ginger, garlic, green onion and chili. The four dishes having identical seasoning information refer to the braised prawns, shredded cabbage, dry fried string beans and fried beef with pepper; and the four dishes are cooked first according to a sequence. Most of the seasoning information of the braised pork in brown sauce and the braised beef with soy sauce is the same; and the two dishes are sequenced after the above four dishes are cooked. A little seasoning information of the leaf lettuce with garlic, small green vegetables, steamed perch with scallion and black beans and tomato and egg soup is the same; and the four dishes are sequenced after the braised pork in brown sauce and the braised beef with soy sauce are cooked. After analyzing the seasoning information of the 10 dishes, the automatic cooker performs cooking sequencing on the 10 dishes. On the one hand, a number of the times of changing seasonings and cleaning seasoning boxes between every two dishes of the automatic cooker may be decreased; on the other hand, trouble of mixed taste caused by incomplete cleaning of a pot body of the automatic cooker and the seasoning boxes between every two dishes of the automatic cooker may also be decreased. Meanwhile, the cooking efficiency may be improved; and the automatic cooker has excellent user experience and viscosity.

Application Scenario III

When users Li Si, Wang wu, et al. take meals in a restaurant, dishes are cooked for various users by using an intelligent automatic cooker. The intelligent automatic cooker receives a plurality of electronic recipes transmitted by the users Li Si, Wang wu, et al. Before preset cooking start time, the received 10 to-be-cooked electronic recipes transmitted by the plurality of users are sequenced by the intelligent automatic cooker. The sequencing basis is similarity of seasonings of the electronic recipes of the 10 to-be-cooked dishes. Dishes with high similarity of the seasoning adding sequences are cooked in sequence, thereby decreasing the turnover and cleaning frequency of seasoning boxes. When the 10 dishes are respectively braised prawns, braised pork in brown sauce, braised beef with soy sauce, shredded cabbage, dry fried string beans, fried beef with pepper, leaf lettuce with garlic, small green vegetables, steamed perch with scallion and black beans and tomato and egg soup, the 10 dishes are sequenced according to respective seasoning information as follows: edible oil, chili, ginger, garlic, green onion, salt, sugar, vinegar, soy sauce and aromatic vinegar. The four dishes having identical seasoning adding sequences refer to the braised prawns, shredded cabbage, dry fried string beans and fried beef with pepper; and the four dishes are cooked first according to a sequence. Most of the seasoning information of the braised pork in brown sauce and the braised beef with soy sauce is the same; and the two dishes are sequenced after the above four dishes are cooked. A little seasoning information of the leaf lettuce with garlic, small green vegetables, steamed perch with scallion and black beans and tomato and egg soup is the same; and the four dishes are sequenced after the braised pork in brown sauce and the braised beef with soy sauce are cooked. After analyzing the seasoning adding sequences of the 10 dishes, the automatic cooker performs cooking sequencing on the 10 dishes. On the one hand, a number of the times of changing seasonings and cleaning seasoning boxes between every two dishes of the automatic cooker may be decreased; on the other hand, trouble of mixed taste caused by incomplete cleaning of a pot body of the automatic cooker and the seasoning boxes between every two dishes of the automatic cooker may also be decreased. Meanwhile, the cooking efficiency may be improved; and the automatic cooker has excellent user experience and viscosity.

The embodiments of the present disclosure further provide an executing method of data. The method is applicable to the Internet-of-Things device in the system embodiments.

Figure 2D:
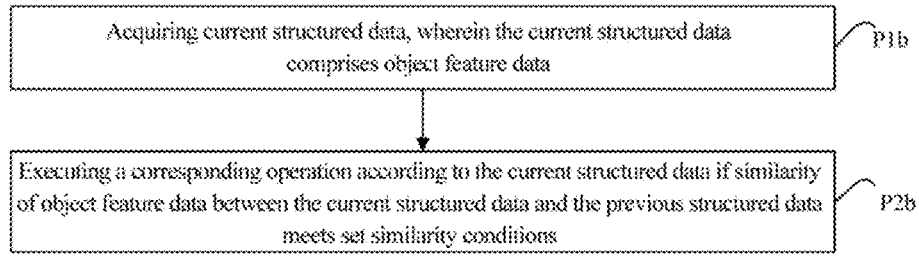

FIG. 2d is a flow chart of an executing method of data. As shown in FIG. 2d, the method comprises:

P1b. acquiring current structured data, wherein the current structured data comprises object feature data; and P2b, executing a corresponding operation according to the current structured data if similarity of object feature data between the current structured data and the previous structured data meets set similarity conditions.

In the embodiments of the present disclosure, the Internet-of-Things device may receive a control instruction transmitted by the terminal device, and acquire the current structured data according to the control instruction. The current structured data comprises object feature data. The Internet-of-Things device may judge the similarity of the object feature data between the current structured data and the previous structured data according to the object feature data, and execute a corresponding operation according to the current structured data under a condition that it is determined that the similarity meets the set similarity condition.

In an optional embodiment, on the basis of the similarity of the object feature data between the current structured data and the previous structured data, if the similarity of the object feature data between the current structured data and the previous structured data does not meet the set similarity condition, first prompt information may also be output to prompt the user to process the hardware resource dependent on the execution operation. In the embodiments of the present disclosure, the manner and content of the output first prompt information are not limited. For example, the user may be prompted in the form of image-text, animation or voice. If the user chooses not to process the hardware resource, the corresponding operation may be executed, and an instruction of not processing the hardware resource is transmitted to the Internet-of-Things device. Alternatively, if the user has already processed the hardware resource, an instruction of continuously executing the operation may be transmitted to the Internet-of-Things device. Further, the Internet-of-Things device may execute the corresponding operation according to the current structured data in response to the instruction of not processing the hardware resource transmitted by the user or the instruction of continuously executing the operation transmitted by the user after the hardware resource is processed.

Further optionally, under a condition that it is determined that the set similarity condition is not met according to the similarity of the object feature data between the current structured data and the previous structured data, identifier information of a to-be-processed hardware resource may also be identified; and prompt information with the identifier information of the to-be-processed hardware resource may be output to the user. Then, according to the identifier information, the user may know which hardware resource should be processed so as to avoid processing errors.

In the embodiments of the present disclosure, the manner of determining the similarity of the object feature data between the current structured data and the previous structured data by the Internet-of-Things device is not limited, which depends on the content of the control instruction transmitted to the Internet-of-Things device by the terminal device. Optionally, the Internet-of-Things device may directly receive the similarity of the object feature data between the current structured data and the previous structured data transmitted by the terminal device, and determine whether the set similarity condition is met according to the similarity. Alternatively, the Internet-of-Things device may calculate the similarity of the object feature data between the current structured data and the previous structured data according to the adding sequence, content and category of the object feature data in the received current structured data and the object feature data in the previous structured data, and determine whether the set similarity condition is met according to the calculation result. A specific calculation mode may refer to the above embodiments. Unnecessary details are not given herein.

Optionally, when the embodiments of the present disclosure are applied to the cooking scenario, the current structured data may be a current electronic recipe; the previous structured data may be a previous electronic recipe; the hardware resource may be a seasoning box containing the seasonings; and the object feature data may be seasoning information.

Another terminal device in the embodiments of the present disclosure has a similar structure to that of the device as shown in FIG. 1f. Specifically, another terminal device may refer to FIG. 1f, and is not illustrated herein. In the present embodiment, the terminal device comprises: a display screen, a processor and a memory storing a computer program. The display screen is used for displaying a structured data list; and a number of the processor or the memory may be one or more.

A memory is mainly used for storing computer programs, and these computer programs may be executed by the processor, so that the processor controls the terminal device to realize corresponding functions and complete corresponding actions or tasks. In addition to storing the computer programs, the memory may be configured to store various other data to support operations on the terminal device. Examples of the data include instructions for any application or method operated on the terminal device.

In the embodiments of the present disclosure, the implementation form of the processor is not limited, and may be, for example, but not limited to, CPU, GPU or MCU, etc. The processor may be seen as a control system of the terminal device and may be used for executing a computer program stored in the memory to control the terminal device to realize corresponding functions and complete corresponding actions or tasks. It is worth noting that, according to different implementation forms and location scenarios of the terminal device, the functions to be implemented and the actions or tasks to be completed thereby will be different; and correspondingly, the computer programs stored in the memory may be different, and the processor may execute different computer programs to control the terminal device to realize different functions and complete different actions or tasks.

In some optional embodiments, the terminal device may further comprise other components such as a power component, a communication component and an audio component. These components are merely one part of components that are given schematically. It does not mean that the terminal device only comprises these components. The terminal device may further comprise other components for different application requirements. Specific components are determined based on the product form of the terminal device.

In the embodiments of the present disclosure, while executing the computer programs in the memory, the processor is used for: acquiring a plurality of structured data in response to a selection operation of the user, wherein the plurality of structured data comprises object feature data; determining the execution sequence of the plurality of structured data according to the similarity among the object feature data in the plurality of structured data; and controlling the Internet-of-Things device to execute corresponding operations in accordance with the plurality of structured data according to the execution sequence.

In an optional embodiment, while acquiring the plurality of structured data, the processor is used for: displaying a first interface, wherein the first interface includes a data list for enabling a user to select desired structured data from the data list; and displaying the plurality of structured data on the second interface according to a selected sequence in response to a selection operation of the user to the data list.

In an optional embodiment, before determining the execution sequence of the plurality of structured data, the processor is further used for: displaying prompt information whether to selectively adjust the execution sequence of the plurality of structured data on a second interface; and executing an operation of determining the execution sequence of the plurality of structured data in accordance with similarity of the object feature data among the plurality of structured data in response to a confirm operation of the user to the prompt information.

In an optional embodiment, while determining the execution sequence of the plurality of structured data according to the similarity of the object feature data among the plurality of structured data, the processor is used for: dividing the plurality of structured data into a plurality of grades, wherein each grade at least includes one structured data, and the execution sequence of the structured data at a high grade takes precedence over the execution sequence of the structured data at a low grade; and determining the execution sequence between the at least two structured data according to the similarity of the object feature data between the at least two structured data if each grade includes at least two structured data.

In an optional embodiment, while dividing the plurality of structured data into a plurality of grades, the processor is used for: presetting at least one reference material category, wherein each reference material category represents a grade other than the highest grade; judging whether the structured data includes object feature data under the reference material category with respect to each structured data; dividing the structured data into grades corresponding to the included reference material category if the structured data includes the object feature data under the reference material category; and dividing the structured data as the highest grade if the structured data does not include the object feature data under any reference material category.

In an optional embodiment, the plurality of grades include a first grade and a second grade; the at least one reference material category includes a seasoning category having consistency greater than a set consistency threshold value; and the material category having consistency greater than the set consistency threshold value represents the second grade.

In an optional embodiment, while determining the execution sequence between the at least two structured data based according to the similarity of the object feature data between the at least two structured data, the processor is used for: calculating the similarity of object feature data between at least two structured data according to the adding sequence, content and category of the object feature data in the at least two structured data; and sequencing the at least two structured data according to the similarity of the object feature data from high to low to obtain an execution sequence between the at least two structured data.

In an optional embodiment, while calculating the similarity of the object feature data between the at least two structured data according to the adding sequence, the content and the category of the object feature data in the at least two structured data, the processor is used for: with respect to any two structured data, determining the similarity of the object feature data between any two structured data as the first similarity if the contents of the object feature data on the same adding sequence in any two structured data are all the same; determining the similarity of the object feature data between any two structured data as the second similarity if the contents of the object feature data on the same adding sequence in any two structured data are not all the same, but the categories of the object feature data on the same adding sequence are all the same; and determining the similarity of the object feature data between any two structured data as the third similarity if the categories of object feature data on the same adding sequence in any two structured data are not all the same. The first similarity is greater than the second similarity, and the second similarity is greater than the third similarity.

In an optional embodiment, while controlling the Internet-of-Things device to execute corresponding operations according to the plurality of structured data according to the execution sequence, the processor is used for: sequentially transmitting a first execution instruction to the Internet-of-Things device according to the execution sequence, wherein the first execution instruction includes identifier information of the structured data that needs to be executed according to the sequence; or carrying the execution sequence in a second execution instruction, and transmitting the second execution instruction to the Internet-of-Things device for enabling the Internet-of-Things device to execute operations corresponding to the plurality of structured data in sequence according to the execution sequence.

In an optional embodiment, the structured data is an electronic recipe and the object feature data is seasoning information.

The structure of another Internet-of-Things device in the embodiments of the present disclosure is similar to the structure of the device shown in FIG. 1g. Specifically, the Internet-of-Things device may refer to FIG. 1g, and is not illustrated herein. In the present embodiment, the Internet-of-Things device comprises a display screen, a processor and a memory storing a computer program, wherein a number of the processor or the memory may be one or more.

The memory is mainly used for storing computer programs, and these computer programs may be executed by the processor, so that the processor controls the Internet-of-Things device to realize corresponding functions and complete corresponding actions or tasks. In addition to storing computer programs, the memory may be configured to store various other data to support operations on the Internet-of-Things device. Examples of the data include instructions for any application or method operated on the Internet-of-Things device.

In the embodiments of the present disclosure, the implementation form of the processor is not limited, and may be, for example, but not limited to, CPU, GPU or MCU, etc. The processor may be seen as a control system of the Internet-of-Things device, and may be used for executing a computer program stored in the memory so as to control the Internet-of-Things device to realize corresponding functions and complete corresponding actions or tasks. It is worth noting that, according to different implementation forms and location scenarios of the Internet-of-Things devices, the functions to be implemented and the actions or tasks to be completed thereby will be different; and correspondingly, different computer programs may be stored in the memory, and the processor may execute different computer programs to control the Internet-of-Things device to realize different functions and complete different actions or tasks.

In some optional embodiments, if the Internet-of-Things device is a cooking device in a cooking scenario, the Internet-of-Things device may further include a pot body, a heating base for heating the pot body, and a base bearing the heating base. A display screen, a processor, and a memory may be arranged on the base. Further optionally, the Internet-of-Things device may further comprise: a pot cover for covering the pot body; a support for supporting the pot body and the pot cover; a seasoning box for containing seasonings required for cooking; a measuring device for measuring the amount of the contained seasonings; an audio component for outputting prompt information to a user; and a communication component for establishing communication connection with other devices. These components are merely one part of components that are given schematically. It does not mean that the Internet-of-Things device only comprises these components. The Internet-of-Things device may further comprise other components for different application requirements. Specific components are determined based on the product form of the Internet-of-Things device.

In the embodiment of the present disclosure, while executing the computer program in the memory, the processor is used for: receiving current structured data transmitted by a terminal device, wherein the structured data comprises seasoning information required for cooking a dish; and executing a corresponding operation according to the current structured data if similarity of the seasoning information between the current structured data and the previous structured data meets the set similarity condition, In an optional embodiment, the processor is further used for: outputting first prompt information to prompt a user to process a hardware resource dependent on an execution operation if the similarity of the seasoning information between the current structured data and the previous structured data does not meet a set similarity condition; and executing a corresponding operation according to the current structured data in response to an instruction of not processing the hardware resource transmitted by the user or an execution continuing instruction transmitted by the user after processing the hardware resource.

In an optional embodiment, while transmitting the first prompt information to the user, the processor is used for: identifying identifier information of a hardware resource to be processed according to the similarity of seasoning information between the current structured data and the previous structured data; and outputting the prompt information with the identifier information of the to-be-processed hardware resource for enabling the user to confirm whether to process the to-be-processed hardware resource.

In an optional embodiment, the processor is further used for: receiving the similarity of object feature data between the current structured data and the previous structured data transmitted by the terminal device; or calculating the similarity of the object feature data between the current structured data and the previous structured data according to the adding sequence, content and category of the object feature data in the current structured data and the object feature data in the previous structured data.

In an optional embodiment, the current structured data is a current electronic recipe; the previous structured data is a previous electronic recipe; the hardware resource is a seasoning box; and the object feature data is seasoning information.

Correspondingly, the embodiments of the present disclosure further provide a computer readable storage medium storing a computer program; and when the computer program is executed, various steps in the above method embodiments can be realized.

According to the Internet-of-Things device involved in the embodiments of the present disclosure, in practical applications, the structure of the Internet-of-Things device may also be different according to different intelligence degrees of the Internet-of-Things device. For example, by taking an Internet-of-Things device implemented as an automatic cooker as an example, for some automatic cookers, a pot cover of the pot body of each automatic cooker may be automatically opened and closed, and an opening/closing state of the pot cover may be monitored by a sensor. For another example, a display screen may be provided on some automatic cookers through which various types of cooking information may be broadcast. For another example, pot bodies of some automatic cookers may be provided with cooking mechanisms; for example, the cooking mechanisms may refer to mixers and stir-frying machines; and operating states and running hours of these cooking mechanisms may be automatically controlled.

In one embodiment of the present disclosure, a plurality of first components may be configured on the Internet-of-Things device, wherein corresponding first objects may be contained in the first components; and second components may also be arranged, wherein the first objects and the second objects may be contained in the second components In some application scenarios, to automatically control the addition amounts of the first objects, various first objects may be prefabricated into a liquid or solid form, so that the first objects may be conveniently added into the second components by controlling the opening and closing of the first component pipeline. By taking the Internet-of-Things device implemented as an automatic cooker as an example, the above first component is a seasoning box; the first object is seasoning; the second object is a food material; and the second component is a pot body. Seasonings may be conveniently added into the pot body by controlling the opening and closing of the seasoning box pipeline.

In one embodiment, the Internet-of-Things device may be of an integrated design; an operating system may be built in the Internet-of-Things device; and a display screen may be installed on the Internet-of-Things device. The Internet-of-Things device may receive various instructions input by a user and may feedback various types of information about the execution process of task objects to the user through a touch operating method or a key-type operation manner. In addition, the Internet-of-Things device may also be of a separate design, and a wireless or wired communication module may be installed on the Internet-of-Things device. The Internet-of-Things device may establish communication connection with an external intelligent device through a built-in communication module. For example, the Internet-of-Things device may establish wireless connection with intelligent terminal devices such as a smart phone, a smart speaker, an intelligent TV box, a smart watch, intelligent glasses, a computer device and an autonomous mobile robot via wireless modules such as Wi-Fi, Bluetooth, ZigBee and NFC (Near Field Communication), and may also establish wired connection with the intelligent terminal devices such as the smart phone, the smart speaker, the intelligent TV box, the smart watch, the intelligent glasses, the computer device and the autonomous mobile robot via wired modules such as a serial port, a USB interface and a Lightning interface. Thus, a user may issue instructions to the Internet-of-Things device by manipulating an external intelligent device, and monitor various data during the execution of the task object of the Internet-of-Things device through the intelligent device.

In addition, the Internet-of-Things device may further conduct communication connection with a cloud data processing server, so that various data acquired by the Internet-of-Things device may be uploaded to the data processing server for processing; and the processing result fed back by the data processing server may be received. Of course, if the computing capability of a built-in system of the Internet-of-Things device is high enough, the data processing may be executed by the Internet-of-Things device; and the data processing result is displayed to the user via a display screen or an intelligent terminal.

A plurality of structured data may be generally built in the current Internet-of-Things device. The structured data may be broadcast via voice or video during execution of a task object. Thus, the user may complete the process of executing the task by following the broadcast content. However, the built-in structured data in the current Internet-of-Things device is usually limited; and the speed of broadcasting the structured data and the speed of executing the task by the user may not be synchronized. Thus, a few target tasks may be made and the production effect of the target tasks is poor.

To solve the problem, the embodiments of the present disclosure further provide a generating method of structured data for the Internet-of-Things device and an executing method of structured data for the Internet-of-Things device. The method is applicable to the above intelligent Internet-of-Things device. Specifically, the generating method of structured data for the Internet-of-Things device provided by one implementation mode comprises: setting execution flow data of a task object in the structured data, and collecting user operation data and Internet-of-Things device operation data that correspond to the execution flow data; and determining condition parameters that correspond to the execution flow data of the task object according to the user operation data and the Internet-of-Things device operation data; and generating structured data according to each of the condition parameters.

In the present implementation mode, a user using the Internet-of-Things device may freely generate the own structured data, and share the generated structured data to other users in the network.

In the present implementation mode, the Internet-of-Things device may provide a "structured data recording" function. When the function is triggered, the Internet-of-Things device may enter the process of generating the structured data. Before generation of the structured data, both the first object and the second object required in the structured data may be prepared. The prepared first object may be put into a first component of the Internet-of-Things device. In a built-in system of the Internet-of-Things device or an external device connected with the Internet-of-Things device, a first object name may be set for each first component according to the first object placed in the first component. Thus, which first object is added to the second component during the execution of the task may be subsequently identified according to the set first object name.

In practice, each first component may be visually displayed in the display screen; and each first component may correspond to an editable control. The user may fill in the first object name in the editable control, so that the Internet-of-Things device may store the first object name input by the user to establish a corresponding relationship between the first component and the first object name.

In the present implementation mode, after entering the process of generating the structured data, the Internet-of-Things device may collect user operation data and Internet-of-Things device operation data involved in the execution flow data of each task object. Specifically, the Internet-of-Things device may provide a "new" function; and once the function is triggered, it is indicated that the new execution flow data of a new task object is generated. The execution flow data of different task objects may be arranged according to a time sequence established by the steps, so as to form the execution flow data of each task object in the whole structured data. Currently, after setting the execution flow data of the new task object in the structured data, the Internet-of-Things device may start the collection process of the user operation data and the Internet-of-Things device operation data.

In the present implementation mode, after corresponding user operation data and Internet-of-Things device operation data in the execution flow data of the task object are collected, condition parameters corresponding to the execution flow data of the task object may be determined according to the collected data, wherein the condition parameters may characterize various details in the execution flow data of the task object; and the execution flow data of the corresponding task object may be restored according to the condition parameters. In practical applications, types of the condition parameters may be preset. Specifically, a large amount of structured data or the execution process of an actual task object may be analyzed to summarize the condition parameters that may be involved in the execution flow data of the task object.

In one implementation mode, the condition parameters may comprise at least one of an execution flow data sequence number of the task object, a second component operation state, a task execution mode in the second component, execution time corresponding to the task execution mode in the second component, a third component opening/closing state, an execution temperature, a type of the first object, addition weight of the first object, and prompt information. The execution flow data sequence number of the task object may characterize the execution flow data of the execution flow data of the task object in the whole structured data.

It should be noted that, in practical applications, the condition parameters may include more contents. For example, the condition parameters may further comprise emptying time after the first object is added into each first component; and the emptying time may characterize the amount of the first object remaining in the first component. In addition, the condition parameters may further include cleaning time of each first component, and the emptying time after cleaning, etc. With the continuous update of the Internet-of-Things devices, the contents included in the condition parameters can also increase synchronously. More or less contents may be included in the condition parameters when essence of the technical solutions of the present disclosure is understood by those skilled in the art. However, the improvement should fall within the protection scope of the present disclosure.

In the present implementation mode, after the condition parameters corresponding to the execution flow data of each task object are determined, the execution flow data of each task object may be displayed in the form of condition parameters, so that the final structured data may be constructed. Various pieces of information included in the structured data may be displayed to the user via a display screen or an external device. To facilitate post-adjustment of the structured data, corresponding weight of the first object and/or the second object may be included in the displayed structured data; and the weight may be respectively provided with an adjustment control.

In the present implementation mode, the structured data displayed to the user is a visual interface. However, the structured data stored in the Internet-of-Things device or uploaded to the server needs to be a language that can be recognized by a computer. In view of this, inside the Internet-of-Things device, the execution flow data of each task object in the structured data may be converted into a corresponding data frame, and the converted data frame is uploaded to a server or locally stored in the Internet-of-Things device. Specifically, a data protocol may be formulated first during data conversion; and the data protocol may define a data format of the data frame. The data format may indicate which data segments should be included in the data frame and in which sequence the data segments should be arranged. In practical applications, these data segments may respectively characterize different condition parameters. Thus, the execution flow data of each task object may correspond to a data frame; and various condition parameters obtained by parsing the execution flow data of the task object may be included in the data frame.

In the present implementation mode, identifiers that can be recognized by a machine may be filled in different data segments of the data frame; and these identifiers may represent numerical values of the corresponding condition parameters. In this way, when the execution flow data of the task object is converted into the corresponding data frame, the identifier corresponding to each condition parameter in the execution flow data of the task object may be determined, and the determined identifier is filled in the corresponding data segment, thereby generating the data frame corresponding to the execution flow data of the task object. It should be noted that, the data segments of all the condition parameters are generally included in the data frame. However, the numerical values of all the condition parameters may not be necessarily generated in the execution flow data of a certain task object. For example, a second object type and second object weight are included in the data frame, but only the first object is added into the execution flow data of some task objects, and the second object is not added. Thus, empty identifiers may be displayed in the data segments that characterize the second object type and the second object weight. The identifier of each condition parameter may also be preset in the data protocol. Structural illustration of the data frame and the meaning of each data segment may refer to specific descriptions in subsequent embodiments.

It should be noted that, the above data format may be applied to data storage inside the Internet-of-Things device or communication between the Internet-of-Things device and the server, and may be further applied to communication between the Internet-of-Things device and the external device. For example, after counting the execution time, the Internet-of-Things device may transmit the execution time to the external device according to the above data format. Thus, data transmission among the Internet-of-Things device, the server and the external device may be realized through a preset data protocol.

In one implementation mode, while generating the structured data, the Internet-of-Things device may record the execution process of the entire task object, and synchronously upload the recorded video as a selectable attachment of the structured data to the server for other users to download and view. In addition, after the target task is completed, the user may also take a photograph of the target task and upload the photograph as a cover of the structured data to the server for other users to browse.

The present disclosure further provides a generating system of structured data for an Internet-of-Things device. The system comprises:
  a data collection unit, used for setting execution flow data of a task object in the structured data, and collecting user operation data and Internet-of-Things device operation data that correspond to the execution flow data of the task object; and
  a structured data generation unit, used for determining condition parameters that correspond to the execution flow data of the task object according to the user operation data and the Internet-of-Things device operation data; and generating the structured data according to the condition parameters that correspond to the execution flow data of each task object.

The present disclosure further provides an Internet-of-Things device. The Internet-of-Things device comprises a memory and a processor, wherein the memory is used for storing a computer program; and when executed by the processor, the computer program is used for realizing the following functions:

setting execution flow data of a task object in the structured data, and collecting user operation data and Internet-of-Things device operation data that correspond to the execution flow data; and determining condition parameters that correspond to the execution flow data of the task object according to the user operation data and the Internet-of-Things device operation data; and generating the structured data according to the condition parameters that correspond to the execution flow data of each task object.

It may be seen from the above that, the structured data may be freely generated by the user in the technical solutions provided by one or more embodiments of the present disclosure. Specifically, the Internet-of-Things device may set the execution flow data of each task object in the structured data according to the execution process of the task object of the user. When the Internet-of-Things device is used by the user, the Internet-of-Things device may collect the user operation data that corresponds to the execution flow data of each task object and/or the own operation data for the Internet-of-Things device. For example, the user operation data may be as follows: the Internet-of-Things device is controlled to add the first object, and an execution temperature, execution time and the like are set. The own operation data for the Internet-of-Things device may be an operation state of the second component, a task execution mode in the second component, etc. The condition parameters in the execution flow data of each task object may be determined by summarizing the user operation data and the Internet-of-Things device operation data, and these condition parameters may be finally used for generating the structured data. Thus, by parsing the execution process of the task object of the user, a wide variety of structured data may be freely generated, and are not limited to the limited structured data built in the Internet-of-Things device only.

In addition, the present disclosure further provides an executing method of structured data for the Internet-of-Things device. According to the method, the structured data shared by other users may be downloaded by the user via the Internet-of-Things device or the external device, and the structured data is parsed via the Internet-of-Things device, so as to automatically or semi-automatically generate a target task.

The executing method of structured data for the Internet-of-Things device provided by the present disclosure may comprise:

acquiring structured data, and identifying execution flow data of a task object comprised in the structured data; parsing execution flow data of a current task object to acquire user operation data that corresponds to the execution flow data of the current task object and/or the Internet-of-Things device operation data; and executing the Internet-of-Things device operation data, and/or displaying the user operation data to the user, and receiving an operation fed back by the user, so as to complete the execution flow data of the current task object.

In the present implementation mode, the user may download the structured data shared by other users in the Internet-of-Things device, may also download the structured data via an external device connected with the Internet-of-Things device, and then transmits the structured data back to the Internet-of-Things device. As mentioned above, the structured data may be transmitted in the Internet-of-Things device or the external device in a mode of data frame. Thus, after the Internet-of-Things device acquires the structured data, each data frame may be parsed, and each data frame may correspond to the execution flow data of a task object, so that the execution flow data of each task object included in the structured data may be recognized.

In the present implementation mode, with respect to the data frame corresponding to the execution flow data of each task object, the Internet-of-Things device may sequentially read various data segments in the data frame according to a preset data protocol so as to learn various details in the execution flow data of the task object. Specifically, the Internet-of-Things device may recognize a data format of the data frame; the data format is determined by a data protocol; and data segment for characterizing the condition parameters may be included in the data format. Then, the Internet-of-Things device may sequentially read the identifiers filled in each data segment, and determine the condition parameters included in the execution flow data of the current task object based on the read identifiers. One part of the condition parameters determined by the Internet-of-Things device may serve as own running data for the Internet-of-Things device; and the other part of the condition parameters may serve as operation data needing cooperation of the user. Therefore, the condition parameters included in the execution flow data of the current task object may be used for characterizing user operation data and/or Internet-of-Things device operation data corresponding to the execution flow data of the current task object. Detailed descriptions of the condition parameters may refer to the embodiments above or below. Unnecessary details are not given herein.

In the present implementation mode, the Internet-of-Things device operation data may be directly executed in sequence by the Internet-of-Things device, while the user operation data usually needs to be displayed to the user by character or voice to remind the user of executing a corresponding operation. In addition, the Internet-of-Things device operation data may further include information such as an execution temperature corresponding to the execution flow data of the current task object, execution time at the execution temperature, an operation state of the second component corresponding to the execution flow data of the current task object and an execution mode of the task in the second component. Contents of the part are described above. Unnecessary details are not given herein.

The present disclosure further provides a executing system of structured data for an Internet-of-Things device, the system comprising: a structured data analysis unit, used for acquiring structured data and identifying execution flow data of a task object comprised in the structured data; a data acquisition unit, used for parsing execution flow data of a current task object to acquire user operation data that corresponds to the execution flow data of the current task object and/or the Internet-of-Things device operation data; and an execution unit, used for executing the Internet-of-Things device operation data, and/or displaying the user operation data to the user, and receiving an operation fed back by the user, so as to complete execution flow data of the current task object.

The present disclosure further provides an Internet-of-Things device. The Internet-of-Things device comprises a memory and a processor, wherein the memory is used for storing a computer program; and when executed by the processor, the computer program is used for realizing the following functions:

acquiring structured data, and identifying execution flow data of a task object comprised in the structured data;

parsing execution flow data of a current task object to acquire user operation data that corresponds to the execution flow data of the current task object and/or the Internet-of-Things device operation data; and executing the Internet-of-Things device operation data, and/or displaying the user operation data to the user, and receiving an operation fed back by the user, so as to complete the execution flow data of the current task object.

In some optional embodiments, the Internet-of-Things device in the above embodiments may be implemented as a kitchen robot, such as an automatic cooker. Correspondingly, the structured data may be implemented as an electronic recipe used by the kitchen robot; the first component may be implemented as a seasoning box; the first object may be implemented as a seasoning; the second component may be implemented as a pot body; and the third component may be implemented as a pot cover. Based on this, the present disclosure provides a generating and executing method of a recipe for an automatic cooker. The methods may be applied to an intelligent automatic cooker, and are described below in detail in combination with drawings.

Figure 3A:
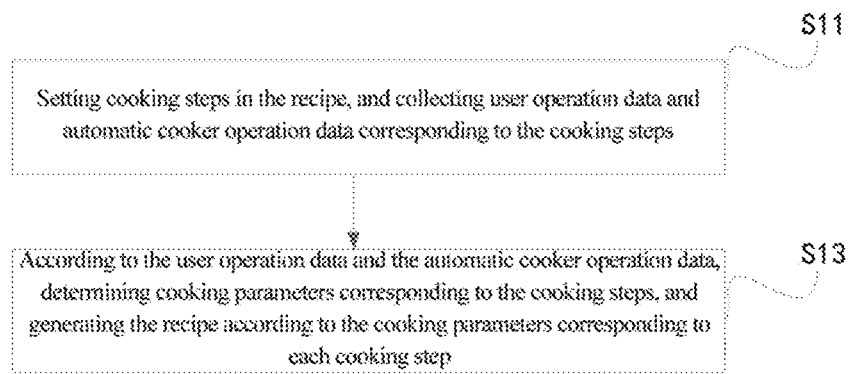
FIG. 3a is a schematic diagram of steps of a generating method of a recipe provided by embodiments of the present disclosure.

The technical solutions provided by the present disclosure may be applied to any of the above scenarios. Specifically, the recipe generating method for the automatic cooker provided by one embodiment may comprise a plurality of steps as shown in FIG. 3a.

S11: setting cooking steps in the recipe, and collecting user operation data and automatic cooker operation data corresponding to the cooking steps.

In the present implementation mode, a user using the automatic cooker may freely generate the own recipe, and share the generated recipe to other users in the network. During generation of the recipe, the automatic cooker may record user operation records during cooking of a dish, and may also record the own operation data of the automatic cooker. A recipe with an excellent cooking effect may be generated in combination with the data in the two aspects.

Specifically, in the embodiment, the automatic cooker may provide a "recipe recording" function. When the function is triggered, the automatic cooker may enter a process of generating the recipe. Before the recipe is generated, both seasonings and food materials needed in the recipe may be prepared, wherein the prepared seasonings may be put into the seasoning boxes of the automatic cooker. In a built-in system of the automatic cooker or an external device connected with the automatic cooker, a seasoning name may be set for each seasoning box according to the seasoning placed in the seasoning box. Thus, which seasoning is added to the pot body in the cooking process may be identified subsequently according to the set seasoning name.

Figure 3B:
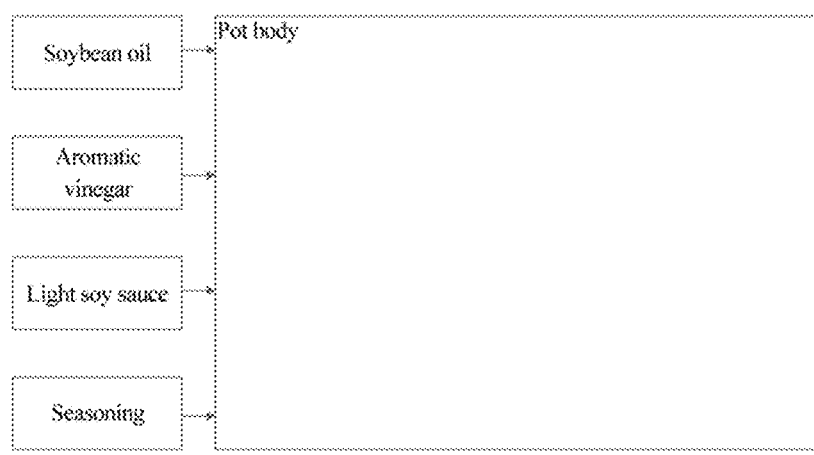
FIG. 3b is a schematic diagram of seasoning addition provided by embodiments of the present disclosure.

In practical application, with reference to FIG. 3b, each seasoning box may be visually displayed on the display screen, and each seasoning box may correspond to an editable control. The user may fill the seasoning names in the editable control, so that the automatic cooker may store the seasoning names input by the user, so as to establish a corresponding relationship between the seasoning boxes and the seasoning names.

In the embodiment, the automatic cooker may collect user operation data and automatic cooker operation data related to each cooking step after entering the process of generating the recipe. Specifically, the automatic cooker may provide a "new step" function, and whenever the function is triggered, it indicates that a new cooking step is generated. Different cooking steps may be arranged according to the time sequence that the steps are established, so as to constitute each cooking step in the whole recipe. Currently, after a new cooking step in the recipe is set, the automatic cooker may start a collection process of the user operation data and the automatic cooker operation data.

In practical application, the cooking steps may involve the addition of the seasonings and the food materials, and the setting of specific details such as the cooking temperature, the cooking duration, a cooking manner, etc. For example, for a seasoning required in a current cooking step, the user may apply a seasoning addition instruction to a corresponding seasoning box. Specifically, the seasoning addition instruction may be implemented in a variety of manners. For example, the user may continuously press on the control for characterizing the seasoning box for a certain period of time; and in the duration of pressing, a pipeline of the seasoning box may be in an open state, so as to add the seasoning into the pot body. When the user stops pressing the control of the seasoning box, the pipeline of the seasoning box may be in a closed state, so as to stop adding the seasoning. In addition, the user may also directly edit the weight of a to-be-added seasoning in a control for characterizing the weight of the seasoning, and then trigger a "seasoning adding" function, so that the automatic cooker may automatically add the corresponding weight of the seasoning into the pot body.

In the embodiment, the cooked food material also needs to be added in the current cooking step possibly, and the food material may usually be added by the user manually. The user may edit the food material name and the food material weight of the food material in the automatic cooker or the external device after the food material is added into the pot body. The food material name and the food material weight edited by the user may also be recorded by the automatic cooker as the user operation data. Of course, in some scenarios, a food material area may also be set in the automatic cooker; similarly to the seasoning box, a corresponding food material name may also be edited in the food material area in the automatic cooker; and the food material may be automatically weighed in the food material area, so as to learn the food material weight of the to-be-added food material. Thus, the automatic cooker may also obtain the food material name and the food material weight of the food material. Only in such the scenario, the food material name and the food material weight may serve as the automatic cooker operation data. It can be seen that the contents contained in the user operation data and the automatic cooker operation data may also be different according to different cooking processes and different structures of the automatic cooker, and specifically, different data may be divided according to the actual cooking process.

Figure 3C:
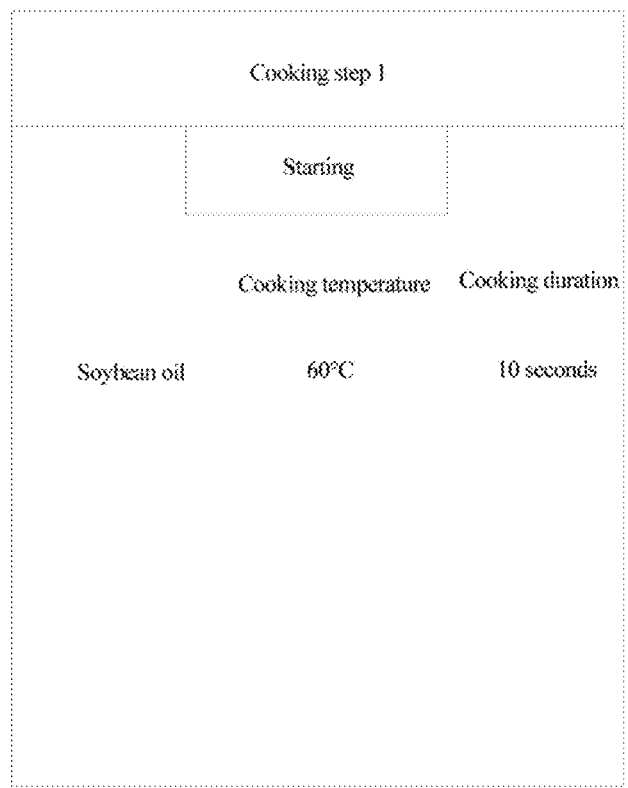
FIG. 3c is a schematic diagram of cooking step setting provided by embodiments of the present disclosure.

In the embodiment, the user may also set the cooking temperature and the cooking duration that correspond to the cooking steps. For example, after 20 g of soybean oil is placed, the soybean oil may be heated at the temperature of 60° C. for 20 seconds. Thus, the cooking temperature may be 60° C., and the cooking duration may be 20 seconds. In different scenarios, different means may be adopted for setting the cooking temperature and the cooking duration. For example, the user may directly set the cooking temperature and the cooking duration that correspond to the cooking steps in the automatic cooker or the external device. For example, with reference to FIG. 3c, in the controls corresponding to the cooking steps, two controls for setting the cooking temperature and the cooking duration may be contained; and in the two controls, the corresponding cooking temperature and cooking duration may be filled, and then a "start" key may be triggered. Thus, the automatic cooker may automatically heat the temperature to the set cooking temperature and continuously heat for the set cooking duration at the cooking temperature. In the case, the cooking temperature and the cooking duration may be recorded by the automatic cooker or the external device as the user operation data.

In another scenario, both the cooking temperature and the cooking duration may be recorded as the automatic cooker operation data. Specifically, the user may manually cook directly after the seasonings and/or the food materials are added. In the process, the automatic cooker may monitor the temperature of the pot body and the cooking duration, so as to record the cooking temperature and the cooking duration that correspond to the cooking steps. Thus, the recorded cooking temperature and cooking duration may serve as the automatic cooker operation data.

Of course, in another scenario, the cooking temperature and the cooking duration may belong to the user operation data and the automatic cooker operation data respectively. For example, the user may set the cooking temperature in the automatic cooker or the external device and then trigger a cooking start key, and when cooking at the cooking temperature and after a certain period of time, the user may create a next new cooking step. Thus, the cooking temperature may be contained in the user operation data, and since the cooking duration is counted by a timer in the automatic cooker, the cooking duration at the cooking temperature may be included in the automatic cooker operation data.

In the embodiment, in addition to the above seasonings, food materials, cooking temperature and cooking duration, the cooking steps may also involve an operation state of the pot body and a cooking manner in the pot body, the operation state of the pot body may be used for characterizing the state of the pot body in the cooking steps. In practical application, the operation state of the pot body may comprise, for example, opening of the pot lid, seal pressurization, closing of the pot lid, a heating process, a seasoning adding process, a cleaning process, a waiting process, etc. The cooking manner in the pot body may be used for indicating the cooking manner of the seasonings or the food materials. In practical application, the cooking manner in the pot body may be, for example, steaming and boiling, stir-frying, stirring, frying, etc. During the operation of the automatic cooker, the operation state of the pot body and the cooking manner in the pot body may be monitored by a built-in sensor, and therefore, the operation state of the pot body and the cooking manner in the pot body that correspond to the cooking steps may be included in the automatic cooker operation data.

In practical application, due to different complexity degrees of the cooking steps, the contents contained in the user operation data and the automatic cooker operation data are also different possibly. Therefore, the above-mentioned contents are only a part of the contents contained in the user operation data and the automatic cooker operation data, which does not mean that the technical solution of the present disclosure can only be applied to the above scenarios.

S13: according to the user operation data and the automatic cooker operation data, determining cooking parameters corresponding to the cooking steps, and generating the recipe according to the cooking parameters corresponding to each cooking step.

In the embodiment, after the corresponding user operation data and automatic cooker operation data in the cooking steps are collected, the cooking parameters corresponding to the cooking steps may be determined according to the collected data; the cooking parameters may characterize each detail in the cooking steps; and the corresponding cooking steps may be restored according to the cooking parameters. In practical application, the types of cooking parameters may be preset. Specifically, a large number of recipes or actual cooking processes may be analyzed, so as to summarize the cooking parameters that are possibly involved in the cooking steps.

In one embodiment, the cooking parameters may comprise at least one of serial numbers of the cooking steps, the operation state of the pot body, the cooking manner in the pot body, the cooking duration corresponding to the cooking manner in the pot body, the opening/closing state of the pot lid, the cooking temperature, the types of the seasonings, the adding weight of the seasonings and prompt information, wherein the serial numbers of the cooking steps may characterize the execution sequence of the cooking steps in the whole recipe. The operation state of the pot body and the cooking manner in the pot body may be as described above. The cooking duration and the cooking temperature that correspond to the cooking manner in the pot body may be manually set by the user, or may be statistically obtained by the timer or a temperature sensor in the automatic cooker. The opening/closing state of the pot lid may be set manually by the user or sensed by the sensor in the automatic cooker. Since the corresponding seasoning name is edited for each seasoning box, the corresponding seasoning type may be determined by identifying the seasoning name of the current seasoning box. Then, by analyzing a seasoning addition instruction input by the user, the weight corresponding to the seasoning name may be determined. Thus, the identified seasoning name (or the seasoning type) and the corresponding weight may serve as the cooking parameters corresponding to the cooking steps. The prompt information may be voice prompt information or text prompt information, wherein the prompt information may be used for reminding an operation process in the current cooking step. For example, the prompt information may be voice information: "please adding 500 g of pork and clicking the Ready key". In practical application, the prompt information may be automatically generated by the automatic cooker, or may be input by the user. For example, after the automatic cooker identifies that 20 g of soybean oil is added in the cooking steps, corresponding voice prompt information "please adding 20 g of soybean oil" may be generated. For another example, when the user manually adds 500 g of pork, voice prompt information or text prompt information "500 g of pork needs to be added here" may be input, and subsequently, the automatic cooker may convert the prompt information input by the user into a uniform broadcasting format or a uniform broadcasting voice according to a voice recognition or text recognition technology.

In practical application, when the weight corresponding to the seasoning name is determined, if various seasonings are pre-processed into a liquid state, the duration of the seasoning addition instruction may be counted, and the weight corresponding to the seasoning name is determined according to the duration and the concentration of the seasoning in the current seasoning box. In addition, the start time and the end time of the seasoning addition instruction may also be identified, the start weight of the seasoning at the start time and the end weight of the seasoning at the end time in the current seasoning box may be recorded, and the difference between the two weights may serve as the adding weight of the seasoning. Therefore, the weight corresponding to the seasoning name may be determined according to the start weight and the end weight described above.

It should be noted that, in practical application, the cooking parameters may comprise more contents. For example, the cooking parameters may also comprise the emptying time after the seasoning is added into each seasoning box, and the emptying time may characterize the remaining amount of the seasoning in the seasoning box. In addition, the cooking parameters may also comprise the cleaning time for each seasoning box, the emptying time after cleaning, etc. With the continuous update of the automatic cooker, the contents contained in the cooking parameters may also be increased synchronously, and the cooking parameters may comprise more or less contents under the situation that those skilled in the art understand the essence of the technical solution of the present disclosure, but such the improvement should fall within the protection scope of the present disclosure.

In the embodiment, after the cooking parameters corresponding to each cooking step are determined, each cooking step may be displayed in a form of cooking parameters, so that the final recipe may be constructed. Various items of information contained in the recipe may be displayed to the user by the display screen or the external device. In order to facilitate the later adjustment of the recipe, the corresponding weights of the seasonings and/or the food materials may be included in the displayed recipe, and the weights may have respective adjustment controls. Specifically, with reference to FIG. 3d, near each weight, the adjustment controls with a plus sign and a minus sign are arranged, and the adjustment controls may be manipulated by the user, so as to adjust the size of the corresponding weight. Thus, the user may taste a dish after completing the making of the dish, and may adjust the adding amounts of the seasonings and/or the food materials according to a taste result to make the dish made according to the recipe more delicious.

In the embodiment, the recipe displayed to the user is a visual interface, however, the recipe stored in the automatic cooker or uploaded to a server needs to be in a computer recognizable language. In view of this, in the automatic cooker, each cooking step in the recipe may be converted into a corresponding data frame, and the converted data frame is uploaded to the server or stored in the automatic cooker locally. Specifically, a data protocol may be formulated first during data conversion; and the data protocol may define a data format of the data frame. The data format may indicate which data segments should be included in the data frame and in which sequence the data segments should be arranged. In practical application, the data segments may respectively characterize different cooking parameters, so that each cooking step may correspond to a data frame; and in the data frame, all the cooking parameters parsed by the cooking step may be included.

In the embodiment, machine recognizable identifiers may be filled in the different data segments in the data frame, and the identifiers may represent numerical values of the corresponding cooking parameters. Thus, when the cooking steps are converted into the corresponding data frames, the identifier corresponding to each cooking parameter in the cooking steps may be determined, and the determined identifier may be filled in a corresponding data segment, so as to generate the data frames corresponding to the cooking steps. It should be noted that the data frame usually comprises the data segments of all the cooking parameters, but a certain cooking step does not necessarily generate the numerical values of all the cooking parameters. For example, the data frame comprises the type of the food material and the weight of the food material, but in some cooking steps, only the seasonings are added, and no food material is added, so that an empty identifier may be displayed in the data segments for characterizing the type of the food material and the weight of the food material, wherein the identifier of each cooking parameter may also be preset in the data protocol. For example, with respect to the cooking parameters of the operation state of the pot body, 00 may represent that the pot lid is opened, 01 may represent that the pot lid is closed, and 02 may represent a heating process, etc. For example, a data frame converted by a certain cooking step may be shown as follows:

01 02 01 02 00 50 03 14 00 00 00 00 00 00 00 00 . . .
wherein according to the preset data protocol, data segments from left to right respectively represent the meanings as follows:
01: represents the serial number of the cooking step and represents a first step;
02: represents the operation state of the pot body, represents a heating process;
01: represents voice prompt information and represents a first segment of voice prompt;
02: represents the opening/closing state of the pot lid and represents closing of the pot lid;
00: represents the stirring time and represents no stirring;
50: represents the cooking temperature and represents decimal 80° C.;
03: represents the cooking duration and represents decimal 3 seconds;
14: represents the adding amount of a seasoning box 1 and represents decimal 20 g;
The remaining 00 represents no data or no operation.

Thus, the computer may learn specific cooking details of each cooking step by identifying the contents of each data segment in the data frame.

It should be noted that the above data format may not only be applied to data storage in the automatic cooker, or to communication between the automatic cooker and the server, but also be applied to communication between the automatic cooker and the external device. For example, the automatic cooker may also transmit the cooking duration to the external device according to the above data format after the cooking duration is counted. Thus, data transmission among the automatic cooker, the server and the external device may be realized through the preset data protocol.

In one embodiment, when a recipe is generated, the automatic cooker may record a whole cooking process and synchronously upload a recorded video as an optional attachment to the recipe to the server, so as to be downloaded and viewed by other users. In addition, after the making of the dish is completed, the user may also take a picture of the dish and upload the picture as a cover of the recipe to the server, so as to be viewed by other users.

Figures 3D, 3E:
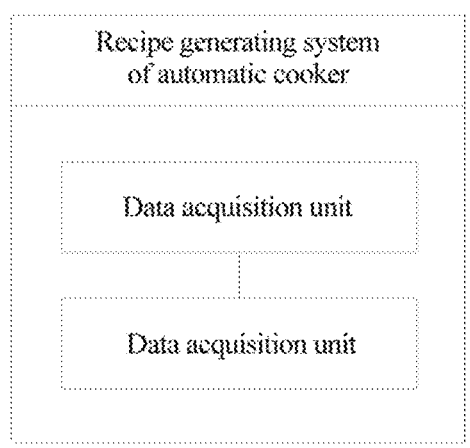
FIG. 3d is a schematic diagram of parameter setting provided by embodiments of the present disclosure.
FIG. 3e is a schematic diagram of a function module of a generating system of a recipe provided by embodiments of the present disclosure.

The present disclosure further provides a recipe generating system for an automatic cooker, and with reference to FIG. 3e, the system comprises:
a data collection unit, used for setting cooking steps in a recipe and collecting user operation data and automatic cooker operation data that correspond to the cooking steps; and
a recipe generation unit, used for determining cooking parameters corresponding to the cooking steps according to the user operation data and the automatic cooker operation data, and generating the recipe according to the cooking parameters corresponding to each cooking step.

The present disclosure further provides an automatic cooker; the automatic cooker comprises a memory and a processor; the memory is used for storing a computer program; and when the computer program is executed by the processor, the computer program is used for realizing the following functions:

Setting cooking steps in a recipe, and collecting user operation data and automatic cooker operation data that correspond to the cooking steps; and according to the user operation data and the automatic cooker operation data, determining cooking parameters corresponding to the cooking steps, and generating the recipe according to the cooking parameters corresponding to each cooking step.

It can be seen from the above that, according to the technical solution provided by one or more embodiments of the present disclosure, a user may generate a recipe freely. Specifically, the automatic cooker may set each cooking step in the recipe according to the cooking process of the user. In the process that the user uses the automatic cooker, the automatic cooker may collect the user operation data corresponding to each cooking step and the own operation data of the automatic cooker, wherein the user operation data may be used for, for example, manipulating the automatic cooker to add seasonings, and setting the cooking temperature, the cooking duration, etc. The own operation data of the automatic cooker may be an operation state of a pot body, a cooking manner in the pot body, etc. By summarizing the user operation data and the automatic cooker operation data, the cooking parameters in each cooking step may be determined, and the cooking parameters may be used for generating the recipe finally. Thus, by parsing the cooking process of the user, various recipes may be generated freely, which do not just limited to limited recipes built into the automatic cooker.

In addition, the present disclosure further provides a recipe executing method of an automatic cooker; and the method may enable a user to download recipes shared by other users by the automatic cooker or an external device, and parse the recipes through the automatic cooker, thereby automatically or semi-automatically realizing the making of dishes.

Figure 3F:
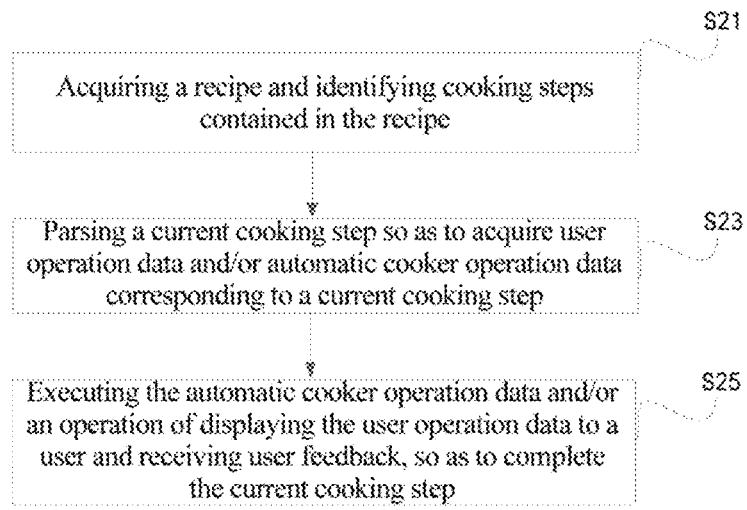
FIG. 3f is a schematic diagram of steps of an executing method of a recipe provided by embodiments of the present disclosure.

With reference to FIG. 3f, the recipe executing method of the automatic cooker, which is provided by the present disclosure, may comprise the following steps:

S21: acquiring a recipe and identifying cooking steps contained in the recipe.

In the embodiment, the user may download the recipes shared by other users in the automatic cooker, or may download the recipes through the external device connected with the automatic cooker, and transmit the recipes back to the automatic cooker. According to the above contents, the recipes may be transmitted by means of data frames in the automatic cooker or the external device. Thus, when the recipe is acquired by the automatic cooker, each data frame may be parsed, and each data frame may correspond to a cooking step, so that each cooking step contained in the recipe may be identified.

S23: parsing a current cooking step, so as to acquire user operation data and/or automatic cooker operation data corresponding to the current cooking step.

In the embodiment, with regard to the data frame corresponding to each cooking step, the automatic cooker may sequentially read each data segment in the data frame according to a preset data protocol so as to learn each detail in the cooking step. Specifically, the automatic cooker may identify a data format of the data frame, the data format is determined by the data protocol, and the data segments for characterizing cooking parameters may be included in the data format. Then, the automatic cooker may sequentially read identifiers filled in each data segment and determine the cooking parameters contained in the current cooking step based on the read identifiers. In the cooking parameters determined by the automatic cooker, one part of the cooking parameters may serve as own operation data of the automatic cooker, and the other part thereof may be used as operation data requiring to be cooperated by the user. Thus, the cooking parameters contained in the current cooking step may be used for characterizing the user operation data and/or the automatic cooker operation data corresponding to the current cooking step.

In the embodiment, the above cooking parameters may also comprise at least one of serial numbers of the cooking steps, an operation state of a pot body, a cooking manner in the pot body, the cooking duration corresponding to the cooking manner in the pot body, an opening/closing state of a pot lid, the cooking temperature, the types of seasonings, the adding weight of the seasonings and prompt information. In addition, in practical application, the cooking parameters may also comprise more contents. For example, the cooking parameters may also comprise the emptying time after the seasoning is added into each seasoning box, and the emptying time may characterize the remaining amount of the seasoning in the seasoning box. In addition, the cooking parameters may also comprise the cleaning time for each seasoning box, the emptying time after cleaning, etc. With the continuous update of the automatic cooker, the contents contained in the cooking parameters may also be increased synchronously, and the cooking parameters may comprise more or less contents under the situation that those skilled in the art understand the essence of the technical solution of the present disclosure, but such the improvement should fall within the protection scope of the present disclosure. The specific meaning of each of the above cooking parameters has been described above, which is not repeated herein.

S25: executing the automatic cooker operation data, and/or displaying the user operation data to the user and receiving an operation fed back by the user to complete the current cooking step.

In the embodiment, the automatic cooker operation data may be directly executed in sequence by the automatic cooker, and the user operation data usually needs to be displayed to the user by means of texts or voices to remind the user to execute a corresponding operation. Specifically, the automatic cooker operation data may comprise the types of to-be-added seasonings and the corresponding weights. Thus, when the automatic cooker operation data is executed, the seasoning box corresponding to the type of the to-be-added seasoning may be determined according to the seasoning name, and the opening duration of the seasoning box may be determined according to the weight. In the embodiment, the seasonings may be pre-processed into a liquid form, so that the opening duration of the seasoning box may be determined according to the concentration and the weight of the seasoning. Finally, the automatic cooker may keep the seasoning box open in the duration of opening, so as to add the seasoning into the pot body.

In addition, the automatic cooker operation data may also comprise information such as the cooking temperature corresponding to the current cooking step, the cooking duration at the cooking temperature, an operation state of the pot body corresponding to the current cooking step, a cooking manner in the pot body, etc. Contents of the part are described above. Unnecessary details are not given herein.

When all the cooking steps are executed sequentially by the automatic cooker, if the user operation data is parsed, the user may be reminded to execute a corresponding operation by means of voices or texts. Specifically, the user operation data may comprise prompt information used for characterizing the food material name and the food material weight, so that the automatic cooker or the external device may broadcast voice prompt information: "please adding 500 g of pork and continuously heating for half an hour at 120° C.". Thus, after each cooking step in the recipe is executed, the automatic cooker may remind the user to fill a tray to complete the cooking process of the dish.

In some application scenarios, after the user makes a dish according to the downloaded recipe, the user may evaluate the dish according to the taste, so as to improve the screening efficiency of the recipe.

In a specific application example, the automatic cooker may be connected with a smart phone by a serial port, and an App (Application) of the automatic cooker may be installed in the smart phone; and through the app, the user may control the automatic cooker to execute cooking steps of a recipe. Specifically, when the user gets ready to upload a recipe, the user may click a "recipe generation" key in the app, and then a recipe generation interface may be entered; in the interface, the user may respectively edit seasoning names for six seasoning boxes existing currently, and then may click a "new cooking step", thereby starting the production of a first cooking step. In the cooking step, the user may select the soybean oil in the second seasoning box and perform long press on a soybean oil control in the app, so as to add the soybean oil into the pot body. After completing the adding process of the soybean oil, the automatic cooker may count the weight of the soybean oil according to the concentration of the soybean oil and the opening duration of a pipeline, and transmit the weight back to the app, so as to display the adding amount of the soybean oil in the app. Subsequently, the user may set the predicted heating temperature as 60° C. and the heating duration as 10 seconds in the app and click a "start" key. After receiving an operation instruction issued by the user, the automatic cooker may heat the soybean oil. Thus, the production of the first cooking step may be completed. Subsequently, the user may continue to produce other cooking steps through the function of creating the new cooking step. After each cooking step is completed, the user may generate the recipe of a current dish and may upload the recipe to the server, so as to be selected by other users.

In addition, the user may also download recipes shared by other users from the server, and the recipes may be read by the automatic cooker. The automatic cooker may transmit the required seasonings and food materials to the app, so as to be prepared by the user. After the seasonings and the food materials are prepared by the user, the cooking process may be started. After the cooking process is started, the automatic cooker may execute the parsed automatic cooker operation data and/or the user operation data in sequence according to the execution sequence of all the identified cooking steps. When the user operation data appears, the automatic cooker may broadcast the voice or text prompt information to remind the user to add the food materials or execute other operations, and finally may complete the making of the dish.

Figure 3G:
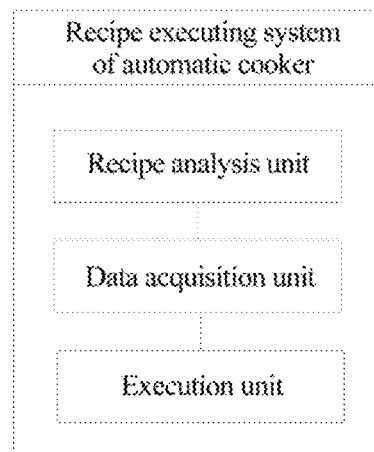
FIG. 3g is a schematic diagram of a function module of an executing system of a recipe provided by embodiments of the present disclosure.

With reference to FIG. 3g, the present disclosure further provides an executing system of a recipe of an automatic cooker; and the system comprises:

a recipe analysis unit, used for acquiring a recipe and identifying cooking steps contained in the recipe;

a data acquisition unit, used for parsing a current cooking step so as to acquire user operation data and/or automatic cooker operation data corresponding to a current cooking step; and an execution unit, used for executing the automatic cooker operation data and/or an operation of displaying the user operation data to a user and receiving user feedback, so as to complete the current cooking step.

Figure 3H:
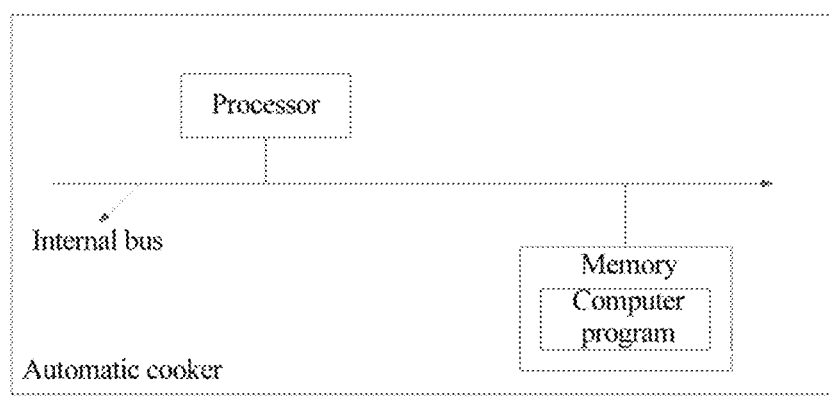
FIG. 3h is a structural schematic diagram of an automatic cooker provided by embodiments of the present disclosure.

With reference to FIG. 3h, the present disclosure further provides an automatic cooker; the automatic cooker comprises a memory and a processor; the memory is used for storing a computer program; and when the computer program is executed by the processor, the computer program is used for realizing the following functions:

acquiring a recipe and identifying cooking steps contained in the recipe;

parsing a current cooking step, so as to acquire user operation data and/or automatic cooker operation data corresponding to the current cooking step; and executing the automatic cooker operation data, and/or an operation of displaying the user operation data to a user and receiving user feedback, so as to complete the current cooking step.

In the embodiment, the memory may comprise a physical apparatus used for storing information, and the physical apparatus is usually used for storing the information by means of electrical, magnetic or optical media, etc. after the information is digitalized. The memory may comprise: an apparatus for storing information in an electrical energy manner, such as an RAM (Random Access Memory), an ROM (Read Only Memory), etc.; an apparatus for storing information in a magnetic energy manner, such as a hard disk, a floppy disk, a magnetic tape, a magnetic core memory, a magnetic bubble memory, a U disk; and an apparatus for storing information in an optical manner, such as a CD or a DVD. Of course, the memory comprises other ways of memories, such as a quantum memory, a grapheme memory, etc.

In the embodiment, the processor may be implemented in any suitable manner. For example, the processor may take the form of, for example, a microprocessor or a processor, as well as a computer readable medium for storing computer-readable program codes (e.g. software or firmware) executable by the (micro) processor, a logic gate, a switch, an ASIC (Application Specific Integrated Circuit), a programmable logic controller, an embedded microcontroller, etc.

Each embodiment of the description is described in a progressive manner, the same or similar parts of all the embodiments refer to each other, and each embodiment focuses on differences from the other embodiments.

It can be seen from the above that, according to the technical solution provided by one or more embodiments of the present disclosure, a user may generate a recipe freely. Specifically, the automatic cooker may set each cooking step in the recipe according to the cooking process of the user. In the process that the user uses the automatic cooker, the automatic cooker may collect the user operation data corresponding to each cooking step and the own operation data of the automatic cooker, wherein the user operation data may be used for, for example, manipulating the automatic cooker to add seasonings, and setting the cooking temperature, the cooking duration, etc. The own operation data of the automatic cooker may be an operation state of a pot body, a cooking manner in the pot body, etc. By summarizing the user operation data and the automatic cooker operation data, the cooking parameters in each cooking step may be determined, and the cooking parameters may be used for generating the recipe finally. Thus, by parsing the cooking process of the user, various recipes may be generated freely, which do not just limited to limited recipes built into the automatic cooker. In addition, when the user uses the automatic cooker, the user may acquire the recipes shared by others, and then the automatic cooker may analyze the acquired recipes, so as to identify the cooking steps contained in the recipes. By parsing the cooking steps, the user operation data and/or the automatic cooker operation data corresponding to each cooking step may be determined. The user operation data in the scenario may be displayed to the user by the automatic cooker, so as to remind the user to execute operations such as adding the food materials, operating the pot body, etc. The automatic cooker operation data may be automatically executed by the automatic cooker, for example, automatically adding the seasonings, automatically setting the cooking temperature and the cooking duration, etc. Thus, the cooking steps in the recipe are parsed one by one, and the dish can be finally completed through the cooperation of the user and the automatic cooker, which not only improves the preparation efficiency of the dish, but also enables the dish prepared to be matched with the recipe, so as to achieve the better cooking effect.

Although a current Internet-of-Things device has a structured data generation function, the current structured data generation function often requires to be used by the user who have higher professional knowledge, resulting in the efficiency of generating the structured data is not high.

In order to solve the problem, embodiments of the present disclosure provide a generating method of structured data for an Internet-of-Things device, which may be applied to the above intelligent Internet-of-Things device. Specifically, a generating method of structured data for an Internet-of-Things device, which is provided by an embodiment, comprises: generating candidate structured data in a structured data creation process, and displaying the candidate structured data to the user; receiving uploaded structured data edited by the user with respect to the candidate structured data, and taking the uploaded structured data as structured data generated by the user in the structured data creation process.

In the embodiment, the Internet-of-Things device may provide a "structured data creation" function. When the function is triggered, the Internet-of-Things device may enter the process of generating the structured data. The process of generating the structured data may be divided into an object preparation stage and a job stage, and the Internet-of-Things device may guide the user to complete the two stages through a voice system or a screen display system. After the object data is acquired by the Internet-of-Things device, the object data may be processed locally, and may also be further uploaded to a data processing server at a cloud for processing, which is not limited in the present disclosure.

In the embodiment, after completing the object preparation stage, the user may enter the job stage under the guidance of the Internet-of-Things device. In the job stage, the user may execute a series of job actions, such as adding an object, opening and closing a component, stirring, setting the temperature, etc., the job actions may be recorded by the Internet-of-Things device, and for a specific job action, the Internet-of-Things device can also record the duration of the action. For example, the Internet-of-Things device may record a stirring duration, a heating duration, etc. The data recorded by the Internet-of-Things device may serve as the job data in the job stage, and the job data may also be processed locally by the Internet-of-Things device or uploaded to the data processing server at the cloud for processing, which is not limited in the present disclosure.

In the embodiment, both the above object data and job data may serve as operation data generated by the user in the structured data creation process, and the operation data may generate a corresponding operation step sequence according to the sequence of adding objects or the sequence of job time. The operation step sequence may comprise time-ordered operation steps, each operation step may have various parameters, and the parameters may indicate the stage, in which the operation step is located in the structured data creation process.

In the embodiment, after the user operation data is acquired by the Internet-of-Things device, a target structured data template matched with the operation data may be queried in a preset structured data template library. The preset structured data template library may be constructed by a machine learning algorithm. Specifically, the Internet-of-Things device may acquire a large number of structured data samples in advance, and the structured data samples may be recorded by the Internet-of-Things device by the user during the use of the Internet-of-Things device. In addition, in order to ensure the accuracy of the structured data samples, the structured data samples may also be actively input into the Internet-of-Things device by a user with higher work experience. The structured data samples may be converted into the operation step sequences by the above serializing method, and the converted operation step sequences may serve as structured data templates of the structured data samples.

In the embodiment, after a large number of structured data samples are acquired, and the structured data samples are converted into the corresponding structured data templates, the structured data templates may be classified according to preset multiple dimensions by means of manual annotation. In practical application, the preset multiple dimensions may be, for example, dimensions of the classification, complexity, etc. of the job object. In the embodiment, after each structured data template is manually annotated, annotated results may be processed by utilizing a machine learning algorithm, so as to divide the structured data templates into different structured data template sets. In one practical application example, the structured data templates annotated manually may be classified by adopting a KNN (K-Nearest Neighbor) classification algorithm. When a new structured data template appears, the category of the new structured data template may also be judged by the KNN algorithm.

In the embodiment, by analyzing a large number of structured data samples, a structured data template library containing the plurality of structured data template sets may be obtained finally. With regard to the operation data generated by the user in the structured data creation process, the operation data may be serialized to obtain a corresponding operation step sequence, and then a target structured data template matched with the user operation data may be determined by comparing the similarity between the operation step sequence and each structured data template in the structured data template library. Since the operation step sequence has a stronger time-ordered correlation, an RNN (Recurrent Neural Network) may be adopted for calculating the similarity between the operation step sequence and the structured data template. Specifically, for each operation step in the operation step sequence, a delayed result of each operation step may be calculated in sequence by utilizing an RNN algorithm.

For example, for the first operation step in the operation step sequence, a data packet of the operation step may be operated with a delayer in the RNN algorithm, and a result obtained may serve as the delay result of the first operation step. Thus, each operation step may correspond to a delayed result, and the delayed results are arranged in a generation sequence, so as to obtain a classification code corresponding to the operation step sequence. Each structured data template in the structured data template library may also obtain a respective classification code in a similar manner, and subsequently, by calculating the similarity between a classification code of the operation data and the classification code of the structured data template, one or more structured data templates with the highest similarity may serve as the target structured data template matched with the operation data. According to the above manner, the target structured data template matched with the operation data may be determined based on the generated classification code.

In the embodiment, since the operation data possibly contains both the object data and the job data simultaneously, in order to obtain a better matching result, the object data and the job data may be matched respectively; the operation data is split into the object data and the job data; and then the object data is processed into an object step sequence, and the job data is processed into an operation step sequence. Then, a classification code corresponding to the object step sequence and a classification code corresponding to the operation step sequence may be generated. With regard to the structured data templates in the structured data template library, the data may also be split in the manner, and an object classification code and a job classification code of each structured data template are obtained. Then, multiple structured data templates with higher similarity (e.g. the similarity may be above a certain threshold) may be determined by utilizing the object classification codes according to the above similarity calculation manner, and the structured data templates may serve as a first structured data template set matched with the object data.

Similarly, a second structured data template set matched with the job data may be determined according to the job classification codes. Then, the target structured data template matched with the operation data may be screened out from a union set of the first structured data template set and the second structured data template set. For example, the structured data template contained in both the first structured data template set and the second structured data template set may serve as the screened-out target structured data template. Of course, the target structured data template may also be screened according to the popularity of the structured data templates and the preference of the user, which is not limited in the present disclosure.

In the embodiment, after the target structured data template matched with the user operation data is determined, the user operation data may be applied to the target structured data template, so that detailed parameters may be filled in the target structured data template, so as to generate the candidate structured data containing various detailed parameters.

Of course, in practical application, the candidate structured data may also be generated based on other data, and is not limited to the manner of generating the candidate structured data by the above operation data. For example, the Internet-of-Things device may learn the preference of the user for operation tasks by analyzing historical job data of the user; and in combination with the popularity of the operation tasks in the recent period of time, the Internet-of-Things device may screen out some operation tasks with higher popularity and preference of the user, and may take structured data of the screened-out operation tasks as candidate structured data. In addition, the Internet-of-Things device may also generate candidate structured data in combination with some limited information input by the user. For example, when the user creates the structured data, the variety of the structured data desired to be created may be input in the Internet-of-Things device, and names of a part of objects in the structured data may be provided. Thus, the Internet-of-Things device may screen out the candidate structured data according with conditions from multiple structured data according to the limited information input by the user.

In the embodiment, after the candidate structured data is generated by the Internet-of-Things device, the candidate structured data may be displayed to the user through a display screen or a terminal device of the user. The user can browse material preparation steps, cooking steps and various parameters therein.

In the embodiment, since the candidate structured data is generated by using the structured data template, operation steps that are not executed by the user may be contained in the candidate structured data. The user may choose whether to adopt the operation steps that are not executed by the user. If the user adopts the operation steps in the candidate template, the data received by the Internet-of-Things device may be the uploaded structured data confirmed by the user; and if the user does not adopt the operation steps in the candidate template but modifies the operation steps therein, the data received by the Internet-of-Things device is the uploaded structured data modified by the user. Therefore, the user may selectively edit the candidate structured data provided by the Internet-of-Things device. Whether the candidate structured data is modified or not by the user, the uploaded structured data received by the Internet-of-Things device may serve as the structured data generated by the user in the structured data creation process. The structured data may be stored locally by the Internet-of-Things device, so that the Internet-of-Things device may automatically produce based on the structured data subsequently. In addition, the Internet-of-Things device may also upload the structured data to the data processing server at the cloud, and other users can obtain the structured data by accessing the data processing server, so as to realize the sharing of the structured data.

In the embodiment, in order to further optimize the structured data template library, the uploaded structured data edited by the user may be processed in different manners. With regard to the confirmed uploaded structured data, since the structured data template in the structured data template library is still used and is not modified by the user, after the uploaded structured data confirmed by the user is received, the confirmed uploaded structured data may serve as a new structured data template and added into a corresponding structured data template set of the structured data template library. However, if the uploaded structured data modified by the user is received, the uploaded structured data is no longer consistent with the original structured data template, and cannot be directly added into the corresponding structured data template set; instead, the modified uploaded structured data may be written into a manual annotation library, so as to take the modified uploaded structured data as a new structured data sample after a label is added into the modified uploaded structured data by means of manual annotation, and the new structured data sample may be classified in a machine learning manner, so as to add the modified uploaded structured data into the structured data template set matched with the added label. In such the manner, the structured data templates in the structured data template library may be constantly enriched, so that the candidate structured data recommended to the user can be more and more accurate.

An embodiment of the present disclosure further provides a generating system of structured data for an Internet-of-Things device. The system comprises: a candidate structured data generating unit, used for generating candidate structured data in a structured data creation process and displaying the candidate structured data to a user; and a structured data editing unit, used for receiving uploaded structured data edited by the user with respect to the candidate structured data, and taking the uploaded structured data as structured data generated by the user in a structured data creation process.

In one embodiment, the candidate structured data generating unit comprises: an operation data acquisition module, used for acquiring user operation data in the structured data creation process, wherein the operation data comprises at least one of object data and job data; a structured data comparison module, used for comparing the operation data in a preset structured data template library to determine a target structured data template matched with the operation data, and applying the operation data to the target structured data template to generate the candidate structured data corresponding to the operation data.

An embodiment of the present disclosure further provides an Internet-of-Things device. The Internet-of-Things device comprises a memory and a processor, wherein the memory is used for storing a computer program, and the computer program is used for realizing the following functions when executed by the processor: generating candidate structured data in a structured data creation process, and displaying the candidate structured data to a user; receiving uploaded structured data edited by the user with respect to the candidate structured data, and taking the uploaded structured data as structured data generated by the user in a structured data creation process.

An embodiment of the present disclosure further provides a recommending system of a job for an Internet-of-Things device. The system comprises: an operation data acquisition unit, used for acquiring operation data of a user in a structured data creation process, wherein the operation data comprises at least one of object data and job data; a job step recommendation unit, used for comparing the operation data in a preset structured data template library to determine a target structured data template matched with the operation data, and recommending a job step in the target structured data template to the user; and a judgment unit, used for judging whether to continuously recommend a subsequent job step in the target structured data template to the user according to whether the user adopts an instruction of the job step.

An embodiment of the present disclosure further provides an Internet-of-Things device. The Internet-of-Things device comprises a memory and a processor, wherein the memory is used for storing a computer program, and the computer program is used for realizing the following functions when executed by the processor: acquiring operation data of a user in a structured data creation process, wherein the operation data comprises at least one of object data and job data; comparing the operation data in a preset structured data template library to determine a target structured data template matched with the operation data, and recommending a job step in the target structured data template to the user; and judging whether to continuously recommend a subsequent job step in the target structured data template to the user according to whether the user adopts an instruction of the job step.

In some optional embodiments, the Internet-of-Things device in the above embodiments may be implemented as a kitchen robot, such as an automatic cooker, etc.; and accordingly, the structured data may be implemented as an electronic recipe used by the kitchen robot, an object may be implemented as a seasoning, a component may be implemented as a seasoning box, a pot body, etc. Based on this, the embodiments of the present disclosure provide a generating method of structured data for an Internet-of-Things device, which may be applied to an intelligent automatic cooker. Specifically, the recipe generating method for the automatic cooker provided by one embodiment may comprise a plurality of steps as shown in FIG. 4a.

P11: generating candidate recipes in a recipe creation process, and displaying the candidate recipes to a user.

In the embodiment, the automatic cooker may provide a "recipe creation" function. When the function is triggered, the automatic cooker may enter a process of generating the recipe. The recipe generation process may be divided into a seasoning preparation stage and a dish cooking stage. The automatic cooker may guide the user to complete the two stages through a voice system or a screen display system. For example, in the seasoning preparation stage, the automatic cooker may prompt the user by voice: "please preparing seasonings required in the recipe creation process, and inputting the seasonings into the system in sequence". Then, on the display screen of the automatic cooker, an editing page of the recipe may be displayed. The user may fill names, weights, the adding sequence, etc. of the seasonings in the editing page, and may add the corresponding seasoning into the seasoning box of the automatic cooker. The automatic cooker may also record the weight of the seasoning actually added by the user by a pressure sensor in the seasoning box. Thus, in the seasoning preparation stage, information input by the user and information detected by the automatic cooker may be acquired by the automatic cooker as corresponding seasoning preparation data. After acquiring the seasoning preparation data, the automatic cooker may process the seasoning preparation data locally, and may also further upload the seasoning preparation data to a data processing server at a cloud for processing, which is not limited in the present disclosure.

In the embodiment, after completing the seasoning preparation stage, the user may enter the dish cooking stage under the guidance of the automatic cooker. In the dish cooking stage, the user may perform a series of cooking actions, such as adding the seasonings, opening and closing a pot lid, stir-frying and stirring, setting the temperature, etc., the cooking actions may be recorded by the automatic cooker, and the automatic cooker may also record the action duration for a specific cooking action. For example, the automatic cooker may record the stir-frying period, the heating duration, etc. The data recorded by the automatic cooker may serve as cooking data of the dish cooking stage, and the cooking data may also be processed locally by the automatic cooker or uploaded to the data processing server at a cloud for processing, which is not limited in the present disclosure.

In the embodiment, both the above seasoning preparation data and cooking data may serve as operation data generated by the user in the recipe creation process, and the operation data may generate a corresponding operation step sequence according to the sequence of seasoning addition or the sequence of cooking time. The operation step sequence may comprise time-ordered operation steps, and each operation step may have various parameters. The parameters may indicate the stage, in which the operation step is located in the structured data creation process, the names of the seasonings involved in the operation step, the weights of the seasonings, as well as a state of a pot lid, a stirring state, the heating power, the heating duration, etc. corresponding to the operation step.

Specifically, in one application scenario example, a user needs to generate a recipe of braised prawns, then the user may add a series of seasonings, such as vegetable oil, cooking wine, shredded ginger, onion, etc. into the seasoning boxes of the automatic cooker, and the weights of the seasonings may be filled by the user in a human-computer interaction interface of the automatic cooker, and may also be automatically measured by the seasoning boxes of the automatic cooker through a measuring device, such as a pressure sensor. When adding the seasonings, the user may add the seasonings according to the actual adding sequence of the seasonings in the cooking process, or may sort the adding sequence of the seasonings in the human-computer interaction interface of the automatic cooker after all the seasonings are added. Thus, after the seasoning preparation data obtained in the seasoning preparation stage is serialized, a seasoning adding step sequence as shown in FIG. 4b may be obtained. In FIG. 4b, the seasonings prepared by the user may be displayed in different addition steps according to the adding sequence.

After the seasonings are added, the user may enter a cooking process of a dish. In one application scenario, when a user cooks a dish, the automatic cooker may automatically record various operations of functions of the user in the cooking process by means of a time axis, and the operations may be recorded as cooking data according to a standard data format in the automatic cooker. In another application scenario, a user may also actively add various cooking steps in the automatic cooker. For example, the user may click a control of "add steps" in the human-computer interaction interface of the automatic cooker, then the automatic cooker may enter a listening process of cooking steps, and at the moment, the operations executed by the user can be recorded by the automatic cooker. Each time the user starts a new step, the automatic cooker may enter the listening process of the cooking steps by triggering the control of "add steps", and the purpose of such the processing is that the automatic cooker may not record some unnecessary operations of the user, rather than record core operations of the user in the cooking process.

After the cooking data obtained by the user in the dish cooking stage is serialized, a cooking step sequence as shown in FIG. 4c may be obtained. In FIG. 4c, each cooking step may be sequentially arranged according to the sequence of cooking time, and various parameters such as an operating state, a state of a pot lid, a stirring state, the heating power, the heating time, adding of the seasonings, the actual operation of the device, etc. may be marked. Thus, the operation data obtained by the automatic cooker may be processed in such a manner, so as to obtain a standardized operation step sequence.

In the embodiment, after obtaining the user operation data, the automatic cooker may query a target recipe template matched with the operation data in a preset recipe template library. The preset recipe template library may be constructed by a machine learning algorithm. Specifically, the automatic cooker may acquire a large number of recipe data samples in advance, and the recipe data samples may be recorded by the automatic cooker by the user during use of the automatic cooker. In addition, in order to ensure the accuracy of the recipe data samples, the recipe data samples may also be actively input into the automatic cooker by a user (such as a chef) with higher cooking experience. The recipe data samples may be converted into the operation step sequences as shown in FIG. 4b and FIG. 4c through the serializing method described in step P11, and the converted operation step sequences may serve as recipe templates of the recipe data samples. Specifically, for the seasoning preparation data in the recipe data samples, the seasoning preparation data may be processed into the seasoning adding step sequence according to the sequence of seasoning addition. With regard to the cooking data in the recipe data samples, the cooking data may be processed into the cooking step sequence according to the sequence of cooking time. It should be noted that the recipe template may contain necessary parameters such as the variety of seasonings, the seasoning adding sequence, cooking steps in the dish cooking process, etc., while detailed parameters such as the heating duration, the weights of the seasonings, etc. may not be contained, and the reason is that the detailed parameters such as the heating duration and the weights of the seasonings are greatly changed with the number of cooked dishes; and only the seasonings, food materials and cooking steps necessary for completing one dish need to be recorded in the recipe template.

In the embodiment, after a large number of recipe data samples are acquired, and the recipe data samples are converted into the corresponding recipe templates, the recipe templates may be classified according to preset multiple dimensions by means of manual annotation. In practical application, the preset multiple dimensions may be, for example, dimensions of classification, complexity, etc. of the dishes. With reference to FIG. 4d, the classification of the dishes may be divided into A-type samples, B-type samples and C-type samples, and the complexity of the dishes may be divided into big meat, stir-frying, seasoned vegetables, stewing, quick stir-frying of hard objects, etc. A large number of recipe templates may be classified according to such the dimensions.

In the embodiment, after each recipe template is manually annotated, annotation results may be processed by utilizing a machine learning algorithm, so as to divide the recipe templates into different recipe template sets. In one practical application example, the recipe templates annotated manually may be classified by adopting a KNN classification algorithm. When a new recipe template appears, the category of the new recipe template may also be judged by the KNN algorithm.

In the embodiment, by analyzing a large number of samples of the recipe data, a recipe template library containing a plurality of recipe template sets may be obtained finally. With regard to operation data generated by the user in the recipe creation process, the operation data may be serialized to obtain a corresponding operation step sequence, and then a target recipe template matched with the user operation data may be determined by comparing the similarity between the operation step sequence and each recipe template in the recipe template library. Since the operation step sequence has a stronger time-ordered correlation, an RNN may be adopted for calculating the similarity between the operation step sequence and the recipe template. Specifically, for each operation step in the operation step sequence, a delayed result of each operation step may be calculated in sequence by utilizing an RNN algorithm. For example, for the first operation step in the operation step sequence, a data packet of the operation step may be operated with a delayer in the RNN algorithm, and a result obtained may serve as the delay result of the first operation step. Thus, each operation step may correspond to a delayed result, and the delayed results are arranged in a generation sequence, so as to obtain a classification code corresponding to the operation step sequence. Each recipe template in the recipe template library may also obtain a respective classification code in a similar manner, and subsequently, by calculating the similarity between a classification code of the operation data and the classification code of the recipe template, one or more recipe templates with the highest similarity may serve as the target recipe template matched with the operation data. In such the manner, the target recipe template matched with the operation data may be determined based on the generated classification code.

In the embodiment, since the operation data possibly contains both the seasoning preparation data and the cooking data simultaneously, in order to obtain a better matching result, the seasoning preparation data and the cooking data may be matched respectively. Specifically, with reference to FIG. 4e, the operation data may be split into seasoning preparation data and cooking data, then the seasoning preparation data may be processed into the seasoning adding step sequence as shown in FIG. 4b, and the cooking data may be processed into the cooking step sequence as shown in FIG. 4c. Then, a seasoning adding classification code corresponding to the seasoning adding step sequence and a cooking classification code corresponding to the cooking step sequence may be generated. With regard to the recipe templates in a recipe template library, the data may also be split in the manner, and the seasoning adding classification code and the cooking classification code of each recipe template are obtained. Then, multiple recipe templates with higher similarity (e.g. The similarity may be above a certain threshold) may be determined by using the seasoning adding classification codes according to the above similarity calculation manner, and the recipe templates may serve as a first recipe template set matched with the seasoning preparation data. Similarly, a second recipe template set matched with the cooking data may be determined according to the cooking classification codes. Then, the target recipe template matched with the operation data may be screened out from a union set of the first recipe template set and the second recipe template set. For example, the recipe template included in both the first recipe template set and the second recipe template set may serve as the screened-out target recipe template. Of course, the target recipe template may also be screened according to the popularity of the recipe templates and the preference of the user, which is not limited in the present disclosure.

In the embodiment, after the target recipe template matched with the user operation data is determined, since the target recipe template generally does not contain detailed parameters, such as the weights of the seasonings, the weights of the food materials, the heating duration, etc., the user operation data may be applied to the target recipe template, and thus, the detailed parameters may be filled in the target recipe template, so as to generate a candidate recipe containing various detailed parameters.

Of course, in practical application, the candidate recipe may also be generated based on other data and is not limited to the manner of generating the candidate recipe by the above operation data. For example, the automatic cooker may learn the preference of the user for dishes by analyzing the historical cooking data of the user; and in combination with the popularity of the dishes in the recent period of time, the automatic cooker may screen out some dishes with higher popularity and preference of the user, and may take recipes of the screened-out dishes as candidate recipes. In addition, the automatic cooker may also generate candidate recipes in combination with some limited information input by the user. For example, when the user creates the recipe, the user may input the variety of the recipe desired to be created in the automatic cooker, and names of a part of seasonings or food materials in the recipe may be provided. Thus, the automatic cooker can screen out candidate recipes according with conditions from multiple recipes according to the limited information input by the user.

In the embodiment, after generating the candidate recipe, the automatic cooker may display the candidate recipe to the user through a display screen or a terminal device of the user. The user can browse material preparation steps, cooking steps and various parameters therein.

P13: receiving an uploaded recipe edited by a user with regard to the candidate recipe, and taking the uploaded recipe as a recipe generated by the user in a recipe creation process.

In the embodiment, since the candidate recipe is generated by using the recipe template, the candidate recipe possibly contains an operation step which is not executed by the user in the candidate recipe. For example, when a user makes braised prawns, only eight cooking steps are executed, and a candidate recipe may contain a 9th cooking step; and 9th cooking step is not executed by the user, but is self-contained in the original target recipe template. The user may choose whether to adopt the operation steps that are not executed by the user. If the user adopts the operation steps in the candidate template, the recipe received by the automatic cooker may be an uploaded recipe confirmed by the user; however, if the user does not adopt the operation steps in the candidate template but modifies the operation steps therein, the recipe received by the automatic cooker is the uploaded recipe modified by the user. Therefore, the user may selectively edit the candidate recipe provided by the automatic cooker. Whether the candidate recipe is modified or not by the user, the uploaded recipe received by the automatic cooker may serve as the recipe generated by the user in the recipe creation process. The recipe may be stored locally by the automatic cooker, so that the automatic cooker may automatically make dishes according to the recipe subsequently. In addition, the automatic cooker may also upload the recipe to a data processing server at a cloud, and other users may obtain the recipe by accessing the data processing server, so as to realize the sharing of the recipe.

In the embodiment, in order to further optimize the recipe template library, the uploaded recipe edited by the user may be processed in different manners. With regard to the confirmed uploaded recipe, since the recipe template in the recipe template library is still used and is not modified by the user, after the uploaded recipe confirmed by the user is received, the confirmed uploaded recipe may be taken as a new recipe template and added into a corresponding recipe template set of the recipe template library. However, if the uploaded recipe modified by the user is received, the uploaded recipe is no longer consistent with the original recipe template, and cannot be directly added into the corresponding recipe template set; instead, the modified uploaded recipe may be written into a manual annotation library, so as to take the modified uploaded recipe as a new recipe data sample after a label is added into the modified uploaded recipe by means of manual annotation, and the new recipe data sample may be classified in a machine learning manner described in step S13, so as to add the modified uploaded recipe into the recipe template set matched with the added label. In such the manner, the recipe templates in the recipe template library may be constantly enriched so that the candidate recipes recommended to the user can be more and more accurate.

With reference to FIG. 4f, an embodiment of the present disclosure further provides a recipe generating system for an automatic cooker. The system comprises:

a candidate recipe generation unit, used for generating a candidate recipe in a recipe creation process and displaying the candidate recipe to a user; and a recipe editing unit, used for receiving an uploaded recipe edited by the user with respect to the candidate recipe, and taking the uploaded recipe as the recipe generated by the user in the recipe creation process.

In one embodiment, the candidate recipe generating unit comprises:

an operation data acquisition module, used for acquiring operation data of a user in a recipe creation process, wherein the operation data comprises at least one of seasoning preparation data and cooking data; and a recipe comparison module, used for comparing the operation data in a preset recipe template library to determine a target recipe template matching the operation data, and applying the operation data to the target recipe template to generate a candidate recipe corresponding to the operation data.

Figure 4G:
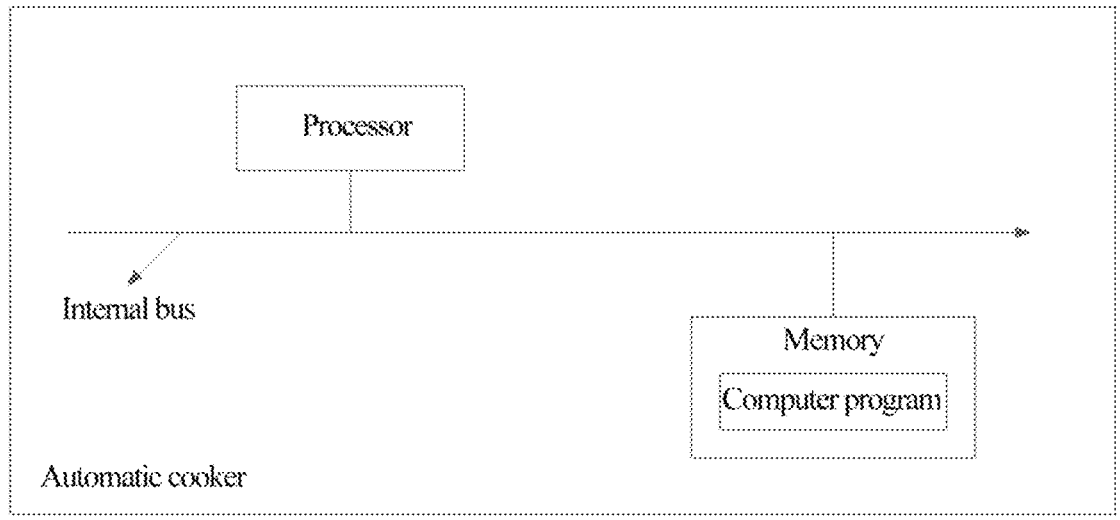
FIG. 4g is a structural schematic diagram of another automatic cooker provided by embodiments of the present disclosure.

With reference to FIG. 4g, an embodiment of the present disclosure further provides an automatic cooker. The automatic cooker comprises a memory and a processor, wherein the memory is used for storing a computer program, and when the computer program is executed by the processor, the computer program is used for realizing the following functions:

generating a candidate recipe in a recipe creation process, and displaying the candidate recipe to a user; and receiving an uploaded recipe edited by the user with regard to the candidate recipe, and taking the uploaded recipe as a recipe generated by the user in a recipe creation process.

Figure 4H:
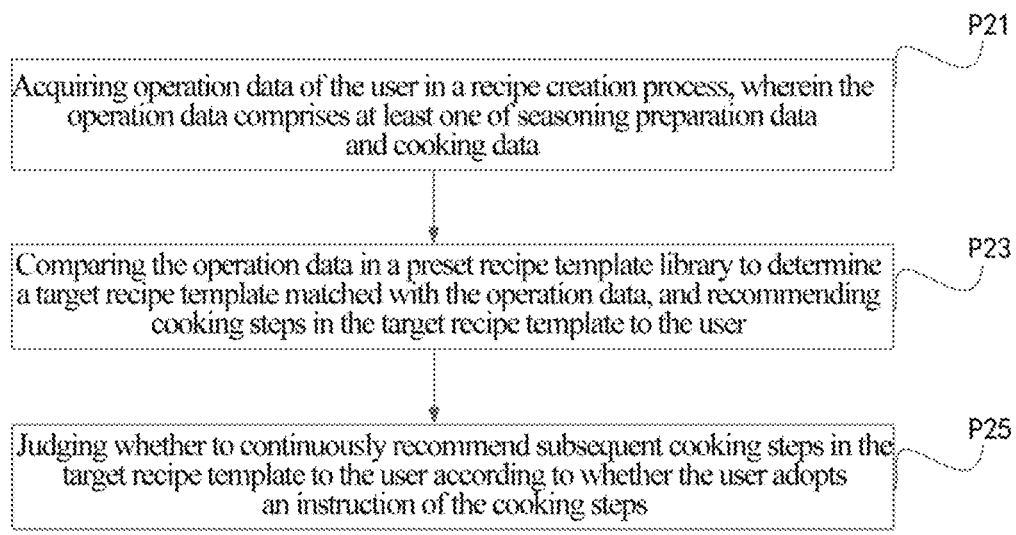
FIG. 4h is a flow chart of a recommending method of a cooking step provided by embodiments of the present disclosure.
Figure 4I:
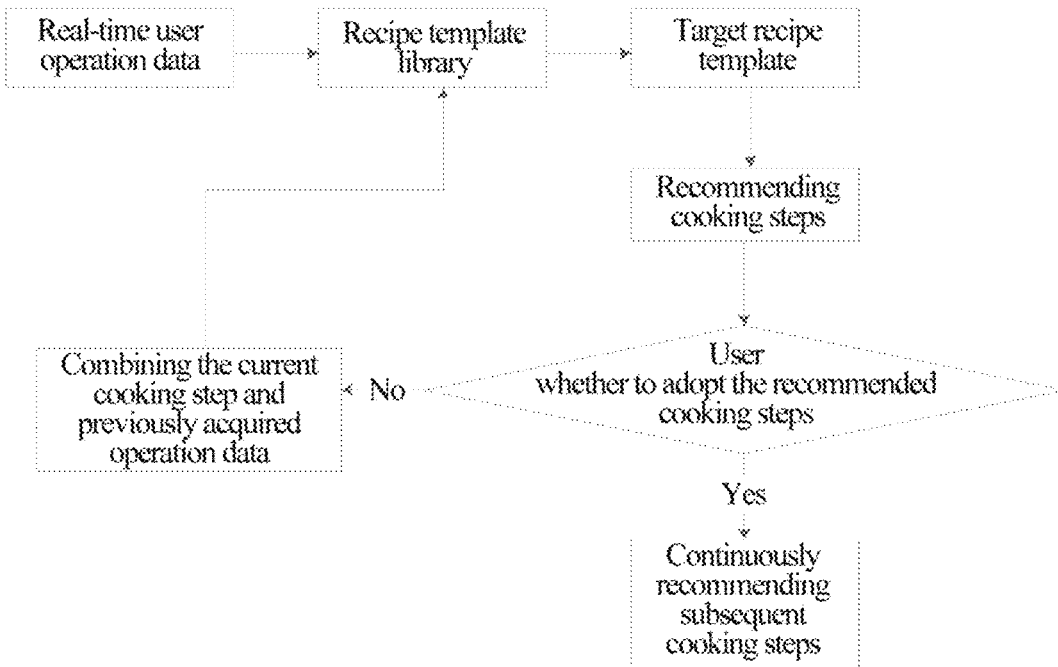
FIG. 4i is a flow chart of another recommending method of a cooking step provided by embodiments of the present disclosure.

In practical application, the user may not have a clear cooking idea at the time of recipe creation, but only prepares some seasonings and food materials. In view of this, when guiding the user to create a recipe, the automatic cooker in the present disclosure may dynamically recommend applicable cooking steps to the user according to operation data currently executed by the user. The user may finally complete the recipe creation process by choosing to adopt or not adopt the cooking steps. Specifically, an embodiment of the present disclosure further provides a cooking recommending method for an automatic cooker. With reference to FIG. 4h and FIG. 4i, the method may comprise the following steps.

P21: acquiring operation data of the user in a recipe creation process, wherein the operation data comprises at least one of seasoning preparation data and cooking data.

In the embodiment, the automatic cooker may guide the user into the seasoning preparation stage and the dish cooking stage in the recipe creation process according to the process described in the step P11. The operation data executed by the user in the seasoning preparation stage may serve as the seasoning preparation data, and the operation data executed by the user in the dish cooking stage may serve as the cooking data. It should be noted that the automatic cooker may acquire the operation data generated by the user in the recipe creation process in real time, and may analyze the operation data currently acquired (or upload the operation data to the data processing server for analysis). Therefore, in the embodiment, the automatic cooker continuously performs real-time analysis on the acquired operation data in the process of acquiring the operation data without waiting for the end of the whole cooking process.

P23: comparing the operation data in the preset recipe template library to determine the target recipe template matched with the operation data, and recommending cooking steps in the target recipe template to the user.

In the embodiment, the automatic cooker can perform real-time analysis on the operation data acquired in the recipe creation process, process the operation data into an operation step sequence according to the solution described in step P13, and compare the operation step sequence and the recipe templates in the preset recipe template library, so as to determine the target recipe template matched with the operation data. Specifically, a classification code of the operation step sequence may be generated according to the solution in step P13, and a target recipe template matched with the operation data may be determined based on the classification code. In addition, since the currently analyzed operation data is only a part of data in the cooking process, when the target recipe template is determined, the recipe template containing the operation step sequence in the recipe template library may serve as a target recipe template matched with the operation data. For example, the currently analyzed operation data is only seasoning preparation data; after the seasoning preparation data is processed into the seasoning adding step sequence, through the matching with the recipe templates in the recipe template library, it is found that the seasoning preparation stages of 10 recipe templates contain the seasoning adding step sequence; and therefore, all the 10 recipe templates may serve as matched target recipe templates. The reason for such the processing is that the target recipe templates obtained by matching partial user operation data are all possible dishes that the user wants to cook, and the cooking steps of the target recipe templates may be recommended to the user subsequently, so as to allow the user to select what recipe to create.

In the embodiment, the above recipe template library may be created in the manner of the step P13, which is not repeated herein.

P25: judging that whether to continue to recommend subsequent cooking steps in the target recipe template to the user according to an instruction that whether the user adopts the cooking steps.

In the embodiment, after the target recipe template matched with the user operation data is determined, the automatic cooker may identify cooking steps located after the user operation data in the target recipe template, and recommend the cooking steps to the user through a display screen or a terminal device of the user. For example, the user operation data has completed the seasoning preparation stage, and the first two cooking steps of the cooking stage have been executed; and on the basis, three matched target recipe templates are obtained by the automatic cooker through analysis, then the cooking steps located after the first two cooking steps executed by the user may be identified respectively in the three target recipe templates, and the identified cooking steps are recommended to the user through the display screen, so as to be selected by the user.

In practical application, when the cooking steps of the multiple target recipe templates are identified, the cooking steps may be sorted according to the popularity of the target recipe templates and recommended to the user in sequence. The preference of the user for dishes may also be analyzed in conjunction with the historical cooking records of the user, and the cooking steps of the target recipe templates, which the user are interested in, may be preferentially recommended to the user.

In the embodiment, the user may choose to adopt or not adopt the cooking steps recommended by the automatic cooker, and if the automatic cooker receives the instruction that the user adopts the cooking steps, it indicates that the user is interested in the steps of the recommended target recipe template, and at the moment, the automatic cooker may continue to recommend the subsequent cooking steps in the target recipe template to the user, so as to guide the user to complete the making of a dish. However, if the automatic cooker receives an instruction that the user does not adopt the cooking steps, it indicates that the user is not interested in the recommended cooking steps, or the user has ideal cooking steps. At the moment, the automatic cooker may collect a current cooking step executed by the user, re-determine a matched target recipe template in the recipe template library again on the basis of the current cooking step and the previously acquired operation data, and recommend cooking steps in the re-determined target recipe template to the user. Thus, by continuously analyzing real-time user operation data and continuously recommending cooking steps to the user, the automatic cooker may gradually reduce the range of dishes that the user wants to cook, and may finally guide the user to cook a specific dish.

It can be seen from the above that by analyzing the user operation data in real time, the automatic cooker may dynamically analyze a recipe template that the user is interested in and recommend cooking steps in the recipe template to the user. According to the received instruction that whether the user adopts the cooking steps, the automatic cooker may choose to continue to recommend the cooking steps or re-determine a matched recipe template, and may finally guide the user to make a dish, so as to complete the dish creation process.

One embodiment of the present disclosure further provides a cooking recommending system for an automatic cooker. The system comprises:
  an operation data acquisition unit, used for acquiring operation data of a user in a recipe creation process, wherein the operation data comprises at least one of material preparation data and cooking data;
  a cooking step recommendation unit, used for comparing the operation data in a preset recipe template library to determine a target recipe template matched with the operation data, and recommending cooking steps in the target recipe template to the user; and
  a judgment unit, used for judging whether to continuously recommend subsequent cooking steps in the target recipe template to the user according to whether the user adopts the instruction of the cooking step.

One embodiment of the present disclosure further provides an automatic cooker. The automatic cooker comprises a memory and a processor, wherein the memory is used for storing a computer program, and when executed by the processor, the computer program is used for realizing the following functions:
  acquiring operation data of a user in a recipe creation process, wherein the operation data comprises at least one of material preparation data and cooking data;
  comparing the operation data in a preset recipe template library to determine a target recipe template matched with the operation data, and recommending cooking steps in the target recipe template to the user; and
  judging whether to continuously recommend subsequent cooking steps in the target recipe template to the user according to whether the user adopts the instruction of the cooking step.

In the embodiment, the memory may comprise a physical apparatus used for storing information, and the physical apparatus is usually used for storing the information by means of electrical, magnetic or optical media, etc. after the information is digitalized. The memory may comprise: an apparatus for storing information in an electrical energy manner, such as an RAM (Random Access Memory), an ROM (Read Only Memory), etc.; an apparatus for storing information in a magnetic energy manner, such as a hard disk, a floppy disk, a magnetic tape, a magnetic core memory, a magnetic bubble memory, a U disk; and an apparatus for storing information in an optical manner, such as a CD or a DVD. Of course, the memory comprises other ways of memories, such as a quantum memory, a grapheme memory, etc.

In the embodiment, the processor may be implemented in any suitable manner. For example, the processor may take the form of, for example, a microprocessor or a processor, as well as a computer readable medium for storing computer-readable program codes (e.g. software or firmware) executable by the (micro) processor, a logic gate, a switch, an ASIC (Application Specific Integrated Circuit), a programmable logic controller, an embedded microcontroller, etc.

Application Scenario I:

The present disclosure is described below with respect to specific application scenarios. For example, a user needs a recipe of braised prawns, and the recipe generating method is explained in combination with a specific automatic cooker.

The automatic cooker is an intelligent household appliance device. The user first searches for the recipe of braised prawns through a man-machine interaction interface. The automatic cooker will automatically search whether there is a matched recipe, and the search range includes: a memory, an Internet server, an Internet-of-Things server or an intelligent terminal device interconnected with the automatic cooker. The search results are displayed to the user via the man-machine interaction interface for selection; and the user may select the recipe matched with the braised prawns, and may also create a recipe of the braised prawns.

A recipe library is managed by the automatic cooker. Various types of recipes are firstly classified, and the classifying method comprises at least one of time and region, such as, breakfast, lunch, dinner, Chinese food, western food, Hunan cuisine, Sichuan cuisine, Jiangsu and Zhejiang cuisine, Guangdong cuisine and northeastern Chinese cuisine. Then, the various types of recipes having identical elements are clustered; the clustering method comprises at least one of tastes, raw materials and operation data, such as stir-frying, steaming, and stewing for a long time. Finally, various types of dishes are standardized; and a standardized recipe template library of the recipes is formed by virtue of operation data formed by preset habits of the users or historical records, such as material preparation data and cooking data.

When a user needs to create a new recipe of the braised prawns, the automatic cooker firstly acquires the operation data of the user for creating the braised prawns. The operation data may be personalized selections for the user. For example, after the data and modes of quick frying and stir frying are selected, the operation data is compared with recipe data in the preset recipe template library so as to determine a target recipe template matched with the operation data. Thus, the automatic cooker automatically finds a suitable recipe template according to the selection of the user, and applies the operation data of the user to the recipe template to generate candidate recipes required by the user. Then, the candidate recipes are displayed to the user on the man-machine interaction interface for selection. After one of the candidate recipes is selected by the user, such as, extremely spicy braised prawns, the operation data, such as an editing temperature, time and the amount of seasonings, of the recipe may be continuously edited, to form the present recipe of the braised prawns. After the various operation data of the recipe are complete, the automatic cooker uploads the recipe of the braised prawns to an execution mechanism; and the recipe is used for cooking the present braised prawns.

Application Scenario II:

The present disclosure is described below with respect to specific application scenarios. For example, a user needs a recipe of braised prawns, and the recipe generating method is explained in combination with a specific automatic cooker.

The automatic cooker is an intelligent household appliance device. The user first searches for the recipe of braised prawns through a man-machine interaction interface. The automatic cooker will automatically search whether there is a matched recipe, and the search range includes: a memory, an Internet server, an Internet-of-Things server or an intelligent terminal device interconnected with the automatic cooker. The search results are displayed to the user via the man-machine interaction interface for selection; and the user may select the recipe matched with the braised prawns, and may also create a recipe of the braised prawns.

A recipe library is managed by the automatic cooker. Various types of recipes are firstly classified, and the classifying method comprises at least one of time and region, such as, breakfast, lunch, dinner, Chinese food, western food, Hunan cuisine, Sichuan cuisine, Jiangsu and Zhejiang cuisine, Guangdong cuisine and northeastern Chinese cuisine. Then, the various types of recipes having identical elements are clustered; the clustering method comprises at least one of tastes, raw materials and operation data, such as stir-frying, steaming, and stewing for a long time. Finally, various types of dishes are standardized; and a standardized recipe template library of the recipes is formed by virtue of operation data formed by preset habits of the users or historical records, such as material preparation data and cooking data.

When a user needs to create a new recipe of the braised prawns, the automatic cooker firstly acquires the operation data of the user for creating the braised prawns. The operation data may be personalized selections for the user. For example, after the data and modes of quick frying and stir frying are selected, the operation data is compared with recipe data in the preset recipe template library so as to determine a target recipe template matched with the operation data. Thus, the automatic cooker automatically finds a suitable recipe template according to the selection of the user, and applies the operation data of the user to the recipe template to generate candidate recipes required by the user. Then, the candidate recipes are displayed to the user on the man-machine interaction interface to be recommended to the user. After one of the candidate recipes is selected by the user, such as, stir-fried braised prawns, the operation data, such as an editing temperature, time and the amount of seasonings, of the recipe may be continuously edited, to form the present recipe of the braised prawns. After the various operation data of the recipe are complete, the automatic cooker uploads the recipe of the braised prawns to an execution mechanism; and the recipe is used for cooking the present braised prawns.

Application Scenario III:

The present disclosure is described below with respect to specific application scenarios. For example, a user needs a recipe of stewed pork with brown sauce, and a recommending method of a recipe is explained in combination with a specific automatic cooker.

The automatic cooker is an intelligent household appliance device. The user first searches for the recipe of the stewed pork with brown sauce through a man-machine interaction interface. The automatic cooker will automatically search whether there is a matched recipe, and the search range includes: a memory, an Internet server, an Internet-of-Things server or an intelligent terminal device interconnected with the automatic cooker. The search results are displayed to the user via the man-machine interaction interface for selection; and the user may select the recipe matched with the stewed pork with brown sauce, and may also create a recipe of the stewed pork with brown sauce.

A recipe library is managed by the automatic cooker. Various types of recipes are firstly classified, and the classifying method comprises at least one of time and region, such as, breakfast, lunch, dinner, Chinese food, western food, Hunan cuisine, Sichuan cuisine, Jiangsu and Zhejiang cuisine, Guangdong cuisine and northeastern Chinese cuisine. Then, the various types of recipes having identical elements are clustered; the clustering method comprises at least one of tastes, raw materials and operation data, such as stir-frying, steaming, and stewing for a long time. Finally, various types of dishes are standardized; and a standardized recipe template library of the recipes is formed by virtue of operation data formed by preset habits of the users or historical records, such as material preparation data and cooking data.

When a user needs to create the recipe of the stewed pork with brown sauce, the automatic cooker is paired and interconnected with a smartphone; the operation data of the user for creating the stewed pork with brown sauce is acquired in application software APP built in the smartphone. The operation data may be personalized selections for the user. For example, after the data and modes of stewing and braising are selected, the operation data on the smartphone is compared with recipe data in the preset recipe template library on the automatic cooker so as to determine a target recipe template matched with the operation data. Thus, the smartphone automatically finds a suitable recipe template according to the selection of the user, and applies the operation data of the user to the recipe template to generate candidate recipes required by the user. Then, the candidate recipes are displayed on the smartphone and recommended to the user for selection. After one of the candidate recipes is selected by the user, such as, stewed type stewed pork with brown sauce, the operation data, such as an editing temperature, time and the amount of seasonings, of the recipe may be continuously edited, to form the present recipe of the stewed pork with brown sauce. After the various operation data of the recipe are complete, the smartphone uploads the recipe of the stewed pork with brown sauce to an automatic cooker; and the recipe is used for cooking the present stewed pork with brown sauce.

Application Scenario IV:

The present disclosure is described below with respect to specific application scenarios. For example, a user needs a recipe of stewed pork with brown sauce, and a recommending method of a recipe is explained in combination with a specific automatic cooker.

The automatic cooker is an intelligent household appliance device. The automatic cooker is first paired and interconnected with a smartphone by a user. The recipe of stewed pork with brown sauce is searched through application software APP built in the smartphone. The smartphone will automatically search whether there is a matched recipe, and the search range includes: a memory, an Internet server, an Internet-of-Things server or an intelligent terminal device interconnected with the automatic cooker. The search results are displayed to the user via the smartphone for selection; and the user may select the recipe matched with the stewed pork with brown sauce, and may also create a recipe of the stewed pork with brown sauce.

A recipe library is managed by application software APP built in the smartphone. Various types of recipes are firstly classified, and the classifying method comprises at least one of time and region, such as, breakfast, lunch, dinner, Chinese food, western food, Hunan cuisine, Sichuan cuisine, Jiangsu and Zhejiang cuisine, Guangdong cuisine and northeastern Chinese cuisine. Then, the various types of recipes having identical elements are clustered; the clustering method comprises at least one of tastes, raw materials and operation data, such as stir-frying, steaming, and stewing for a long time. Finally, various types of dishes are standardized; and a standardized recipe template library of the recipes is formed by virtue of operation data formed by preset habits of the users or historical records, such as material preparation data and cooking data.

When the user needs to create the recipe of the stewed pork with brown sauce, the operation data of the user for creating the present stewed pork with brown sauce is acquired in the application software APP built in the smartphone. The operation data may be personalized selections for the user. For example, after the data and modes of stewing and braising are selected, the operation data on the smartphone is compared with recipe data in the preset recipe template library on the smartphone so as to determine a target recipe template matched with the operation data. Thus, the smartphone automatically finds a suitable recipe template according to the selection of the user, and applies the operation data of the user to the recipe template to generate candidate recipes required by the user. Then, the candidate recipes are displayed on the smartphone and recommended to the user for selection. After one of the candidate recipes is selected by the user, such as, stewed type stewed pork with brown sauce, the operation data, such as an editing temperature, time and the amount of seasonings, of the recipe may be continuously edited, to form the present recipe of the stewed pork with brown sauce. After the various operation data of the recipe are complete, the automatic cooker receives the recipe uploaded by the smartphone; and the recipe is used for cooking the present stewed pork with brown sauce.

Each embodiment of the description is described in a progressive manner, the same or similar parts of all the embodiments refer to each other, and each embodiment focuses on differences from the other embodiments.

It may be seen from the above that, according to the technical solutions provided by one or more embodiments of the present disclosure, the user may independently create a recipe while using the automatic cooker. In the recipe creation process, the automatic cooker may acquire the operation data of the user; and the operation data may be material preparation data at a seasoning preparation state and may also be cooking data at a dish cooking stage. After the operation data of the user is acquired by the automatic cooker, the operation data may be compared with the recipe template in the recipe template library so as to determine a target recipe template matched with the operation data best. The target recipe template may characterize dish cooking steps. Subsequently, the actual operation data of the user may be applied to the target recipe template to generate a candidate recipe containing various cooking parameters. The automatic cooker may provide the candidate recipe for the user. The user may confirm that the candidate recipe is a finally generated recipe according to own requirements, and may also adjust steps or parameters in the candidate recipe so as to obtain the finally generated recipe. It may be seen from the above that, during recipe creation, the user does not need to perform too many additional operations, but only needs to perform the cooking process normally, thereby greatly simplifying the recipe generation process and improving the recipe generation efficiency.

While executing a task on the Internet-of-Things device, the user may first query the structured data of the target task desired to be made from the internet, and then manually prepare a first object and a second object required by the target task according to contents of the structured data. Later, the user may start the Internet-of-Things device and operate the Internet-of-Things device in turn according to the contents of the structured data. However, when a user executes a task by using the Internet-of-Things device, if the Internet-of-Things device cannot effectively recognize or execute the contents of the structured data, the user needs to frequently and accurately control the Internet-of-Things device according to the contents of the structured data. However, most of the Internet-of-Things device oriented groups are users who have no professional knowledge; and it is difficult or unwilling for the users to participate too much in generation of target tasks by using the Internet-of-Things device. Therefore, user experience during execution of the tasks by using the Internet-of-Things device is poor.

To solve the above problem, the embodiments of the present disclosure provide structured data. One of the structured data corresponds to one target task, and may be applied to the above intelligent Internet-of-Things device. Therefore, the Internet-of-Things device may execute different target tasks based on the structured data of different target tasks. The structured data may be generated by a manufacturer of the Internet-of-Things device according to a user-defined protocol after improving common structured data, and is stored in a server provided by the manufacturer. The structured data may also be edited manually by the user of the Internet-of-Things device on the intelligent terminal device and uploaded to the server provided by the manufacturer. The terminal herein may be an Internet-of-Things device, and may also be a mobile communication device, such as a mobile phone, a tablet computer and a watch, installed with an application program app corresponding to the Internet-of-Things device. The acquisition authority of the structured data generated by the manufacturer may be set to be public, i.e., all users may consult or acquire the structured data for free. Further, the corresponding acquisition authority of the structured data that is manually edited by the user may be set by the user, e.g., the structured data may be set as public structured data, private structured data or to-be-paid structured data.

The structured data in the embodiments of the present disclosure may comprise step execution information and export information. The step execution information may be used for recording all the execution flow data of the target task, i.e., all the execution flow data required from the start of the Internet-of-Things device to the completion of the target task, while the basis for division of the execution flow data may be the execution of a new instruction and/or the end of the duration.

Each execution flow data in the structured data may correspond to a frame of character strings; and the character strings may be composed of various types of characters such as numbers, letters and symbols based on a user-defined protocol. Specifically, each frame of character strings may include a plurality of hardware recognizable character groups; and each hardware recognizable character group corresponds to a piece of detail information in the current execution flow data. The detailed information may be one or more of a hardware running state, an execution mode, an execution temperature, execution time, first object adding information, a prompt requirement, reservation time, stirring duration, a stirring direction and a third component opening/closing state, or may also be detailed contents during other target task execution processes. It is worth mentioning that, the first object adding information may be specifically the number of the used first components and the type and amount of the first objects placed in each first component. Thus, all the first objects required during the execution of the target task may be clearly and intuitively displayed by respectively setting the first objects for each of the first components. Moreover, the structured data is conveniently parsed and executed by the Internet-of-Things device.

Further, in the character string corresponding to each execution flow data, the detailed information corresponding to the hardware recognizable character group at the same position is the same. Specifically, the corresponding detailed information at each position in the character string may be defined by a user-defined protocol. For example, after standard format contents such as a frame header and a frame tail are removed, n (n is a positive integer) characters are taken as a group in the remaining data, and the character group from left to right respectively corresponds to the hardware running state, the execution mode, the execution temperature, execution time, the addition amount of the first component 1, the addition amount of the first component 2, the addition amount of the first component m (m is a positive integer), the prompt requirement and the reservation time. The export information may at least comprise structured data description information and manual operation prompt information corresponding to the target task. The structured data description information is used for describing basic information of the target task. A user may quickly obtain a basic understanding of the target task via the structured data description information. The structured data description information may at least comprise one or more of a structured data identifier, target task product information, first object information and second object information. The structured data identifier may be used for uniquely identifying the structured data, and in particular may be a serial number, a QR code and an index value of the structured data. The structured data product information can help the user understand the target task comprehensively and at least may include contents as follows:

Name: the structured data product information may be the most common name of the target task, and may have another name of the target task.

Image: may be at least one of picture, animation and video during execution prompt, process and completion of the target task.

Object trend characterization: by taking the object as a dish as an example, the object characterization may be sour, sweet, spicy and pungent tastes; and if a target task has a plurality of object trend characterizations, corresponding proportion coefficients of the various object trend characterizations may be respectively identified according to the proportions of the object trend characterizations.

Mouthfeel: by taking the object as the dish as an example, the mouthfeel may be tender, crispy, loose, soft, glutinous, chewy and crispy.

Cuisine: the country or region to which the target task belongs may be indicated; and by taking the object as a dish as the example, the belonging may be Shandong cuisine, Sichuan cuisine, Italian cuisine and French cuisine.

Execution time consumption: basic time consumption required for executing the target task may be indicated, so that the user may reasonably select the structured data according to available time.

Further, the basic information of the structured data may further include historical information of the target task, and is configured with a voice file corresponding to the historical information. Thus, when the target task is executed by the Internet-of-Things device, the voice file of the historical information of the target task may be played via voice. Therefore, the user can learn corresponding historical information knowledge while waiting for completion of the execution of the target task.

The first object information and the second object information in the structured data description information may be names and pictures of all the second objects and first objects required for executing the target task, wherein the names may include major names and another names of the second objects or the first objects, and the pictures may be pictures of the second objects or the first objects in different forms, so as to enable the user to quickly and accurately determine the second objects and the first objects.

Optionally, the structured data may include object trend characterization data; the object trend characterization data may exist in the form of object trend characterization options; and each object trend characterization option may correspond to one or more pieces of step change information. It can be understood that, the structured data includes the object trend characterization data to enable the user to select the own favorite object trend characterization. If the user selects a certain object trend characterization option, the step execution information in the structured data will change according to the corresponding step change information. If the user does not select any object trend characterization option, the step execution information in the structured data will remain in a default state.

Optionally, since different categories of people are suitable for different target tasks, different user suitability degrees may be given for the different categories of people in the structured data of the target tasks. Therefore, the structured data further comprises population suitability information, wherein the population suitability information comprises a plurality of user category identifiers, and suitability corresponding to each of the user category identifiers. It may be seen that, the suitability corresponding to all the user categories is difficultly given in the structured data with respect to diverse population category classification. Therefore, only a user category with the suitability lower than a certain threshold value may be given to achieve a warning effect on unsuitable populations.

Optionally, by taking the target task as a diet category as an example, considering that health preservation has become an important concept pursued currently, people will pay attention to nutritional value of the target task while paying attention to color, aroma and taste of the target task. Therefore, the structured data may further comprise nutritional composition information; and identifiers and content of a plurality of nutritional ingredients comprised in the target task may be sequentially recorded in the nutritional composition information according to a content proportion from high to low. Thus, the user may intuitively and quickly know the nutritional ingredients comprised in the target task through the nutritional composition information of the target task, so as to design the own diet plan.

Optionally, after selecting one target task, the user may make reminders and recommendations associated with the target task based on the target task. Based on this, the structured data may further comprise associated target task information; and the associated target task information at least may comprise one or more of kindred target task information, similar target task information, matched target task information, and contradicted target task information. The kindred target task information may be an upgraded version or a simplified version of the current target task; and by virtue of the setting of the kindred target task information, the user may freely select the target task of the upgraded version or the simplified version according to actual situations after acquiring the above structured data. The similar target task information may be a target task similar to object trend characterization of the current target task or similar material consumption; and by virtue of the setting of the similar target task information, the diet plan of the user may be enriched, and the same target task may be avoided from being repeatedly used by the user. The matched target task information may be a matched target task of the current target task; and by virtue of the setting of the matched target task information, the user does not need to consume extra effort for matching. The contradicted target task information may be a target task that is unsuitable for sharing of the current target task; and by virtue of the setting of the contradicted target task information, wrong matching of the user may be avoided.

Further, according to the kindred target task information, the similar target task information, the matched target task information and the contradicted target task information in the above associated target task information, a display manner of the information may be specifically a target task and/or a second object identifier, i.e., the name and/or picture of the target task and/or the second object identifier. Meanwhile, each piece of the associated target task information may further comprise a user approval degree of the corresponding target task, so as to screen and judge the associated target task information by the user. When the user approves the above associated target task information, a commendation operation may be executed on the corresponding target task, so that the user approval degree of the corresponding target task may be improved.

Further, if the Internet-of-Things device enters an anomaly state due to an accident while executing the target task, a great impact will be caused to the user. Therefore, in view of this situation, the structured data may comprise anomaly processing information; and the anomaly processing information may comprise a plurality of types of anomaly state information, and handling information corresponding to each type of anomaly state information. It should be noted that, the above anomaly state information may be a determined abnormal state of the Internet-of-Things device caused by fault events after all the possible fault events are summarized by analyzing the execution flow data of the target task by the Internet-of-Things device manufacturer; and the handling information is the most reasonable and effective measure that can be taken by the Internet-of-Things device with respect to the corresponding anomaly state information.

It is worth mentioning that, the step execution information and the export information may be respectively stored in different data files; and the export information can correspond to various data files, such as picture files, video files and voice prompt files. While acquiring the structured data, the Internet-of-Things device may selectively download one or more of the data files of the step execution information and the information files of the export information according to requirements.

The structured data shown in the embodiments of the present disclosure is composed of two major parts such as the step execution information and the export information. The execution flow data of the target task is recorded by the character string composed of the hardware recognizable character group in the step execution information; and the export information comprises structured data description information and manual operation prompt information corresponding to the target task. Thus, the structured data is structured. On the one hand, all the step details in the target task execution process may be restored by parsing the character string, and then the execution process of the target task may be automatically completed thereby without excessive manual participation; on the other hand, a kitchen robot may intuitively and effectively display details of the target task by outputting the export information. Further, when the structured data is generated in a structured form, generation and management of the structured data may be facilitated.

The present embodiment further provides a method for executing tasks based on structured data. An execution subject of the method may be an Internet-of-Things device; and the method may be completed through assistance of a server corresponding to a user terminal and the Internet-of-Things device. The Internet-of-Things device may be used for executing a corresponding target task according to the acquired structured data in response to a target task execution instruction of the user. A cooking app corresponding to the Internet-of-Things device may be installed on the user terminal; and the user may transmit the target task execution instruction to the Internet-of-Things device via the cooking app, so that the Internet-of-Things device may be triggered to start executing the corresponding target task. The server may be used for storing the structured data and may provide the stored structured data for the Internet-of-Things device. Further, the structured data may include the step execution information and export information; and the server may respectively store the step execution information and the export information as different files while storing the structured data.

The method for executing tasks based on structured data provided by the present embodiment comprises: receiving an execution instruction of a target task, and downloading structured data of the target task from a server, wherein the structured data comprises step execution information and export information; parsing the export information, and outputting structured data description information or manual operation prompt information in the export information when an information output instruction is received; parsing the step execution information, and acquiring a character string that corresponds to all execution flow data of the target task; and executing the target task based on a hardware recognizable character group that corresponds to each piece of detailed information comprised in the character string.

In the embodiments, the user may select the target task on the cooking app of the user terminal and click a corresponding execution key, so that the Internet-of-Things device may be triggered to receive an execution instruction of the target task. Alternatively, the user may directly perform a touch operation on the Internet-of-Things device to select a target task and click a corresponding execution key, and may also trigger the Internet-of-Things device to receive the execution instruction of the target task. Later, the Internet-of- Things device may establish communication connection with the server and download the structured data of the target task from the server.

In the embodiments, after downloading the structured data of the target task from the server, the Internet-of-Things device may parse the export information to acquire the structured data description information or the manual operation prompt information in the export information. Later, the Internet-of-Things device may monitor reception of an information output instruction. While receiving the information output instruction, the Internet-of-Things device may first determine the structured data description information or manual operation prompt information corresponding to the information output instruction, and then output corresponding information.

In the embodiments, after acquiring character strings corresponding to all the execution flow data of the target task, the Internet-of-Things device may parse the character strings in sequence according to the sequence of the execution flow data so as to acquire the hardware recognizable character group that corresponds to each piece of detailed information comprised in the character strings, thereby executing the target task based on these character groups.

Optionally, both an application operating system for parsing the export information and an embedded host program for parsing step execution information may be simultaneously built in the Internet-of-Things device. Therefore, after acquiring the structured data, the Internet-of-Things device may respectively parse the corresponding information by utilizing the application operating system and the embedded host program. On the one hand, the information output instruction may be triggered by a manual operation; and on the other hand, the information output instruction may be generated during execution of the target task after the step execution information is parsed by the embedded host program.

Optionally, in the character string corresponding to each execution flow data of the structured data, the detailed information corresponding to the hardware recognizable character group at the same position is the same. Therefore, specific processing may be as follows: sequentially reading character strings corresponding to each execution flow data according to the sequence of the execution flow data; extracting all hardware recognizable character groups in the character strings with respect to the character string corresponding to target execution flow data; and completing the target execution flow data according to the detailed information corresponding to all the hardware recognizable character groups.

In the embodiments, after the Internet-of-Things device parses the structured data to obtain the character string corresponding to each execution flow data of the target task, the character string corresponding to each execution flow data may be loaded in sequence according to the sequence of the execution flow data. When the character string corresponding to the target execution flow data is completely loaded, all the hardware recognizable character groups may be extracted from the character string according to an offset position of the character in the character string according to a user-defined protocol. Each hardware recognizable character group may correspond to a piece of detailed information in the target execution flow data. Thus, the Internet-of-Things device may complete the target execution flow data by loading and executing all the above hardware recognizable character groups.

Optionally, the detailed information in the execution flow data at least comprises one or more of a hardware running state, an execution mode, an execution temperature, execution time, first object adding information, a prompt requirement, reservation time, stirring duration, a stirring direction and a third component opening/closing state.

In the embodiment, the Internet-of-Things device may execute detailed processing of each execution flow data according to the detailed information of each execution flow data recorded in the structured data. For example, the hardware running state, the execution mode, the execution temperature, execution time, the first object adding information, the prompt requirement, the reservation time, the stirring duration, the stirring direction and the third component opening/closing state of the Internet-of-Things device may be set, so that the execution of the target task may be finally completed.

Optionally, the first object adding information includes a number of the used first components and the type and amount of the first objects in each of the first components.

In the embodiments, the Internet-of-Things device may be provided with a plurality of first components; and each of the first components is provided with a unique number. Correspondingly, the first object adding information in the structured data may include the number of the used first component, and the type and amount of the first objects added in each first component. Thus, the Internet-of-Things device may instruct the user to add a plurality of first objects into the plurality of first components in manners of displaying characters/pictures, playing voice and/or flashing lights after reading the first object adding information.

Further, when the first objects are added, any first object required for the execution of the target task may be added to any first component, and then the Internet-of-Things device may identify the first object in the first component and temporarily redefine the number of the first component according to the identification result. In addition, if the first objects in all the first components are traversed and a certain first object is found to be absent, the Internet-of-Things device may also execute preset processing to prompt the user. Based on this, even if an error occurs when the user adds the first object, the Internet-of-Things device may adjust and prompt based on the structured data, so that the target task may be successfully executed.

It is worth mentioning that, although the amount of the first object used in each first component is defined in the first object adding information, when the user adds the first object to the first component, the addition amount of the first object may be not less than the amount of the first object, and the first object does not need to be accurately added according to a specified amount. However, during execution, the Internet-of-Things device may accurately extract a quantitative amount of the first objects from the first components. Therefore, on the one hand, the first object addition processing by the user is simplified; and on the other hand, the amount of the first object is accurately controlled by the Internet-of-Things device, thereby ensuring the execution effect of the target task.

Optionally, the structured data description information at least includes one or more of structured data identifiers, target task product information, first object information, and second object information. Therefore, the processing of outputting the structured data description information may be as follows: when an external display instruction of a target task input by the user is received, the structured data identifiers, the target task product information, first object information and second object information are displayed on a preset display screen.

In the embodiment, the structured data description information of the structured data may comprise at least one or more of the structured data identifiers, the target task product information, the first object information and the second object information. After downloading the structured data of the target task, the Internet-of-Things device, considering that there are many contents of the structured data description information, can first only store the structured data description information, and display a display key corresponding to the structured data description information without displaying specific information contents. When a user clicks the display key, or a display instruction of the structured data description information is input through the cooking app, the Internet-of-Things device may be triggered to receive an external display instruction of the target task input by the user, so that the Internet-of-Things device may display the structured data identifiers, the target task product information, the first object information and the second object information on a preset display screen.

Optionally, the structured data further comprises object trend characterization data; and the object trend characterization data comprises a plurality of object trend characterization options, and step change information corresponding to each object trend characterization option. Therefore, before the target task is executed, there may be processing as follows: parsing the object trend characterization data in the structured data, and displaying a plurality of object trend characterization options; determining step change information corresponding to the target object trend characterization option while receiving a selection instruction of the target object trend characterization option; and adjusting the step execution information based on the step change information.

In the embodiment, after downloading the structured data of the target task, the Internet-of-Things device may parse the object trend characterization data in the structured data, and display the plurality of object trend characterization options included in the object trend characterization data on the preset display screen. Then, the user may perform a touch operation on the display screen of the Internet-of-Things device so as to select the required object trend characterization option. While receiving the selection instruction of the target object trend characterization option, the Internet-of-Things device may determine the step change information corresponding to the target object trend characterization option according to the above object trend characterization data. Thereafter, the Internet-of-Things device may load the step change information to adjust the step execution information of the target task.

Optionally, the structured data further comprises associated target task information, wherein the associated target task information at least comprises one or more of kindred target task information, similar target task information, matched target task information and contradicted target task information; and the associated target task information includes a target task and/or a second object identifier, and an approval degree of the target task and/or the second object.

Therefore, after acquiring the structured data of the target task, there may be the following processing: acquiring and displaying the kindred target task information in the associated target task information in the structured data while receiving a target task upgrading/simplifying instruction; acquiring and displaying similar target task information in the associated target task information in the structured data when receiving a similar target task recommendation instruction; acquiring and displaying matched target task information in the associated target task information in the structured data while receiving a matched target task recommendation instruction; and acquiring and displaying the contradicted target task information in the associated target task information in the structured data after receiving the execution instruction of the target task.

In the embodiments, after downloading the structured data of the target task, the Internet-of-Things device may parse to acquire the associated target task information included therein. Later, the Internet-of-Things device may respectively set corresponding information query keys with respect to the kindred target task information, the similar target task information, the matched target task information and the contradicted target task information in the associated target task information; and the information query keys corresponding to the plurality of associated target task information are displayed on the display screen.

The kindred target task information may be an upgraded or simplified version of the current target task; and the form of the information query key may be a target task upgrading/simplifying key. When the user clicks the target task upgrading/simplifying key, the Internet-of-Things device may receive a target task upgrading/simplifying instruction, so that the kindred target task information may be acquired and displayed.

The similar target task information may be a target task similar to the current target task object trend characterization or similar to material usage; and the information query key may be in the form of a similar recommendation key. When the user clicks the similar recommendation key, the Internet-of-Things device may receive a similar target task recommendation instruction, so that the similar target task information may be acquired and displayed.

The matched target task information may be a matched target task of the current target task; and the form of the information query key may be a matched recommendation key. When the user clicks the similar target task recommendation key, the Internet-of-Things device may receive a matched target task recommendation instruction, so that the matched target task information may be acquired and displayed. Further, after receiving the execution instruction of the target task, the Internet-of-Things device may actively display the above matched target task information so as to assist the user to build a target plan.

The contradicted target task information may be a target task unsuitable for common use of the current target task; and the form of the information query key may be a poor matching display key. When the user clicks the poor matching display key, the Internet-of-Things device may receive a contradicted target task display instruction, so that contradicted target task information may be acquired and displayed. Further, considering that the use of contradicted target tasks should be avoided as much as possible, the user should be actively informed of the contradicted target task information as soon as possible. Therefore, the Internet-of-Things device may acquire and display the contradicted target task information after receiving the execution instruction of the target task.

Optionally, the structured data comprises anomaly processing information; and the anomaly processing information comprises a plurality of anomaly state information, and handling information corresponding to each piece of the anomaly state information. Therefore, the Internet-of-Things device performs anomaly monitoring and handling based on the anomaly processing information, and corresponding processing may be as follows: the handling information corresponding to the anomaly state information is executed when it is detected that the execution state of the target task meets the target anomaly state information.

During implementation, after downloading the structured data of the target task, the Internet-of-Things device may read the anomaly processing information included therein. The Internet-of-Things device may continuously monitor the execution state of the target task during the execution of the target task. When it is detected that the execution state of the target task meets the target anomaly state information, the Internet-of-Things device may determine the handling information corresponding to the target anomaly state information according to the above abnormal processing information, and execute the handling information.

In the embodiments of the present disclosure, an execution instruction of a target task is received, and structured data of the target task is downloaded from a server, wherein the structured data comprises step execution information and export information; the export information is parsed, and structured data description information or manual operation prompt information in the export information is output when an information output instruction is received; the step execution information is parsed, and character strings corresponding to all the execution flow data of the target task are acquired; and the target task is executed based on the hardware recognizable character group corresponding to each detailed information contained in the character string. Thus, the structured data is structured. On the one hand, all the step details in the target task execution process may be restored by the Internet-of-Things device by parsing the character string, and then the execution process of the target task may be automatically completed thereby without excessive manual participation; on the other hand, the Internet-of-Things device may intuitively and effectively display details of the target task by outputting the export information. Further, when the structured data is generated in a structured form, generation and management of the structured data may be facilitated.

Based on the same technical concept, the embodiments of the present disclosure further provide an apparatus for executing tasks based on structured data. The apparatus comprises: a structured data acquisition module, used for receiving an execution instruction of a target task and downloading structured data of the target task from a server, wherein the structured data comprises step execution information and export information; a structured data parsing module, used for parsing the export information, parsing the step execution information, and acquiring character strings corresponding to all the execution flow data of the target task; an information output module, used for outputting structured data description information or manual operation prompt information in the export information when an information output instruction is received; and a target task execution module, used for executing the target task based on a hardware recognizable character group that corresponds to each piece of detailed information comprised in the character string.

Specific procedures of an operating principle of the apparatus for executing tasks based on structured data may refer to the above method embodiments. Unnecessary details are not given herein.

In some optional embodiments, the Internet-of-Things device in the above embodiments may be implemented as a kitchen robot, such as an automatic cooker; and correspondingly, the structured data may be implemented as an electronic recipe used by a kitchen robot; the execution flow data may be a cooking step; the target task may be a to-be-cooked dish; the first object may be a seasoning; the first component may be a seasoning box; the second component may be implemented as a pot body; and the third component may be a pot cover. Based on this, the embodiments of the present disclosure provide a structured recipe. One structured recipe corresponding to one dish, and may be applied to an automatic cooker. Thus, the automatic cooker may perform the cooking of different dishes based on the structured recipe of different dishes. The structured recipe may be generated by a manufacturer of the automatic cooker after improving a common recipe according to a user-defined protocol, and is stored in a server provided by the manufacturer. The structured recipe may also be manually edited by a user of the automatic cooker on a terminal and uploaded to the server provided by the manufacturer. The terminal herein may be an automatic cooker, or may be a mobile communication device installed with an app corresponding to the automatic cooker, such as a mobile phone and a tablet computer. The acquisition authority of the structured data generated by the manufacturer may be set to be public, i.e., all users may consult or acquire the structured data for free. Further, the corresponding acquisition authority of the structured data that is manually edited by the user may be set by the user, e.g., the structured data may be set as public structured data, private structured data or to-be-paid structured data.

Figure 5A:
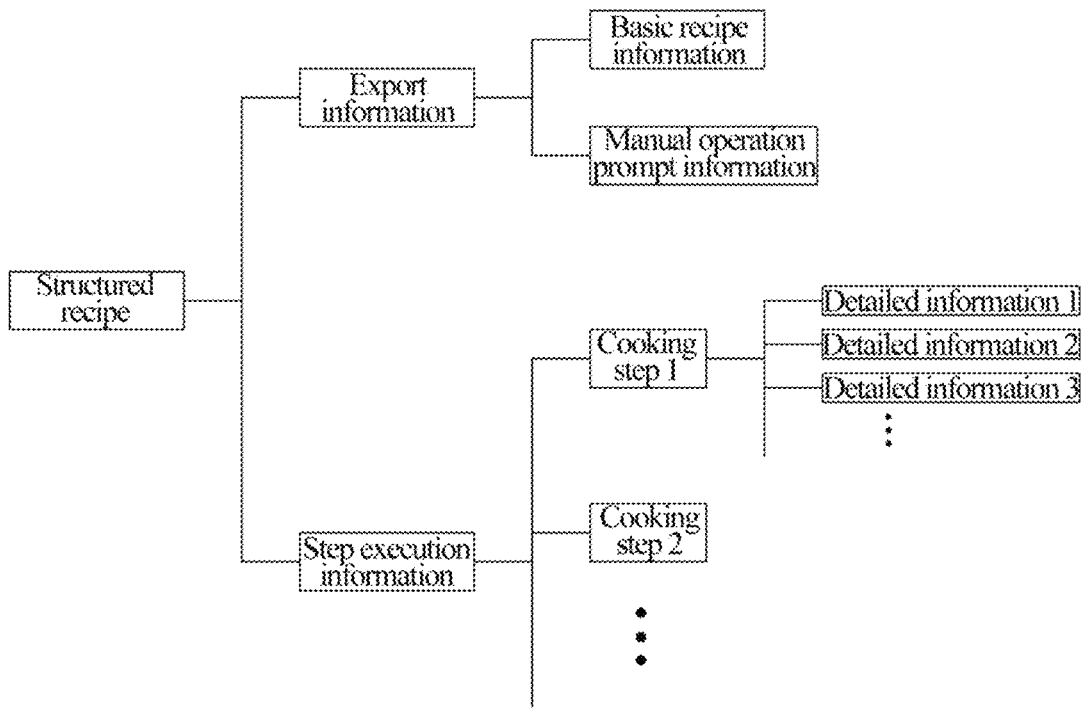
FIG. 5a is a schematic diagram of a structured recipe provided by embodiments of the present disclosure.

As shown in FIG. 5a, the structured recipe may comprise step execution information and export information:

The step execution information may be used for recording all the cooking steps of the dish, namely, all the cooking steps required from the start of the automatic cooker to completion of dishing up. The basis for dividing the cooking steps may be the execution of a new instruction and/or the end of the duration. The specific cooking steps may include: heating the pot and the oil; pouring vegetables; stir-frying; stewing and adding auxiliary materials.

Each cooking step in the structured recipe may correspond to a frame of character strings; and the character strings may be composed of a plurality of types of characters, such as numbers, letters and symbols based on a user-defined protocol. Specifically, each frame of character strings may include a plurality of machine recognizable character groups; and each machine recognizable character group corresponds to a piece of detail information in the current cooking step. The detailed information may be one or more of a machine running state (such as, standby, pause, reservation, cooking or ending), a cooking mode (stir-frying, high pressure, steaming or heating), a heating temperature, cooking time, auxiliary material adding information (such as, 5 ml of added oil, 5 g of added water or 5 g of added green onion), a prompt requirement (prompting the user to pour raw materials and dish up), reservation time, stirring duration, a stirring direction (stirring clockwise, stirring anticlockwise or a combination of the two directions) and a pot cover opening/closing state (including an uncovering state and a closing state), or may also be detailed contents during other target task execution processes. It is worth mentioning that, the auxiliary material adding information may specifically be a number of used material boxes and the type and amount of auxiliary materials placed in each material box. For example: "material box1-oil-5 ml", "material box2-salt-5 g", and "material box 3-water-10 ml". Thus, all the auxiliary materials required for cooking the dish may be clearly and intuitively displayed by respectively setting the auxiliary materials for each of the material boxes. Moreover, the structured recipe is conveniently parsed and executed by the automatic cooker.

Further, in the character string corresponding to each cooking step, the detailed information corresponding to the machine recognizable character group at the same position is the same. Specifically, the corresponding detailed information at each position in the character string may be defined by a user-defined protocol. For example, after standard format contents such as a frame header and a frame tail are removed, n (n is a positive integer) characters are taken as a group in the remaining data, and the character group from left to right respectively corresponds to a machine running state, the cooking mode, the heating temperature, cooking time, the addition amount of the material box 1, the addition amount of the material box 2, the addition amount of the material box m (m is a positive integer), the prompt requirement and the reservation time. Herein, by taking the character string " . . . 040102050000000000000000 . . . " without the frame header and the frame tail as an example, 04 represents that the machine running state is stir-frying; 01 represents that the cooking mode is heating; 02 represents that the heating temperature is 110° C.; 05 represents that the heating time is 5 s; and the remaining 00 represents that there is no data or no operation.

The export information may at least comprise basic recipe information and manual operation prompt information corresponding to the recipe. The basic recipe information is used for describing basic information of the recipe. A user may quickly obtain a basic understanding of the recipe via the basic recipe information. The basic recipe information may at least comprise one or more of a recipe identifier, recipe product information and raw and auxiliary material information. The recipe identifier may be used for uniquely identifying the recipe, and in particular may be a serial number, a QR code and an index value of the recipe. The recipe product information can help the user understand the dish comprehensively, and at least may include contents as follows:

Name: the recipe product information may be the most common name of the dish, and may have another name of the dish. For example, the name of the dish is "minced pork with vermicelli", and the another name includes "vermicelli with spicy minced pork", "fried minced pork with vermicelli", and "home-made minced pork with vermicelli".

Picture: may be a picture of the completely cooked dish.

Taste: for example, it may be sour, sweet, spicy and pungent; and if one dish has various tastes, corresponding proportion coefficients of the various tastes may be respectively identified according to the proportion degree of the tastes. For "sweet and sour fillet", the taste may be identified as follows: "sour: 40%; sweet: 60%; spicy: 0".

Mouthfeel: the mouthfeel may be tender, crispy, loose, soft, glutinous, chewy and crispy.

Cuisine: the country or region to which the dish belongs may be indicated, such as Shandong cuisine, Sichuan cuisine, Italian cuisine and French cuisine.

Cooking time consumption: basic time consumption required for cooking the dish may be indicated, so that the user may reasonably select the recipe according to available time.

Further, the basic information of the recipe may further include historical information of the dish, and is configured with a voice file corresponding to the historical information. Thus, when the dish is cooked by the automatic cooker, the voice file of the historical information of the dish may be played via voice. Therefore, the user can learn corresponding historical knowledge while waiting for completion of the cooking of the dish.

The raw and auxiliary material information in the basic recipe information may be names and pictures of all the raw materials and auxiliary materials required for cooking the dish, wherein the names may include major names and another names of the raw materials or auxiliary materials, and the pictures may be pictures of the raw materials or the auxiliary materials in different forms, so as to enable the user to quickly and accurately determine the raw materials and the auxiliary materials. For example, by taking "tomato" as an example, the names may include "tomato", "*Solanum lycopersicum*" and "foreign persimmon"; and the pictures may include complete tomatoes, sliced tomatoes and chopped tomatoes.

Optionally, the structured recipe may include taste preference information; the taste preference information may exist in the form of taste options; and each of the taste options may correspond to one or more pieces of step change information. It can be understood that, the recipe includes the taste preference information to enable the user to select the own favorite taste. If the user selects a certain taste option, the step execution information in the structured recipe will change according to the corresponding step change information. If the user does not select any taste option, the step execution information in the structured recipe will remain in a default state.

Optionally, since different categories of people are suitable for different edible dishes, different user suitability degrees may be given for the different categories of people in the structured recipe of the dish. For example, "stir-fried pork" has the suitability of 10% for pregnant women and children, the suitability of 20% for the elderly and the suitability of 0% for hypertension groups. Therefore, the structured recipe further comprises population suitability information, wherein the population suitability information comprises a plurality of user category identifiers, and suitability corresponding to each of the user category identifiers. It may be seen that, the suitability corresponding to all the user categories is difficultly given in the structured recipe with respect to diverse population category classification. Therefore, only a user category with the suitability lower than a certain threshold value may be given to achieve a warning effect on unsuitable populations.

Optionally, considering that health preservation has become an important concept pursued currently, people will pay attention to nutritional value of the dish while paying attention to color, aroma and taste of the dish. Therefore, the structured recipe may further comprise nutritional composition information; and identifiers and content of a plurality of nutritional ingredients comprised in the dish may be sequentially recorded in the nutritional composition information according to a content proportion from high to low. Thus, the user may intuitively and quickly know the nutritional ingredients comprised in the dish through the nutritional composition information of the dish, so as to design the own diet plan.

Optionally, after selecting one dish, the user may make reminders and recommendations associated with the dish based on the dish. Based on this, the structured recipe may further comprise associated dish information; and the associated dish information at least may comprise one or more of kindred dish information, similar dish information, matched dish information, and contradicted dish information. The kindred dish information may be an upgraded version or a simplified version of the current dish; by taking "spicy diced chicken with peanuts" as an example, the upgraded version may be "spicy diced chicken with peanuts and prawn balls", and the simplified version may be "stir-fried chicken cubes with cucumber"; and by virtue of the setting of the kindred dish information, the user may freely select the dish of the upgraded version or the simplified version according to actual situations after acquiring the above structured recipe. The similar dish information may be a dish similar to taste of the current dish or similar material consumption; by taking "spicy diced chicken with peanuts" as an example, the similar dish may be "spicy diced chicken with peanuts" and "diced chicken with green pepper"; and by virtue of the setting of the similar dish information, the diet plan of the user may be enriched, and the user may be avoided from repeatedly eating the same dish. The matched dish information may be a matched dish of the current dish; for example, if the taste of the current dish is sour and spicy, the matched dish may be a dish with rich soup; for another example, if the current dish is sour and spicy, the matched dish may be a dish having light mouthfeel; and by virtue of the setting of the matched dish information, the user does not need to consume extra efforts for matching the dishes. The contradicted dish information may be a dish that is unsuitable to be eaten with the current dish together; if the current dish is "steamed crab", the contradicted dish may be "dried persimmon"; and by virtue of the setting of the contradicted dish information, wrong diet matching of the user may be avoided.

Further, according to the kindred dish information, the similar dish information, the matched dish information and the contradicted dish information in the above associated dish information, a display manner of the information may be specifically a dish and/or a raw material identifier, i.e., the name and/or picture of the dish and/or the raw material. Meanwhile, each piece of the associated dish information may further comprise a user approval degree of the corresponding dish, so as to screen and judge the associated dish information by the user. When the user approves the above associated dish information, a commendation operation may be executed on the corresponding dish, so that the user approval degree of the corresponding dish may be improved.

Further, if the automatic cooker enters an anomaly state due to an accident while cooking the dish, a great impact will be caused to the user. Therefore, in view of this situation, the structured recipe may comprise anomaly processing information; and the anomaly processing information may comprise a plurality of types of anomaly state information, and handling information corresponding to each type of anomaly state information. It should be noted that, the above anomaly state information may be a determined abnormal state of the automatic cooker caused by fault events after all the possible fault events are summarized by analyzing the cooking steps of the dish by the automatic cooker manufacturer; and the handling information is the most reasonable and effective measure that can be taken by the automatic cooker with respect to the corresponding anomaly state information.

It is worth mentioning that, the step execution information and the export information may be respectively stored in different data files; and the export information can correspond to various data files, such as picture files, video files and voice prompt files. While acquiring the structured recipe, the automatic cooker may selectively download one or more of the data files of the step execution information and the information files of the export information according to requirements.

The structured recipe shown in the embodiments of the present disclosure is composed of two major parts such as the step execution information and the export information. The cooking steps of the dish are recorded by the character strings composed of the machine recognizable character group in the step execution information; and the export information comprises the basic recipe information and manual operation prompt information corresponding to the dish. Thus, the recipe is structured. On the one hand, all the step details in the dish cooking process may be restored by parsing the character string, and then the cooking process of the dish may be automatically completed thereby without excessive manual participation; on the other hand, an automatic cooker may intuitively and effectively display details of the dish by outputting the export information. Further, when the recipe is generated in a structured form, generation and management of the recipe may be facilitated.

Figure 5B:
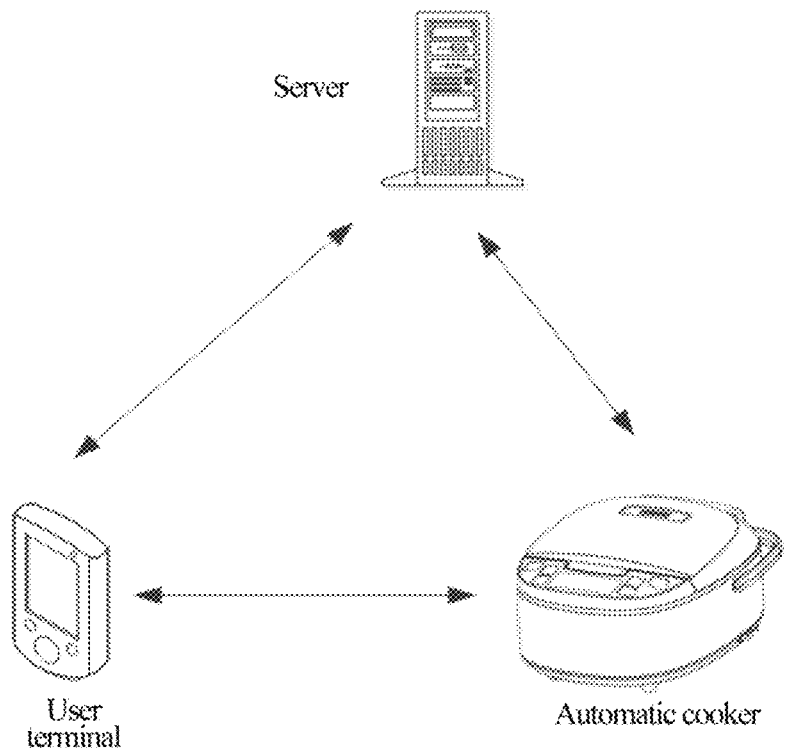
FIG. 5b is a schematic diagram of a cooking scenario based on a structured recipe provided by embodiments of the present disclosure.

The present embodiment further provides a method for cooking dishes based on a structured recipe. An execution subject of the method may be an automatic cooker; and the method may be completed through assistance of a server corresponding to a user terminal and the automatic cooker. The specific application scenario may be as shown in FIG. 5b. The automatic cooker may be used for cooking a corresponding dish according to the acquired structured recipe in response to a dish cooking instruction of the user. A cooking app corresponding to the automatic cooker may be installed on the user terminal; and the user may transmit the dish cooking instruction to the automatic cooker via the cooking app, so that the automatic cooker may be triggered to start cooking the corresponding dish. The server may be used for storing the structured recipe and may provide the stored structured recipe for the automatic cooker. Further, the structured recipe may include the step execution information and the export information; and the server may respectively store the step execution information and the export information as different files while storing the structured recipe.

Figure 5C:
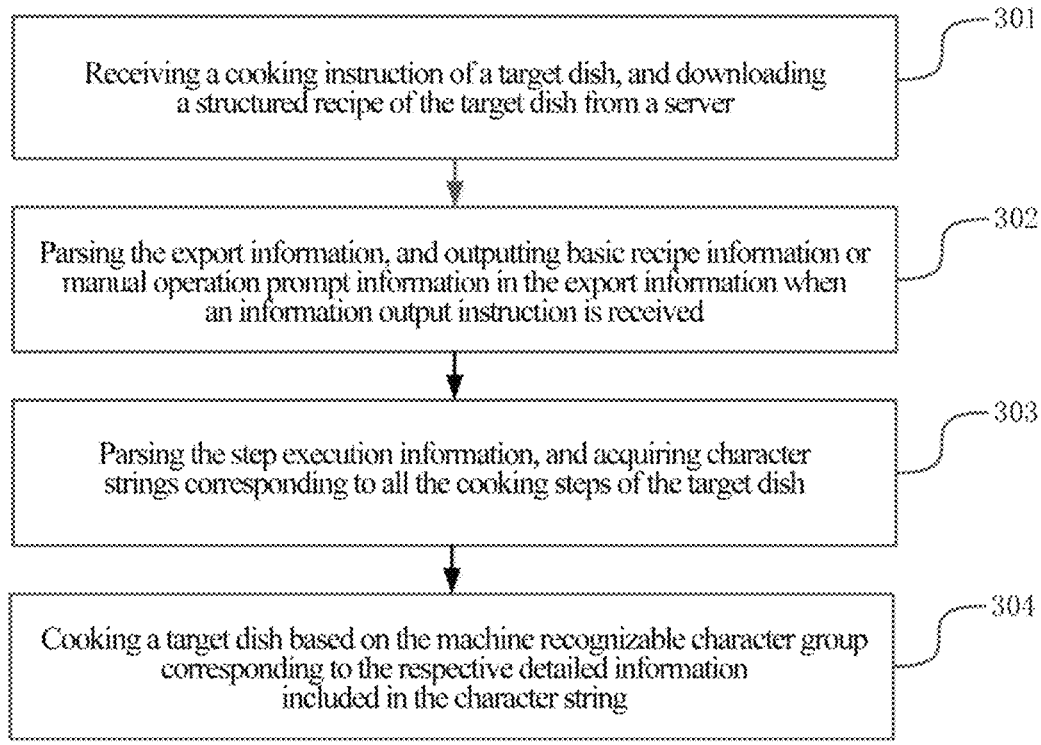
FIG. 5c is a flow diagram of a cooking method based on a structured recipe provided by embodiments of the present disclosure.

The processing flow shown in FIG. 5c will be described below in detail in combination with specific implementation modes:

Step 301, a cooking instruction of a target dish is received, and a structured recipe of the target dish is downloaded from a server.

The structured recipe comprises step execution information and export information.

During implementation, a user may select a target dish on a cooking app on a user terminal, and click a corresponding cooking key, so that the automatic cooker may be triggered to receive a cooking instruction of the target dish. Alternatively, a user may directly perform a touch operation on the automatic cooker to select a target dish and click a corresponding cooking key, and may also trigger the automatic cooker to receive the cooking instruction of the target dish. Later, the automatic cooker may establish communication connection with the server and download a structured recipe of the target dish from the server.

Step 302, the export information is parsed; and basic recipe information or manual operation prompt information in the export information is output when an information output instruction is received.

During implementation, after downloading the structured recipe of the target dish from the server, the automatic cooker may parse the export information so as to obtain basic recipe information or manual operation prompt information in the export information. Later, the automatic cooker may monitor the reception of the information output instruction. While receiving the information output instruction, the automatic cooker may first determine basic recipe information or manual operation prompt information corresponding to the information output instruction, and then output corresponding information.

Step 303, the step execution information is parsed; and character strings corresponding to all the cooking steps of the target dish are acquired.

Step 304, a target dish is cooked based on the machine recognizable character group corresponding to the respective detailed information included in the character string.

During implementation, after the automatic cooker acquires character strings corresponding to all the cooking steps of the target dish, the character strings may be parsed in sequence according to the sequence of the cooking steps so as to acquire the machine-identifiable character group that corresponds to various detailed information included in the character strings, so that the target dish may be cooked based on the character groups.

Optionally, both an application operating system for parsing the export information and an embedded host program for parsing the step execution information may be simultaneously built in the automatic cooker. Therefore, after acquiring the structured recipe, the automatic cooker may respectively parse the corresponding information by utilizing the application operating system and the embedded host program. On the one hand, the information output instruction in the step 302 may be triggered by a manual operation; and on the other hand, the information output instruction may be generated during cooking of the dish after the step execution information is parsed by the embedded host program.

Optionally, in the character string corresponding to each cooking step of the structured recipe, the detailed information corresponding to the machine recognizable character group at the same position is the same. Therefore, specific processing of the step 304 may be as follows: sequentially reading character strings corresponding to each cooking step according to the sequence of the cooking step; extracting all machine recognizable character groups in the character strings with respect to the character string corresponding to target cooking step; and completing the target cooking step according to the detailed information corresponding to all the machine recognizable character groups.

In the embodiments, after the automatic cooker parses the structured recipe to obtain the character string corresponding to each cooking step of the target dish, the character string corresponding to each cooking step may be loaded in sequence according to the sequence of the cooking steps. When the character string corresponding to the target cooking step is completely loaded, all the machine recognizable character groups may be extracted from the character string according to an offset position of the character in the character string according to a user-defined protocol. Each machine recognizable character group may correspond to a piece of detailed information in the target cooking step. Thus, the automatic cooker may complete the target cooking step by loading and executing all the above machine recognizable character groups.

Optionally, the detailed information in the cooking step at least comprises one or more of a machine running state, a cooking mode, a heating temperature, cooking time, auxiliary material adding information, a prompt requirement, reservation time, stirring duration, a stirring direction and a pot cover opening/closing state.

In the embodiment, the automatic cooker may execute detailed processing of each cooking step according to the detailed information of each cooking step recorded in the structured recipe. For example, the machine running state (such as, standby, pause, reservation, cooking or ending), the cooking mode (stir-frying, high pressure, steaming or heating), the heating temperature, the cooking time, the auxiliary material adding information (such as, 5 ml of added oil, 5 g of added water or 5 g of added green onion), the prompt requirement (prompting the user to pour raw materials and dish up), the reservation time, the stirring duration, the stirring direction (stirring clockwise, stirring anticlockwise or a combination of the two directions) and the pot cover opening/closing state (including an uncovering state and a closing state) of the automatic cooker may be set, so that the cooking of the dish may be finally completed.

Optionally, the auxiliary material adding information includes a number of used material boxes and the type and amount of auxiliary materials placed in each material box.

During implementation, the automatic cooker may be provided with a plurality of material boxes; and each material box is provided with a unique number. Correspondingly, the auxiliary material adding information in the structured recipe may comprise the number of the used material boxes, and the type and amount of the auxiliary materials added in each material box. Thus, after reading the auxiliary material adding information, the automatic cooker may instruct the user to add a plurality of auxiliary materials in a plurality of material boxes by displaying characters/pictures, playing voice and/or flashing lights.

Further, when the auxiliary materials are added, any auxiliary material required for cooking the dish may be added to any material box; and then the automatic cooker may identify the auxiliary materials in the material box and temporarily redefine the number of the material box according to the identification result. For example, the auxiliary material adding information in the structured recipe may be: "material box 1-oil-5 ml", "material box 2-salt-5 g", and "material box 3-water-10 ml", while the user adds the oil in the material box 4 while adding the auxiliary materials, adds the water in the material box1 and adds the salt in the material box 2. The automatic cooker can temporarily define the raw material box 4 as a new material box 1 and defines the raw material box 1 as a new material box 3 after identifying the auxiliary materials in each material box. In addition, if the auxiliary materials in all the material boxes are traversed and a certain auxiliary material is found to be absent, the automatic cooker may also execute preset processing to prompt the user. Based on this, even if an error occurs when the user adds the auxiliary materials, the automatic cooker may adjust and prompt based on the structured data, so that the dish may be successfully executed.

It is worth mentioning that, although the amount of the auxiliary materials used in each material box is defined in the auxiliary material adding information, when the user adds the auxiliary materials to the material boxes, the addition amount of the auxiliary materials may be not less than the amount of the auxiliary materials, and the auxiliary materials do not need to be accurately added according to a specified amount. However, during cooking, the automatic cooker may accurately extract a quantitative amount of the auxiliary materials from the material boxes. Therefore, on the one hand, the auxiliary material addition processing by the user is simplified; and on the other hand, the amount of the auxiliary materials is accurately controlled by the automatic cooker, thereby ensuring the cooking effect of the dish.

Optionally, the basic recipe information at least includes one or more of recipe identifiers, dish product information and raw and auxiliary material information. Therefore, the processing of outputting the basic recipe information in the step 302 may be as follows: when a recipe display instruction of a target dish input by the user is received, the recipe identifiers, the dish product information and/or the raw and auxiliary material information are displayed on a preset display screen.

During implementation, the basic recipe information of the structured recipe may at least include one or more of the recipe identifiers, the dish product information and the raw and auxiliary material information. After downloading the structured recipe of the target dish, the automatic cooker, considering that there are many contents of the basic recipe information, can first only store the basic recipe information, and display a display key corresponding to the basic recipe information without displaying specific information contents. When a user clicks the display key, or a display instruction of the basic recipe information is input through the cooking app, the automatic cooker may be triggered to receive a recipe display instruction of the target dish input by the user, so that the automatic cooker may display the recipe identifiers, the dish product information and/or the raw and auxiliary material information on a preset display screen.

Optionally, the structured recipe further comprises taste preference information; and the taste preference information comprises a plurality of taste options, and step change information corresponding to each taste option. Therefore, before the target dish is cooked, there may be processing as follows: parsing the taste preference information in the structured recipe, and displaying a plurality of taste options; determining step change information corresponding to the target taste options while receiving a selection instruction of the target taste options; and adjusting the step execution information based on the step change information.

During implementation, after downloading the structured recipe of the target dish, the automatic cooker may parse the taste preference information in the structured recipe, and display the plurality of taste options included in the taste preference information on the preset display screen. Then, the user may perform a touch operation on the display screen of the automatic cooker so as to select the required taste preference. While receiving the selection instruction of the target taste option, the automatic cooker may determine the step change information corresponding to the target taste option according to the above taste preference information. Thereafter, the automatic cooker may load the step change information to adjust the step execution information of the target dish. For example, when the target taste option selected by the user is "salty" and the corresponding step change information may be "increasing a salt amount by 10%", the salt amount in each cooking step of the target dish may be adjusted.

Optionally, the structured recipe further comprises population suitability information, wherein the population suitability information comprises a plurality of user category identifiers, and suitability corresponding to each of the user category identifiers. Thus, before cooking the target dish, there may be processing as follows: acquiring locally stored user information, and determining a target user category identifier corresponding to the user information; and displaying the target user category identifier and the suitability corresponding to the target user category identifier.

During implementation, after downloading the structured recipe and parsing to obtain the population suitability information of the target dish, the automatic cooker may firstly acquire the locally stored user information, and then judge a target user category to which the user information belongs, namely, determining the target user category identifier corresponding to the user information. Then, the automatic cooker may display the target user category identifier and the suitability corresponding to the target user category identifier. Further, it may be set that, only when the suitability is less than a preset threshold value, the automatic cooker actively displays a corresponding user category identifier and the suitability; and if the suitability is greater than the preset threshold value, no display is needed.

Optionally, the structured recipe may further comprise nutritional composition information; and identifiers and content of a plurality of nutritional ingredients comprised in the dish may be sequentially recorded in the nutritional composition information according to a content proportion from high to low. Therefore, after acquiring the structured recipe of the target dish, there may be the following processing: parsing nutritional composition information in the structured recipe when a nutrition analysis instruction for the target dish is received; and displaying the identifiers and content of the plurality of nutritional ingredients comprised in the target dish according to a content proportion from high to low.

During implementation, the structured recipe may further include nutritional composition information; and a plurality of major nutritional ingredients included in the target dish may be recorded in the nutritional composition information. After downloading the structured recipe of the target task, the automatic cooker, considering that there are many contents of the nutritional composition information, can first only store the nutritional composition information, and display a nutrition analysis key without displaying specific information contents. When a user clicks the nutrition analysis key, or a nutrition analysis instruction is input through the cooking app, the automatic cooker may be triggered to receive a nutrition analysis instruction of the target dish input by the user, so that the automatic cooker may parse the nutritional composition information in the structured recipe. Then, the automatic cooker may display the identifiers and content of the plurality of nutritional ingredients comprised in the target dish according to a content proportion from high to low.

Optionally, the structured recipe further comprises associated dish information; the associated dish information at least comprises one or more of kindred dish information, similar dish information, matched dish information, and contradicted dish information; and the associated dish information comprises dish and/or raw material identifiers and approval degrees of the dishes and/or raw materials.

Therefore, after acquiring the structured recipe of the target dish, there may be the following processing: acquiring and displaying the kindred dish information in the associated dish information in the structured recipe while receiving a dish upgrading/simplifying instruction; acquiring and displaying the similar dish information in the associated dish information in the structured recipe while receiving a similar dish recommendation instruction; acquiring and displaying matched dish information in the associated dish information in the structured recipe while receiving a matched dish recommendation instruction; and acquiring and displaying contradicted dish information in the associated dish information in the structured recipe after receiving a cooking instruction of the target dish, During implementation, the automatic cooker may parse to obtain the associated dish information included therein after downloading the structured recipe of the target dish. Later, the automatic cooker may respectively set corresponding information query keys with respect to the kindred dish information, the similar dish information, the matched dish information and the contradicted dish information in the associated dish information, and display the information query keys corresponding to the plurality of associated dish information on the display screen.

The kindred dish information may be an upgraded version or a simplified version of the current dish; and the form of the information query key may be a dish upgrading/simplifying key. When the user clicks the dish upgrading/simplifying key, the automatic cooker may receive a dish upgrading/simplifying instruction, so that the same family of dish information may be acquired and displayed.

The similar dish information may be a dish similar to taste of the current dish or similar material consumption; and the information query key may be in the form of a similar recommendation key. When the user clicks the similar recommendation key, the automatic cooker may receive a similar dish recommendation instruction, so that similar dish information may be acquired and displayed.

The matched dish information may be a matched dish of the current dish; and the form of the information query key may be a matched recommendation key. When the user clicks the similar dish recommendation key, the automatic cooker may receive a matched dish recommendation instruction, so that the matched dish information may be acquired and displayed. Further, the automatic cooker may actively display the above matched dish information after receiving the cooking instruction of the target dish, so as to assist the user to build a diet plan.

The contradicted dish information may be a dish that is unsuitable to be eaten with the current dish together; and the form of the information query key may be a poor matching display key. When the user clicks the poor matching display key, the automatic cooker may receive a contradicted dish display instruction, so that contradicted dish information may be acquired and displayed. Further, considering that the contradicted dish should be avoided from being eaten as much as possible, the user should be actively informed of the contradicted dish information as soon as possible. Therefore, the automatic cooker may acquire and display the contradicted dish information after receiving the cooking instruction of the target dish.

Optionally, the structured recipe comprises anomaly processing information; and the anomaly processing information comprises a plurality of anomaly state information, and handling information corresponding to each piece of the anomaly state information. Therefore, the automatic cooker performs anomaly monitoring and handling based on the anomaly processing information, and corresponding processing may be as follows: the handling information corresponding to the target anomaly state information is executed when it is detected that the cooking state of the target dish meets the target anomaly state information.

During implementation, after downloading the structured recipe of the target dish, the automatic cooker may read the anomaly processing information included therein. The automatic cooker may continuously monitor the cooking state of the target dish during the cooking of the target dish. When it is detected that the cooking state of the target dish meets the target anomaly state information, the automatic cooker may determine the handling information corresponding to the target anomaly state information according to the above abnormal processing information, and execute the handling information.

In the embodiments of the present disclosure, an execution instruction of a target dish is received, and a structured recipe of the target dish is downloaded from a server, wherein the structured recipe comprises step execution information and export information; the export information is parsed, and basic recipe information or manual operation prompt information in the export information is output when an information output instruction is received; the step execution information is parsed, and character strings corresponding to all the cooking steps of the target dish are acquired; and the target dish is cooked based on the machine recognizable character group corresponding to each detailed information contained in the character string. Thus, the recipe is structured. On the one hand, all the step details in the dish cooking process may be restored by the automatic cooker by parsing the character string, and then the cooking process of the dish may be automatically completed thereby without excessive manual participation; on the other hand, the automatic cooker may intuitively and effectively display details of the dish by outputting the export information. Further, when the recipe is generated in a structured form, generation and management of the recipe may be facilitated.

The above embodiment will be further described below by taking the cooking of "scrambled eggs with tomatoes" as an example:

1. after purchasing an automatic cooker, a user may install an app corresponding to the automatic cooker on a mobile phone, and enter an identification code of the automatic cooker on the app to establish a binding relationship with the automatic cooker;
2. when the user wants to cook "scrambled eggs with tomatoes", the user may search for the name of dish in the app, so that a server may feedback names and pictures of various dishes to the app for display according to matching degrees of the names;
3. the user may click to select "Scrambled Eggs with Tomatoes" on an app interface, so that the app may send a cooking instruction of "Scrambled Eggs with Tomatoes" to the automatic cooker;
4. after receiving the cooking instruction, the automatic cooker may acquire step execution information and external execution information in a corresponding structured recipe from the server;
5. an application operating system in the automatic cooker analyzes basic recipe information in the structured recipe, and determines raw materials and auxiliary materials required for the cooking: three eggs, two tomatoes, rapeseed oil, salt, white sugar and light soy sauce;
6. the application operating system in the automatic cooker analyzes manual operation prompt information, and prompts the user to prepare the above raw materials and auxiliary materials one by one in a manner of voice playing or screen displaying.

Here, a plurality of raw material bins and a plurality of material boxes may be arranged on the automatic cooker; each raw material bin may process and store a raw material; and each material box may store an auxiliary material. When the raw materials and the auxiliary materials are prepared, the automatic cooker may first open a first raw material bin and prompt to add three eggs, open a second raw material bin after the eggs are added and prompt to add two tomatoes, and after the tomatoes are added, open a first material box and prompt to pour enough rapeseed oil, open a second material box and prompt pour enough light soy sauce, open a third material box and prompt to add enough salt, and open a fourth material box and prompt to add enough white sugar.

It is worth mentioning that adding auxiliary materials into the material boxes will inevitably lead to excess auxiliary materials in the material boxes. Therefore, the automatic cooker may detect the remaining amount of auxiliary material in each material box when prompting the user to prepare the auxiliary materials. If it is found that an auxiliary material in a material box is sufficient, the step of adding the auxiliary material may be skipped.

7. After detecting that all raw materials and auxiliary materials are added, the automatic cooker may analyze the step execution information in the structured recipe and cook according to cooking steps recorded therein:

(1) preparing egg wash;
(2) heating oil;
(3) scrambling the eggs;
(4) putting the eggs into a plate;
(5) heating oil;
(6) stir-frying the tomatoes;
(7) pouring the eggs;
(8) adding 20 ml of clear water, 10 g of white sugar, 5 ml of light soy sauce and 20 g of salt;
(9) dishing up; and
(10) washing the cooker.

The automatic cooker may independently accomplish all the above steps, and may perform voice broadcast at the beginning and end of each step to inform the user of a cooking progress of the dish. Meanwhile, the automatic cooker may broadcast a cooking situation of the dish in the machine on a screen in real time. Further, if there are steps that the automatic cooker is unable to accomplish independently, the automatic cooker may prompt the user to perform related operations in a manner of voice prompt, for example, may prompt the user to perform the dish-up operation.

8. In case of a fault during cooking, the automatic cooker may handle the fault based on a preset fault response mechanism. For example, the automatic cooker may perform self-test first and try to repair the fault independently; and in case of failure, the automatic cooker may notify the user in a manner of playing ringtone, flashing lights, etc., and prompt the user to perform related operations in a manner of playing voice or displaying information.

Based on the processing of the above steps 301-304, in another embodiment, the automatic cooker may only acquire the step execution information in the structured recipe, which is mainly used to execute cooking steps of a target dish. The rest of the information in the structured recipe may be acquired from the server by a user terminal and displayed on the user terminal. In this way, the information in the structured recipe may be browsed through the user terminal; and the target dish may be cooked by interaction between the user terminal and the automatic cooker.

Figure 5D:
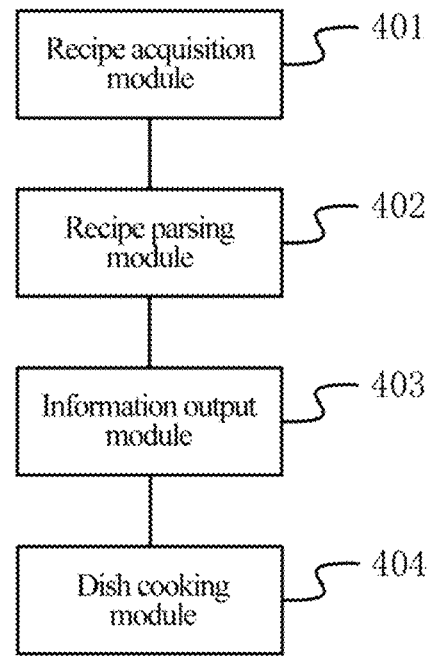
FIG. 5d is a structural schematic diagram of a cooking device based on a structured recipe provided by embodiments of the present disclosure.

Based on the same technical concept, embodiments of the present disclosure further provide a cooking apparatus based on a structured recipe, as shown in FIG. 5d, the apparatus comprises:

a recipe acquisition module 401, used for receiving a cooking instruction of a target dish and downloading a structured recipe of the target dish from a server, where the structured recipe comprises step execution information and export information;

a recipe analysis module 402, used for analyzing the export information, analyze the step execution information, and acquiring character strings corresponding to all cooking steps of the target dish;

an information output module 403, used for outputting basic recipe information or manual operation prompt information in the export information when receiving an information output instruction; and a dish cooking module 404, used for cooking the target dish based on a machine-recognizable character set corresponding to each piece of detailed information included in the character strings.

Optionally, the recipe analysis module 402 is specifically used for analyzing the export information through a built-in application operating system, and analyzing the step execution information through a built-in embedded host program.

The information output instruction is triggered by manual operation or generated when the embedded host program executes the cooking steps.

Optionally, the dish cooking module 404 is specifically used for:

sequentially reading the character string corresponding to each cooking step according to the sequence of the cooking steps;

extracting all machine-recognizable character sets in the character string corresponding to a target cooking step; and finishing the target cooking steps according to the detailed information corresponding to all the machine-recognizable character sets.

Optionally, the detailed information in the cooking steps at least comprises one or more of machine running state, cooking mode, heating temperature, cooking time, auxiliary material adding information, prompt demand, reservation time, stirring duration, stirring direction and open/close state of a pot cover.

Optionally, the auxiliary material adding information comprises the number of material boxes and the type and amount of auxiliary material in each material box.

Optionally, the basic recipe information at least comprises one or more of recipe identifier, information of finished dish, and information of raw materials and auxiliary materials.

The information output module 403 is specifically used for:

when a recipe display instruction of the target dish inputted by the user is received, the recipe identifier, the information of finished dish, and/or the information of raw materials and auxiliary materials are displayed on the preset display screen.

Optionally, the structured recipe further comprises taste tendency information, which comprises a plurality of taste options and step change information corresponding to each taste option; and the apparatus further comprises a taste adjustment module, used for:

analyzing the taste tendency information in the structured recipe, and displaying the various taste options;

determining step change information corresponding to the target taste option when receiving a selection instruction of a target taste option; and adjusting the step execution information based on the step change information.

Optionally, the structured recipe further comprises crowd suitability information, which comprises a plurality of user category identifiers and suitability corresponding to each user category identifier; and the information output module 403 is further used for:

acquiring locally stored user information, and determining a target user category identifier corresponding to the user information; and displaying the target user category identifier and the suitability corresponding to the target user category identifier.

Optionally, the structured recipe further comprises nutritional composition information, where identifiers and contents of various nutritional ingredients included in each dish are sequentially recorded according to content ratios in descending order;

the information output module 403 is further used for:

analyzing the nutritional composition information in the structured recipe when receiving a nutritional analysis instruction for the target dish; and displaying identifiers and contents of various nutritional ingredients included in the target dish according to content ratios in descending order.

Optionally, the structured recipe further comprises information of associated dishes, where the information of associated dishes at least comprises one or more of information of same-family dishes, information of similar dishes, information of matching dishes and information of conflicting dishes; the information of associated dishes comprises identifiers of dishes and/or raw materials and approval degrees of dishes and/or raw materials;

the information output module 403 is further used for:

acquiring and displaying the information of same-family dishes in the information of associated dishes in the structured recipe when receiving a dish upgrading/simplifying instruction;

acquiring and displaying the information of similar dishes in the information of associated dishes in the structured recipe when receiving a similar dish recommendation instruction;

acquiring and displaying the information of matching dishes in the information of associated dishes in the structured recipe when receiving a matching dish recommendation instruction; and acquiring and displaying the information of conflicting dishes in the information of associated dishes in the structured recipe after receiving a cooking instruction of a target dish.

Optionally, the structured recipe comprises exception handling information, which comprises various kinds of exception state information, and response handling information corresponding to each kind of exception state information; and the apparatus further comprises an exception repairing module, used for:

when detecting that a cooking state of the target dish meets a target exception state information, executing the response handling information corresponding to the target exception state information.

Figure 5E:
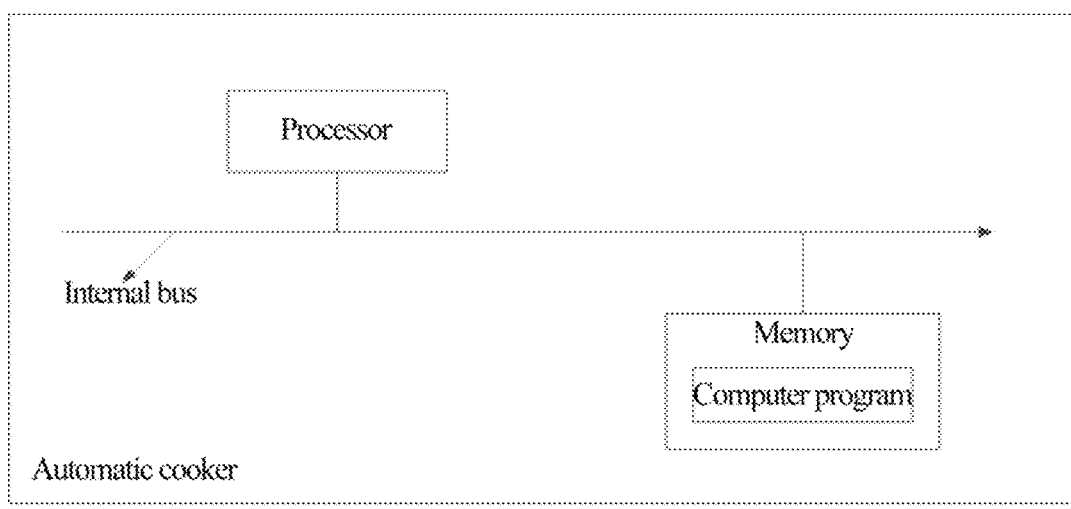
FIG. 5e is a structural schematic diagram of another automatic cooker provided by embodiments of the present disclosure.

Referring to FIG. 5e, the present disclosure further provides an automatic cooker, comprising a memory and a processor, where the memory is used for storing a computer program; and when being executed by the processor, the computer program is used for realizing the following functions:

receiving a cooking instruction of a target dish and downloading a structured recipe of the target dish from a server, where the structured recipe comprises step execution information and export information;

analyzing the export information, and outputting basic recipe information or manual operation prompt information in the export information when receiving an information output instruction;

analyzing the step execution information, and acquiring character strings corresponding to all cooking steps of the target dish; and cooking the target dish based on a machine-recognizable character set corresponding to each piece of detailed information included in the character strings.

There is a problem that a speed of broadcasting structured data in a current Internet-of-Things device may not be synchronized with a cooking speed of user, thereby causing a relatively poor production effect of a target task. Embodiments of the present disclosure further provide an executing method of data for an Internet-of-Things device; and the method may be applied to the intelligent Internet-of-Things device. Specifically, the executing method of data for the Internet-of-Things device provided by one embodiment comprises: loading structured data, and identifying condition parameters comprised in the structured data; generating execution flow data of the structured data based on the condition parameters, wherein the execution flow data comprises user operation data and/or Internet-of-Things device operation data; and executing the Internet-of-Things device operation data, and/or displaying the user operation data to a user, and receiving an operation fed back by the user to complete the execution process of the structured data.

In one embodiment, the condition parameters may comprise at least one of a serial number of the execution flow data, a second component operation state, an execution mode of a task object in the second component, execution time corresponding to the execution mode of the task object in the second component, an execution temperature, a first object category, the added weight of the first object, and prompt information. The serial number of the execution flow data may represent the execution flow data of the execution flow data in the whole structured data. The second component operation state may be used for representing the state of the second component in the execution flow data. The execution mode of the task object in the second component may be used for indicating the execution mode of a task object of the first object or the second object. The prompt information may be voice prompt information or text prompt information, wherein the prompt information may be used for reminding an operation process in the current execution flow data.

In the present embodiment, the loaded structured data usually needs to be in a language recognizable to the computer. In view of this, each piece of execution flow data in the structured data may be converted into corresponding data frames. Specifically, a data protocol may be formulated first during data conversion; and the data protocol may define a data format of the data frame. The data format may indicate which data segments should be included in the data frame and in which sequence the data segments should be arranged. In practical application, the data segments may respectively represent different condition parameters, so that each piece of execution flow data may correspond to a data frame.

In the present implementation mode, identifiers that can be recognized by a machine may be filled in different data segments of the data frame; and these identifiers may represent numerical values of the corresponding condition parameters. Thus, when the execution flow data is converted into a corresponding data frame, an identifier corresponding to each condition parameter in the execution flow data may be determined, and the determined identifier is filled in a corresponding data segment, thereby generating a data frame corresponding to the execution flow data. It should be noted that the data frame usually includes data segments of all condition parameters, but the values of all condition parameters may not necessarily be generated in a certain piece of execution flow data.

In the present embodiment, after the structured data are loaded, the Internet-of-Things device may sequentially read each data segment in the data frame according to a preset data protocol, so as to get each detail in the execution flow data. Specifically, the Internet-of-Things device may recognize a data format of the data frame; the data format is determined by a data protocol; and data segment for characterizing the condition parameters may be included in the data format. Then, the Internet-of-Things device may sequentially read the identifiers filled in each data segment, and determine the condition parameters included in the current execution flow data based on the read identifiers.

In the present embodiment, after the condition parameters included in the structured data are recognized, the combination of the condition parameters may form the execution flow data of the structured data. Specifically, one part of the condition parameters determined by the Internet-of-Things device may be used as data for operation of the Internet-of-Things device, and the other part may be used as operation data that the user needs to cooperate. The data for operation of the Internet-of-Things device may be used as the Internet-of-Things device operation data; and the operation data that the user needs to cooperate may be used as the user operation data. In this way, the condition parameters included in the current execution flow data may be used for representing the user operation data and/or the Internet-of-Things device operation data corresponding to the current execution flow data. Since the execution flow data may be composed of different execution flow data, the execution flow data may include the user operation data and/or the Internet-of-Things device operation data.

In the present implementation mode, the Internet-of-Things device operation data may be directly executed in sequence by the Internet-of-Things device, while the user operation data usually needs to be displayed to the user by character or voice to remind the user of executing a corresponding operation. Specifically, the Internet-of-Things device operation data may comprise a first to-be-added object category and corresponding weight. Thus, when the Internet-of-Things device operation data are executed, a first component corresponding to the first to-be-added object category may be determined according to a first object name; and an opening duration of the first component may be determined according to the weight. In addition, the Internet-of-Things device operation data may further include information such as the execution temperature corresponding to the current execution flow data, the execution time at the execution temperature, the second component operation state corresponding to the current execution flow data, and the execution mode of the task object in the second component.

When the Internet-of-Things device sequentially executes the execution flow data, if the user operation data are analyzed, the user may be reminded to perform the corresponding operation in a mode of voice or text. Specifically, the user operation data may comprise prompt information for representing a second object name and second object weight, so that the Internet-of-Things device or external device may broadcast voice prompt information; and after all execution flow data in the structured data are executed, the Internet-of-Things device may remind the user to perform a final operating action to finish the execution process of the target task.

In one embodiment, when the Internet-of-Things device executes the current Internet-of-Things device operation data, in order to ensure the safety of the execution process or to improve the operating effect, whether a precondition exists in the current Internet-of-Things device operation data may be judged. For example, the current Internet-of-Things device operation data may refer to high-pressure heating of the second object in the second component; in order to ensure the safety of the execution process, the high-pressure heating may have a precondition that "a high-pressure second component has been successfully locked". In this way, the Internet-of-Things device may judge whether the precondition is met; and the current Internet-of-Things device operation data may be executed only when the precondition is met.

In one embodiment, in a process of executing the Internet-of-Things device operation data, the Internet-of-Things device may further detect whether the Internet-of-Things device has a fault or the second component has a fault; and if there is a fault, the Internet-of-Things device may suspend the execution of the Internet-of-Things device operation data and send prompt information matched with the fault. In practical application, the Internet-of-Things device may have problems of insufficiency of first object, failure of a pump body supplying the first object, etc.; and the second component may have problems of dryout, mismatching of the second component, etc.

In case of the mismatching of the second component, the material of the second component is different from the material matching the second component, to cause problems of different magnetic induction intensities, different heating speeds, different energy consumption, etc.; at this time, current in a heating circuit inside the Internet-of-Things device will apparently change, so whether the mismatching of the second component appears may be judged by detecting the current in the heating circuit of the Internet-of-Things device. If the current in the heating circuit changes greatly, it indicates that the mismatching of the second component may appear.

A pressure sensor may be built into the first component of the Internet-of-Things device; in case of the insufficiency of the first object in the first component, the value detected by the pressure sensor will be small; in this way, whether the first object is insufficient may be judged by detecting induction parameters of the pressure sensor. In addition, in case of the fault of the pump body supplying the first object, there will be a problem that the added amount of the first object is not matched with a preset added amount, so whether the pump body has a fault may be detected by detecting the actual added amount of the first object.

In one embodiment, the user operation data may also comprise prompt information used for characterizing completion of execution of a task object. Generally, when the last execution process data is completed, the prompt information used for characterizing the completion of the execution of the task object may be displayed to the user. However, in some special execution processes, situations such as high pressure, high temperature, etc. are possibly involved; at the moment, in order to ensure the safety of the user, when the execution of the task object is completed, a current state of the second component of the Internet-of-Things device may be detected; and only when the second component is in a state of being capable of being turned on is ensured, the prompt information for characterizing the completion of the execution of the task object may be displayed to the user.

In one embodiment, the Internet-of-Things device does not require the user to participate in the execution process excessively during the cooking of the target task, but may automatically complete the execution process. Specifically, the Internet-of-Things device may only generate the user operation data only twice after parsing the structured data, wherein the one-time user operation data may be used for prompt information for characterizing addition of the second object; and the other user operation data may be used for the prompt information for characterizing the completion of the execution of the task object.

The present disclosure further provides an executing system of data for an Internet-of-Things device. The system comprises: a structured data analysis unit, used for loading structured data and identifying condition parameters contained in the structured data; a data acquisition unit, used for generating execution flow data of the structured data based on the condition parameters, wherein the execution flow data comprises user operation data and/or Internet-of-Things device operation data; and an execution unit, used for executing the Internet-of-Things device operation data and/or displaying the user operation data to a user and receiving the user feedback, so as to complete an execution process of the structured data.

The present disclosure further provides an Internet-of-Things device. The Internet-of-Things device comprises a memory and a processor, wherein the memory is used for storing a computer program, and when the computer program is executed by the processor, the computer program is used for realizing the following functions: loading structured data and identifying condition parameters contained in the structured data; generating execution flow data of the structured data based on the condition parameters, wherein the execution flow data comprises user operation data and/or Internet-of-Things device operation data; and executing the Internet-of-Things device operation data, and/or displaying the user operation data to a user and receiving the user feedback, so as to complete an execution process of the structured data.

In another embodiment of the present disclosure, an Internet-of-Things device may execute an execution process adaptively in response to an execution instruction of a task object, which is input by a user, without loading structured data when the execution process is executed. Specifically, an executing method of data for the Internet-of-Things device, which is provided in the embodiment, comprises: receiving the execution instruction of the task object, which is issued by the user, and generating the user operation data and/or the Internet-of-Things device operation data in response to the execution instruction of the task object; and executing the Internet-of-Things device operation data and/or displaying the user operation data to the user and receiving the user feedback, so as to complete the execution process.

In the embodiment, when the user wants to execute the Internet-of-Things device data, the execution instruction of the task object of "start job" may be issued to the Internet-of-Things device. After the user issues the execution instruction of the task object to the Internet-of-Things device, the Internet-of-Things device automatically selects an appropriate target task and performs a job. Specifically, the Internet-of-Things device may execute the target task according to historical execution data and the preference of the user. After acquiring the historical execution data of the user, the Internet-of-Things device may identify execution time corresponding to the execution instruction of the task object. The execution time may be execution time designated by the user, or may be system time when the user issues the execution instruction of the task object. For example, if the execution time set by the user is not included in the execution instruction of the task object, the system time when the Internet-of-Things device receives the execution instruction of the task object may be taken as the execution time. If the execution time is defined by the user in the execution instruction of the task object, the execution time defined by the user prevails. After the execution time is identified, the user operation data and/or the Internet-of-Things device operation data corresponding to the execution instruction of the task object may be generated based on the historical execution data and the execution time. In the embodiment, after the target structured data is screened, the target structured data may comprise target task information of multiple target tasks. Subsequently, the execution frequency of each task object in the target structured data may be counted. The execution frequency of the task object may be the frequencies of the job per unit duration. For example, it may be the frequencies of the job in a week or a month. After the execution frequency of the task object is counted, a to-be-executed target task may be selected from the above target tasks based on the execution frequency of the task object, and the corresponding user operation data and/or Internet-of-Things device operation data are generated according to the structured data of the target task.

In another application scenario, the user has an explicit idea about the to-be-used target task, but does not know how to perform the job. At the moment, the execution instruction of the task object, which is issued by the user, may comprise a to-be-executed target second object. Thus, after the execution instruction of the task object is received, the Internet-of-Things device may select the structured data comprising the target second object from the structured data set. Subsequently, according to the above description, in combination with the execution time corresponding to the execution instruction of the task object, the target task according with the expectation of the user may be finally screened out. Specifically, the execution time corresponding to the execution instruction of the task object may be identified, and the user operation data and/or the Internet-of-Things device operation data corresponding to the execution instruction of the task object may be generated based on the selected structured data and the execution time.

Of course, in some application scenarios, in addition to the target second object, the user may also add other restrictions, such as an execution manner of the task object, a required first object, etc. in a manner of keywords. Thus, by setting more restrictions, the target task made by the Internet-of-Things device may be more suitable for the expectation of the user.

In another application scenario, the user possibly wants to get the guidance of the Internet-of-Things device or wants to take over subsequent execution flow data by the Internet-of-Things device in the process of executing the job task by using the Internet-of-Things device, and at the moment, the user may issue the execution instruction of the task object to the Internet-of-Things device. After the execution instruction of the task object is received, the Internet-of-Things device may collect the execution flow data currently completed by the user, wherein the execution flow data currently completed by the user may be input into the Internet-of-Things device by the user, or automatically perceived by the Internet-of-Things device in the job process of the user.

In the embodiment, after the execution flow data currently completed is collected, the to-be-executed target task may be predicted. Specifically, the Internet-of-Things device or a background server of the Internet-of-Things device may analyze a large amount of structured data by using algorithms such as a regression analysis, a decision-making tree, a neural network and so on, so that a structured data prediction tree may be constructed. In the structured data prediction tree, different execution flow data may serve as leaf nodes, and the structured data may serve as a parent node; and according to the collected one or more execution flow data, the structured data which may be finally realized may be predicted by the structured data prediction tree. Of course, more than one structured data may be predicted according to the collected execution flow data, and at the moment, the predicted structured data may be further screened in combination with the execution time and the preference of the user, so as to obtain the final to-be-executed target task.

In one embodiment, the Internet-of-Things device does not require the user to participate in the execution process excessively during the execution of the target task, but may automatically complete the execution process. Specifically, the Internet-of-Things device may generate the user operation data only twice after receiving the execution instruction of the task object of the user. Specifically, the one-time user operation data may be used for prompt information for characterizing addition of the second object; and the other user operation data may be used for the prompt information for characterizing the completion of the execution of the task object. Thus, the user only needs to participate in two steps in the whole process, and does not participate in the intermediate execution processes, and the user does not need to stay at the side of the Internet-of-Things device at any time in the execution process, thereby greatly liberating the time of the user.

The present disclosure further provides an executing system of data for an Internet-of-Things device. The system comprises: a data generation unit, used for receiving an execution instruction of a task object, which is issued by a user, and generating user operation data and/or Internet-of-Things device operation data in response to the execution instruction of the task object; and an execution unit, used for executing the Internet-of-Things device operation data and/or displaying the user operation data to the user and receiving the user feedback, so as to complete an execution process.

The present disclosure further provides an Internet-of-Things device. The Internet-of-Things device comprises a memory and a processor, wherein the memory is used for storing a computer program, and when the computer program is executed by the processor, the computer program is used for realizing the following functions: receiving the execution instruction of the task object, which is issued by the user, and generating user operation data and/or Internet-of-Things device operation data in response to the execution instruction of the task object; and executing the Internet-of-Things device operation data and/or displaying the user operation data to the user and receiving the user feedback, so as to complete the execution process.

Each embodiment of the description is described in a progressive manner, the same or similar parts of all the embodiments refer to each other, and each embodiment focuses on differences from the other embodiments.

It may be seen from the above that, in the technical solutions provided by one or more embodiments of the present disclosure, when the Internet-of-Things device is used by the user, the execution instruction of the task object may be transmitted to the Internet-of-Things device; and in response to the execution instruction of the task object, the Internet-of-Things device may determine the user operation data and/or the Internet-of-Things device operation data during execution. The user operation data in the scenario may be displayed to the user by the Internet-of-Things device so as to remind the user of executing operations of adding a second object, operating a second component, etc. The Internet-of-Things device operation data may be automatically executed by the Internet-of-Things device. For example, the first object is automatically added; the execution temperature and execution time are automatically set, etc. Thus, through the cooperation between the user and the Internet-of-Things device, the target task can be finally completed, which not only improves the production efficiency of the target task, but also achieves the better job effect.

Figure 6A:
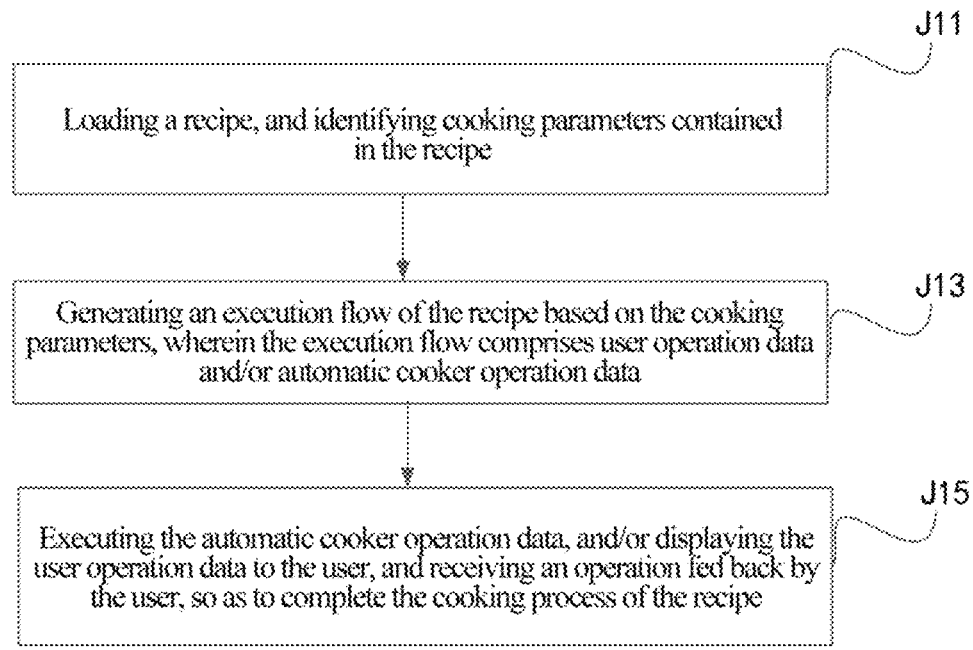
FIG. 6a is a schematic diagram of steps of an automatic cooking method for an automatic cooker provided by embodiments of the present disclosure.

In some optional embodiments, the Internet-of-Things device in the above embodiments may be implemented as a kitchen robot, such as an automatic cooker, etc.; accordingly, the structured data may be implemented as an electronic recipe used by the kitchen robot; the execution flow data may be a cooking step; the executed job task may be a to-be-cooked dish; the first object may be a seasoning; the first component may be a seasoning box; and the third component may be a pot body, etc. Based on this, the present disclosure provides an automatic cooking method for an automatic cooker, and the method may be applied to an intelligent automatic cooker. Specifically, an automatic cooking method for an automatic cooker, which is provided by one embodiment, may comprise multiple steps as shown in FIG. 6a.

J11: loading a recipe, and identifying cooking parameters contained in the recipe.

In the embodiment, the user may download the recipes shared by other users in the automatic cooker, or may download the recipes through the external device connected with the automatic cooker, and transmit the recipes back to the automatic cooker. For example, the user may download the recipe in an APP of the automatic cooker of a smartphone and transmit the recipe back to the automatic cooker. Thus, the automatic cooker may analyze the recipe, so as to identify the cooking parameters contained in the recipe. Specifically, the cooking parameters may characterize the various details of the cooking steps of the recipe; and according to the cooking parameters, the corresponding cooking steps may be restored, so as to execute a cooking process of dishes.

In the embodiment, the types of the cooking parameters may be preset. Specifically, a large number of recipes or actual cooking processes may be analyzed, so as to summarize the cooking parameters that are possibly involved in the cooking steps.

In one embodiment, the cooking parameters may comprise at least one of serial numbers of the cooking steps, the operation state of the pot body, the cooking manner in the pot body, the cooking duration corresponding to the cooking manner in the pot body, the opening/closing state of the pot lid, the cooking temperature, the types of the seasonings, the adding weight of the seasonings and prompt information, wherein the serial numbers of the cooking steps may characterize the execution sequence of the cooking steps in the whole recipe. The operating state of the pot body may be used for characterizing the state of the pot body in the cooking steps. In practical application, the operation state of the pot body may comprise, for example, opening of the pot lid, seal pressurization, closing of the pot lid, a heating process, a seasoning adding process, a cleaning process, a waiting process, etc. The cooking manner in the pot body may be used for indicating the cooking manner of the seasonings or the food materials. In practical application, the cooking manner in the pot body may be, for example, steaming and boiling, stir-frying, stirring, frying, etc. The prompt information may be voice prompt information or text prompt information, wherein the prompt information may be used for reminding an operation process in the current cooking step. For example, the prompt information may be voice information: "please adding 500 g of pork and clicking the Ready key". In practical application, the prompt information may be automatically generated by the automatic cooker, or may be input by the user. For example, in the making process of the recipe, after the automatic cooker recognizes that 20 g of soybean oil is added in the cooking steps, corresponding voice prompt information "please adding 20 g of soybean oil" may be generated. For another example, when the user manually adds 500 g of pork, voice prompt information or text prompt information "500 g of pork needs to be added here" may be input, and subsequently, the automatic cooker may convert the prompt information input by the user into a uniform broadcasting format or a uniform broadcasting voice according to a voice recognition or text recognition technology.

It should be noted that, in practical application, the cooking parameters may comprise more contents. For example, the cooking parameters may also comprise the emptying time after the seasoning is added into each seasoning box, and the emptying time may characterize the remaining amount of the seasoning in the seasoning box. In addition, the cooking parameters may also comprise the cleaning time for each seasoning box, the emptying time after cleaning, etc. With the continuous update of the automatic cooker, the contents contained in the cooking parameters may also be increased synchronously, and the cooking parameters may comprise more or less contents under the situation that those skilled in the art understand the essence of the technical solution of the present disclosure, but such the improvement should fall within the protection scope of the present disclosure.

In the embodiment, the loaded recipe usually needs to be in a computer recognizable language. In view of this, each cooking step in the recipe may be converted into a corresponding data frame. Specifically, a data protocol may be formulated first during data conversion; and the data protocol may define a data format of the data frame. The data format may indicate which data segments should be included in the data frame and in which sequence the data segments should be arranged. In practical application, the data segments may respectively characterize different cooking parameters, so that each cooking step may correspond to a data frame.

In the embodiment, machine recognizable identifiers may be filled in the different data segments in the data frame, and the identifiers may represent numerical values of the corresponding cooking parameters. Thus, when the cooking steps are converted into the corresponding data frames, the identifier corresponding to each cooking parameter in the cooking steps may be determined, and the determined identifier may be filled in a corresponding data segment, so as to generate the data frames corresponding to the cooking steps. It should be noted that the relevant description and example of the data frame may refer to the embodiment shown in FIG. 3b, which is not repeated herein.

In the embodiment, after the recipe is loaded by the automatic cooker, each data segment in the data frame may be read sequentially according to a preset data protocol, so that each detail in the cooking steps may be learnt. Specifically, the automatic cooker may identify a data format of the data frame, the data format is determined by the data protocol, and the data segments for characterizing cooking parameters may be included in the data format. Then, the automatic cooker may sequentially read identifiers filled in each data segment and determine the cooking parameters contained in the current cooking step based on the read identifiers.

J13: generating an execution flow of the recipe based on the cooking parameters, wherein the execution flow comprises user operation data and/or automatic cooker operation data.

In the embodiment, after the cooking parameters contained in the recipe are identified, a combination of the cooking parameters may form the execution flow of the recipe. Specifically, one part of the cooking parameters determined by the automatic cooker may be partly taken as own operation data of the automatic cooker, and the other part of the cooking parameters may be taken as the operation data required to be cooperated by the user, wherein the own operation data of the automatic cooker may be taken as the automatic cooker operation data, and the operation data required to be cooperated by the user may be taken as the user operation data. Thus, the cooking parameters contained in a current cooking step may be used for characterizing user operation data and/or automatic cooker operation data corresponding to the current cooking step. Since the execution flow may be composed of different cooking steps, the execution flow may contain the user operation data and/or the automatic cooker operation data.

J15: executing the automatic cooker operation data, and/or displaying the user operation data to the user, and receiving an operation of the user feedback, so as to complete the cooking process of the recipe.

In the embodiment, the automatic cooker operation data may be directly executed in sequence by the automatic cooker, and the user operation data usually needs to be displayed to the user by means of texts or voices to remind the user to execute a corresponding operation. Specifically, the automatic cooker operation data may contain the variety of to-be-added seasonings and the corresponding weights. Thus, when the automatic cooker operation data is executed, the seasoning box corresponding to the type of the to-be-added seasoning may be determined according to the seasoning name, and the opening duration of the seasoning box may be determined according to the weight. In the embodiment, the seasonings may be pre-processed into a liquid form, so that the opening duration of the seasoning box may be determined according to the concentration and the weight of the seasoning. Finally, the automatic cooker may keep the seasoning box open in the duration of opening, so as to add the seasoning into the pot body.

In addition, the automatic cooker operation data may also comprise information such as the cooking temperature corresponding to the current cooking step, the cooking duration at the cooking temperature, an operation state of the pot body corresponding to the current cooking step, a cooking manner in the pot body, etc. Contents of the part are described above. Unnecessary details are not given herein.

When all the cooking steps are executed sequentially by the automatic cooker, if the user operation data is parsed, the user may be reminded to execute a corresponding operation by means of voices or texts. Specifically, the user operation data may comprise prompt information used for characterizing the food material name and the food material weight, so that the automatic cooker or the external device may broadcast voice prompt information: "please adding 500 g of pork and continuously heating for half an hour at 120° C.". Thus, after each cooking step in the recipe is executed, the automatic cooker may remind the user to fill a tray to complete the cooking process of the dish.

In one embodiment, in order to ensure the safety of the cooking process or to enhance the cooking effect when the automatic cooker executes the current automatic cooker operation data, whether the current automatic cooker operation data has a precondition or not may be judged. For example, the current automatic cooker operation data may be that cooking materials in the pot body are subjected to high pressure heating, and in order to ensure the safety of the cooking process, the high pressure heating may have a precondition that "a lid of a pressure cooker has been successfully locked". Thus, the automatic cooker may determine that whether the precondition is satisfied, and execute the current automatic cooker operation data only if the precondition is satisfied. For example, an electromagnetic switch sensor of the pot lid may output a successful locking signal after the pot lid is successfully locked, and the automatic cooker may judge that whether the precondition is satisfied by detecting that whether the signal exists currently. The high pressure heating process is executed only if the successful locking signal is detected.

In one embodiment, in the process of executing the automatic cooker operation data, the automatic cooker may also detect that whether the automatic cooker or the pot body has a fault; and if a fault occurs, the execution of the automatic cooker operation data may be suspended, and prompt information matched with the occurred fault may be sent out. In practical application, the automatic cooker possibly has the situations, such as shortage of seasonings, failure of a pump body for seasoning supply, etc.; and the pot body possibly has the situations, such as dry burning, mismatching of the pot body, etc.

Specifically, if the pot body has the situation of dry burning, the temperature rising speed of the pot body is faster, and at the moment, the automatic cooker may detect the temperature rising speed of the pot body and judge that whether the pot body has the situation of dry burning based on the temperature rising speed. If the temperature rising speed exceeds a preset speed threshold, the boiler has the situation of dry burning may be judged; and at the moment, the heating process may be stopped, and prompt information for characterizing the dry burning of the pot body may be sent to a central control system, or sound control alarm information may be sent to the user.

If the pot body is not matched, since the material of the pot body is different from the material of a matched pot body, problems such as different magnetic induction intensities, different heating speeds and different energy consumption are caused; and at the moment, current in a heating loop in the automatic cooker is changed significantly, so that by detecting the current in the heating loop of the automatic cooker, whether the pot body is not matched may be judged. If the current in the heating loop is changed greatly, it indicates that the pot body is not matched.

A pressure sensor may be built in each seasoning box of the automatic cooker; and if the seasoning in the seasoning box is insufficient, the numerical value detected by the pressure sensor is smaller, and therefore, by detecting induction parameters of the pressure sensor, whether the seasoning is insufficient may be judged. In addition, if the pump body for seasoning supply has a fault, the problem that the adding amount of the seasoning is not matched with the preset adding amount occurs; and whether the pump body has a fault may be detected by detecting the actual adding amount of the seasoning.

In one embodiment, the user operation data may also comprise prompt information for characterizing the end of cooking. Generally, when the last cooking step is completed, the prompt information for characterizing the end of cooking may be displayed to the user. However, in some special cooking processes, the situations such as high pressure, high temperature, etc. may be involved; and at the moment, in order to ensure the safety of the user, the current state of the pot body of the automatic cooker may be detected at the end of cooking, and only when the pot body is in a state of being capable of being turned on is ensured, the prompt information for characterizing the end of cooking is displayed to the user. For example, after the cooking is completed by using a pressure cooker, the pressure in a pressure cooker body needs to be released before the user opens a lid of the pressure cooker. At the moment, by reading the numerical value of a pressure sensor in the pot body, it can be known that the pot body is in a high pressure state currently, and therefore, an automatic pressure relief operation needs to be performed before the user is prompted to unlock the lid of the pressure cooker.

In one embodiment, the automatic cooker does not require the user to participate in the cooking process excessively during the cooking of the dishes, but can automatically complete the cooking process. Specifically, the automatic cooker may only generate the user operation data twice after parsing the recipe, wherein the one-time user operation data may be used for prompt information for characterizing addition of cooking materials. For example, at the initial stage of cooking, the automatic cooker may remind the user of food materials and seasonings used in the cooking process through voice prompt information. Thus, the user may add the food materials and the seasonings to a location or area designated by the cooking machine. Thus, subsequently, the automatic cooker may automatically obtain the corresponding food materials and seasonings from the location or area and may automatically complete the cooking process of a dish. The other user operation data may be used for prompt information for characterizing the end of cooking. For example, after the dish is cooked, the automatic cooker may remind the user of the end of the cooking process through voice prompt information, and ask the user to hold the dish. Thus, the user only needs to participate in two steps in the whole process, and does not participate in the middle cooking process, and the user does not need to stay at the side of the automatic cooker at any time in the cooking process, thereby greatly liberating the time of the user.

Figure 6B:
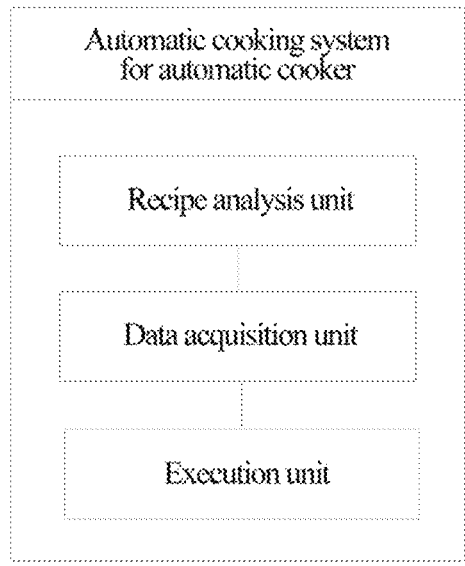
FIG. 6b is a schematic diagram of a function module of an automatic cooking system for an automatic cooker provided by embodiments of the present disclosure.

By referring to FIG. 6b, the present disclosure further provides an automatic cooking system for an automatic cooker. The system comprises:
 a recipe analysis unit, used for loading a recipe and identifying cooking parameters contained in the recipe;
 a data acquisition unit, used for generating an execution flow of the recipe based on the cooking parameters, wherein the execution flow comprises user operation data and/or automatic cooker operation data; and
 an execution unit, used for executing the automatic cooker operation data and/or displaying the user operation data to a user, and receiving an operation fed back by the user, so as to complete a cooking process of the recipe.

Figure 6C:
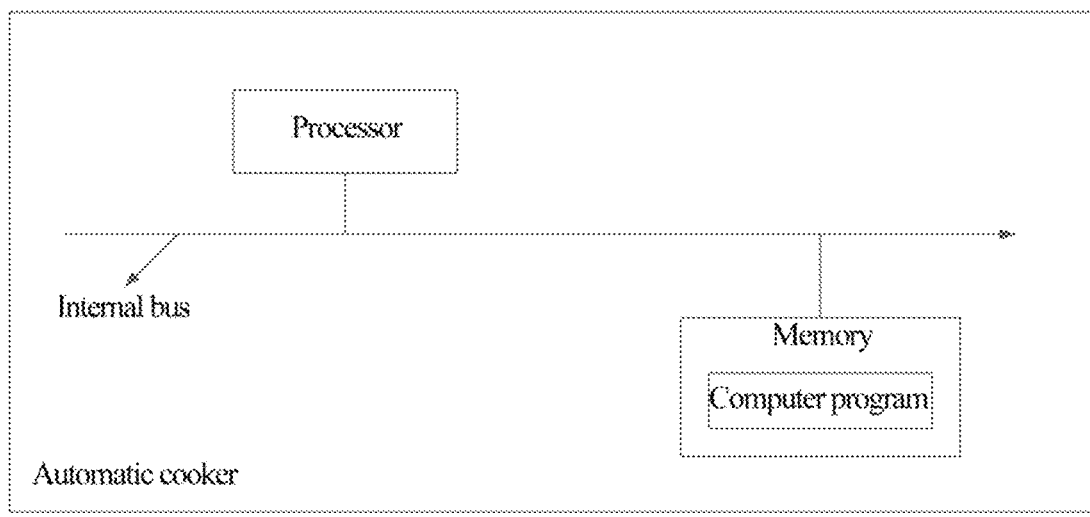
FIG. 6c is a structural schematic diagram of another automatic cooker provided by embodiments of the present disclosure.
Figure 6D:
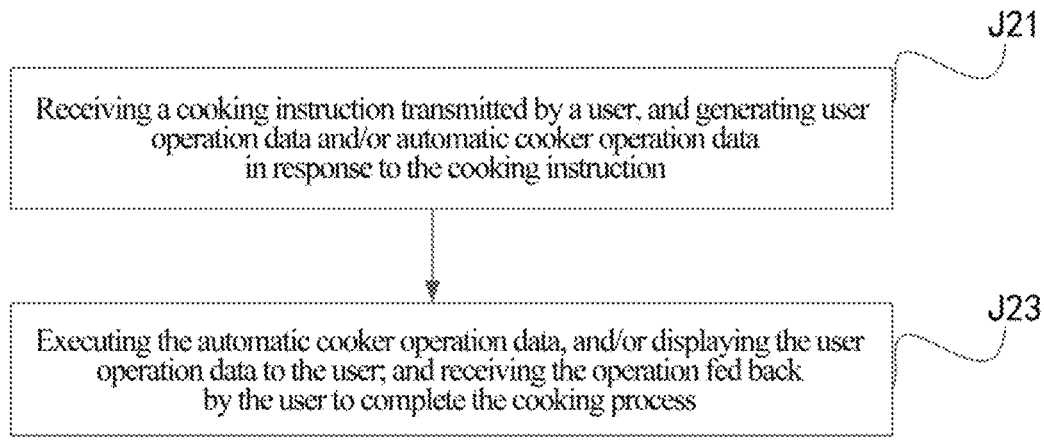
FIG. 6d is a schematic diagram of steps of an automatic cooking method for another automatic cooker provided by embodiments of the present disclosure.

By referring to FIG. 6c, the present disclosure further provides an automatic cooker. The automatic cooker comprises a memory and a processor, wherein the memory is used for storing a computer program, and when executed by the processor, the computer program is used for realizing the following functions:
 loading a recipe and identifying cooking parameters contained in the recipe;
 generating an execution flow of the recipe based on the cooking parameters, wherein the execution flow comprises user operation data and/or automatic cooker operation data; and
 executing the automatic cooker operation data and/or displaying the user operation data to a user, and receiving an operation fed back by the user, so as to complete a cooking process of the recipe In another embodiment of the present disclosure, in the cooking process, the automatic cooker may adaptively execute a cooking process without loading a recipe in response to a cooking instruction input by the user. Specifically, by referring to FIG. 6d, the automatic cooking method of the automatic cooker provided in the present embodiment may include the following steps.

J21: A cooking instruction transmitted by a user is received, and user operation data and/or automatic cooker operation data are generated in response to the cooking instruction.

In the present embodiment, when the user wants the automatic cooker to cook automatically, a cooking instruction of "start cooking" may be transmitted to the automatic cooker. Specifically, the user may issue the cooking instruction on the touch screen of the automatic cooker, or issue the cooking instruction by triggering a key characterizing "start cooking" on the automatic cooker, and may also issue the cooking instruction in the automatic cooker APP in an external device. The cooking instruction may contain different contents according to different application scenarios.

In an application scenario, when a user feels hungry and may not want to make any dish, the user may directly issue a cooking instruction to the automatic cooker, and then the automatic cooker automatically selects a suitable dish and performs cooking. Specifically, the automatic cooker may cook dishes that conform to the user preference according to historical cooking data of the user. When the user uses the automatic cooker in the past, cooked dishes or recipes executed in the automatic cooker may be recorded by the automatic cooker, and these data may be used as the historical cooking data of the user. The historical cooking data may include information of cooked dishes and cooking times of the dishes. The dish information may include food materials, seasonings and cooking methods required for cooking the dishes. Specifically, the dish information may be represented by a data frame in step J11. Thus, the automatic cooker may subsequently restore the details of the cooked dishes by parsing the dish information.

In the present embodiment, after acquiring the historical cooking data of the user, the automatic cooker may identify the cooking time corresponding to the cooking instruction. The cooking time may be user-specified cooking time or system time when the user issues the cooking instruction. For example, if the cooking time set by the user is not included in the cooking instruction, the system time when the automatic cooker receives the cooking instruction may be taken as the cooking time. If the user defines the cooking time in the cooking instruction, the user-defined cooking time serves as the cooking time of the automatic cooker. After the cooking time is identified, the user operation data and/or automatic cooker operation data corresponding to the cooking instructions may be generated based on the historical cooking data and the cooking time. Specifically, target cooking data matched with the cooking time may be screened from the historical cooking data. For example, a time period may be generated according to the cooking time, and then historical cooking data within the time period may be used as the target cooking data. For example, when the user issues a cooking instruction at 8:30 in the morning, the cooking time may be 8:30 in the morning, then the generated time period may be 6:00 to 10:00 in the morning; and subsequently, historical cooking data in this time period may be used as the target cooking data, and the other historical cooking data may be eliminated. The purpose of the above processing is as follows: a dish meeting a time point when the user issues the cooking instruction may be cooked according to the time point.

In the present embodiment, after screening the target cooking data, the target cooking data may include dish information of a plurality of dishes therein. Subsequently, a cooking frequency of each dish in the target cooking data may be counted. The cooking frequency may be a number of cooking times in unit time. For example, the cooking frequency may be a number of cooking times within a week or a month. After the cooking frequency is counted, a target to-be-cooked dish may be selected from the above various dishes based on the cooking frequency; and corresponding user operation data and/or automatic cooker operation data may be generated according to the recipe of the target dish.

Specifically, the respective dishes may be sequenced according to the counted cooking frequency, and a dish having the highest cooking frequency may be used as the target to-be-cooked dish, so that the dish meeting the user preference may be cooked. In addition, to prevent the user from repeatedly eating the same dishes in the recent period, historical dishes cooked in the recent specified period may be identified. For example, the historical dishes cooked in last two days may be identified. Then, the historical dishes may be eliminated from the respective dishes; and subsequently, the remaining dishes may be sequenced according to a counted cooking frequency. Further, the dish with the highest cooking frequency among the remaining dishes may be taken as a target to-be-cooked dish. Thus, the user may taste different types of dishes in a short time without repeatedly eating the same dishes.

In another application scenario, when the user has a clear idea about the own desired dishes, but does not know how to cook, the cooking instructions given by the user may contain target to-be-cooked food materials. For example, if the user wants to eat a bass, an identifier characterizing the target food material "bass" may be included in the cooking instruction transmitted by the user. Thus, while receiving the cooking instructions, the automatic cooker may select a recipe comprising the target food material from a recipe set. The recipe set may be a recipe stored locally in the automatic cooker, or a recipe downloaded by the automatic cooker from a server; and the recipe may be uploaded to the server by another user for sharing. Subsequently, according to the above description, in combination with the cooking time corresponding to the cooking instruction, dishes meeting the expectation of the user may be finally screened out. Specifically, the cooking time corresponding to the cooking instruction may be identified; and the user operation data and/or automatic cooker operation data corresponding to the cooking instruction may be generated based on the selected recipe and the cooking time.

In one embodiment, a recipe selected from the recipe set may have an applicable cooking time period, and then, a time period meeting the expectation of the user may be generated according to the cooking time corresponding to the identified cooking instruction. Thus, the time period may be matched with the cooking time of the recipe, so that a recipe matched with the cooking time may be further screened. Subsequently, any of the recipes may be randomly selected, or the most popular recipe may be selected as the to-be-cooked recipe.

In another embodiment, the dish meeting the user preference may be made in combination with the historical cooking data of the user after the recipe is screened according to the cooking time. Specifically, the historical cooking data of the user may be acquired, and a target recipe meeting the user preference is screened from the selected recipes according to the historical cooking data. Moreover, the user operation data and/or automatic cooker operation data corresponding to the target recipe are generated. Specifically, the selected recipe and the recipe in the historical cooking data may be subjected to intersection operation, and the recipes subjected to intersection operation are sequenced according to the cooking frequency of the user. Subsequently, the dishes to be cooked may be selected from the sequenced recipes in the manner of selection in the previous embodiments.

Of course, in some application scenarios, in addition to the target food materials, the user may also add other restricted conditions, such as cooking modes and needed seasonings, in a manner of keywords. For example, if the user wants to eat stewed beef brisket with tomatoes, beef brisket may be selected as the target food material. In addition, the cooking mode may be stewing, and the auxiliary materials may be the tomatoes. Thus, by setting more restricted conditions, the dishes made by the automatic cooker can meet the expectations of the user more.

In another application scenario, the user may want to get instructions from the automatic cooker or to take over subsequent cooking steps by the automatic cooker in the process of cooking the foods by utilizing the automatic cooker. Then, the cooking instruction may be transmitted to the automatic cooker by the user. While receiving the cooking instruction, the automatic cooker may collect the cooking steps that have been completed by the user currently. The cooking steps that have been completed by the user currently may be recorded in the automatic cooker by the user, or automatically sensed by the automatic cooker during the frying process of the user. For example, the automatic cooker may sense which seasoning box is opened by the user and sense how much weight of seasonings added to the seasoning box.

In the present embodiment, a target to-be-cooked dish may be predicted after the currently completed cooking steps are collected. Specifically, the automatic cooker or a background server of the automatic cooker can analyze a large number of recipes by utilizing algorithms such as regression analysis, decision tree and neural network, so that a recipe prediction tree may be constructed. In the recipe prediction tree, different cooking steps may serve as leaf nodes, and a recipe may serve as a parent node. A recipe that may be finally realized may be predicted via the recipe prediction tree according to one or more collected cooking steps. Of course, there may be more than one predicted recipes according to the collected cooking steps. Then, the predicted recipes may be further screened in combination with the cooking time and user preference, thereby obtaining the final to-be-cooked target dish. Subsequently, a recipe of the target dishes may be acquired; and the user operation data and/or automatic cooker operation data corresponding to the recipe of the target dish may be generated.

In the present embodiment, the above dish information or recipe may be represented by the data frame in step J11. Thus, the user operation data and/or the automatic cooker operation data may be finally obtained by parsing the cooking parameters in each data frame. For example, the automatic cooker operating data may include data such as the type of to-be-added seasonings and the corresponding weight; a cooking temperature corresponding to the current cooking step; cooking duration at the cooking temperature; a pot body running state and a cooking mode in the pot body corresponding to the current cooking step. The user operation data may include prompt information for characterizing the name of the food material and the weight of the food material, and prompt information for characterizing the end of cooking.

J23: The automatic cooker operation data is executed; and/or the user operation data is displayed to the user; and the operation fed back by the user is received to complete the cooking process.

In the embodiment, the automatic cooker operation data may be directly executed in sequence by the automatic cooker, and the user operation data usually needs to be displayed to the user by means of texts or voices to remind the user to execute a corresponding operation. Specifically, the automatic cooker operation data may contain the variety of to-be-added seasonings and the corresponding weights. Thus, when the automatic cooker operation data is executed, the seasoning box corresponding to the type of the to-be-added seasoning may be determined according to the seasoning name, and the opening duration of the seasoning box may be determined according to the weight. In the embodiment, the seasonings may be pre-processed into a liquid form, so that the opening duration of the seasoning box may be determined according to the concentration and the weight of the seasoning. Finally, the automatic cooker may keep the seasoning box open in the duration of opening, so as to add the seasoning into the pot body.

In addition, the automatic cooker operation data may also comprise information such as the cooking temperature corresponding to the current cooking step, the cooking duration at the cooking temperature, an operation state of the pot body corresponding to the current cooking step, a cooking manner in the pot body, etc. Contents of the part are described above. Unnecessary details are not given herein.

When all the cooking steps are executed sequentially by the automatic cooker, if the user operation data is parsed, the user may be reminded to execute a corresponding operation by means of voices or texts. Specifically, the user operation data may comprise prompt information used for characterizing the food material name and the food material weight, so that the automatic cooker or the external device may broadcast voice prompt information: "please adding 500 g of pork and continuously heating for half an hour at 120° C.". Thus, after each cooking step in the recipe is executed, the automatic cooker may remind the user to fill a tray to complete the cooking process of the dish.

In one embodiment, the automatic cooker does not require the user to participate in the cooking process excessively during the cooking of the dishes, but can automatically complete the cooking process. Specifically, the automatic cooker may generate the user operation data only twice after receiving the cooking instruction of the user. Specifically, the one-time user operation data may be used for prompt information for characterizing addition of cooking materials. For example, at the initial stage of cooking, the automatic cooker may remind the user of food materials and seasonings used in the cooking process through voice prompt information. Thus, the user may add the food materials and the seasonings to a location or area designated by the cooking machine. Thus, subsequently, the automatic cooker may automatically obtain the corresponding food materials and seasonings from the location or area and may automatically complete the cooking process of a dish. The other user operation data may be used for prompt information for characterizing the end of cooking. For example, after the dish is cooked, the automatic cooker may remind the user of the end of the cooking process through voice prompt information, and ask the user to hold the dish. Thus, the user only needs to participate in two steps in the whole process, and does not participate in the middle cooking process, and the user does not need to stay at the side of the automatic cooker at any time in the cooking process, thereby greatly liberating the time of the user.

Figure 6E:
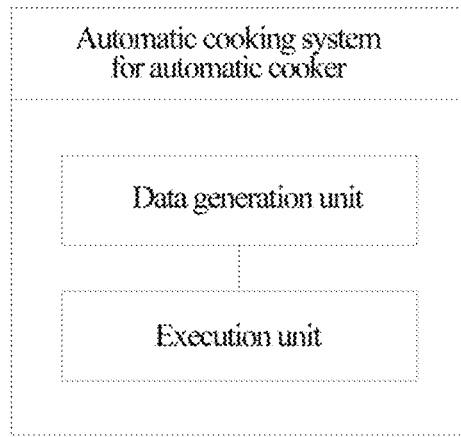
FIG. 6e is a schematic diagram of a function module of an automatic cooking system for another automatic cooker provided by embodiments of the present disclosure.

By referring to FIG. 6e, the present disclosure further provides an automatic cooking system for an automatic cooker. The system comprises:

a data generation unit, used for receiving a cooking instruction transmitted by a user, and generating user operation data and/or automatic cooker operation data in response to the cooking instruction; and an execution unit, used for executing the automatic cooker operation data and/or displaying the user operation data to a user and receiving an operation fed back by the user to complete a cooking process.

The present disclosure further provides an automatic cooker; the automatic cooker comprises a memory and a processor; the memory is used for storing a computer program; and when the computer program is executed by the processor, the computer program is used for realizing the following functions:

receiving a cooking instruction transmitted by a user, and generating user operation data and/or automatic cooker operation data in response to the cooking instruction; and executing the automatic cooker operation data, and/or displaying the user operation data to a user and receiving an operation fed back by the user to complete a cooking process.

It may be seen from the above that, in the technical solutions provided by one or more embodiments of the present disclosure, when the automatic cooker is used, the user may transmit a cooking instruction to the automatic cooker; and the automatic cooker may determine the user operation data and/or automatic cooker operation data in the cooking process in response to the cooking instruction, The user operation data in the scenario may be displayed to the user by the automatic cooker, so as to remind the user to execute operations such as adding the food materials, operating the pot body, etc. The automatic cooker operation data may be automatically executed by the automatic cooker, for example, automatically adding the seasonings, automatically setting the cooking temperature and the cooking duration, etc. Thus, through the cooperation between the user and the automatic cooker, dishes may be finally completed, thereby improving the cooking efficiency of the dishes and achieving an excellent cooking effect.

In some application scenarios, considering the lack of social functions of the current Internet-of-Things device, it is necessary to spend more time and effort to cooperate among users, and it is difficult to accurately control the Internet-of-Things devices to enjoy the pleasure of executing operation tasks; and poor user experience is brought. To solve the problem, the embodiments of the present disclosure provide a method for operating an Internet-of-Things device. The method may be applied to an intelligent terminal and/or a server. The intelligent terminal in the embodiments of the present disclosure may comprise any one of a mobile phone, a PAD, a computer, a cleaning robot, a service robot, a smart speaker, an intelligent router, a television, a refrigerator, an intelligent door lock, a monitoring device and an intelligent automatic cooker.

The method comprises: acquiring a multi-machine simultaneous operation instruction, wherein the multi-machine simultaneous operation instruction is generated according to multi-machine simultaneous operation time information corresponding to recipes; and controlling a first Internet-of-Things device to execute the multi-machine simultaneous operation instruction, so as to enable the first Internet-of-Things device to execute an operation corresponding to the recipes at time corresponding to the multi-machine simultaneous operation time information.

It should be noted that, the manner of acquiring the multi-machine simultaneous operation instruction is not limited in the present disclosure. The acquiring a multi-machine simultaneous operation instruction may comprise: acquiring multi-machine simultaneous operation time information corresponding to the structured data from a second Internet-of-Things device, an intelligent terminal or a server, and generating the multi-machine simultaneous operation instruction according to the multi-machine simultaneous operation time information. In the present implementation mode, the multi-machine simultaneous operation instruction is generated by an application client to which the method is applied; and the consumption of computing resources of the above second Internet-of-Things device, intelligent terminal or server may be decreased. The acquiring a multi-machine simultaneous operation instruction may further comprise: acquiring the multi-machine simultaneous operation instruction generated by the second Internet-of-Things device, the intelligent terminal or the server according to the multi-machine simultaneous operation time information from the second Internet-of-Things device, the intelligent terminal or the server. In the present implementation mode, the multi-machine simultaneous operation instruction is generated by the above second Internet-of-Things device, intelligent terminal or server; and the consumption of computing resources of the application client to the method may be decreased. According to the differences between the effects of the two implementation modes, corresponding implementation modes may be used according to requirements of practical application scenarios.

The multi-machine simultaneous operation instruction may be generated according to an instruction format that may be received and executed by the Internet-of-Things device and the structured data. The structured data comprises any one or more of identity information of the Internet-of-Things device, job parameters, a combination of information input by a user and job parameters of the structured data, and job operation information. The multi-machine simultaneous operation time information may be, for example, start time when the Internet-of-Things device starts a job for the structured data, or may be a time sequence when the Internet-of-Things device performs a job for the structured data.

The multi-machine simultaneous operation instruction may include: a job instruction for enabling the Internet-of-Things device to start executing a job operation according to the structured data, or a plurality of job instructions corresponding to a plurality of step job operations of the structured data on a one-to-one basis, or a job instruction for enabling a plurality of machines to simultaneously transmit prompt information. By the time of the multi-machine simultaneous operation, a plurality of Internet-of-Things devices may automatically start the operations, or may gradually operate by executing a series of multi-machine simultaneous operation instructions corresponding to the operation steps in the structured data one by one. During the job process, if user cooperation is required, prompt information such as voice and characters may be simultaneously transmitted to the user for prompting the user to operate by executing a job instruction that enables multiple machines to transmit the prompt information simultaneously. For a program requiring user cooperation; a plurality of Internet-of- Things devices may simultaneously transmit the prompt information to the user; each program of the structured data may have precise time control; and the user may enable respective operating machines to precisely execute the operation of the same structured data simultaneously without spending too much time and effort cooperation, so as to make up for the lack of social function of the Internet-of-Things devices and improve user experience.

It should be noted that, in practical applications, the multi-machine simultaneous operation time information and the multi-machine simultaneous operation instruction may further include other contents. Specifically, the contents may be set according to actual scenario requirements. More or less contents may be included in the multi-machine simultaneous operation time information and the multi-machine simultaneous operation instruction under a condition that the essence of the technical solutions of the present disclosure is understood by those skilled in the art.

The first Internet-of-Things device is any one of two or more Internet-of-Things devices; and the other Internet-of-Things devices in the two or more Internet-of-Things devices execute the operation corresponding to the structured data at the time corresponding to the multi-machine simultaneous operation time information with the first Internet-of-Things device by acquiring the multi-machine simultaneous operation instruction.

For example, the method may be applied to an intelligent terminal or a server. According to the present implementation mode, the intelligent terminal or the server may generate a multi-machine simultaneous operation instruction according to multi-machine simultaneous operation time information that corresponds to the structured data, and realize the control by transmitting the multi-machine simultaneous operation instruction to the first Internet-of-Things device. For another example, the server may transmit the multi-machine simultaneous operation instruction to the intelligent terminal; the intelligent terminal transmits the multi-machine simultaneous operation instruction to the first Internet-of-Things device in wireless manners such as Bluetooth and Wi-Fi; and the server realizes the control by transmitting the multi-machine simultaneous operation instruction to the first Internet-of-Things device.

Under a condition that the method is applied to the intelligent terminal or the server, for example, the controlling the first Internet-of-Things device to execute the multi-machine simultaneous operation instruction may comprise: transmitting the structured data to the first Internet-of-Things device; and transmitting the multi-machine simultaneous operation instruction to the first Internet-of-Things device when the time corresponding to the multi-machine simultaneous operation time information is reached, wherein the multi-machine simultaneous operation instruction is used for enabling the first Internet-of-Things device to start executing job operations according to the structured data. Alternatively, the controlling the first Internet-of-Things device to execute the multi-machine simultaneous operation instruction comprises: gradually transmitting the multi-machine simultaneous operation instruction to the first Internet-of-Things device according to a multi-step job operations of the structured data when the time corresponding to the multi-machine simultaneous operation time information is reached; and the multi-machine simultaneous operation instruction is used for enabling the first Internet-of-Things device to execute the job operations according to steps.

For another example, the method may be applied to the first Internet-of-Things device.

According to the present implementation mode, the first Internet-of-Things device may generate the multi-machine simultaneous operation instruction according to multi-machine simultaneous operation time information corresponding to the structured data, or acquire the multi-machine simultaneous operation instruction from other intelligent terminals or servers, to control the present machine to execute the multi-machine simultaneous operation instruction. For example, the previously downloaded machine readable bin\hex file structured data may be transmitted to the first Internet-of-Things device by a mobile application in advance in a wireless manner such as Bluetooth. The first Internet-of-Things device starts timing and generates the multi-machine simultaneous operation instruction according to the multi-machine simultaneous operation time information of the structured data, and executes the multi-machine simultaneous operation instruction when the reservation time is reached, so that the plurality of machine start working simultaneously.

In the embodiments of the present disclosure, since the multi-machine simultaneous operation instruction is acquired in the method, and the multi-machine simultaneous operation instruction is generated according to multi-machine simultaneous operation time information corresponding to structured data, the first Internet-of-Things device is controlled to execute the multi-machine simultaneous operation instruction, so that the first Internet-of-Things device may execute a job operation corresponding to the structured data at the time corresponding to the multi-machine simultaneous operation time information. Moreover, the first Internet-of-Things device is any one of two or more Internet-of-Things devices; and the other Internet-of-Things devices in the two or more Internet-of-Things devices execute the operation corresponding to the structured data at the time corresponding to the multi-machine simultaneous operation time information with the first Internet-of-Things device by acquiring the multi-machine simultaneous operation instruction. Therefore, a cooperation channel among a plurality of Internet-of-Things devices is established through the multi-machine simultaneous operation time information that corresponds to structured data, so that the two or more Internet-of-Things devices may respectively simultaneously execute operations corresponding to the same structured data at the time corresponding to the multi-machine simultaneous operation time information, and the operation of the same structured data may be precisely and simultaneously executed by a respective operation machine without too much time and energy of the user, thereby overcoming defects of social functions of the Internet-of-Things devices and improving user experience.

According to the method provided in the embodiments of the present disclosure, the respective Internet-of-Things devices of different users may automatically and simultaneously execute job tasks. Specifically, users in different places can simultaneously perform the identical task without additional effort cooperation, thereby saving time and effort of users, and effectively making up the gap in the social function of the Internet-of-Things devices. In situations that users are not allowed to gather together or cannot gather together on important festivals, multiple users in different places may complete job tasks together.

It may be understood that, the structured data is an electronic data that may be transmitted through the Internet of Things, and may also be stored, uploaded, or downloaded in various devices. It should be noted that, the content in the structured data is not limited in the embodiments of the present disclosure. For example, the structured data may include: any one or more of identity information of the Internet-of-Things device, operation parameters, a combination of user input information and operation parameters of the structured data, and operation information. The data format of the structured data is not limited. For example, the structured data is any or a combination of data formats such as pictures, videos, characters and audio. According to requirements, the structured data may be received from a source end and/or transmitted to a target end to improve the interactivity of the structured data. The multi-machine simultaneous operation time information may be included in the structured data or stored separately corresponding to the structured data. According to the structured data provided by the embodiment, the structured data may adapt to the Internet-of-Things device, so that the Internet-of-Things device obtains the operation details required by the job, thereby facilitating the successful execution of the job.

In addition, an application manner of the structured data is not limited in the embodiments of the present disclosure. For example, the method may further comprise: receiving any one or more of an editing operation, a sharing operation, a payment operation, an encryption operation, a decryption operation, and a triggering operation for starting a job of the structured data on the structured data; and executing the any one or more operations on the structured data in accordance with the any one or more received operations. In the present implementation mode, subdivision of the structured data is achieved through the editing operation of the structured data; interaction among the users is enhanced through the sharing operation; protection of interests of relevant people who produce the structured data is improved through the payment operation, for example, the total or partial contents of the structured data may be obtained at the target end after completion of payment or after prepayment; data security protection of the structured data is improved through the encryption operation and the decryption operation; and autonomous use of the structured data by the user is realized through the job triggering operation, and the utilization ratio of the structured data is increased.

In one or more embodiments of the present disclosure, the structured data for multi-machine simultaneous operation and/or other structured data for any purpose may also be acquired from the second Internet-of-Things device, the intelligent terminal or the server according to actual application scenario requirements. In the present implementation mode, by acquiring the structured data from the second Internet-of-Things device, the intelligent terminal or the server, the social function is further enhanced, multi-machine cooperation is achieved, and the same job task is completed in the same place.

To enable the user to know the multi-machine simultaneous operation time information and the structured data in advance for preparation, in one or more embodiments, the server may feedback a message for the structured data at preset time before the time corresponding to the multi-machine simultaneous operation time information. Further, the intelligent terminal may extract the multi-machine simultaneous operation time information and a structured data link from the message of the structured data, and download the structured data according to the structured data link. In the present implementation mode, the same structured data may be pushed to the user in a certain period of time via a push function.

In one or more embodiments of the present disclosure, the user may choose to participate or not to participate in multi-machine simultaneous tasks via the server in combination with the above implementation modes. Specifically, the transmitting the message participating in the multi-machine simultaneous job task to the server may comprise: receiving a message inviting to participate in the multi-machine simultaneous task from the server; acquiring a task page of the multi-machine simultaneous task according to the message inviting to participate in the multi-machine simultaneous task; displaying the task page to the user; and transmitting the message participating in the multi-machine simultaneous job task to the server if the message participating in the multi-machine simultaneous job task input by the user is received through the task page. Correspondingly, if the user does not input information participating in the multi-machine simultaneous task on the task page, it indicates that the user does not participate in the activity.

In one or more embodiments of the present disclosure, to enhance the interactivity of intelligent tasks, the method may further comprise: transmitting and/or receiving social interaction messages for the structured data via a social platform. For example, the social platform may provide functions for users to make friends, chat online, share, conduct sales or group purchase, and browse community forums, etc. According to the implementation mode, multiple users may complete the job tasks together through the social platform to enhance the user experience.

In one or more embodiments of the present disclosure, to enhance the interactivity of intelligent jobs, the method may further comprise: transmitting and/or receiving sales information for the structured data via an Internet platform. According to the implementation mode, the user can select the desired structured data or sell the own structured data, thereby improving the user experience.

Corresponding to the above method embodiments, the present disclosure further provides an Internet-of-Things device, comprising: an instruction acquisition module and an execution control module. The acquisition instruction module may be configured to acquire a multi-machine simultaneous operation instruction, wherein the multi-machine simultaneous operation instruction is generated according to multi-machine simultaneous operation time information corresponding to structured data. The execution control module may be configured to control a first Internet-of-Things device to execute the multi-machine simultaneous operation instruction, so as to enable the first Internet-of-Things device to execute an operation corresponding to the structured data at time corresponding to the multi-machine simultaneous operation time information.

Another embodiment of the present disclosure provides a method for operating an Internet-of-Things device. The method may be applied to an intelligent terminal and/or a server. The intelligent terminal in the embodiment of the present disclosure may comprise a mobile phone or an intelligent automatic cooker. For example, the method may comprise: acquiring structured data, wherein the structured data comprises corresponding multi-machine simultaneous operation time information; and transmitting the structured data to an intelligent terminal, so as to enable the intelligent terminal to acquire a multi-machine simultaneous operation instruction, wherein the multi-machine simultaneous operation instruction is generated according to multi-machine simultaneous operation time information corresponding to the structured data; further enable the intelligent terminal to control a first Internet-of-Things device to execute the multi-machine simultaneous operation instruction; and enable the first Internet-of-Things device to execute an operation corresponding to the structured data at time corresponding to the multi-machine simultaneous operation time information.

Corresponding to the above method embodiments, the Internet-of-Things device provided by one embodiment of the present disclosure comprises: a structured data acquisition module and a structured data transmitting module. The structured data acquisition module is configured to acquire structured data, wherein the structured data comprises corresponding multi-machine simultaneous operation time information. The structured data transmitting module may be configured to transmit the structured data to an intelligent terminal, so as to enable the intelligent terminal to acquire a multi-machine simultaneous operation instruction, wherein the multi-machine simultaneous operation instruction is generated according to multi-machine simultaneous operation time information corresponding to the structured data; further enable the intelligent terminal to control a first Internet-of-Things device to execute the multi-machine simultaneous operation instruction; and enable the first Internet-of-Things device to execute an operation corresponding to the structured data at time corresponding to the multi-machine simultaneous operation time information.

The first Internet-of-Things device is any one of two or more Internet-of-Things devices; and the other Internet-of-Things devices in the two or more Internet-of-Things devices execute the operation corresponding to the structured data at the time corresponding to the multi-machine simultaneous operation time information with the first Internet-of-Things device by acquiring the multi-machine simultaneous operation instruction.

Since the structured data acquired by the Internet-of-Things device comprises the corresponding multi-machine simultaneous operation time information, and the structured data is transmitted to the intelligent terminal, so that the intelligent terminal acquires the multi-machine simultaneous operation instruction, and the multi-machine simultaneous operation instruction is generated according to the multi-machine simultaneous operation time information corresponding to the structured data. Therefore, by controlling the first Internet-of-Things device to execute the multi-machine simultaneous operation instruction, the first Internet-of-Things device and other Internet-of-Things devices may simultaneously execute job operations corresponding to the structured data. It may be seen that, according to the apparatus, an intelligent cooperation channel among a plurality of Internet-of-Things devices is established through the multi-machine simultaneous operation time information that corresponds to structured data, so that the two or more Internet-of-Things devices may respectively simultaneously execute operations corresponding to the same structured data at the time corresponding to the multi-machine simultaneous operation time information, and the operation of the same structured data may be precisely and simultaneously executed by a respective operation machine without too much time and energy of the user, thereby overcoming defects of social functions of the Internet-of-Things devices and improving user experience.

Another aspect of the present disclosure provides an operating system for an Internet-of-Things device, comprising: two or more Internet-of-Things devices such as Internet-of-Things devices and Internet-of-Things devices. The two or more Internet-of-Things devices are respectively configured to: acquire the multi-machine simultaneous operation instruction, wherein the multi-machine simultaneous operation instruction is generated according to multi-machine simultaneous operation time information corresponding to structured data; execute the multi-machine simultaneous operation instruction to enable the two or more Internet-of-Things devices to respectively execute job operations corresponding to the structured data at the time corresponding to the multi-machine simultaneous operation time information at the same time.

A specific process of implementing the multi-machine simultaneous operation by each Internet-of-Things device in the operating system for the Internet-of-Things device may refer to the contents of the above embodiments. Unnecessary details are not given herein. In some optional embodiments, the Internet-of-Things device in the above embodiments may be implemented as a kitchen robot such as an intelligent automatic cooker; and correspondingly, the structured data may be implemented as an electronic recipe used by a kitchen robot. The executed job task may be a to-be-cooked dish.

Figure 7A:
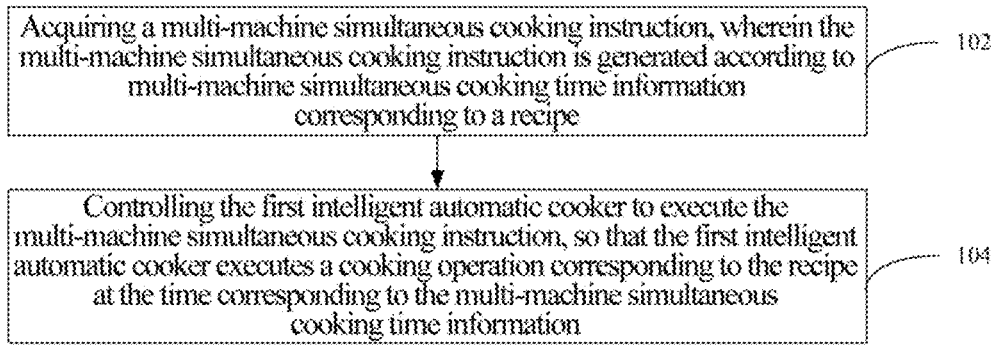
FIG. 7a is a flow chart of an intelligent cooking method provided by embodiments of the present disclosure.

Based on this, the technical solutions of the present disclosure will be described below in detail by taking the Internet-of-Things device implemented as the intelligent automatic cooker as an example. FIG. 7a illustrates a flow chart of an intelligent cooking method according to embodiments in one aspect of the present disclosure. The method may be applied to an intelligent terminal and/or a server. The method may include steps 102-104.

Step 102: acquiring a multi-machine simultaneous cooking instruction, wherein the multi-machine simultaneous cooking instruction is generated according to multi-machine simultaneous cooking time information corresponding to a recipe.

Figure 7B:
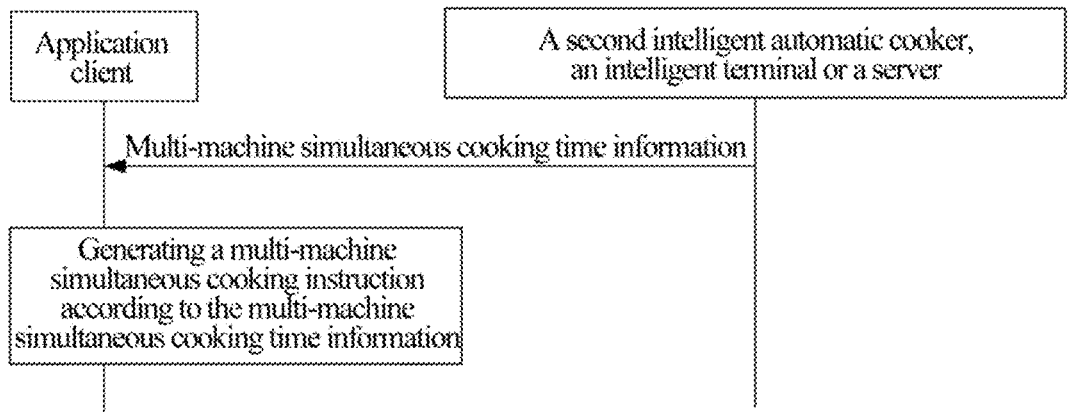
FIG. 7b is a schematic diagram of message interaction provided by embodiments of the present disclosure.
Figure 7C:
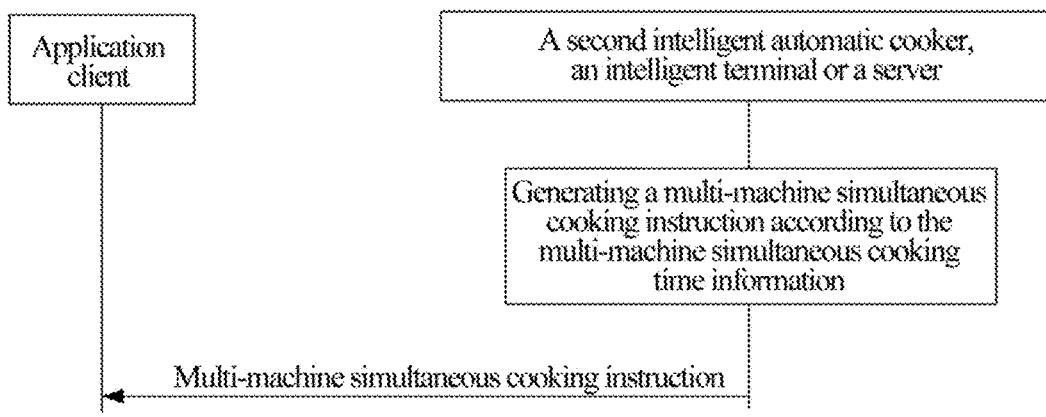
FIG. 7c is a schematic diagram of another message interaction provided by embodiments of the present disclosure.

It should be noted that, a manner of acquiring the multi-machine simultaneous cooking instruction is not limited in the present disclosure. For example, a message interaction diagram is shown in FIG. 7b. The acquiring a multi-machine simultaneous cooking instruction may comprise: acquiring the multi-machine simultaneous cooking time information corresponding to the recipe from a second intelligent automatic cooker, an intelligent terminal or a server, and generating the multi-machine simultaneous cooking instruction according to the multi-machine simultaneous cooking time information. In the present implementation mode, the multi-machine simultaneous cooking instruction is generated by an application client to which the method is applied; and the consumption of computing resources of the above intelligent automatic cooker, the intelligent terminal or the server may be decreased. For another example, a message interaction diagram is shown in FIG. 7c. The acquiring a multi-machine simultaneous cooking instruction may comprise: acquiring a multi-machine simultaneous cooking instruction generated by the second intelligent automatic cooker, the intelligent terminal or the server according to the multi-machine simultaneous cooking time information from the second intelligent automatic cooker, the intelligent terminal or the server. In the present implementation mode, the multi-machine simultaneous cooking instruction is generated by the above second intelligent automatic cooker, the intelligent terminal or the server; and the consumption of computing resources of the application client in the method may be decreased. According to the differences between the effects of the two implementation modes, corresponding implementation modes may be used according to requirements of practical application scenarios.

The multi-machine simultaneous cooking instruction may be generated according to an instruction format that can be received and executed by the intelligent automatic cooker and recipe data. The recipe data comprises any one or more data of identity information of the intelligent automatic cooker, cooking parameters, a combination of user input information and the cooking parameters of the recipe, and cooking operation information.

The multi-machine simultaneous cooking time information may be, for example, a start time at which the intelligent automatic cooker starts cooking for the recipe, or may be a time sequence at which the intelligent automatic cooker cooks for the recipe.

The multi-machine simultaneous cooking instruction may include: a cooking instruction used for enabling the intelligent automatic cooker to start executing a cooking operation according to the recipe, or a plurality of cooking instructions corresponding to a plurality of cooking operations of the recipe one by one, or a cooking instruction for enabling a plurality of machines to simultaneously transmit prompt information. When the multi-machine simultaneous cooking time is reached, the plurality of intelligent automatic cookers may be automatically turned on to start making dishes, or the dishes may be gradually made by executing a series of multi-machine simultaneous cooking instructions corresponding to the cooking steps in the recipe one by one. During the cooking process, if user cooperation is required, prompt information such as voice and characters may be simultaneously transmitted to the user for prompting the user to operate by executing a job instruction that enables multiple machines to transmit the prompt information simultaneously. For a program requiring user cooperation, a plurality of intelligent automatic cookers may simultaneously transmit the prompt information to the user; each program of the recipe may have precise time control; and the user may enable respective automatic cookers to precisely execute cooking of the same recipe simultaneously without spending too much time and effort cooperation, so as to make up for the lack of social function of the intelligent automatic cookers and improve user experience.

It should be noted that, in practical applications, the multi-machine simultaneous cooking time information and the multi-machine simultaneous cooking instruction may further include other contents. Specifically, the contents may be set according to actual scenario requirements. More or less contents may be included in the multi-machine simultaneous cooking time information and the multi-machine simultaneous cooking instruction under a condition that the essence of the technical solutions of the present disclosure is understood by those skilled in the art.

Step 104: The first intelligent automatic cooker is controlled to execute the multi-machine simultaneous cooking instruction, so that the first intelligent automatic cooker executes a cooking operation corresponding to the recipe at the time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

For example, the intelligent cooking method may be applied to an intelligent terminal or a server. According to the present implementation mode, the intelligent terminal or the server may generate the multi-machine simultaneous cooking instruction according to multi-machine simultaneous cooking time information that corresponds to the recipe, and realize the control by transmitting the multi-machine simultaneous cooking instruction to the first intelligent automatic cooker. For another example, the server may transmit the multi-machine simultaneous cooking instruction to the intelligent terminal; the intelligent terminal transmits the multi-machine simultaneous cooking instruction to the first intelligent automatic cooker in wireless manners such as Bluetooth and Wi-Fi; and the server realizes the control by transmitting the multi-machine simultaneous cooking instruction to the first intelligent automatic cooker.

Under a condition that the method is applied to the intelligent terminal or the server, for example, the controlling the first intelligent automatic cooker to execute the multi-machine simultaneous cooking instruction may comprise: transmitting the recipe to the first intelligent automatic cooker; and transmitting the multi-machine simultaneous cooking instruction to the first intelligent automatic cooker when the time corresponding to the multi-machine simultaneous cooking time information is reached, wherein the multi-machine simultaneous cooking instruction is used for enabling the first intelligent automatic cooker to start executing the cooking operation according to the recipe. Alternatively, the controlling the first intelligent automatic cooker to execute the multi-machine simultaneous cooking instruction comprises: gradually transmitting the multi-machine simultaneous cooking instruction to the first intelligent automatic cooker according to a multi-step cooking operation of the recipe when the time corresponding to the multi-machine simultaneous cooking time information is reached; and the multi-machine simultaneous cooking instruction is used for enabling the first intelligent automatic cooker to execute the cooking operation according to steps.

For another example, the intelligent cooking method may be applied to the first intelligent automatic cooker. According to the present implementation mode, the first intelligent automatic cooker may generate the multi-machine simultaneous cooking instruction according to multi-machine simultaneous cooking time information corresponding to the recipe, or acquire the multi-machine simultaneous cooking instruction from other intelligent terminals or servers, to control the present machine to execute the multi-machine simultaneous cooking instruction. For example, the previously downloaded machine readable bin\hex file recipe may be transmitted to the first intelligent automatic cooker by a mobile application in advance in a wireless manner such as Bluetooth. The first intelligent automatic cooker starts timing and generates the multi-machine simultaneous cooking instruction according to multi-machine simultaneous cooking time information of the recipe, and executes the multi-machine simultaneous cooking instruction when the reservation time is reached, so that the plurality of machines start working simultaneously.

Figure 7D:
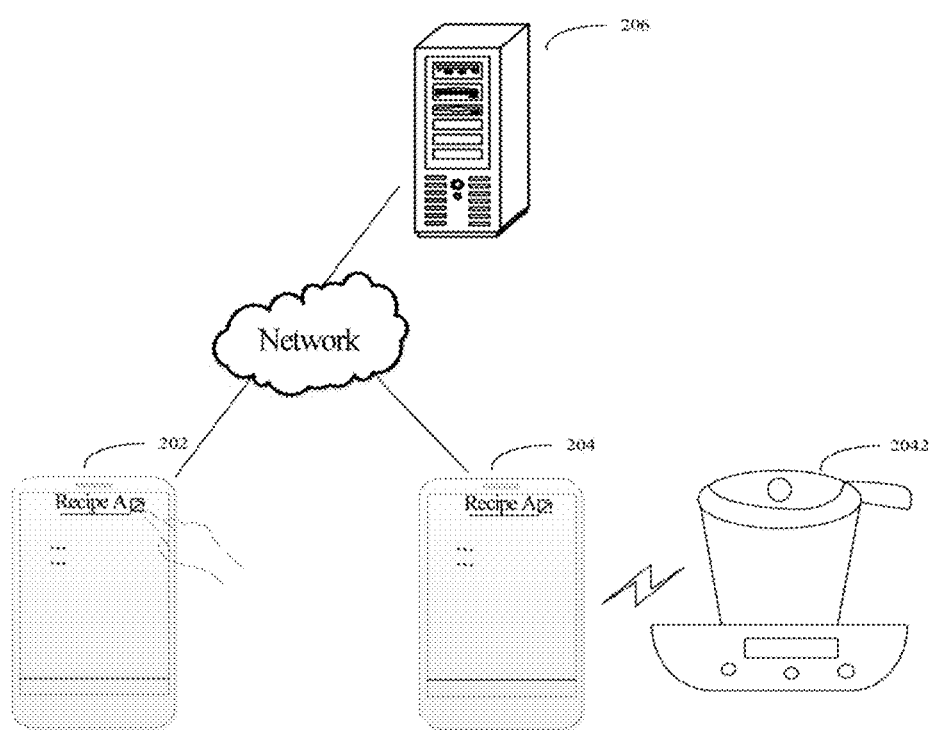
FIG. 7d is a schematic diagram of an application scenario provided by embodiments of the present disclosure.
Figure 7E:
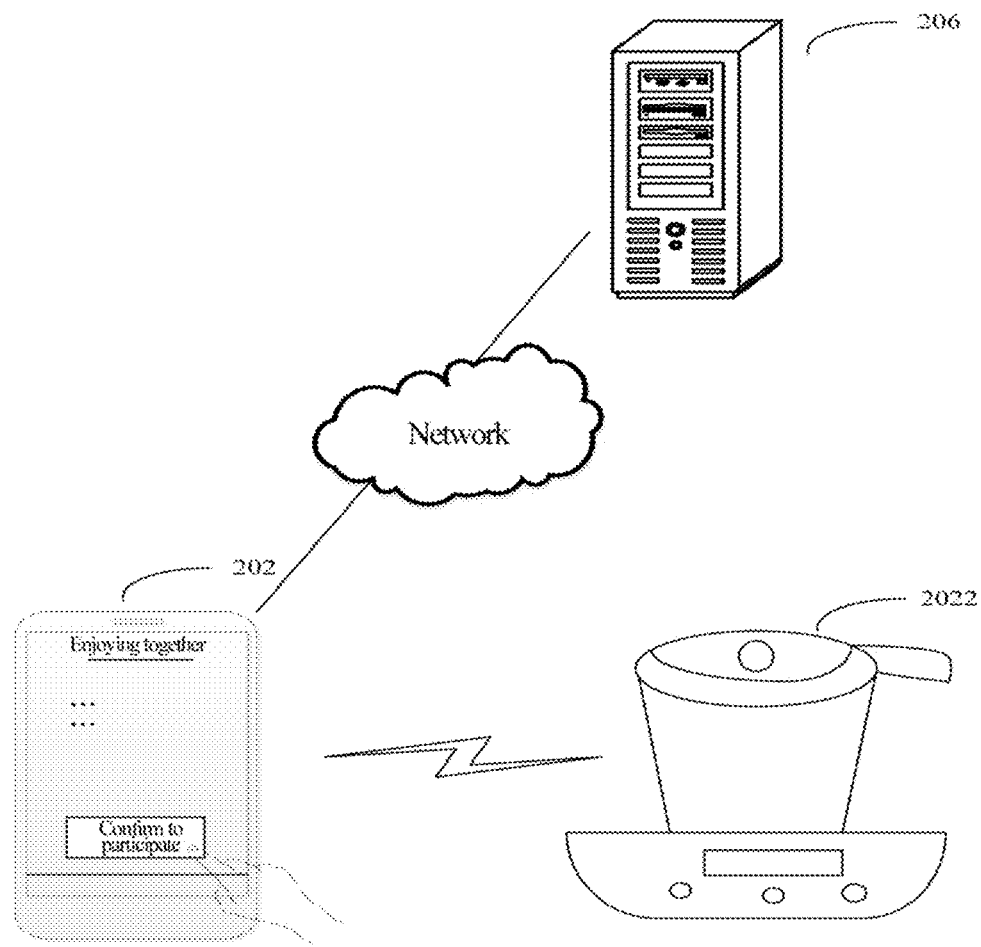
FIG. 7e is a schematic diagram of another application scenario provided by embodiments of the present disclosure.
Figure 7F:
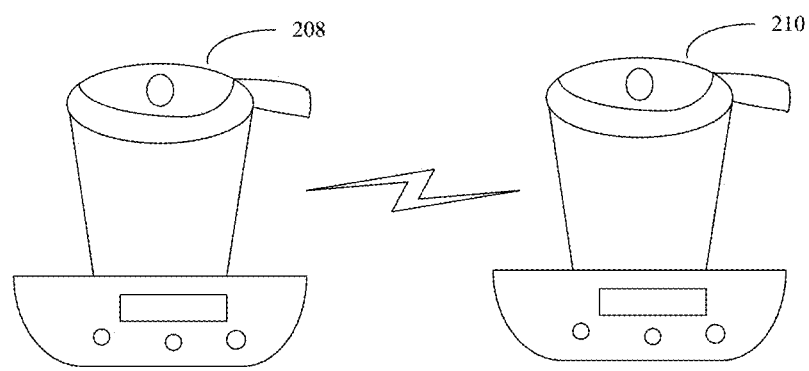
FIG. 7f is a schematic diagram of another application scenario provided by embodiments of the present disclosure.

The embodiments of the present disclosure will be illustratively described below in combination with the application scenario diagrams as shown in FIG. 7d to FIG. 7f.

For example, in the application scenario shown in FIG. 7d, the server 206 publishes a recipe on an intelligent terminal application 202. Users may conduct behaviors, such as sharing, selling or paying, on the recipes containing the multi-machine simultaneous cooking time information. By virtue of the operations such as sharing, selling or paying, an application client 204 may acquire the multi-machine simultaneous cooking time information from the server 206 or simultaneously acquires corresponding recipes. Then, the server 206 may transmit the multi-machine simultaneous cooking instruction to the application client 204 or generate the multi-machine simultaneous cooking instruction by the application client 204. If the application client 204 is an intelligent automatic cooker, multi-machine simultaneous cooking may be achieved by executing the acquired multi-machine simultaneous cooking instruction. If the application client 204 is an intelligent terminal other than an intelligent automatic cooker, such as a mobile phone, the multi-machine simultaneous cooking instruction may be transmitted to the intelligent automatic cooker 2042 to realize multi-machine simultaneous cooking.

For another example, in the application scenario shown in FIG. 7e, if a user of the intelligent terminal application 202 applying the method determines to participate in the multi-machine simultaneous cooking task of the server 206 for the promotion of the recipe, the multi-machine simultaneous cooking time information may be acquired from the server 206 or the corresponding recipe may be acquired simultaneously. Then, the server 206 may transmit the multi-machine simultaneous cooking instructions to the intelligent terminal application 202 or generate the multi-machine simultaneous cooking instruction by the intelligent terminal application 202. If the intelligent terminal application 202 is an intelligent automatic cooker, multi-machine simultaneous cooking may be achieved by executing the acquired multi-machine simultaneous cooking instruction. If the intelligent terminal application 202 is an intelligent terminal other than an intelligent automatic cooker, such as a mobile phone, the multi-machine simultaneous cooking instruction may be transmitted to the intelligent automatic cooker 2022 to realize multi-machine simultaneous cooking.

For another example, in the application scenario shown in FIG. 7f, the method may be applied to the first intelligent automatic cooker 208. The user of the second intelligent automatic cooker 210 may transmit the recipe and corresponding multi-machine simultaneous cooking time information to the first intelligent automatic cooker 208 via Bluetooth. The first intelligent automatic cooker 208 generates the multi-machine simultaneous cooking instruction according to the multi-machine simultaneous cooking time information, and cooks according to the recipe simultaneously with the second intelligent automatic cooker 210 by executing the multi-machine simultaneous cooking instruction.

It should be noted that, the intelligent terminal, the server and the intelligent automatic cooker shown in the above application scenario diagrams are merely used for schematically illustrating the application scenarios in the embodiments of the present disclosure, rather than forming a limitation to the method in the embodiments of the present disclosure.

It may be seen that, since the method acquires the multi-machine simultaneous cooking instruction, and the multi-machine simultaneous cooking instruction is generated according to multi-machine simultaneous cooking time information corresponding to the recipe, the first intelligent automatic cooker is controlled to execute the multi-machine simultaneous cooking instruction so as to enable the first intelligent automatic cooker to execute the cooking operation corresponding to the recipe at the time corresponding to the multi-machine simultaneous cooking time information. Moreover, the first intelligent automatic cooker is any one of two or more intelligent automatic cookers, and the other intelligent automatic cookers execute the cooking operation corresponding to the recipe at the time corresponding to the multi-machine simultaneous cooking time information with the first intelligent automatic cooker by acquiring the multi-machine simultaneous cooking instruction. Therefore, a cooperation channel among a plurality of intelligent automatic cookers is established through the multi-machine simultaneous cooking time information that corresponds to recipe, so that the two or more intelligent automatic cookers may respectively simultaneously execute operations corresponding to the same recipe at the time corresponding to the multi-machine simultaneous cooking time information, and the cooking of the same recipe may be precisely and simultaneously executed by a respective automatic cooker without too much time and energy of the user, thereby overcoming defects of social functions of the automatic cookers and improving user experience.

According to the method provided in the embodiments of the present disclosure, the respective intelligent automatic cookers of different users may automatically and simultaneously cook foods of the same taste. Specifically, users in different places can simultaneously cook the identical dish without additional effort cooperation, thereby saving time and effort of users, and effectively making up the gap in the social function of the intelligent automatic cookers. In situations that users are not allowed to gather together or cannot gather together on important festivals, desire of multiple users in different places for dining together and eating the same meals is achieved.

It may be understood that, the recipe is an electronic data that may be transmitted in various devices through the Internet of Things, and may also be stored, uploaded, or downloaded in the devices. It should be noted that, the content in the recipe data of the recipe is not limited in the embodiments of the present disclosure. For example, the recipe data of the recipe may include: any one or more data of identity information of the intelligent automatic cooker, cooking parameters, a combination of user input information and cooking parameters of the recipe, and cooking operation information. The data format of the recipe is not limited. For example, the recipe is any or a combination of data formats such as pictures, videos, characters and audio. According to requirements, the recipe may be received from a source end and/or transmitted to a target end to improve the interactivity of the recipe. The multi-machine simultaneous cooking time information may be included in the recipe data or stored separately corresponding to the recipe. The identity information of the intelligent automatic cooker may comprise, for example, a model number and an identity number of the intelligent automatic cooker; the cooking parameters may comprise, for example, any one or a combination of cooking parameters such as temperature, power, metering, time, water amount, salt amount, oil amount, seasoning amount, food material amount, auxiliary material amount, stirring and pot cover; the information input by the user may comprise, for example, a seasoning name input by the user and a corresponding seasoning box; the cooking operation information may include, for example, an operation instruction (e.g. pause), an operation sequence (e.g. whether to add water or salt first), and an operation step. According to the recipe provided by the embodiment, the recipe may adapt to the intelligent automatic cooker, so that the intelligent automatic cooker obtains the operation details required by the cooking, thereby facilitating the successful execution of the cooking.

In addition, an application manner of the recipe is not limited in the embodiments of the present disclosure. For example, the method may further comprise: receiving any one or more of an editing operation, a sharing operation, a payment operation, an encryption operation, a decryption operation, and a triggering operation for starting cooking of the recipe on the recipe; and executing the any one or more operations on the recipe in accordance with the any one or more received operations. For example, the recipe may be transmitted to a target end corresponding to the sharing operation and/or the payment operation by virtue of execution of the sharing operation and/or the payment operation. In the present implementation mode, subdivision of the recipe is achieved through the editing operation of the recipe; interaction among the users is enhanced through the sharing operation; protection of interests of relevant people who produce the recipe is improved through the payment operation, for example, the total or partial contents of the recipe may be obtained at the target end after completion of payment or after prepayment; data security protection of the recipe is improved through the encryption operation and the decryption operation; and autonomous use of the recipe by the user is realized through the cooking triggering operation, and the utilization ratio of the recipe is increased.

Implementation of some recipe application manners in application scenarios is schematically illustrated below.

For example, application corresponds to the sharing operation. In some application scenarios, the recipe may be stored in any one or more of an intelligent automatic cooker, an intelligent terminal and a server. Through the sharing operation, the server, the intelligent terminal and the intelligent automatic cooker may upload the recipe to the target intelligent automatic cooker, and also download the recipe into the above three devices.

For another example, application corresponds to the payment operation. In some application scenarios, the recipes may be sold on an e-commerce platform. The user may buy the recipe from the e-commerce platform by executing the payment operation on the recipe, and download or transmit the recipe to other intelligent terminals such as an intelligent automatic cooker or a mobile phone of the user. For another example, in some application scenarios, the recipe may correspond to a take-out food on the e-commerce platform; and the user may directly control an intelligent automatic cooker of the owner to cook the corresponding recipe by performing a take-out payment operation on the food from the e-commerce platform, i.e. take-out by ordering a recipe. For another example, a user may transmit a recipe of another user to an intelligent automatic cooker of the user or other intelligent terminals of the user through a payment operation for the recipe stored on the intelligent automatic cooker or other intelligent terminals of the another user. For another example, the user may upload the own recipe on the shared intelligent automatic cooker, or purchase the recipe of the server, or use an original recipe of the shared intelligent automatic cooker; and the desired delicious food of the user is cooked for the user to select through payment on the recipe by using the shared intelligent automatic cooker by utilizing the shared automatic cooker and food materials therein.

It should be noted that, the device medium required for the implementation of the above application manner is not limited. Specifically, for example, the recipe may be displayed via a touch display device of the first intelligent automatic cooker, and any one or more of an editing operation, a sharing operation, a payment operation, an encryption operation, a decryption operation, and a triggering operation for starting cooking of the recipe on the recipe may be received via the touch display device; and/or a QR code is scanned by an image acquisition device of an intelligent terminal to acquire the recipe, and the any one or more of the editing operation, the sharing operation, the payment operation, the encryption operation, the decryption operation, and the triggering operation for starting cooking of the recipe on the recipe may be received by an input device of the intelligent terminal. In the present implementation mode, a plurality of operation modes of the recipe operation may be provided by virtue of the touch display device and/or QR code scanning, so that the user experience is further improved.

In one or more embodiments of the present disclosure, according to practical application scenario requirements, a recipe for multi-machine simultaneous cooking and/or any other recipe for any purpose may also be acquired from a second intelligent automatic cooker, an intelligent terminal or a server. In the present implementation mode, by acquiring the recipe from the second intelligent automatic cooker, the intelligent terminal or the server, the social function is further enhanced, and the aim of simultaneously cooking the same dish in the same place through cooperation of a plurality of machines is achieved.

For example, an application client to which the method is applied may receive a promotion message for a recipe from a server; a participation confirm message input for the promotion message is transmitted to the server in response to the received participation confirm message, so that the recipe is fed back by the server; and the intelligent automatic cooker is controlled to execute a cooking operation corresponding to the recipe. Specifically, in a certain application scenario, the application client of the method may acquire the recipe by participating in a multi-machine simultaneous cooking task promoted by the server. Specifically, for example, the acquiring the recipe from the server may include: transmitting a message participating in the multi-machine simultaneous cooking task to a server; receiving a message for the recipe fed back by a server in response to the message participating in the multi-machine simultaneous cooking task; and acquiring the recipe according to a message of the recipe. In the present implementation mode, a plurality of intelligent automatic cookers may acquire the same recipe and the multi-machine simultaneous cooking instruction by participating in the multi-machine simultaneous cooking task of the server, so that the plurality of intelligent automatic cookers may respectively simultaneously execute a cooking operation corresponding to the same recipe at a time corresponding to time information about the multiple simultaneous automatic cookers; and a user can enable respective automatic cookers to simultaneously execute the cooking of the same recipe without spending time and effort cooperation, which makes up for the lack of a social function of an intelligent automatic cooker and improves user experience. For example, in combination with the use mode of the above payment operation, a server issues a group purchase activity (relative to the multi-machine simultaneous cooking task) via an Internet platform; and some users may acquire a recipe of the group purchase by means of payment, thereby simultaneously operating an intelligent automatic cooker in the reservation time to make a delicious food.

To enable the user to know the multi-machine simultaneous cooking time information and the recipe in advance for preparation, in one or more embodiments, the server may feedback a message for the recipe at preset time before the time corresponding to the multi-machine simultaneous cooking time information. Further, the intelligent terminal may extract the multi-machine simultaneous cooking time information and a recipe link from the message of the recipe, and download the recipe according to the recipe link. In the present implementation mode, the same recipe may be pushed to the user in a certain period of time by a push function.

Figure 7G:
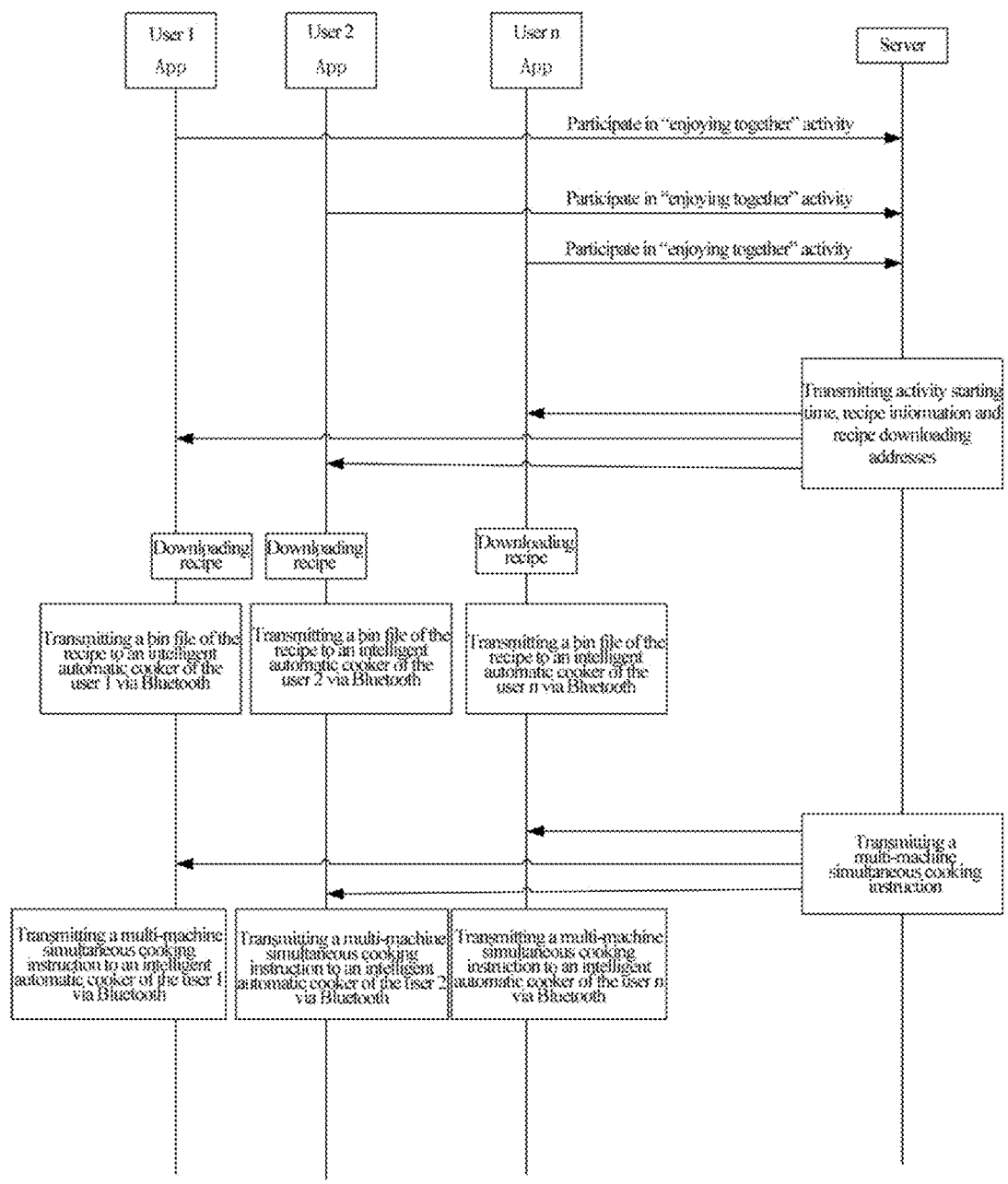
FIG. 7g is a schematic diagram of another message interaction provided by embodiments of the present disclosure.

For example, in combination with the above embodiments, in certain application scenarios, users may participate in "enjoying together" activity released by the server at the intelligent terminal application. As shown in the message interaction diagram shown in FIG. 7g, "user 1" . . . "user n" participate in the "enjoying together" activity released on the intelligent terminal application by the server by using respective intelligent terminals, such as mobile phones. Thus, the intelligent terminal of each user transmits a message participating in the "enjoying together" to the server. Within 1 hour before the specified time, the server transmits a recipe message to the user group participating in the activity accordingly. For example, the message may include activity start time, recipe information and downloading addresses of the recipe. The user needs to prepare the required materials of the recipe in advance according to the message, and downloads the recipe into the intelligent terminal application. The respective intelligent terminal of the user transmits a bin file of the recipe to the respective intelligent automatic cooker through Bluetooth. When a specified time is reached, the respective intelligent automatic cooker of the user may receive a multi-machine simultaneous cooking instruction from a respective intelligent terminal via Bluetooth, or receive multi-machine simultaneous cooking time information so as to generate a multi-machine simultaneous cooking instruction. Thus, by executing the multi-machine simultaneous cooking instruction, the respective intelligent automatic cooker of the user simultaneously executes a cooking operation corresponding to the recipe at the time corresponding to the multi-machine simultaneous cooking time information, thereby achieving an effect of completing cooking and dishing up by the respective intelligent automatic cooker. It may be seen from the application scenario that, according to the method provided in the embodiments of the present disclosure, the intelligent automatic cooker may cooperate with the server and the intelligent terminal such as the mobile phone to complete intelligent cooking.

In one or more embodiments of the present disclosure, the user may also invite own relatives and friends to participate in the activity. For example, a task page of the activity may include detailed information such as recipe introduction, start time of the activity and a number of participants. Specifically, for example, the method may further comprise: transmitting a request for inviting a friend to participate in a multi-machine simultaneous task to a server, wherein the request is used for enabling the server to transmit a message inviting to participate in the multi-machine simultaneous task to the friend. For example, the message inviting to participate in the multi-machine simultaneous task may include a link to the task page of the above activity, so that the friend can learn about the details of the activity by clicking on the link to the activity page and choose to participate or not to participate in the activity. By means of the implementation mode, users can execute the cooking of the same recipe accurately and simultaneously by means of invitation without spending too much time and efforts to cooperate with each other, which makes up for the lack of social function of the intelligent automatic cooker and improves the user experience.

In one or more embodiments of the present disclosure, the user may choose to participate or not to participate in multi-machine simultaneous tasks via the server in combination with the above implementation modes. Specifically, for example, the transmitting the message participating in the multi-machine simultaneous cooking task to the server may comprise: receiving the message inviting to participate in the multi-machine simultaneous task from the server; acquiring a task page of the multi-machine simultaneous task according to the message inviting to participate in the multi-machine simultaneous task; displaying the task page to a user; and transmitting the message participating in the multi-machine simultaneous cooking task to the server if information participating in the multi-machine simultaneous task input by the user is received through the task page. Correspondingly, if the user does not input information participating in the multi-machine simultaneous task on the task page, it indicates that the user does not participate in the activity.

In one or more embodiments of the present disclosure, to enhance the interactivity of intelligent cooking, the method may further comprise: transmitting and/or receiving social interaction messages for the recipe via a social platform. For example, the social platform may provide functions for users to make friends, chat online, share, conduct sales or group purchase, and browse community forums, etc. According to the implementation mode, the user can enjoy the delicious foods and chat with the relatives and friends participating in, for example, the above "enjoying together" activity via the social platform, thereby improving the user experience.

In one or more embodiments of the present disclosure, to enhance the interactivity of intelligent cooking, the method may further comprise: transmitting and/or receiving sales information for the recipe via an Internet platform. For example, the Internet platform may provide at least one of functions of selling recipes, selling food materials, selling delicious foods made by using the food materials and recipes, and selling intelligent automatic cookers. According to the implementation mode, the user can purchase the desired recipe or sell the own recipe for improving the user experience.

Figure 7H:
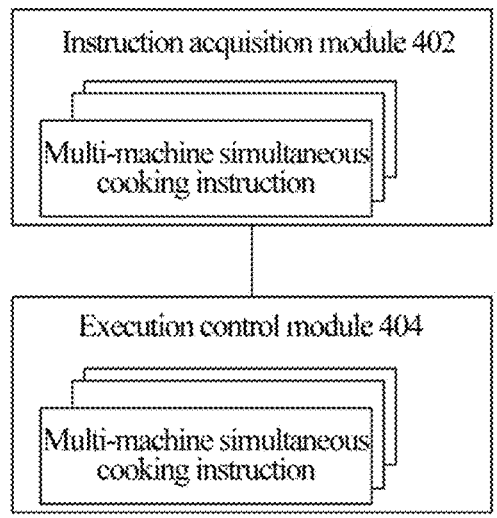
FIG. 7h is a structural schematic diagram of an intelligent cooking device provided by embodiments of the present disclosure.

Corresponding to the above method embodiments, the present disclosure further provides intelligent cooking apparatus embodiments. FIG. 7h shows a structural schematic diagram of an intelligent cooking device provided by one embodiment of the present disclosure. As shown in FIG. 7h, the apparatus comprises: an instruction acquisition module 402 and an execution control module 404.

The acquisition instruction module 402 may be configured to acquire a multi-machine simultaneous cooking instruction, wherein the multi-machine simultaneous cooking instruction is generated according to multi-machine simultaneous cooking time information corresponding to a recipe.

The execution control module 404 may be configured to control a first intelligent automatic cooker to execute the multi-machine simultaneous cooking instruction, so as to enable the first intelligent automatic cooker to execute a cooking operation corresponding to the recipe at time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

It may be seen that, since the apparatus acquires the multi-machine simultaneous cooking instruction, and the multi-machine simultaneous cooking instruction is generated according to multi-machine simultaneous cooking time information corresponding to the recipe, the first intelligent automatic cooker is controlled to execute the multi-machine simultaneous cooking instruction so as to enable the first intelligent automatic cooker to execute the cooking operation corresponding to the recipe at the time corresponding to the multi-machine simultaneous cooking time information. Moreover, the first intelligent automatic cooker is any one of two or more intelligent automatic cookers, and the other intelligent automatic cookers execute the cooking operation corresponding to the recipe at the time corresponding to the multi-machine simultaneous cooking time information with the first intelligent automatic cooker by acquiring the multi-machine simultaneous cooking instruction. Therefore, a cooperation channel among a plurality of intelligent automatic cookers is established through the multi-machine simultaneous cooking time information that corresponds to recipe, so that the two or more intelligent automatic cookers may respectively simultaneously execute operations corresponding to the same recipe at the time corresponding to the multi-machine simultaneous cooking time information, and the cooking of the same recipe may be precisely and simultaneously executed by a respective automatic cooker without too much time and energy of the user, thereby overcoming defects of social functions of the automatic cookers and improving user experience.

Figure 7I:
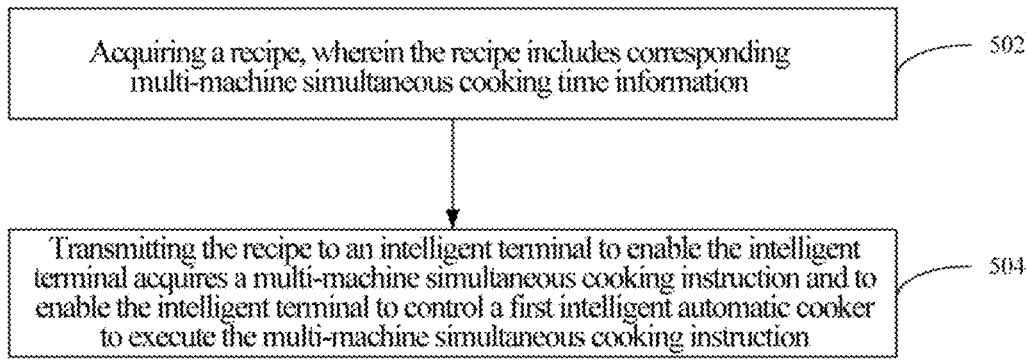
FIG. 7i is a flow chart of another intelligent cooking method provided by embodiments of the present disclosure.

FIG. 7i shows a flow chart of an intelligent cooking method provided by embodiments in another aspect of the present disclosure. The method may be applied to an intelligent terminal and/or a server. The intelligent terminal in the embodiment of the present disclosure may comprise a mobile phone or an intelligent automatic cooker. For example, the method may include steps 502-506.

Step 502: acquiring a recipe, wherein the recipe includes corresponding multi-machine simultaneous cooking time information.

Step 504: transmitting the recipe to an intelligent terminal to enable the intelligent terminal acquires a multi-machine simultaneous cooking instruction, wherein the multi-machine simultaneous cooking instruction is generated according to the multi-machine simultaneous cooking time information corresponding to the recipe, and to enable the intelligent terminal to control a first intelligent automatic cooker to execute the multi-machine simultaneous cooking instruction, so that the first intelligent automatic cooker executes a cooking operation corresponding to the recipe at the time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

For example, the method may include: receiving messages transmitted by a plurality of intelligent terminals for the recipe to participate in a multi-machine simultaneous cooking task, and transmitting the recipe to the plurality of intelligent terminals according to the messages.

In the step of transmitting the recipe to the intelligent terminal described in the embodiments of the present disclosure, the intelligent terminal may be an intelligent automatic cooker, and may also be an intelligent terminal such as a mobile phone. For example, under a condition that the intelligent terminal is the intelligent terminal such as the mobile phone in the step, the controlling the first intelligent automatic cooker to execute the multi-machine simultaneous cooking instruction may mean that the intelligent terminal controls the first intelligent automatic cooker connected thereto via Bluetooth to execute the multi-machine simultaneous cooking instruction. Under a condition that the intelligent terminal is a first intelligent automatic cooker in the step, the controlling the first intelligent automatic cooker to execute the multi-machine simultaneous cooking instruction may mean that the first intelligent automatic cooker controls the present machine to execute the multi-machine simultaneous cooking instruction.

The execution subject of the intelligent cooking method described in the embodiments of the present disclosure is not limited.

For example, the method may be applied to an intelligent terminal such as a mobile phone, and then the intelligent terminal may transmit a recipe and a multi-machine simultaneous cooking instruction to a plurality of intelligent automatic cookers by means of Bluetooth. The multi-machine simultaneous cooking instruction may be generated by the intelligent terminal.

For another example, the method may be applied to a server, and the server may transmit the recipe and the multi-machine simultaneous cooking instruction to the intelligent terminal such as a mobile phone and an intelligent automatic cooker, or transmit a recipe provided with multi-machine simultaneous cooking time information to enable the intelligent terminal to generate the multi-machine simultaneous cooking instruction according to the multi-machine simultaneous cooking time information. For example, in a certain application scenario, a user receiving a recipe pushed by a server, after authorization and preparation, may cook the same dish at different locations at the same time.

Since the recipe acquired by the method comprises the corresponding multi-machine simultaneous cooking time information, and the recipe is transmitted to the intelligent terminal, so that the intelligent terminal acquires the multi-machine simultaneous cooking instruction, and the multi-machine simultaneous cooking instruction is generated according to the multi-machine simultaneous cooking time information corresponding to the recipe. Therefore, by controlling the first intelligent automatic cooker to execute the multi-machine simultaneous cooking instruction, the first intelligent automatic cooker and other intelligent automatic cookers may simultaneously execute the cooking operation corresponding to the recipe. It may be seen that, according to the method, an intelligent cooperation channel among a plurality of intelligent automatic cookers is established through the multi-machine simultaneous cooking time information that corresponds to recipe, so that the two or more intelligent automatic cookers may respectively simultaneously execute cooking operations corresponding to the same recipe at the time corresponding to the multi-machine simultaneous cooking time information, and the operation of the same recipe may be precisely and simultaneously executed by a respective automatic cooker without too much time and energy of the user, thereby overcoming defects of social functions of the intelligent automatic cookers and improving user experience.

Figure 7J:
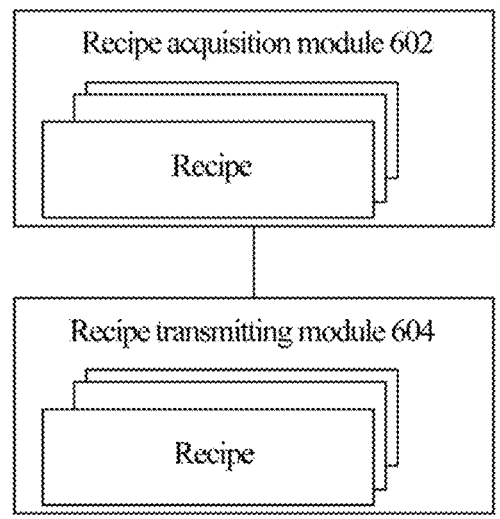
FIG. 7j is structural schematic diagram of another intelligent cooking device provided by embodiments of the present disclosure.

Corresponding to the above method embodiments, the present disclosure further provides intelligent cooking apparatus embodiments. FIG. 7j shows a structural schematic diagram of an intelligent cooking device provided by one embodiment of the present disclosure. As shown in FIG. 7j, the apparatus comprises: a recipe acquisition module 602 and a recipe transmitting module 604.

The recipe acquisition module 602 may be configured to acquire a recipe, wherein the recipe comprises corresponding multi-machine simultaneous cooking time information.

The recipe transmitting module 604 may be configured to transmit the recipe to an intelligent terminal to enable the intelligent terminal to acquire a multi-machine simultaneous cooking instruction, wherein the multi-machine simultaneous cooking instruction is generated according to multi-machine simultaneous cooking time information corresponding to the recipe, and to enable the intelligent terminal to control a first intelligent automatic cooker to execute the multi-machine simultaneous cooking instruction, so that the first intelligent automatic cooker executes a cooking operation corresponding to the recipe at the time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

Since the recipe acquired by the apparatus includes corresponding multi-machine simultaneous cooking time information, and the recipe is transmitted to the intelligent terminal to enable the intelligent terminal to acquire a multi-machine simultaneous cooking instruction, and the multi-machine simultaneous cooking instruction is generated according to the multi-machine simultaneous cooking time information corresponding to the recipe, the first intelligent automatic cooker may be enabled to execute a cooking operation corresponding to the recipe simultaneously with other intelligent automatic cookers by controlling the first intelligent automatic cooker to execute the multi-machine simultaneous cooking instruction. Therefore, according to the apparatus, a cooperation channel among a plurality of intelligent automatic cookers is established through the multi-machine simultaneous cooking time information that corresponds to recipe, so that the two or more intelligent automatic cookers may respectively simultaneously execute operations corresponding to the same recipe at the time corresponding to the multi-machine simultaneous cooking time information, and the cooking of the same recipe may be precisely and simultaneously executed by a respective automatic cooker without too much time and energy of the user, thereby overcoming defects of social functions of the automatic cookers and improving user experience.

Figure 7K:
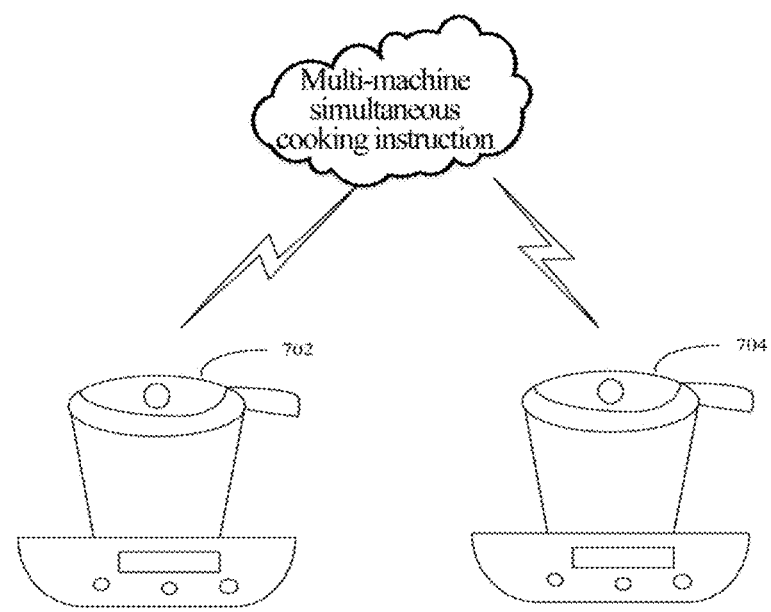
FIG. 7k is a structural schematic diagram of an intelligent cooking system provided by embodiments of the present disclosure.

FIG. 7k shows a structural schematic diagram of an intelligent cooking system according to embodiments in another aspect of the present disclosure. As shown in FIG. 7k, the intelligent cooking system may include: two or more intelligent automatic cookers such as an intelligent automatic cooker 702 and an intelligent automatic cooker 704. The two or more intelligent automatic cookers are respectively configured to: acquire the multi-machine simultaneous cooking instruction, and the multi-machine simultaneous cooking instruction is generated according to multi-machine simultaneous cooking time information corresponding to a recipe; and to execute the multi-machine simultaneous cooking instruction, so that the two or more intelligent automatic cookers respectively execute the cooking operation corresponding to the recipe at the time corresponding to the multi-machine simultaneous cooking time information at the same time.

Figure 7L:
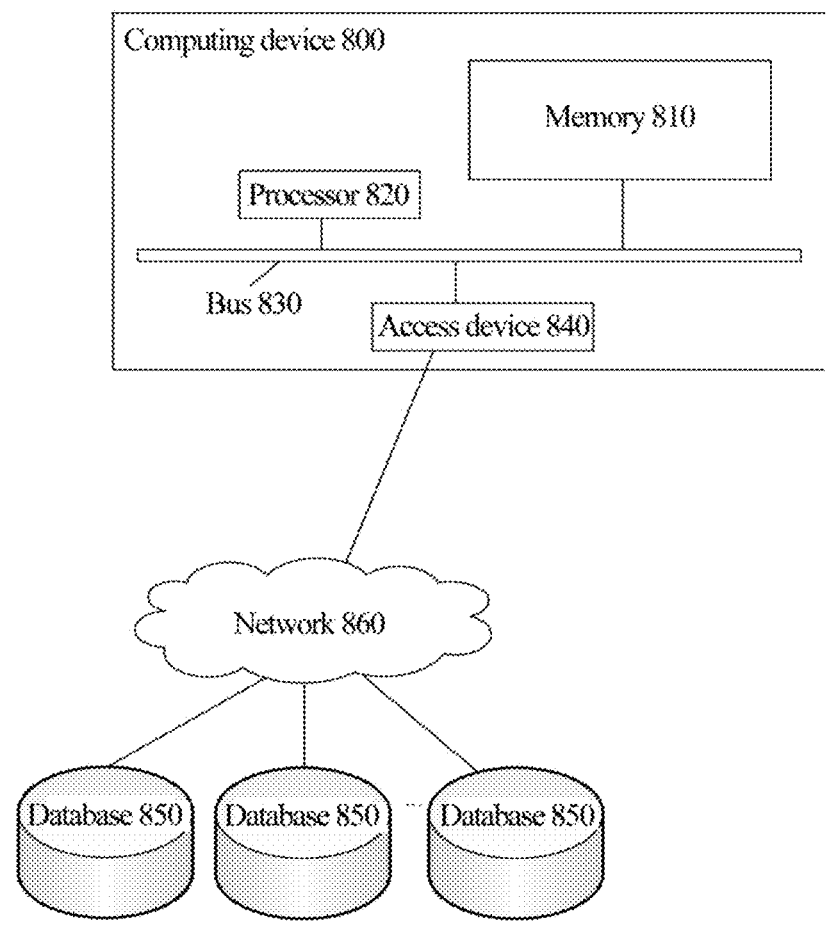
FIG. 7l is a structure diagram of a computing device provided by embodiments of the present disclosure.

FIG. 7l shows a structure diagram of a computing device 800 provided according to one embodiment of the present disclosure. Components of the computing device 800 include, but are not limited to, a memory 810 and a processor 820. The processor 820 is connected to the memory 810 via a bus 830; and a database 850 is used for saving the data.

The computing device 800 further includes an access device 840 that enables the computing device 800 to communicate via one or more networks 860. Examples of such networks include combinations of a public switched telephone network (PSTN), a local area network (LAN), a wide area network (WAN), a personal area network (PAN), or communication networks such as the Internet. The access device 840 may include one or more of wired or wireless network interfaces of any type (e.g. a network interface card (NIC)), such as an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface and a near field communication (NFC) interface.

In one embodiment of the present disclosure, the above components of the computing device 800, as well as other components not shown in FIG. 7l, may also be connected to each other, for example, through a bus. It should be understood that, the structure diagram of the computing device shown in FIG. 7l is merely for illustrative purposes, rather than limiting the scope of the present disclosure. Other components may be added or substituted by those skilled in the art according to requirements.

The computing device 800 may be any type of stationary or mobile computing devices, including mobile computers or mobile computing devices (e.g. tablet computers, personal digital assistants, laptop computers, notebook computers, netbooks, etc.), mobile phones (e.g. smartphones), wearable computing devices (e.g. smartwatches, smart glasses, etc.) or other types of mobile devices, or stationary computing devices such as desktop computers or PCs. The computing device 800 may also be a mobile or stationary server. The computing device 800 may also be an intelligent automatic cooker.

Under a condition that the computing device 800 is the intelligent automatic cooker, the structure of the intelligent automatic cooker may be different according to different intelligence degrees of the intelligent automatic cooker. For example, in some intelligent automatic cookers, the pot cover of the pot body may be automatically opened and closed, and the opening/closing state of the pot cover may be monitored by a sensor. For another example, some intelligent automatic cookers may be equipped with display screens through which various types of cooking information may be broadcast. For another example, the pot bodies of some intelligent automatic cooker may be equipped with cooking mechanisms, such as stirrers and stir fryers. The intelligent automatic cookers may automatically control operating states and operating duration of the cooking mechanisms. For example, in one or more embodiments, a plurality of seasoning boxes may be configured on the intelligent automatic cooker; and corresponding seasonings may be contained in the seasoning boxes. In some application scenarios, to automatically control the adding amount of the seasonings, various seasonings may be premade in the liquid form. Thus, the seasonings may be conveniently added to the pot body by controlling the opening and closing of the seasoning box pipeline. In one or more embodiments, the intelligent automatic cooker may be of an integrated design; an operating system may be built in the intelligent automatic cooker; and a display screen may be installed on the intelligent automatic cooker. Moreover, the intelligent automatic cooker may receive various instructions input by a user and may feedback various types of information about a cooking process to the user via a touch operating method or a key operating method. In addition, the intelligent automatic cooker may also be of a separate design, and a wireless or wired communication module may be installed on the intelligent automatic cooker. The intelligent automatic cooker may establish communication connection with an external intelligent device through a built-in communication module. For example, the intelligent automatic cooker may establish wireless connection with a smartphone, a smart speaker, an intelligent TV box and other devices via a wireless module such as Wi-Fi, Bluetooth, ZigBee and NFC (Near Field Communication, near field communication), and may also establish wired connection with the smartphone, the smart speaker, the intelligent TV box and other devices via a wired module such as a serial port, a USB interface and a Lightning interface. Thus, the user may transmit various instructions to the intelligent automatic cooker by manipulating an external intelligent device, and may monitor various data during cooking of the intelligent automatic cooker through the intelligent device.

In an aspect, the processor 820 may be used for executing the following computer executable instructions:

acquiring a multi-machine simultaneous cooking instruction, wherein the multi-machine simultaneous cooking instruction is generated according to multi-machine simultaneous cooking time information corresponding to a recipe; and controlling a first intelligent automatic cooker to execute the multi-machine simultaneous cooking instruction, so that the first intelligent automatic cooker executes a cooking operation corresponding to the recipe at the time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

In another aspect, the processor 820 may be used for executing the following computer executable instructions:

acquiring a recipe, wherein the recipe includes corresponding multi-machine simultaneous cooking time information; and transmitting the recipe to an intelligent terminal to enable the intelligent terminal to acquire a multi-machine simultaneous cooking instruction, wherein the multi-machine simultaneous cooking instruction is generated according to multi-machine simultaneous cooking time information corresponding to the recipe, and to enable the intelligent terminal to control a first intelligent automatic cooker to execute the multi-machine simultaneous cooking instruction, so that the first intelligent automatic cooker executes a cooking operation corresponding to the recipe at the time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

The above description is an illustrative solution of a computing device in the present embodiment. It should be noted that, the technical solution of the computing device and the technical solution of the above intelligent cooking method fall within the same concept; and details, which are not described in detail, of the technical solution of the computing device may all refer to the description of the technical solution of the above intelligent cooking method.

One embodiment of the present disclosure further provides a computer readable storage medium storing a computer instruction.

In one aspect, when executed by a processor, the instruction is used for:

acquiring a multi-machine simultaneous cooking instruction, wherein the multi-machine simultaneous cooking instruction is generated according to multi-machine simultaneous cooking time information corresponding to a recipe; and controlling a first intelligent automatic cooker to execute the multi-machine simultaneous cooking instruction, so that the first intelligent automatic cooker executes a cooking operation corresponding to the recipe at the time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

In another aspect, when executed by a processor, the instruction is used for:

acquiring a recipe, wherein the recipe includes corresponding multi-machine simultaneous cooking time information; and transmitting the recipe to an intelligent terminal to enable the intelligent terminal to acquire a multi-machine simultaneous cooking instruction, wherein the multi-machine simultaneous cooking instruction is generated according to multi-machine simultaneous cooking time information corresponding to the recipe, and to enable the intelligent terminal to control a first intelligent automatic cooker to execute the multi-machine simultaneous cooking instruction, so that the first intelligent automatic cooker executes a cooking operation corresponding to the recipe at the time corresponding to the multi-machine simultaneous cooking time information.

The first intelligent automatic cooker is any one of two or more intelligent automatic cookers; and the other intelligent automatic cookers in the two or more intelligent automatic cookers execute the cooking operation corresponding to the recipe at the time corresponding to the multi-machine simultaneous cooking time information with the first intelligent automatic cooker by acquiring the multi-machine simultaneous cooking instruction.

The above description is an illustrative solution of a computer readable storage medium in the present embodiment. It should be noted that, the technical solution of the storage medium and the technical solution of the above intelligent cooking method fall within the same concept; and details, which are not described in detail, of the technical solution of the storage medium may all refer to the description of the technical solution of the above intelligent cooking method.

A current Internet-of-Things device is generally provided with a corresponding app; and while using the Internet-of-Things device, a user may download the app on a terminal so as to remotely control the Internet-of-Things device via the app to execute a corresponding job task. Specifically, the user can acquire various structured data through the app, and learn basic information of the job task through structured data; thereafter, the user can judge whether the job task needs to be executed based on the above basic information, and if so, the Internet-of-Things device may be triggered to download the structured data, so that the Internet-of-Things device can complete the corresponding job task according to the structured data. The above structured data may be identified by the Internet-of-Things device, made and uploaded to the network by a manufacturer or other users of the Internet-of-Things device, or made and uploaded by a third party.

However, during implementation of the above process, there are at least the following problems:

On the one hand, the information in the structured data on the network has been determined when the structured data is produced, and the information therein is generally provided by one or more people independently, which results in that the timeliness and authenticity of the information in the structured data are difficult to be guaranteed, and the completed target tasks are possibly difficult to meet real expectations of users. On the other hand, the task execution is completed independently by individual users from the beginning to the ending of task execution; it is impossible to seek help from others in the process of task execution; operation results cannot be shared with the others; the whole process has low interactivity and sociality; and the joy of completing the task is low.

To solve the above problems, the embodiments of the present disclosure provide an executing method of a socialized task. An execution subject of the method may be an intelligent terminal device of a user, and the method may be completed by assistance of an Internet-of-Things device and a server. The user intelligent terminal device may be any intelligent terminal device having an app operation function, and may be a mobile phone, a tablet computer and a computer; the Internet-of-Things device may be used for responding to an operation instruction of the user and executing an operation task according to the acquired structured data; and the server may be a network server corresponding to an Internet-of-Things device and is used for storing the structured data, user information and social information among users.

Further, the server may also be divided into a structured data maintenance server and a server corresponding to a session group according to different functions, or may be a server having both a structured data maintenance function and a session group maintenance function. According to different application scenarios, a first application program, a second application program or other apps may be installed on intelligent terminal devices of users, and the users of the apps can transmit job instructions to a certain one or more Internet-of-Things devices so as to trigger the Internet-of-Things devices to execute corresponding job tasks. A user can log in a personal account in the above app and interact with the server by taking the account as a unit, such as, obtaining structured data, user information and social information from the server. For convenience of description, "intelligent terminal device" will be referred to as "intelligent terminal device of the user" in the following embodiments.

The embodiments of the present disclosure will be described below in combination with specific implementation modes, including: the intelligent terminal device downloads the structured data of the target task based on a structured data acquisition request initiated by the target account; the intelligent terminal device adds the target account to the session group corresponding to the target task according to the session group identifier associated with the structured data; and the intelligent terminal device transmits the structured data to an Internet-of-Things device bound to the intelligent terminal device to trigger the Internet-of-Things device to execute a target task.

In the embodiments, a user may log in the own account (e.g. a target account) in an app on the intelligent terminal device and then search or query structured data of a certain target task via the app by using the target account. Then, the intelligent terminal device may receive a structured data acquisition request initiated by the target account, and the structured data acquisition request may at least include an identifier of the target account and an identifier of the target task. Then, according to the identifier of the target task, the intelligent terminal device may search for the structured data of the target task from a server corresponding to the app or other preset storage addresses on the Internet, and then download the structured data of the target task locally.

In the embodiments, after downloading the structured data of the target task, the intelligent terminal device may acquire the session group identifier associated with the structured data. The session group identifier may be an identifier of a session group oriented at a target task, such as may be an ID and a name of the session group; and the session group of the target task may be established after the structured data of the target task is generated, initiated by the producer of the structured data, or automatically established by the server based on the identifier of the target task, and may also be temporarily created by the server after the first user downloads the structured data of the target task. Of course, in terms of the time, the session group of the target task may be dynamically changed, i.e., the session group may be automatically dissolved after created, when preset group dissolving conditions are met, e.g. after 7 days of creation, or when the structured data of the target task is updated. Similarly, after the session group is dissolved, the session group of the target task is re-established when preset group establishment conditions are met. It is worth mentioning that, the server may retain the session information in the dissolved session group; and any user in the newly established session group of the target task may query the session information in the dissolved session group of the target task. In addition, the server may record account identifiers of all users in the session group when the session group is dissolved, and may invite corresponding users to join in the new session group according to all the recorded account identifiers after the new session group is created.

Thereafter, the intelligent terminal device may transmit the identifier carrying the target account and the group joining request of the session group identifier to the session group server, so that the group server adds the target account to the session group that is oriented at the session group identifier and that corresponds to the target task. Herein, the processing of adding the target account to the session group by the intelligent terminal device may occur when the intelligent terminal device completes downloading of the structured data of the target task, may also occur when the intelligent terminal device triggers the Internet-of-Things device to execute the task object of the target task, and may further occur after any preset user operation, such as, after executing a group joining operation by the user or after viewing the content of the structured data by the user.

Optionally, the session group identifier may be set to be pushed with the structured data simultaneously, or set to be recorded inside the structured data; correspondingly, the intelligent terminal device receives the structured data and the session group identifier of the target task pushed by the structured data maintenance server; or, the intelligent terminal device receives the structured data of the target task pushed by the structured data maintenance server, and reads the session group identifier recorded in the structured data.

In the embodiments, the structured data maintenance server may be used for storing and maintaining structured data of all tasks, and when the structured data needs to be added, deleted or updated, corresponding requests may be transmitted to the structured data maintenance server, and the structured data maintenance server performs maintenance processing on the structured data. When the session group corresponding to the target task is established, the structured data maintenance server may obtain a corresponding session group identifier, and then establish an association relationship between the session group identifier and the structured data of the target task. Specifically, the session group identifier and the structured data may be set to be pushed together, namely, when the intelligent terminal device downloads the structured data of the target task, the structured data server may push the session group identifier associated with the structured data at the same time; and the session group identifier may be directly written in the structured data. Thus, depending on different settings of the association relationship, the intelligent terminal device may receive the session group identifier pushed by the structured data maintenance server while receiving the structured data pushed by the structured data maintenance server; or the intelligent terminal device may read the session group identifier recorded in the structured data after receiving the structured data pushed by the structured data maintenance server.

In the embodiments, the management side of the session group may set a condition for a user within the group to automatically exit the session group, or the user may also set a condition for automatically exiting the session group in a personal account (i.e. a group exit condition). Different accounts, different session groups, different accounts in the same session group, or the same account in different groups may all correspond to different group exit conditions. The group exit condition may be specifically set as follows: the intelligent terminal device controls the target account to exit the session group after the target account enters preset duration of the session group; or the intelligent terminal device is set to control the target account to exit the session group while reaching a preset group exit time point; or the intelligent terminal device is set to control the target account to exit the session group after the target account logs out of the intelligent terminal device. Meanwhile, before the account exits the group, the intelligent terminal device may notify the user in the form of displaying text or playing voice to ask the user whether the user agrees to exit the session group. It is worth mentioning that, after the target account exits the session group, although newly generated session information in the session group cannot be continuously received, and personal session information cannot be continuously transmitted to the session group, all the historical session information in the session group that can be consulted can be consulted before exiting of the target account.

Optionally, one structured data may be associated with a plurality of session groups; different accounts may be added into different session groups, and the corresponding processing may be as follows: the intelligent terminal device determines a target session group identifier from a plurality of session group identifiers associated with structured data according to account information about the target account; and the intelligent terminal device adds the target account to the target session group corresponding to the target task according to the target session group identifier.

In the embodiments, after downloading the structured data of the target task, the intelligent terminal device may acquire a plurality of session group identifiers associated with the structured data, the session groups oriented at the session group identifiers are all session groups corresponding to the target task, and different session groups may face different users. For example, a southern session group and a northern session group may exist according to different regions, or a middle-aged session group and a teenager session group may exist according to different crowds, or different groups may exist according to different application scenarios, etc. Then, according to the account information of the target account, the intelligent terminal device may find the identifier of the session group (namely, the target session group identifier) matched with the account information most among the plurality of session group identifiers, so that the target account may be added to the target session group corresponding to the target task according to the target session group identifier.

In the embodiments, after downloading the structured data of the target task, the intelligent terminal device may transmit the structured data to the Internet-of-Things device bound to the intelligent terminal device, so that the Internet-of-Things device performs the execution processing of the target task according to the structured data. Specifically, there are various ways to trigger the Internet-of-Things device to execute the target task, and two possible ways are provided herein: 1, when the intelligent terminal device completes downloading of the structured data, namely, the structured data is transmitted to the Internet-of-Things device in advance via wireless manners such as Bluetooth and Wi-Fi networks, the Internet-of-Things device parses the structured data and starts timing, and the target task is started to be executed according to the steps recorded in the parsed structured data when reservation time is reached; 2, after acquiring the structured data, the intelligent terminal device parses the structured data and starts timing, and when the reservation time is reached, the cooking steps recorded in the parsed structured data are gradually transmitted to the Internet-of-Things device in the form of an instruction in a wireless manner such as Bluetooth and Wi-Fi, thereby triggering the Internet-of-Things device to start executing the target task according to the received instruction of the steps.

In the embodiments of the present disclosure, the intelligent terminal device downloads the structured data of the target task based on the structured data acquisition request initiated by the target account; the intelligent terminal device adds the target account to the session group corresponding to the target task according to the session group identifier associated with the structured data; and the intelligent terminal device transmits structured data to an Internet-of-Things device bound to the intelligent terminal device, so as to trigger the Internet-of-Things device to execute the target task. Thus, when the user executes the target task by using the Internet-of-Things device, the session group corresponding to the structured data may be automatically added, so that the user may discuss and share related contents of the structured data in the session group with other users, may also consult historical session information in the session group, and further comprehensively and truly know the structured data based on the above processing. Therefore, interactivity and sociability in the execution process of the task object are enhanced; and execution enjoyment of the task object is improved.

Based on the same technical concept, the embodiments of the present disclosure further provide a socialized task object execution apparatus, comprising: a structured data downloading module, used for downloading structured data of a target task based on a structured data acquisition request initiated by a target account; a group adding module, used for adding the target account to a session group corresponding to the target task according to a session group identifier associated with the structured data; and a triggering module, used for transmitting the structured data to an Internet-of-Things device bound to the triggering module, and triggering the Internet-of-Things device to execute the target task.

Optionally, the apparatus further comprises: a group session module, used for receiving group session information transmitted by a server corresponding to the session group, and uploading personal session information generated by the target account to the server; a record query module, used for receiving a record query request of a target information dimension initiated by the target account, and transmitting a dimension identifier of the target information dimension to a server corresponding to the session group, so that the server feeds back session information under the target information dimension in the session group, wherein the target information dimension at least comprises a time dimension, a content dimension and an attribution dimension; and a group exit module, used for controlling the target account to exit the session group after the target account enters preset duration of the session group, or when a preset exit time point is reached, or after the target account logs out of the intelligent terminal device.

One exemplary embodiment of the present disclosure provides an intelligent terminal device. The intelligent terminal device may be used for implementing the execution of the socialized task object provided in the above embodiment, comprising the memory and the processor; the memory is used for storing a computer program, and the processor is used for executing the computer program in the memory to implement the executing method of the socialized task provided by the above method embodiments. Detailed description refers to the above method embodiments. Unnecessary details are not given herein.

In some optional embodiments, the Internet-of-Things device in the above embodiments may be implemented as a kitchen robot, such as an intelligent automatic cooker; correspondingly, the structured data may be implemented as an electronic recipe used by the kitchen robot; and the executed job task may be cooking of a dish. Based on this, the technical solution of the present disclosure is described below in detail by taking the Internet-of-Things device implemented as an automatic cooker as an example.

Figure 8A:
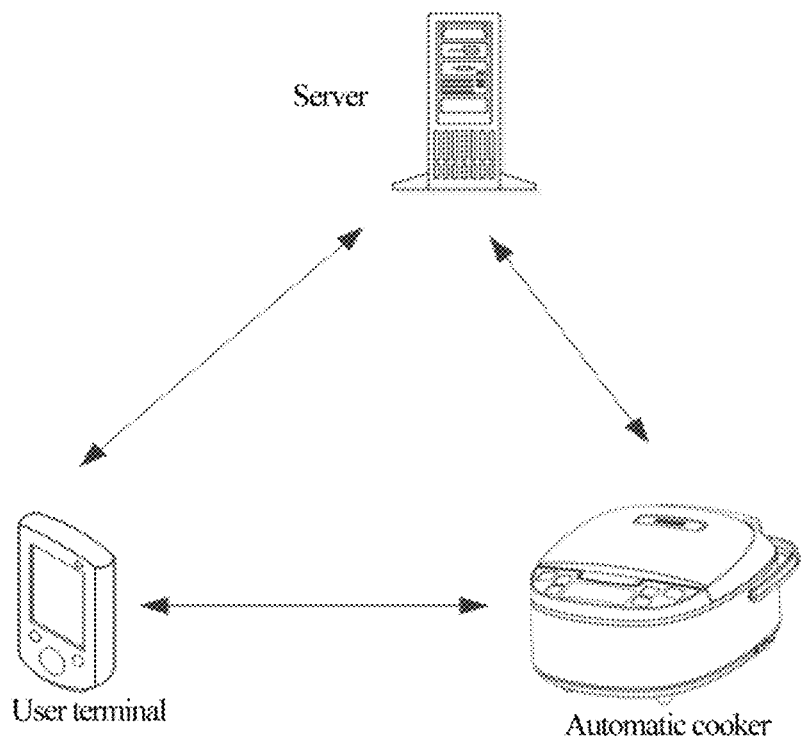
FIG. 8a is a schematic diagram of a socialized dish cooking application scenario provided by embodiments of the present disclosure.

The embodiments of the present disclosure provide a socialized dish cooking method. An execution subject of the method may be a user terminal. The method may be completed by assistance of an intelligent automatic cooker and a server. The specific application scenario may be shown in FIG. 8a. The user terminal may be any intelligent terminal having an app operation function, and may be a mobile phone, a tablet computer and a computer; the automatic cooker may be used for responding to a dish cooking instruction of the user and cooking the corresponding dish according to the acquired recipe; and the server may be a network server corresponding to an intelligent automatic cooker and is used for storing the recipe, user information and social information among users. Further, the server may also be divided into a recipe maintenance server and a server corresponding to a session group according to different functions, or may be a server having both a recipe maintenance function and a session group maintenance function. According to different application scenarios, a cooking app, an ordering app or a take-away app may be installed on the user terminal, and the users of the apps may transmit dish cooking instructions to a certain one or more intelligent automatic cookers so as to trigger the intelligent automatic cookers to start cooking corresponding dishes. A user can log in a personal account in the above app and interact with the server by taking the account as a unit, such as, obtaining the recipe, user information and social information from the server. For convenience of description, "terminal" will be referred to as "user terminal" and "automatic cooker" will be referred to as "intelligent automatic cooker" in the following embodiments.

Figure 8B:
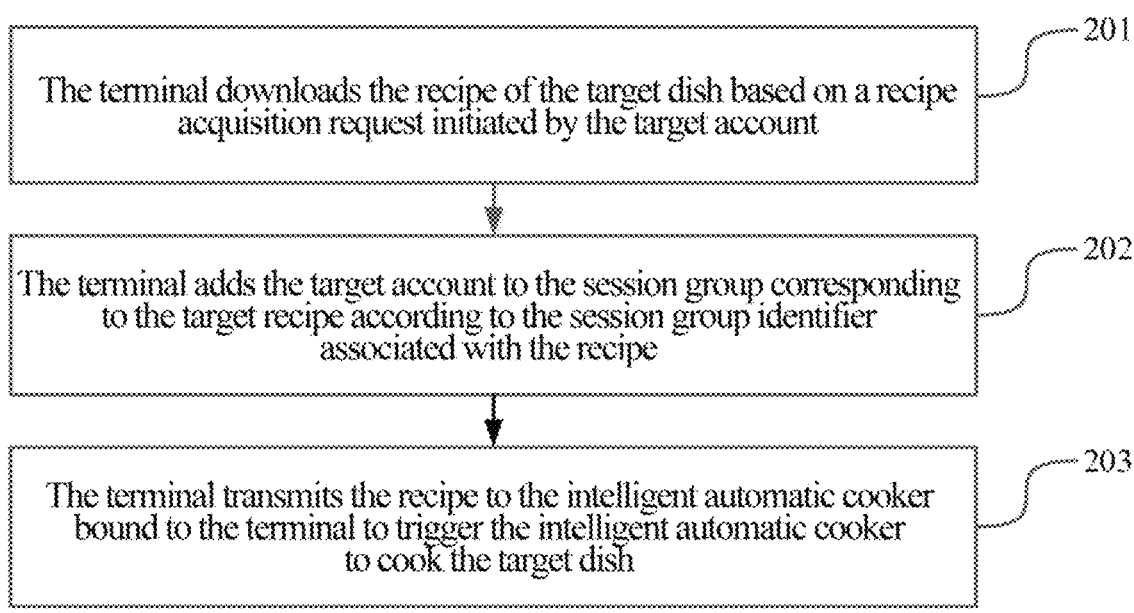
FIG. 8b is a flow chart of a socialized dish cooking method provided by embodiments of the present disclosure.

The processing flow shown in FIG. 8b will be described below in detail in combination with specific implementation modes as follows:

Step 201, the terminal downloads the recipe of the target dish based on a recipe acquisition request initiated by the target account.

In the embodiments, the user may log in the own account (e.g. target account) in the app on the terminal, and then search or query the recipe of a certain dish (e.g. target dish) using the target account through the app. Then, the terminal may receive the recipe acquisition request initiated by the target account; and the recipe acquisition request may at least include an identifier of the target account and an identifier of the target dish. Then, the terminal may search for the recipe of the target dish from a server corresponding to the app or other preset storage addresses on the Internet according to the identifier of the target dish, and then download the recipe of the target dishes locally.

Step 202, the terminal adds the target account to the session group corresponding to the target recipe according to the session group identifier associated with the recipe.

In the embodiments, after downloading the recipe of the target dish, the terminal may acquire the session group identifier associated with the recipe. The session group identifier may be an identifier of a session group oriented at a target dish, such as may be an ID and a name of the session group; and the session group of the target dish may be established after the recipe of the target dish is generated, initiated by the producer of the recipe, or automatically established by the server based on the identifier of the target dish, and may also be temporarily created by the server after the first user downloads the recipe of the target dish. Of course, in terms of the time, the session group of the target dish may be dynamically changed, i.e., the session group may be automatically dissolved after created, when preset group dissolving conditions are met, e.g. after 7 days of creation, or when the recipe of the target dish is updated. Similarly, after the session group is dissolved, the session group of the target dish is re-established when preset group establishment conditions are met. It is worth mentioning that, the server may retain the session information in the dissolved session group; and any user in the newly established session group of the target dish may query the session information in the dissolved session group of the target dish. In addition, the server may record account identifiers of all users in the session group when the session group is dissolved, and may invite corresponding users to join in the new session group according to all the recorded account identifiers after the new session group is created.

Thereafter, the terminal may transmit the identifier carrying the target account and the group joining request of the session group identifier to the session group server, so that the group server adds the target account to the session group that is oriented at the session group identifier and that corresponds to the target dish. Herein, the processing of adding the target account to the session group by the terminal may occur when the terminal completes downloading of the recipe of the target dish, may also occur when the terminal triggers the automatic cooker to cook the target dish, and may further occur after any preset user operation, such as, after executing a group joining operation by the user or after viewing the content of the recipe by the user.

Optionally, the session group identifier may be set to be pushed with the recipe simultaneously, or set to be recorded inside the recipe; and correspondingly, before the step 202, the following processing may be comprised:

The terminal receives a recipe and a session group identifier of the target recipe pushed by a recipe maintenance server; or, the terminal receives the recipe of the target dish pushed by the recipe maintenance server and reads the session group identifier recorded in the recipe.

In the embodiments, the recipe maintenance server may be used for storing and maintaining recipes of all the dishes; and when the recipes need to be added, deleted or updated, corresponding requests may be transmitted to the recipe maintenance server, and the recipe maintenance server performs maintenance processing on the recipes. When a session group corresponding to a target dish is established, the recipe maintenance server may acquire a corresponding session group identifier, and then establish an association relationship between the session group identifier and the recipe of the target dish. Specifically, the session group identifier and the recipe may be set to be pushed together, namely, when the terminal downloads the recipe of the target dish, the recipe server may push the session group identifier associated with the recipe at the same time; and the session group identifier may be directly written in the recipe. Thus, depending on different settings of the association relationship, the terminal may receive the session group identifier pushed by the recipe maintenance server while receiving the recipe pushed by the recipe maintenance server; or the terminal may read the session group identifier recorded in the recipe after receiving the recipe pushed by the recipe maintenance server.

Optionally, after the target account is added to the session group, the user may perform session exchange within the session group via the target account, and the corresponding processing may be as follows: the terminal receives group session information transmitted by a server corresponding to the session group, and uploads personal session information generated by a target account to the server.

In the embodiments, after the terminal adds a target account to the session group, the server corresponding to the session group may mark the target account and actively transmit new group session information generated in the session group to a terminal registered with the target account, so that the terminal may receive the above group session information and display the group session information to the user. Of course, the user may release a personal session message in the session group via the target account, such as asking or sharing about dishes, so that the terminal may upload the personal session information generated by the target account to the server corresponding to the above session group. The above session group supports session information in various formats, such as character, picture, voice, video, and expressions. Further, the user may set a personal head shot nickname after entering the session group; and the head shot nick name may be displayed during session chatting.

Optionally, after joining in the session group, the user may query session information of different information dimensions as required, and the corresponding processing may be as follows: the terminal receives a record query request of a target information dimension initiated by a target account, and transmits a dimension identifier of the target information dimension to a server corresponding to a session group, so that the server feeds back session information under the target information dimension in the session group.

In the embodiments, after the terminal adds the target account to the session group, the user may consult all the historical session information in the session group through the target account on the terminal. The session group may support consulting the historical session information according to a plurality of information dimensions. For example, the historical session information may be consulted from a time dimension, a content dimension and an attribution dimension. For example, the user may consult all the historical session information within 2 days before entering the session group, or consult all the historical session information containing the keyword "taste", or consult all the historical session information belonging to a recipe modification suggestion, or consult all the historical session information released by a certain user. It may be understood that, the server corresponding to the session group may summarize and organize the session information generated in the session group according to different information dimensions. For example, in terms of the content dimension, information about the dimensions such as dish cooking experience, recipe modification suggestions, dish tastes and dish evaluation may be screened from all the historical session information for a user to consult.

After the user performs the consulting operation, the terminal may receive the record query request of the target information dimension initiated by the target account, and thus may transmit a dimension identifier of the target information dimension to the server corresponding to the session group, so that the server screens corresponding historical session information according to the dimension identifier, and feeds back the filtered session information in the target information dimension to the terminal.

Optionally, after entering the session group, the target account may automatically exit the session group when a preset condition is met, and the following processing may exist after the corresponding step 202: the terminal controls the target account to exit the session group after the target account enters preset duration of the session group, or when a preset group exit time point is reached, or after the target account logs out of the terminal.

In the embodiments, the management side of the session group may set a condition for a user within the group to automatically exit the session group, or the user may also set a condition for automatically exiting the session group in a personal account (i.e. a group exit condition). Different accounts, different session groups, different accounts in the same session group, or the same account in different groups may all correspond to different group exit conditions. The group exit condition may be specifically set as follows: the terminal controls the target account to exit the session group after the target account enters the preset duration of the session group; or the terminal controls the target account to exit the session group when the preset exit time point is reached; or the terminal controls the target account to exit the session group after the target account logs out of the terminal. Meanwhile, before the account exits the group, the terminal may notify the user in the form of displaying characters or playing voice to ask the user whether the user agrees to exit the session group. It is worth mentioning that, after the target account exits the session group, although newly generated session information in the session group cannot be continuously received, and personal session information cannot be continuously transmitted to the session group, all the historical session information in the session group that can be consulted can be consulted before exiting of the target account.

Optionally, the recipe of one dish may be associated with a plurality of session groups; different accounts may be added into different session groups; and corresponding processing may be as follows: the terminal determines a target session group identifier in a plurality of session group identifiers associated with the recipe according to the account information of the target account; and the terminal adds the target account to the target session group corresponding to the target dish according to the target session group identifier.

In the embodiments, after downloading the recipe of the target recipe, the terminal may acquire a plurality of session group identifiers associated with the recipe, the session groups oriented at the session group identifiers are all session groups corresponding to the target recipe; and different session groups may face different users. For example, a southern session group and a northern session group may exist according to different regions, or a middle-aged session group and a teenager session group may exist according to different crowds, or a home cooking session group, a restaurant session group, a take-out session group and an activity session group may exist according to different application scenarios. Then, according to the account information of the target account, the terminal may find an identifier of a session group (namely, a target session group identifier) matched with the account information most among the plurality of session group identifiers, so that the target account may be added to the target session group corresponding to the target dish according to the target session group identifier.

Step 203, the terminal transmits the recipe to the intelligent automatic cooker bound to the terminal to trigger the intelligent automatic cooker to cook the target dish.

In the embodiments, after downloading the recipe of the target dish, the terminal may transmit the recipe to the intelligent automatic cooker bound to the terminal, so that the intelligent automatic cooker performs the cooking processing of the target dish according to the recipe. Specifically, there are various ways to trigger the intelligent automatic cooker to cook the dish, and two possible ways are provided herein: 1, when the terminal completes downloading of the recipe, namely, the recipe is transmitted to the intelligent automatic cooker in advance via wireless manners such as Bluetooth and Wi-Fi networks, the intelligent automatic cooker parses the recipe and starts timing, and the target dish is cooked according to the cooking steps recorded in the parsed recipe when reservation time is reached; 2, after acquiring the recipe, the terminal parses the recipe and starts timing, and when the reservation time is reached, the cooking steps recorded in the parsed recipe are gradually transmitted to the intelligent automatic cooker in the form of an instruction in a wireless manner such as Bluetooth and Wi-Fi, thereby triggering the intelligent automatic cooker to start cooking the target dish according to the received instruction of the cooking steps.

Figure 8C:
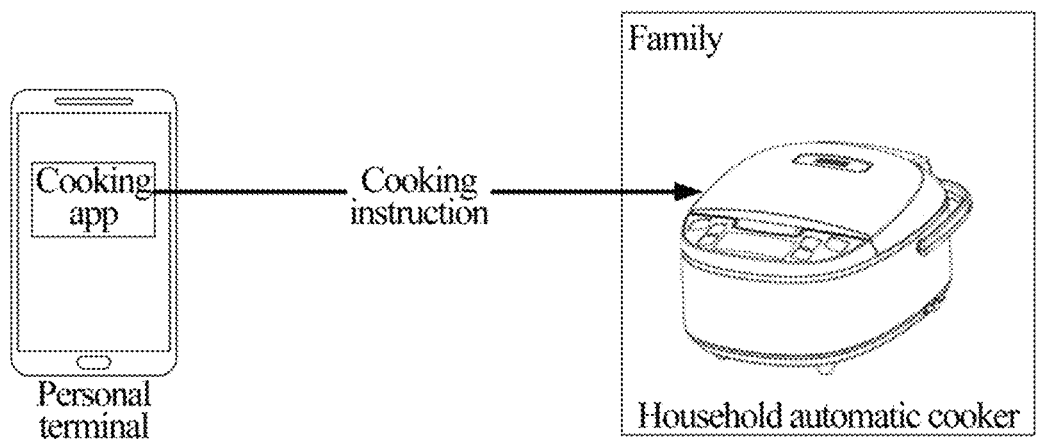
FIG. 8c is a schematic diagram of another socialized dish cooking application scenario provided by embodiments of the present disclosure.

Optionally, the processing of the steps 201-203 may be applied to a variety of scenarios; and a variety of common application scenarios are exemplarily given below:

In the application scenario I, as shown in FIG. 8c, the terminal is a user personal terminal, for example, a mobile phone or a tablet computer; and the automatic cooker is a household automatic cooker. The processing of downloading the recipe may be as follows: the terminal receives a recipe acquisition request of the target recipe initiated by the target account through the cooking app, and downloads the recipe of the target dish.

In the embodiments, after purchasing an automatic cooker, the user may install a cooking app matched the automatic cooker on a terminal, register and log in an account on the cooking app, and then perform associated binding on the automatic cooker and the account. Thus, the user may search the recipe of the target dishes by the cooking app before cooking the target dishes by utilizing the automatic cooker. Then, the terminal may receive the recipe acquisition request of the target dish initiated by the target account through the cooking app, so that the recipe of the target dish may be searched and downloaded. Next, the user may prepare the food materials and auxiliary materials required by the target dishes on the automatic cooker according to the contents of the recipes, and select and click on the corresponding recipes of the target dishes on the cooking APP so as to trigger the terminal to transmit the recipes to the automatic cooker via wireless communication, so that the automatic cooker starts to cook the target dishes at the set time. Meanwhile, after acquiring the session group identifier associated with the recipe, the terminal may ask the user whether to join the session group corresponding to the target recipe in the form of displaying a notification. If the user determines to join, the terminal may request the server to add the target account to the session group corresponding to the target dish, and all the users in the session group may be users who have consulted the recipes of the target dishes or have cooked and tasted the target dishes and have some understanding to the target dishes. Therefore, after entering the session group, the user may interact with other users in the session group. For example, the user may share the experience and feelings of cooking dishes, or exchange recipe modification suggestions, and may also comment on the taste and mouthfeel of the target dishes. Session records exchanged and shared by all users within the session group are automatically stored in the server and associated with the session group; and all the session records associated with the session group may be consulted whenever the users join in the session group.

Figure 8D:
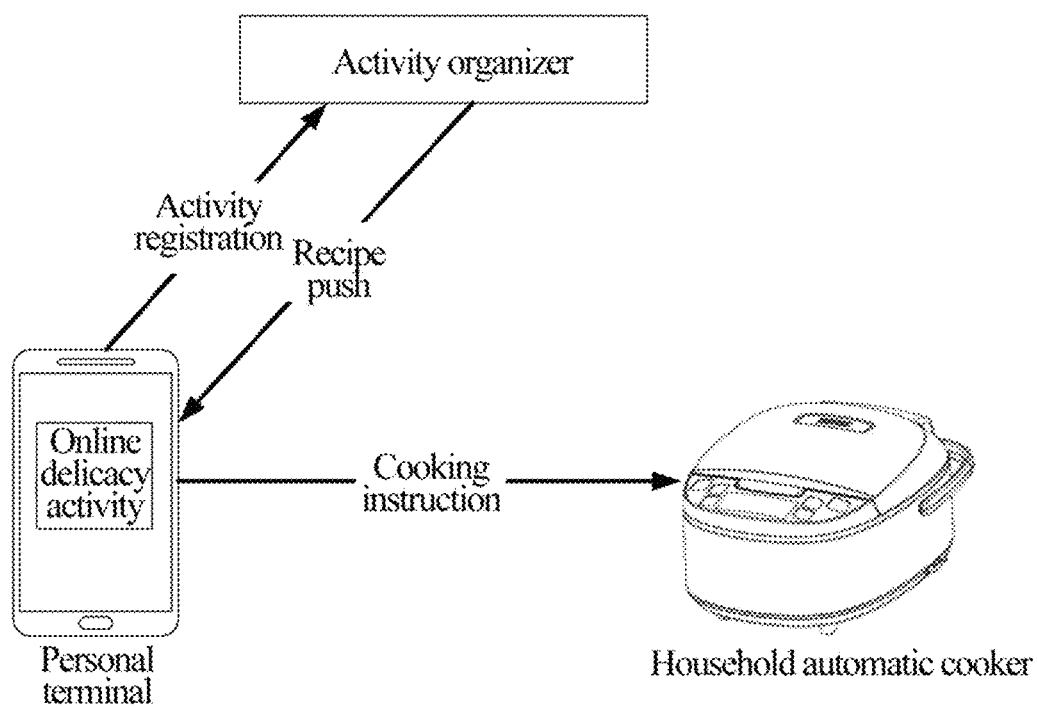
FIG. 8d is a schematic diagram of another socialized dish cooking application scenario provided by embodiments of the present disclosure.

In application scenario II, as shown in FIG. 8d, the terminal is a user personal terminal, for example, a mobile phone or a tablet computer, and the automatic cooker is a household automatic cooker. The processing of downloading the recipe is as follows: the terminal receives a recipe acquisition request of the target dish initiated by the target account via an online delicacy activity at a regular time, and downloads the recipe of the target dish.

In the embodiments, an automatic cooker manufacturer or other merchants may conduct online delicacy activities of allowing many people to simultaneously cook and taste the same dish (target dish), such as "online banquet" and "delicacy sharing". The users may sign up for participating in these online delicacy activities through a personal account (e.g. a target account) on the terminal, so that the target dishes may be cooked using the own home automatic cookers after the start of the activities. After the registration of the online delicacy activity is finished, the terminal may periodically transmit a recipe acquisition request of the target dishes to a server corresponding to an activity organizer, an Internet platform or an automatic cooker according to the content setting of the online delicacy activity, so as to download the recipe of the target dishes. Meanwhile, after acquiring the session group identifier associated with the recipe, the terminal may ask the user whether to join the session group corresponding to the target recipe in the form of displaying a notification. If the user determines to join, the terminal may request the server to add the target account to the session group corresponding to the target dish; and all the users in the session group may be other users participating in the present activity. Therefore, after entering the session group, the user may interact with other users in the session group. For example, the user may share the activity process and results, or exchange recipe modification suggestions, and may also comment on the taste and mouthfeel of the target recipe, etc. Session records exchanged and shared by all users within the session group are automatically stored in the server and associated with the session group; and all the session records associated with the session group may be consulted whenever the users join in the session group. It should be noted that, the above session group may be a specially established activity session group corresponding to the target dish when the activity organizer initiates the online delicacy activity; and all users participating in the online delicacy activity of the target dish may enter the activity session group. When the user participates in the online delicacy activity of a subsequent target dish (such as a second-stage activity), or when the user acquires the recipe of the target dish, historical record information within the activity session group may be called, and information of interest to the user may be quickly consulted therein, so as to improve the user experience of using the automatic cooker and cooking delicious dishes.

Figure 8E:
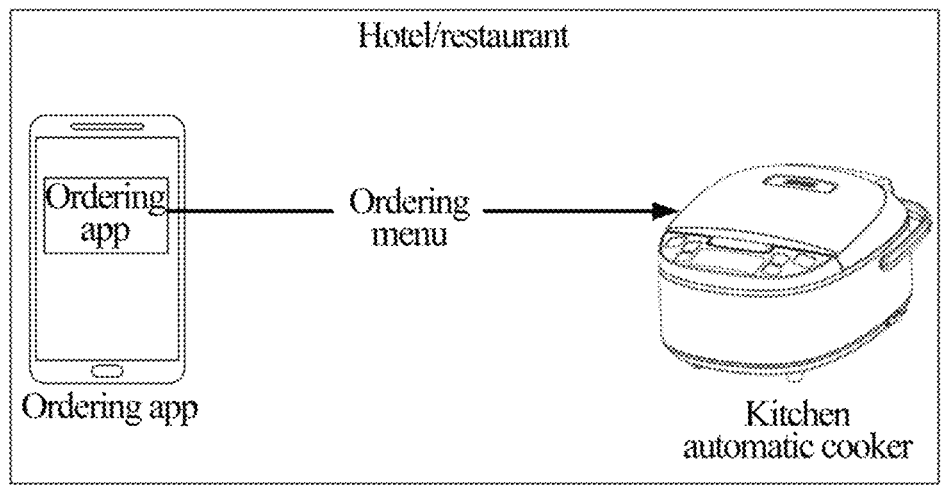
FIG. 8e is a schematic diagram of another socialized dish cooking application scenario provided by embodiments of the present disclosure.

In the application scenario III, as shown in FIG. 8e, the terminal is an ordering terminal of the catering industry, for example, an iPAD; and the automatic cooker is a kitchen automatic cooker for hotels/restaurants. The processing of downloading the recipe may be as follows: the terminal receives a recipe acquisition request of a target dish initiated by a target account via an ordering app, and downloads a recipe of the target dish.

In the embodiments, the hotel/restaurant party may purchase the automatic cookers in batches and set the automatic cookers as kitchen automatic cookers. Moreover, the automatic cooker manufacturer may develop corresponding ordering apps for the kitchen automatic cooker for the catering industry, so that the hotel/restaurant party may install and run the above ordering app on the dish ordering terminal. When the user needs to order dishes, an account (the account may be a personal account registered in advance by the user or a temporary account created by the terminal for the user) may be logged in the ordering app, and then recipes of various dishes may be queried in the ordering app to perform dish ordering. Thus, when the terminal receives the recipe acquisition request of the target dishes initiated by the target account through the ordering app, the recipes of the target dishes may be downloaded, and simultaneously the user is asked whether to join in a session group corresponding to the target dishes. If the user determines to join, the terminal may request the server to add the target account to the session group corresponding to the target dishes, and all the users in the session group may be users who have consulted the recipes of the target dishes in the hotel/restaurant within a certain time (such as, within a day, within a week), or who have tasted the target dishes and have a certain understanding to the target dishes provided by the hotel/restaurant. Therefore, after entering the session group, the user may interact with other users in the session group. For example, the user may share the current dining experience of the hotel/restaurant, and may also comment on the taste and mouthfeel of the target dishes, etc. Session records exchanged and shared by all users within the session group are automatically stored in the server and associated with the session group; and all the session records associated with the session group may be consulted whenever the users join in the session group. It is worth mentioning that, each time the user browses the recipe of a dish while ordering dishes, the terminal may inquire whether the user joins in the session group corresponding to the dish, and the user may join in a session group corresponding to one or more dishes according to own preference, browse historical discussion information in the session group, or ask questions and speak in the session group so as to better understand the taste and mouthfeel of the current dish.

Figure 8F:
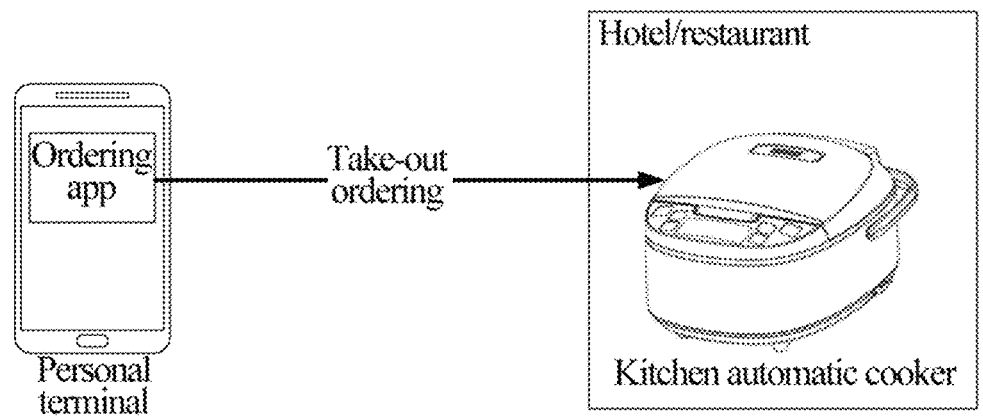
FIG. 8f is a schematic diagram of another socialized dish cooking application scenario provided by embodiments of the present disclosure.

In the application scenario IV, as shown in FIG. 8f, the terminal is a user personal terminal, for example, a mobile phone or a tablet computer, and the automatic cooker is a kitchen automatic cooker of a hotel/restaurant. The processing of downloading the recipe may be: the terminal receives a recipe acquisition request of a target recipe initiated by a target account via an ordering app, and downloads a recipe of the target dish.

In the embodiments, the hotel/restaurant party may purchase the automatic cookers in batches and set the automatic cookers as kitchen automatic cookers. Moreover, the automatic cooker manufacturer may develop corresponding ordering apps for the kitchen automatic cooker for the catering industry, so that the user may install and run the above ordering app on the personal terminal for remote take-out ordering. When the user needs to order dishes, an account may be logged in the ordering app, and then recipes of various dishes may be queried in the ordering app to perform dish ordering. Thus, when the terminal receives the recipe acquisition request of the target dishes initiated by the target account through the ordering app, the recipes of the target dishes may be downloaded, and simultaneously the user is asked whether to join in a session group corresponding to the target dishes. All the users in the session group may be users who have consulted the recipes of the target dishes in the hotel/restaurant within a certain time (such as, within a day, within a week), or who have ordered target dishes through a take-out system and have a certain understanding to the target dishes provided by the hotel/restaurant. Therefore, after entering the session group, the user may interact with other users in the session group. For example, the user may share take-out experience of the hotel/restaurant, and may also comment on the taste and mouthfeel of the target dishes, etc. Session records exchanged and shared by all users within the session group are automatically stored in the server and associated with the session group; and all the session records associated with the session group may be consulted whenever the users join in the session group. It is worth mentioning that, each time the user browses the recipe of a dish while ordering dishes, the terminal may inquire whether the user joins in the session group corresponding to the dish, and the user may join in a session group corresponding to one or more dishes according to own preference, browse historical discussion information in the session group, or ask questions and speak in the session group so as to better understand the taste and mouthfeel of the current dish.

In the embodiments of the present disclosure, the terminal downloads a recipe of a target recipe based on a recipe acquisition request initiated by a target account; the terminal adds the target account to the session group corresponding to the target recipe according to the session group identifier associated with the recipe; and the terminal transmits the recipe to the intelligent automatic cooker bound to the terminal to trigger the intelligent automatic cooker to cook the target dishes. Thus, when the user cooks the dishes by using the intelligent automatic cooker, the dishes may be automatically added into the session group corresponding to the dishes, so that the user may discuss and share related contents of the cooked dishes in the session group with other users, may also consult historical session information in the session group, and further comprehensively and truly know the dishes based on the above processing. Therefore, interactivity and sociability in the dish cooking process are enhanced; and enjoyment of cooking the dishes is improved.

Figure 8G:
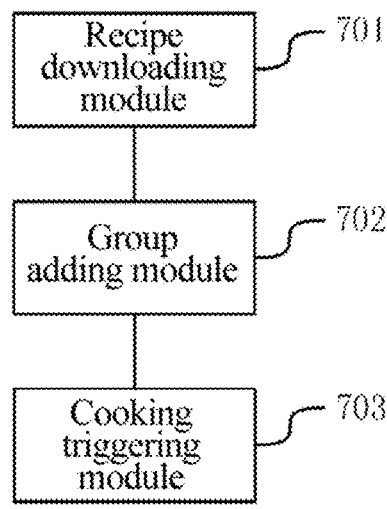
FIG. 8g is a schematic diagram of a socialized dish cooking device provided by embodiments of the present disclosure.

Based on the same technical concept, the embodiments of the present disclosure further provide a socialized dish cooking apparatus. As shown in FIG. 8g, the apparatus comprises:

a recipe downloading module 701, used for downloading a recipe of a target recipe based on a recipe acquisition request initiated by a target account;

a group adding module 702, used for adding the target account to a session group corresponding to the target recipe according to the session group identifier associated with the recipe; and a cooking triggering module 703, used for transmitting the recipe to the intelligent automatic cooker bound to the cooking triggering module, and triggering the intelligent automatic cooker to cook the target dish.

Optionally, the recipe downloading module 701 is specifically used for:

receiving a recipe acquisition request of the target recipe initiated by a target account through a cooking app, and downloading the recipe of the target dish.

The recipe downloading module 701 is specifically used for:

receiving a recipe acquisition request of a target recipe initiated by a target account via an ordering app, and downloading the recipe of the target dish.

The recipe downloading module 701 is specifically used for:

receiving a recipe acquisition request of a target recipe initiated by a target account periodically via an online delicacy activity, and downloading the recipe of the target dish.

Optionally, the recipe downloading module 701 is further used for:

receiving a recipe and a session group identifier of a target recipe pushed by a recipe maintenance server.

Optionally, the recipe downloading module 701 is further used for:

receiving a recipe of a target recipe pushed by a recipe maintenance server, and reading a session group identifier recorded in the recipe.

Optionally, the apparatus further comprises:

a group session module, used for receiving group session information transmitted by a server corresponding to the session group, and uploading personal session information generated by the target account to the server.

Optionally, the apparatus further comprises:

a record query module, used for receiving a record query request of a target information dimension initiated by the target account, and transmitting a dimension identifier of the target information dimension to a server corresponding to the session group, so that the server feeds back session information under the target information dimension in the session group, wherein the target information dimension at least comprises a time dimension, a content dimension and an attribution dimension.

Optionally, the apparatus further comprises:

a group exit module, used for controlling the target account to exit the session group after the target account enters preset duration of the session group, or when a preset group exit time point is reached, or after the target account logs out of the terminal.

Optionally, the group adding module 702 is specifically used for:

determining a target session group identifier from a plurality of session group identifiers associated with the recipe according to account information of the target account; and adding the target account to a target session group corresponding to the target dish according to the target session group identifier.

In the embodiments of the present disclosure, a recipe of a target recipe is downloaded based on a recipe acquisition request initiated by a target account; a target account is added to a session group corresponding to a target recipe according to a session group identifier associated with the recipe; and the recipe is transmitted to an intelligent automatic cooker bound thereto, and the intelligent automatic cooker is triggered to cook a target dish. Thus, when the user cooks the dishes by using the intelligent automatic cooker, the dishes may be automatically added into the session group corresponding to the dishes, so that the user may discuss and share related contents of the cooked dishes in the session group with other users, may also consult historical session information in the session group, and further comprehensively and truly know the dishes based on the above processing. Therefore, interactivity and sociability in the dish cooking process are enhanced; and enjoyment of cooking the dishes is improved.

Figure 8H:
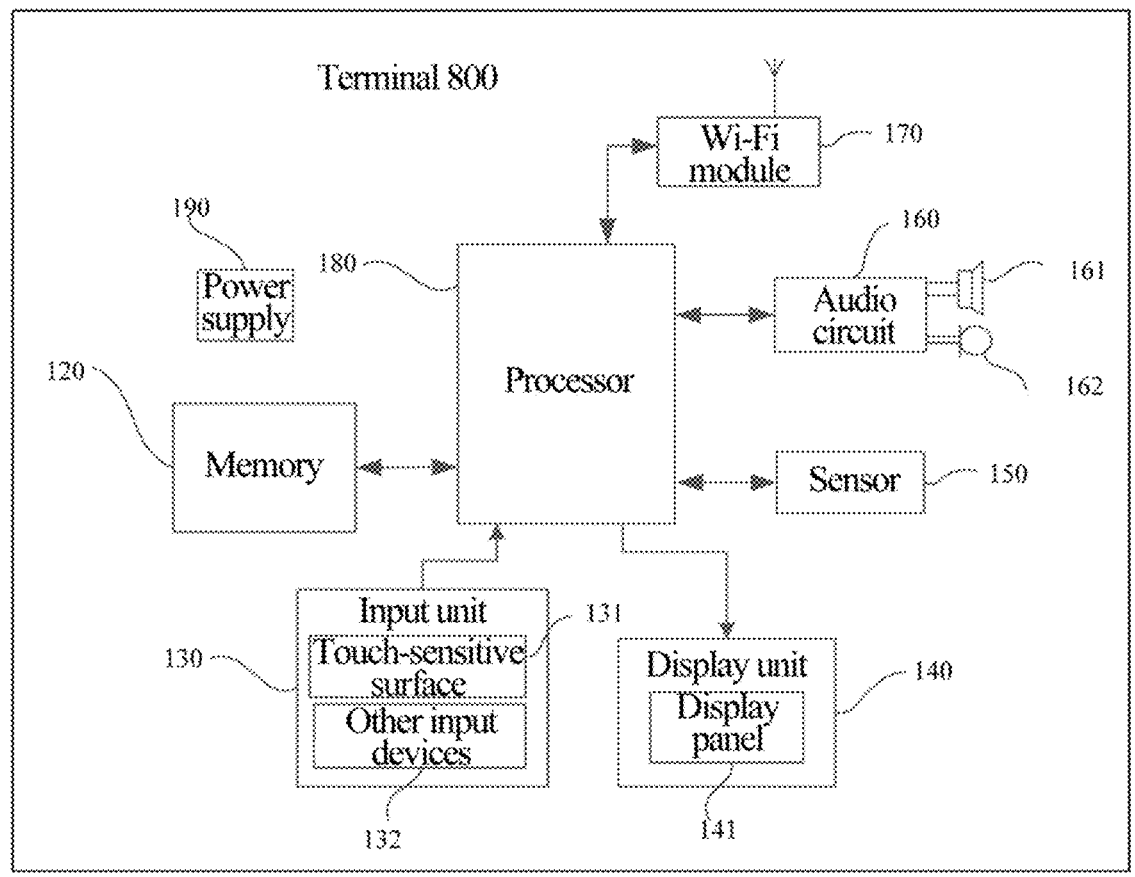
FIG. 8h is a structural schematic diagram of a terminal provided by embodiments of the present disclosure.

FIG. 8h is a structural schematic diagram of a terminal according to an exemplary embodiment. The terminal may be used for implementing the socialized dish cooking provided in the above embodiments.

The terminal 800 may include components such as a memory 120 with one or more computer readable storage media, an input unit 130, a display unit 140, a sensor 150, an audio circuit 160, a Wi-Fi (wireless fidelity) module 170, a processor 180 including one or more processing cores, and a power supply 190. It may be understood by those skilled in the art that, the terminal structure shown in FIG. 8h does not form a limitation to the terminal, and may include more or fewer components than shown, or a combination of some components, or an arrangement of different components, wherein, The memory 120 may be used for storing software programs and modules; and the processor 180 executes the software programs and modules stored in the memory 120 to execute various functional applications and data processing. The memory 120 may mainly comprise a program storing area and a data storing area, wherein the program storing area may store an operating system, an application program required by at least one function (such as a sound playing function and an image playing function); and the data storing area may store data (e.g. audio data and phonebook) and the like created according to the use of the terminal 800. In addition, the memory 120 may include high-speed random access memory and may also include non-volatile memories, such as at least one disk storage device, a flash memory device, or any other volatile solid-state storage device. Correspondingly, the memory 120 may also include a memory controller to provide access to the memory 120 by the processor 180 and the input unit 130.

The input unit 130 may be used for receiving input digital or character information and generating signal input of a keyboard, a mouse, a joystick and an optical or trackball related to user settings and function control. Specifically, the input unit 130 may comprise a touch-sensitive surface 131 as well as other input devices 132. The touch-sensitive surface 131 is also referred to as a touch display screen or a touchpad, and may be used for collecting touch operations on or near the touch-sensitive surface 131 by the user (e.g. operations on or near the touch-sensitive surface 131 by the user using any suitable object or accessory, such as a finger and a touch pen) and driving the corresponding connecting device according to a preset program. Optionally, the touch-sensitive surface 131 may comprise two parts such as a touch detection device and a touch controller. The touch detection device detects a touch orientation of a user, detects a signal brought by a touch operation, and transmits the signal to the touch controller; and the touch controller receives touch information from the touch detection device, converts the touch information into contact coordinates, and transmits the contact coordinates to the processor 180, and may receive an instruction transmitted from the processor 180 and execute the instruction. In addition, the touch-sensitive surface 131 may be implemented through various types such as a resistance type, a capacitance type, infrared rays and surface acoustic waves. In addition to the touch-sensitive surface 131, the input unit 130 may further comprise other input devices 132. Specifically, the other input devices 132 may include, but are not limited to, one or more of a physical keyboard, function keys (such as volume control keys and switch keys), a trackball, a mouse and a joystick.

The display unit 140 may be used for displaying information input by or provided for a user and various graphical user interfaces of the terminal 800; and these graphical user interfaces may be composed of graphics, texts, icons, videos, and any combination thereof. The display unit 140 may include a display panel 141. Optionally, the display panel 141 may be configured in the form of an LCD (Liquid Crystal Display) or an OLED (Organic Light-Emitting Diode). Further, the touch-sensitive surface 131 may cover the display panel 141; and after detecting the touch operation on or near the touch-sensitive surface 131, the touch-sensitive surface 131 transmits the touch operation to determine the type of a touch event, and then the processor 180 provides corresponding visual output on the display panel 141 according to the type of the touch event. In the FIG. 8h, although the touch-sensitive surface 131 and the display panel 141 serving as two separate components are used for realizing input and input functions, in some embodiments, the touch-sensitive surface 131 may be integrated with the display panel 141 for realizing the input and output functions.

The terminal 800 may further include at least one sensor 150, such as a light sensor, a motion sensor, and any other sensor. Specifically, the light sensor may include an ambient light sensor and a proximity sensor. The ambient light sensor may adjust the brightness of the display panel 141 according to the brightness of ambient light; and the proximity sensor may turn off the display panel 141 and/or the backlight when the terminal 800 moves to the ear. As one type of the motion sensor, a gravity acceleration sensor may detect the magnitude of acceleration in various directions (generally three-axis), and detect the magnitude and direction of gravity when stationary, and may be used for applications of recognizing mobile phone gestures (such as horizontal and vertical screen switching, related games, magnetometer gesture calibration), and vibration recognition related functions (such as pedometer, tapping). Other sensors such as gyroscopes, barometers, hygrometers, thermometers and infrared sensors that may also be configured in the terminal 800, which will not be described in detail herein.

The terminal further comprises an audio circuit 160 and a speaker 161. A microphone 162 may provide an audio interface between a user and the terminal 800. The audio circuit 160 may transmit a received electric signal converted by audio data to the speaker 161, and the speaker 161 converts the electric signal into a sound signal for output. Further, the microphone 162 converts the collected sound signal into an electric signal; the electric signal is received by the audio circuit 160 and converted into audio data; then the audio data is output to the processor 180 for processing so as to be transmitted to another terminal via an RF circuit 110, or the audio data is output to the memory 120 for further processing. The audio circuit 160 may further include earplug jacks to provide communication between peripheral headphones and the terminal 800.

The Wi-Fi is a short-range wireless transmission technology. By virtue of a Wi-Fi module 170, the terminal 800 can help a user receive and transmit information, browse webpages and access streaming media, and provides wireless broadband Internet access for the user. Although FIG. 8h shows the Wi-Fi module 170, it may be understood that, the Wi-Fi module does not belong to the necessary constitution of the terminal 800, and may be omitted as needed without changing the scope of essence of the invention.

The processor 180 is a control center of the terminal 800, connects various parts of the whole mobile phone with various interfaces and circuits, and performs various functions of the terminal 800 and executes various functions and processing data by running or executing software programs and/or modules stored in the memory 120 and calling data stored in the memory 120, so as to wholly monitor the mobile phone. Optionally, the processor 180 may include one or more processing cores; and preferably, the processor 180 may integrate an application processor and a modem processor, wherein the application processor mainly processes an operating system, a user interface and an application program, and the modem processor mainly processes wireless communication. It may be understood that, the above modem processor may not be integrated into the processor 180.

The terminal 800 further includes the power supply 190 (e.g. a battery) for supplying power to the various components. Preferably, the power supply may be logically connected to the processor 180 through a power management system, so that functions such as charging and discharging management and power consumption management are realized through the power management system. The power supply 190 may further include any of one or more DC or AC power supplies, a recharging system, a power failure detection circuit, a power converter or inverter, a power state indicator, and the like.

Specifically, in the present embodiment, the display unit of the terminal 800 is a touch screen display; the terminal 800 further includes a memory, and one or more programs, wherein the one or more programs are stored in the memory and configured to be executed by the one or more processors including instructions for socialized dish cooking.

The communication component in the above embodiments is configured to facilitate wired or wireless communication between the device in which the communication component is located and other devices. The device in which the communication component is located may access a wireless network based on a communication standard, such as a mobile communication network like Wi-Fi, 2G, 3G, 4G/LTE and 5G, or a combination thereof. In one exemplary embodiment, the communication component receives a broadcast signal or broadcast-related information from an external broadcast management system via a broadcast channel. In one exemplary embodiment, the communication component may further include a near field communication (NFC) module, a radio frequency identification (RFID) technology, an infrared data association (IrDA) technology, an ultra wide band (UWB) technology and a Bluetooth (BT) technology.

The display screen in the above embodiments includes a screen; and the screen may include a liquid crystal display screen (LCD) and a touch panel (TP). If the screen comprises the touch panel, the screen may be implemented as a touch screen to receive input signals from a user. The touch panel includes one or more touch sensors to sense touches, slides, and gestures on the touch panel. The touch sensors may not only sense the boundaries of a touch or slide action, but also detect the duration and pressure associated with the touch or slide operation.

The power module in the above embodiments supplies power to the various components of the device in which the power module is located. The power components may include a power management system, one or more power supplies, and other components associated with power generation, management and distribution for the device in which the power component is located.

The audio component in the above embodiments may be configured to output and/or input audio signals. For example, the audio component comprises a microphone (MIC); and the MIC is configured to receive external audio signals when the device in which the audio component is located is in an operational mode, such as a call mode, a recording mode and a voice recognition mode. The received audio signal may be further stored in a memory or transmitted via a communication component. In some embodiments, the audio component further comprises a speaker for outputting audio signals.

Those skilled in the art should understand that, the embodiments of the present disclosure may be provided as methods, systems, or computer program products. Correspondingly, the present disclosure may take the form of an entirely hardware embodiment, an entirely software embodiment or an embodiment combining software and hardware aspects. Moreover, the present disclosure may take the form of a computer program product implemented on one or more computer available storage media (including, but not limited to, a disk memory, a CD-ROM and an optical memory) including computer available program codes.

The present disclosure is described with reference to flow charts and/or block diagrams of the methods, devices (systems) and computer program products according to the embodiments of the present disclosure. It should be understood that, each flow and/or block of the flow charts and/or block diagrams, and a combination of flows and/or blocks in the flow charts and/or block diagrams, may be implemented by computer program instructions. These computer program instructions may be provided to a processor of a general-purpose computer, a special-purpose computer, an embedded processor or any other programmable data processing device to produce a machine, so that the instructions that are executed by the processor of the computer or any other programmable data processing device generate an apparatus used for realizing specified functions in one or more flows of the flow charts and/or in one or more blocks of the block diagrams.

These computer program instructions may also be stored in a computer readable memory that can direct the computer or any other programmable data processing device to run in a specified manner, so that the instructions stored in the computer readable memory produce an article of manufacture including an instruction apparatus that realizes specified functions in one or more flows of the flow charts and/or in one or more blocks of the block diagrams.

These computer program instructions may also be loaded onto the computer or any other programmable data processing device to cause a series of operation steps to be executed on the computer or any other programmable device to generate processing implemented by the computer, so that the instructions executed on the computer or any other programmable device provide steps for realizing specified functions in one or more flows of the flow charts and/or in one or more blocks of the block diagrams.

In a typical configuration, the computing device includes one or more central processors (CPU), an input/output interface, a network interface, and a memory.

The memory may include any form of a volatile memory, a random access memory (RAM) and/or a non-volatile memory such as a read-only memory (ROM) or a flash memory (flash RAM) in a computer readable medium. The memory is an example of the computer readable medium.

The computer readable media include volatile and non-volatile, removable and non-removable media; and information storage may be implemented by any method or technology. The information may be computer readable instructions, data structures, modules of programs, or other data. Examples of the storage media for the computer include, but are not limited to, a phase change memory (PRAM), a static random access memory (SRAM), a dynamic random access memory (DRAM), a random access memory (RAM) of any other type, a read-only memory (ROM), an electrically erasable programmable read only memory (EEPROM), a flash memory or any other memory technology, a compact disc read-only memory (CD-ROM), a digital versatile disc (DVD) or any other optical memory or magnetic cassette type; and the magnetic disk of the magnetic tape or any other magnetic storage device or any other non-transmission medium may be used for storing information that may be accessed by the computing device. As defined herein, the computer readable medium does not include transitory media such as modulated data signals or carrier waves.

It should also be noted that, the terms "include", "comprise" or other variants thereof are intended to cover non-exclusive inclusions, such that the processes, methods, commodities or devices include a series of elements include the elements and further include other elements that are not expressly listed, or further include inherent elements of the processes, methods, commodities or devices. In absence of more limitations, elements defined in a statement "comprising one . . . " should not exclude additional identical elements existing in the processes, methods, commodities or devices including the elements.

Finally it should be noted that, the above embodiments are merely used for illustrating the technical solutions of the present disclosure, rather than limiting the present disclosure. Although the present disclosure is described in detail with reference to the above embodiments, those ordinary skilled in the art should understand that, the technical solutions recorded in the above embodiments may also be modified, or equivalent replacements may be made to partial technical features in the technical solutions. However, these modifications or replacements avoid the essence of the corresponding technical solutions from departing from the spirit and scope of the technical solutions in the various embodiments of the present disclosure.

What is claimed is:

1. A generating method of structured data for an Internet-of-Things device, comprising:
generating candidate structured data in a structured data creation process, and displaying the candidate structured data to a user; and
receiving uploaded structured data edited by the user with respect to the candidate structured data, and taking the uploaded structured data as structured data generated by the user in a structured data creation process;
wherein the generating candidate structured data in the structured data creation process comprises:
acquiring operation data of the user in the structured data creation process; and
comparing the operation data in a preset structured data template library to determine a target structured data template matched with the operation data, and applying the operation data to the target structured data template to generate candidate structured data corresponding to the operation data.

2. The method according to claim 1, wherein the preset structured data template library is generated according to the following manners:
acquiring a structured data sample and processing the structured data sample into an operation step sequence, wherein the operation step sequence serves as a structured data template of the structured data sample; and
dividing the structured data template into a corresponding structured data template set according to a preset dimension to generate a structured data template library comprising a plurality of structured data template sets.

3. The method according to claim 2, wherein the processing the structured data sample into the operation step sequence comprises:
processing the object data into an addition object step sequence in accordance with an object addition sequence with respect to object data in the structured data sample; and
processing the operation data into an operation step sequence in accordance with an operation time sequence with respect to the operation data in the structured data sample.

4. The method according to claim 1, wherein the determining the target structured data template matched with the operation data comprises:
processing the operation data into an operation step sequence, and generating a classification code corresponding to the operation step sequence to determine the target structured data template matched with the operation data according to the generated classification code.

5. The method according to claim 1, wherein, after receiving the uploaded structured data edited by the user for the candidate structured data, further comprising:
if uploading structured data confirmed by the user is received, taking the confirmed uploaded structured data as a structured data template if the uploaded structured data confirmed by the user is received, and adding the uploaded structured data into a corresponding structured data template set of the structured data template library;
writing modified uploaded structured data into a manual annotation library if the uploaded structured data modified by the user is received, and taking the modified uploaded structured data as a structured data template to be added into a structured data template set matched with an added label after a label is added for the modified uploaded structured data in a manual annotation mode.

6. A generating system of structured data for an Internet-of-Things device, comprising:
a candidate structured data generating unit, used for generating candidate structured data in a structured data creation process and displaying the candidate structured data to a user; and
a structured data editing unit, used for receiving uploaded structured data edited by the user with respect to the candidate structured data, and taking the uploaded structured data as structured data generated by the user in a structured data creation process;
wherein the candidate structured data generating unit comprises:
an operation data acquisition module, used for acquiring operation data of the user in the structured data creation process; and
a structured data comparison module, used for comparing the operation data in a preset structured data template library to determine a target structured data template matched with the operation data, and applying the operation data to the target structured data template to generate candidate structured data corresponding to the operation data.

7. An Internet-of-Things device, comprising: a memory and a processor, wherein the memory is used for storing a computer program, and the computer program is used for realizing the following functions when executed by the processor:
generating candidate structured data in a structured data creation process, and displaying the candidate structured data to a user; and
receiving uploaded structured data edited by the user with respect to the candidate structured data, and taking the uploaded structured data as structured data generated by the user in a structured data creation process;
wherein the generating candidate structured data in the structured data creation process comprises:
acquiring operation data of the user in the structured data creation process; and
comparing the operation data in a preset structured data template library to determine a target structured data template matched with the operation data, and applying the operation data to the target structured data template to generate candidate structured data corresponding to the operation data.

* * * * *